(12) United States Patent
Kakehashi et al.

(10) Patent No.: US 9,643,469 B2
(45) Date of Patent: May 9, 2017

(54) VEHICLE THERMAL MANAGEMENT SYSTEM

(71) Applicant: DENSO CORPORATION, Kariya, Aichi-pref. (JP)

(72) Inventors: Nobuharu Kakehashi, Toyoake (JP); Takashi Yamanaka, Kariya (JP); Masayuki Takeuchi, Nukata-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 472 days.

(21) Appl. No.: 14/376,316

(22) PCT Filed: Jan. 30, 2013

(86) PCT No.: PCT/JP2013/000504
§ 371 (c)(1),
(2) Date: Aug. 1, 2014

(87) PCT Pub. No.: WO2013/114874
PCT Pub. Date: Aug. 8, 2013

(65) Prior Publication Data
US 2014/0374081 A1    Dec. 25, 2014

(30) Foreign Application Priority Data

Feb. 2, 2012   (JP) .................................. 2012-020905
Apr. 3, 2012   (JP) .................................. 2012-084444
Dec. 20, 2012  (JP) .................................. 2012-278552

(51) Int. Cl.
*B60H 1/00*   (2006.01)
*B60K 11/02*   (2006.01)
(Continued)

(52) U.S. Cl.
CPC .......... *B60H 1/00278* (2013.01); *B60H 1/04* (2013.01); *B60H 1/143* (2013.01); *B60H 1/32* (2013.01);
(Continued)

(58) Field of Classification Search
CPC . B60H 1/04; B60H 1/143; B60H 1/32; B60H 1/00278; B60K 11/02;
(Continued)

(56) References Cited

U.S. PATENT DOCUMENTS 5,834,132 A      11/1998  Hasegawa et al.
5,904,052 A  *   5/1999  Inoue ................. B60H 1/00007
                                                                165/43
(Continued)

FOREIGN PATENT DOCUMENTS

JP    H08138762 A    5/1996
JP    2006512540 A   4/2006
(Continued)

OTHER PUBLICATIONS

International Search Report and Written Opinion (in Japanese with English Translation) for PCT/JP2013/000504, mailed May 7, 2013; ISA/JP.
(Continued)

*Primary Examiner* — Ljiljana Ciric
(74) *Attorney, Agent, or Firm* — Harness, Dickey & Pierce, P.L.C.

(57) ABSTRACT

A heat medium discharge side of a first pump and a heat medium discharge side of a second pump are connected to a first switching valve in parallel with each other. Respective heat medium inlet sides of a plurality of temperature adjustment devices are connected to the first switching valve in parallel with each other. Respective heat medium outlet sides of the temperature adjustment devices are connected to
(Continued)

a second switching valve in parallel with each other. A heat medium suction side of the first pump and a heat medium suction side of the second pump are connected to the second switching valve in parallel with each other. Each of the temperature adjustment devices is switched between a state in which the heat medium circulates between the device and the first pump, and another state in which the heat medium circulates between the device and the second pump.

24 Claims, 61 Drawing Sheets

(51) Int. Cl.
    *B60H 1/14*         (2006.01)
    *B60H 1/04*         (2006.01)
    *B60H 1/32*         (2006.01)
    *H01M 10/625*     (2014.01)
    *B60K 1/00*         (2006.01)
    *H01M 10/6561*    (2014.01)

(52) U.S. Cl.
    CPC ........... *B60K 11/02* (2013.01); *H01M 10/625* (2015.04); *B60K 2001/003* (2013.01); *B60K 2001/005* (2013.01); *H01M 10/6561* (2015.04)

(58) Field of Classification Search
    CPC ....... B60K 2001/003; B60K 2001/005; H01M 10/625; H01M 10/6561
    See application file for complete search history.

(56) References Cited

U.S. PATENT DOCUMENTS

| | | | |
|---|---|---|---|
| 6,092,383 A | 7/2000 | Mertens | |
| 6,357,541 B1* | 3/2002 | Matsuda | B60K 6/22 165/43 |
| 9,464,829 B2* | 10/2016 | Ue | F24F 1/32 |
| 2005/0006076 A1 | 1/2005 | Moeller et al. | |
| 2005/0066524 A1 | 3/2005 | Moeller et al. | |
| 2005/0204587 A1* | 9/2005 | Kime | E01H 10/007 37/266 |
| 2006/0118066 A1 | 6/2006 | Martins | |
| 2007/0245737 A1* | 10/2007 | Inaba | B60H 1/00885 60/670 |
| 2008/0251303 A1 | 10/2008 | Rouaud et al. | |
| 2010/0100266 A1* | 4/2010 | Yoshinori | B60K 1/04 701/22 |
| 2011/0113800 A1* | 5/2011 | Sekiya | B60H 1/00278 62/151 |
| 2012/0205088 A1* | 8/2012 | Morisita | B60H 1/00921 165/202 |
| 2012/0210746 A1 | 8/2012 | Kadle et al. | |
| 2013/0098092 A1* | 4/2013 | Wakamoto | F25B 1/10 62/278 |
| 2013/0298591 A1* | 11/2013 | Ohno | B60H 1/00278 62/426 |
| 2014/0033761 A1* | 2/2014 | Kawakami | B60H 1/00278 62/498 |
| 2014/0038009 A1* | 2/2014 | Okawa | H01M 10/486 429/62 |
| 2014/0103128 A1* | 4/2014 | Patel | B60H 1/00885 237/5 |
| 2015/0000327 A1 | 1/2015 | Kakehashi et al. | |
| 2015/0101789 A1* | 4/2015 | Enomoto | B60H 1/00485 165/202 |
| 2015/0217622 A1* | 8/2015 | Enomoto | B60H 1/00878 165/42 |
| 2015/0258875 A1* | 9/2015 | Enomoto | B60L 1/003 165/104.31 |
| 2015/0273976 A1* | 10/2015 | Enomoto | B60K 6/22 165/202 |
| 2016/0031291 A1* | 2/2016 | Enomoto | B60H 1/00385 62/179 |
| 2016/0153343 A1* | 6/2016 | Kakehashi | B60H 1/00885 123/41.31 |
| 2016/0318499 A1* | 11/2016 | Yamanaka | B60W 10/06 |
| 2016/0332505 A1* | 11/2016 | Yamanaka | B60H 1/03 |

FOREIGN PATENT DOCUMENTS

| | | |
|---|---|---|
| JP | 2006321269 A | 11/2006 |
| JP | 2009507717 A | 2/2009 |
| JP | 2009202794 A | 9/2009 |
| JP | 2010272289 A | 12/2010 |
| JP | 2011098628 A | 5/2011 |
| JP | 2011121551 A | 6/2011 |
| JP | 2011157035 A | 8/2011 |

OTHER PUBLICATIONS

Office Action dated Aug. 18, 2015 issued in the corresponding JP Application No. 2013-004966 with English Translation.

* cited by examiner

VEHICLE THERMAL MANAGEMENT SYSTEM

CROSS REFERENCE TO RELATED APPLICATION APPLICATIONS

This application is a U.S. National Phase Application under 35 U.S.C. 371 of International Application No. PCT/JP2013/000504 filed on Jan. 30, 2013 and published in Japanese as WO 2013/114874 A1 on Aug. 8, 2013. This application is based on Japanese Patent Applications No. 2012-020905 filed on Feb. 2, 2012, No. 2012-084444 filed on Apr. 3, 2012, and No. 2012-278552 filed on Dec. 20, 2012. The entire disclosures of all of the above applications are incorporated herein by reference.

FIELD OF THE INVENTION

The present disclosure relates to a thermal management system used for a vehicle.

BACKGROUND OF THE INVENTION

Conventionally, as disclosed in Patent Document 1, there is proposed a heat controller for cooling a motor generator, an inverter, a battery, and a vehicle compartment of an electric vehicle.

The heat controller in the related art includes a cooling circuit for allowing a coolant for cooling the motor generator and the inverter to circulate therethrough, a first circulation circuit for allowing a coolant for cooling the battery and vehicle compartment to circulate therethrough, and a second circulation circuit for allowing a coolant exchanging heat with outside air through an outdoor heat exchanger to circulate therethrough.

Further, the heat controller includes a first valve for connecting/disconnecting between the cooling circuit and the first circulation circuit, a second valve for connecting the cooling circuit to either the first circulation circuit or second circulation circuit, and a third valve for connecting/disconnecting between the cooling circuit and the second circulation circuit. The respective valves are controlled to switch the subject of connection of the cooling circuit between the first and second circulation circuits.

Heat can be transferred by a heat transfer device between the coolant circulating through the first circulation circuit and the coolant circulating through the second circulation circuit. The heat transfer device transfers the heat from the coolant at a high temperature to the coolant at a low temperature between the coolants in the first and second circulation circuits.

The heat of the coolant in the first circulation circuit is transferred to the coolant in the second circulation circuit by the heat transfer device, and the heat of the coolant in the second circulation circuit can be dissipated into the outside air by the outdoor heat exchanger, thereby cooling the battery and vehicle compartment.

The cooling circuit is connected to the first circulation circuit or second circulation circuit by use of the first to third valves, so that the heat of the coolant in the cooling circuit can be dissipated into the outside air by the outdoor heat exchanger in the second circulation circuit, thereby cooling the motor generator and inverter.

PRIOR ART DOCUMENT

Patent Document

Patent document 1: JP 2011-121551 A

SUMMARY OF INVENTION

The related art described above has an advantage that only one outdoor heat exchanger is required to cool a plurality of temperature adjustment devices, including the motor generator, the inverter, the battery, and the vehicle compartment in a cooling system. However, the entire circuit configuration might become complicated. In this case, as the number of temperature adjustment devices is increased, the circuit configuration becomes more complicated.

For example, the temperature adjustment devices which require cooling include an EGR cooler, an intake air cooler, and the like, in addition to the motor generator, the inverter, and the battery. Those devices have different required cooling temperatures.

In order to appropriately cool the respective temperature adjustment devices, the coolant to circulate through the respective devices is proposed to be switchable among the devices, which leads to an increase in the number of circulation circuits according to the number of devices for the temperature adjustment. Together with the increase, the number of valves for connecting/disconnecting between the respective circulation circuits and the cooling circuit is also increased, which results in a complicated structure of flow paths for connecting the respective circulation circuits and the cooling circuit.

The present disclosure has been made in view of foregoing points, and it is an object of the present disclosure to simplify the structure of a vehicle thermal management system that can switch heat media circulating through a plurality of temperature adjustment devices.

To achieve the above object, a vehicle thermal management system according to an aspect of the present disclosure includes: a first pump and a second pump drawing and discharging a heat medium; a heat medium heat exchanger that exchanges heat between the heat medium and outside air; a plurality of temperature adjustment devices with temperatures adjusted by the heat medium, each of the temperature adjustment devices having a flow path that allows the heat medium to flow therethrough; a first switching valve that switches an inflow state of the heat medium flowing into each of the temperature adjustment devices between one state in which the heat medium discharged from the first pump flows to the temperature adjustment devices, and another state in which the heat medium discharged from the second pump flows to the temperature adjustment devices, wherein a heat medium discharge side of the first pump and a heat medium discharge side of the second pump are connected in parallel with each other, and respective heat medium inlet sides of the temperature adjustment devices are connected in parallel with each other; a second switching valve that switches an outflow state of the heat medium from each of the temperature adjustment devices between one state in which the heat medium flowing out of the temperature adjustment devices flows to the first pump, and another state in which the heat medium flowing out of the temperature adjustment devices flows to the second pump, wherein a heat medium suction side of the first pump and a heat medium suction side of the second pump are connected in parallel with each other, and respective heat medium outlet sides of the temperature adjustment devices are connected in parallel with each other; and a controller that controls operations of the first switching valve and the second switching valve to switch between (i) one circulation state of the heat medium circulating between the first pump and the temperature adjustment devices, and (ii) another circulation state of the heat medium circulating between the second pump and the temperature adjustment devices.

Accordingly, the temperature adjustment devices are connected in parallel between the first and second switching valves for switching the flows of heat media. With such a simple structure, the heat media circulating through the temperature adjustment devices can be switched among the devices of interest.

EMBODIMENTS FOR CARRYING OUT INVENTION

First Embodiment

Figure 1:
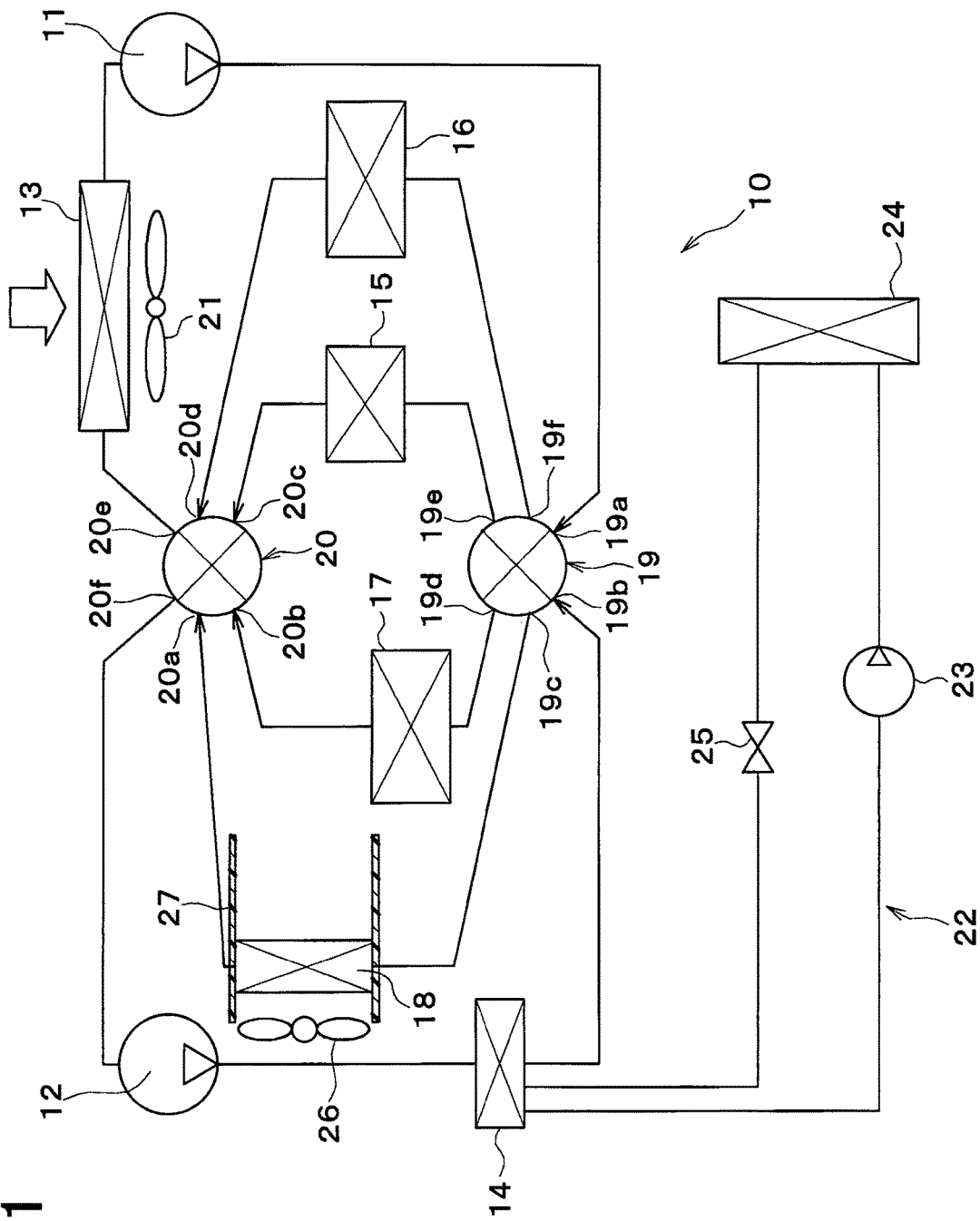
FIG. 1 is an entire configuration diagram of a vehicle thermal management system according to a first embodiment of the invention.

In the following, a first embodiment of the invention will be described based on FIGS. 1 to 15. A vehicle thermal management system 10 shown in FIG. 1 is used to cool various devices mounted on a vehicle (devices requiring cooling or heating) or an interior of the vehicle to an appropriate temperature.

In this embodiment, the cooling system 10 is applied to a hybrid car that can obtain the driving force for traveling from both an internal combustion engine (engine) and an electric motor for traveling.

A hybrid car of this embodiment is configured as a plug-in hybrid car that can charge a battery (vehicle-mounted battery) mounted on the vehicle, with power supplied from an external power source (commercial power source) during stopping of the vehicle. For example, a lithium ion battery can be used as the battery.

A driving force output from the engine is used not only for traveling of the vehicle, but also for operating a generator. Power generated by the generator and power supplied from the external power source can be stored in the battery. The power stored in the battery can be supplied not only to the electric motor for traveling, but also to various vehicle-mounted devices, such as electric components included in the cooling system.

As shown in FIG. 1, the cooling system 10 includes a first pump 11, a second pump 12, a radiator 13, a coolant cooler 14, a battery cooler 15, an inverter cooler 16, an exhaust gas cooler 17, a cooler core 18, a first switching valve 19, and a second switching valve 20.

The first ump 11 and the second pump 12 are an electric pump for drawing and discharging the coolant (heat medium). The coolant is preferably liquid containing at least ethylene glycol or dimethylpolysiloxane.

The radiator 13 is a heat exchanger for heat dissipation (radiator) that dissipates heat of the coolant into the outside air by exchanging heat between the coolant and the outside air. The coolant outlet side of the radiator 13 is connected to the coolant suction side of the first pump 11. An outdoor blower 21 is an electric blower for blowing the outside air to the radiator 13. The radiator 13 and the outdoor blower 21 are disposed at the forefront of the vehicle. Thus, during traveling of the vehicle, the radiator 13 can face the traveling air.

The coolant cooler 14 is a cooling device for cooling the coolant by exchanging heat between the coolant and a low-pressure refrigerant of a refrigeration cycle 22. The coolant inlet side of the coolant cooler 14 is connected to the coolant discharge side of the second pump 12.

The coolant cooler 14 serves as an evaporator of the refrigeration cycle 22. The refrigeration cycle 22 is an evaporation compression refrigerator which includes a compressor 23, a condenser 24, an expansion valve 25, and the coolant cooler 14 as the evaporator. The refrigeration cycle 22 of this embodiment employs a fluorocarbon refrigerant as the refrigerant, and forms a subcritical refrigeration cycle whose high-pressure side refrigerant pressure does not exceed the critical pressure of the refrigerant.

The compressor 23 is an electric compressor driven by power supplied from the battery. The compressor 23 draws and compresses the refrigerant in the refrigeration cycle 22 to discharge the compressed refrigerant therefrom. The condenser 24 is a high-pressure side heat exchanger for condensing a high-pressure refrigerant by exchanging heat between the outside air and the high-pressure refrigerant discharged from the compressor 23.

The expansion valve 25 is a decompression device for decompressing and expanding a liquid-phase refrigerant condensed by the condenser 24. The coolant cooler 14 is a low-pressure side heat exchanger for evaporating a low-pressure refrigerant by exchanging heat between the coolant and the low-pressure refrigerant decompressed and expanded by the expansion valve 25. The gas-phase refrigerant evaporated at the coolant cooler 14 is sucked into and compressed by the compressor 23.

The radiator 13 serves to cool the coolant by the outside air, while the coolant cooler 14 serves to cool the coolant by the low-pressure refrigerant of the refrigeration cycle 22. Thus, the temperature of the coolant cooled by the coolant cooler 14 is lower than that of the coolant cooled by the radiator 13.

Specifically, the radiator 13 cannot cool the coolant to a temperature lower than that of the outside air, whereas the coolant cooler 14 can cool the coolant to a temperature lower than that of the outside air.

Hereinafter, the coolant cooled by the outside air in the radiator 13 is referred to as an "intermediate-temperature coolant", and the coolant cooled by the low-pressure refrigeration of the refrigerant cycle 22 in the coolant cooler 14 is referred to as a "low-temperature coolant".

Each of the coolant cooler 14, the battery cooler 15, the inverter cooler 16, the exhaust gas cooler 17, and the cooler core 18 is the device whose temperature is adjusted by either the intermediate-temperature coolant or the low-temperature coolant.

The battery cooler 15 has a flow passage for coolant, and cools the battery by dissipating the heat of the battery into the coolant.

The battery preferably has its temperature maintained in a range of about 10 to 40° C. for the purpose of preventing the reduction in output, charging efficiency, degradation, and the like.

The inverter cooler 16 has a flow passage for coolant, and cools the inverter by dissipating the heat of the inverter into the coolant.

The inverter is a power converter that converts a direct-current (DC) power supplied from the battery to an alternating-current (AC) voltage to output the AC voltage to an electric motor for traveling. The inverter preferably has its temperature maintained at 65° C. or lower for the purpose of preventing the degradation thereof or the like.

The exhaust gas cooler 17 has a flow passage for coolant, and cools exhaust gas by dissipating the heat of the exhaust gas of the engine into the coolant. The exhaust gas cooled by the exhaust gas cooler 17 is returned to the intake side of the engine. The exhaust gas returned to the intake side of the engine has its temperature maintained in a range of 40 to 100° C. for the purpose of reducing the engine loss, and preventing knocking and generation of NOX, and the like.

The cooler core 18 is a heat exchanger for cooling (air cooler) that cools blast air by exchanging heat between the coolant and the blast air. An indoor blower 26 is an electric blower for blowing the outside air to the cooler core 18. The cooler core 18 and the indoor blower 26 are disposed inside a casing 27 of the indoor air conditioning unit.

Each of the first and second switching valves 19 and 20 is a flow switching device that switches the flow of coolant. The first switching valve 19 and second switching valve 20 have the same basic structure. However, the first switching valve 19 differs from the second switching valve 20 in that an inlet and outlet for the coolant are reversed to each other.

The first switching valve 19 includes two inlets 19a and 19b as an inlet for the coolant, and four outlets 19c, 19d, 19e, and 19f as an outlet for the coolant.

The inlet 19a is connected to the coolant discharge side of the first pump 11. The inlet 19b is connected to the coolant outlet side of the coolant cooler 14.

The outlet 19c is connected to the coolant inlet side of the cooler core 18. The outlet 19d is connected to the coolant inlet side of the exhaust gas cooler 17. The outlet 19e is connected to the coolant inlet side of the battery cooler 15. The outlet 19f is connected to the coolant inlet side of the inverter cooler 16.

The second switching valve 20 includes inlets 20a, 20b, 20c, and 20d as an inlet for the coolant, and outlets 20e, and 20f as an outlet for the coolant.

The inlet 20a is connected to the coolant outlet side of the cooler core 18. The inlet 20b is connected to the coolant outlet side of the exhaust gas cooler 17. The inlet 20c is connected to the coolant outlet side of the battery cooler 15. The inlet 20d is connected to the coolant outlet side of the inverter cooler 16.

The outlet 20e is connected to the coolant inlet side of the radiator 13. The outlet 20f is connected to the coolant suction side of the second pump 12.

The first switching valve 19 is configured to be capable of switching among three types of communication states between the inlets 19a and 19b and the outlets 19c, 19d, 19e, and 19f. The second switching valve 20 is also configured to be capable of switching among three types of communication states between the inlets 20a, 20b, 20c, and 20d and the outlets 20e, and 20f.

Figure 2:
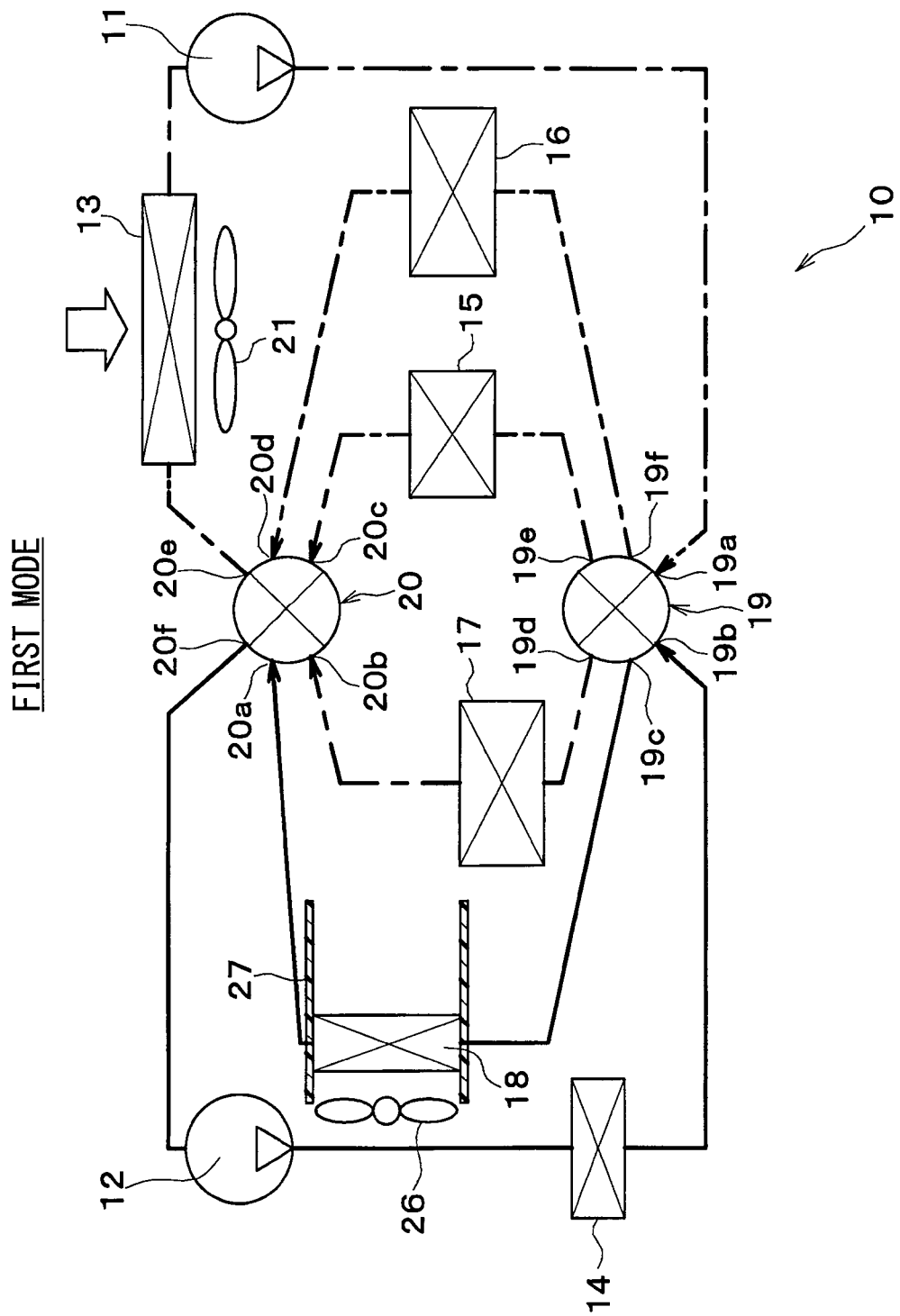
FIG. 2 is a diagram for explaining a first mode in the vehicle thermal management system of FIG. 1.

FIG. 2 shows the operation (first mode) of the cooling system 10 when the first and second switching valves 19 and 20 are switched to a first state.

In the first state, the first switching valve 19 connects the inlet 19a with the outlets 19d, 19e, and 19f, and also connects the inlet 19b with the outlet 19c. Thus, the first switching valve 19 allows the coolant entering the inlet 19a to flow out of the outlets 19d, 19e, and 19f as indicated by alternate long and short dash lines with arrows in FIG. 2, and also allows the coolant entering the inlet 19b to flow out of the outlet 19c as indicated by a solid arrow in FIG. 2.

In the first state, the second switching valve 20 connects the inlets 20b, 20c, and 20d with the outlet 20e, and also connects the inlet 20a with the outlet 20f. Thus, the second switching valve 20 allows the coolant entering the inlets 20b, 20c, and 20d to flow out of the outlet 20e as indicated by alternate long and short dash lines with arrows in FIG. 2, and also allows the coolant entering the inlet 20a to flow out of the outlet 20f as a solid arrow in FIG. 2.

Figure 3:
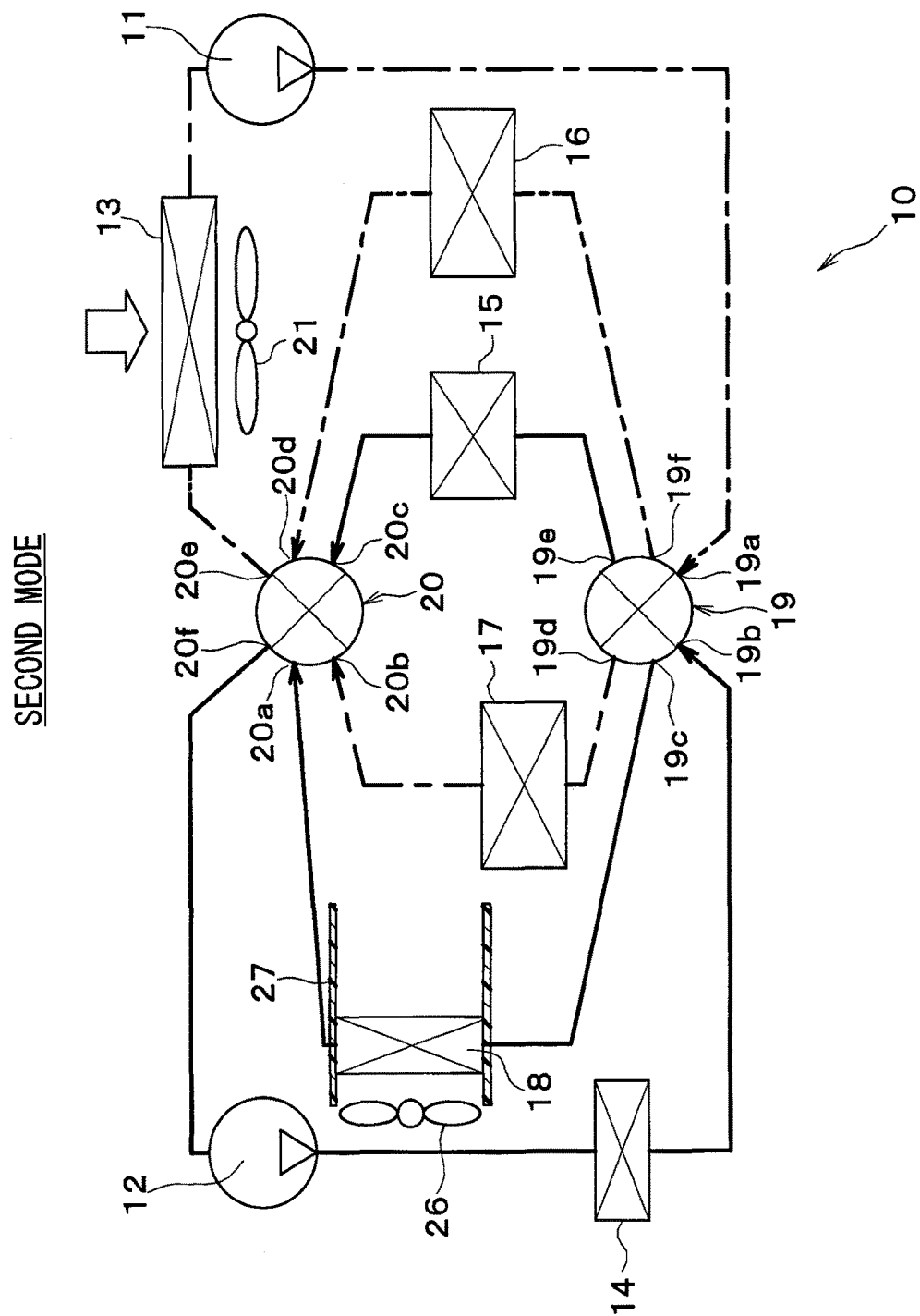
FIG. 3 is a diagram for explaining a second mode in the vehicle thermal management system of FIG. 1.

FIG. 3 shows the operation (second mode) of the cooling system 10 when the first and second switching valves 19 and 20 are switched to a second state.

In the second state, the first switching valve 19 connects the inlet 19a with the outlets 19d, and 19f, and also connects the inlet 19b with the outlets 19c and 19e. Thus, the first switching valve 19 allows the coolant entering the inlet 19a to flow out of the outlets 19d and 19f as indicated by alternate long and short dash lines with arrows in FIG. 3, and also allows the coolant entering the inlet 19b to flow out of the outlets 19c and 19e as indicated by solid arrows in FIG. 3.

In the second state, the second switching valve 20 connects the inlets 20a and 20c with the outlet 20f, and also connects the inlet 20b and 20d with the outlet 20e. Thus, the second switching valve 20 allows the coolant entering the inlets 20b and 20d to flow out of the outlet 20e as indicated by alternate long and short dash lines with arrows in FIG. 3, and also allows the coolant entering the inlets 20a and 20c to flow out of the outlet 20f as indicated by solid lines with an arrow in FIG. 3.

Figure 4:
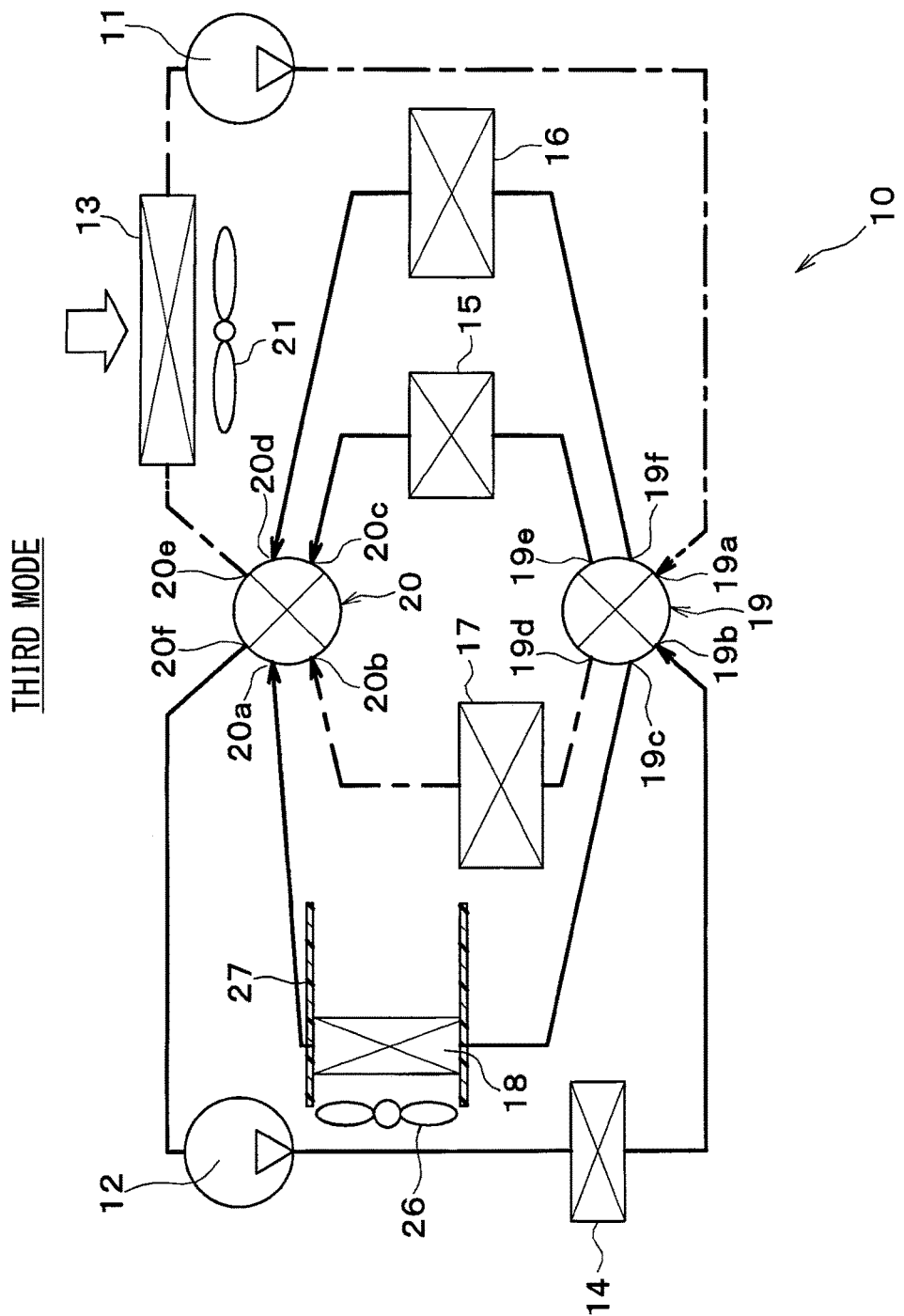
FIG. 4 is a diagram for explaining a third mode in the vehicle thermal management system of FIG. 1.

FIG. 4 shows the operation (third mode) of the cooling system 10 when the first and second switching valves 19 and 20 are switched to a third state.

In the third state, the first switching valve 19 connects the inlet 19a with the outlet 19d, and also connects the inlet 19b with the outlets 19c, 19e, and 19f. Thus, the first switching valve 19 allows the coolant entering the inlet 19a to flow out of the outlet 19d as indicated by an alternate long and short dash line with an arrow in FIG. 4, and also allows the coolant entering the inlet 19b to flow out of the outlets 19c, 19e, and 19f as indicated by solid arrows in FIG. 4.

In the third state, the second switching valve 20 connects the inlet 20b with the outlet 20e and also connects the inlets 20a, 20c, and 20d with the outlet 20f. Thus, the second switching valve 20 allows the coolant entering the inlet 20b to flow out of the outlet 20e as indicated by an alternate long and short dash line with an arrow in FIG. 4, and also allows the coolant entering the inlets 20a, 20c, and 20d to flow out of the outlet 20f as indicated by a solid arrow in FIG. 4.

Figure 5:
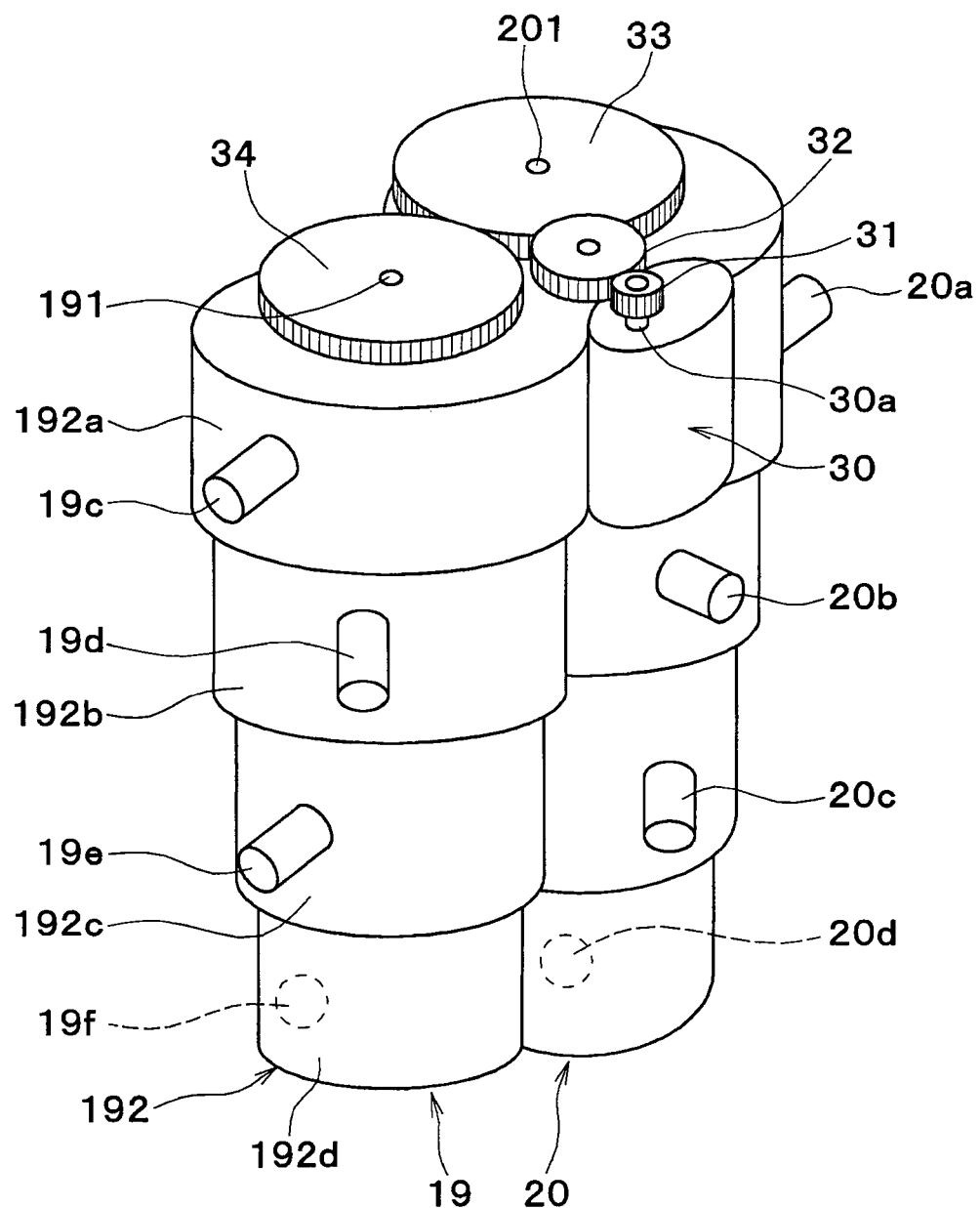
FIG. 5 is a perspective view showing a first switching valve and a second switching valve in the first embodiment.

As shown in FIG. 5, the first switching valve 19 and the second switching valve 20 include rotary shafts 191 and 201 of valve elements, respectively. A rotative force of an output shaft 30a of an electric motor 30 for a switching valve is transmitted to the rotary shafts 191 and 201 via gears 31, 32, 33, and 34. Thus, by the common electric motor 30 for a switching valve, the valve elements of the first and second switching valves 19 and 20 are driven to cooperatively rotate.

Alternatively, an electric motor for a switching valve may be individually provided in each of the first and the second switching valves 19 and 20. In such a case, the operations of the two electric motors for the switching valves may be cooperatively controlled, whereby the valve elements of the first and second switching valves 19 and 20 are driven to cooperatively rotate.

The first switching valve 19 and the second switching valve 20 have the same basic structure. In the following, the specific structure of the first switching valve 19 will be described, and thus the description of the specific structure of the second switching valve 20 will be omitted.

The first switching valve 19 includes a case 192 serving as an outer shell. The case 192 is formed in a substantially cylindrical shape extending in the longitudinal direction of the rotary shaft 191 of the valve element (in the vertical direction of FIG. 5). The rotary shaft 191 of the valve element penetrates one end surface (upper end surface shown in FIG. 5) of the case 192.

The cylindrical surface of the case 192 has outer and inner diameters thereof decreased in four stages from one end side (upper end side of FIG. 5) to the other end side (lower end side of FIG. 5). Specifically, at the cylindrical surface of the case 192, a first cylindrical portion 192a with the largest outer and inner diameters, a second cylindrical portion 192b with the second largest outer and inner diameters, a third cylindrical portion 192c with the third largest outer and inner diameters, and a fourth cylindrical portion 192d with the smallest outer and inner diameters are formed in that order from the one end side to the other end side.

The first cylindrical portion 192a is provided with the outlet 19c. The second cylindrical portion 192b is provided with the outlet 19d. The third cylindrical portion 192c is provided with the outlet 19e. The fourth cylindrical portion 192d is provided with the outlet 19f.

Figure 6:
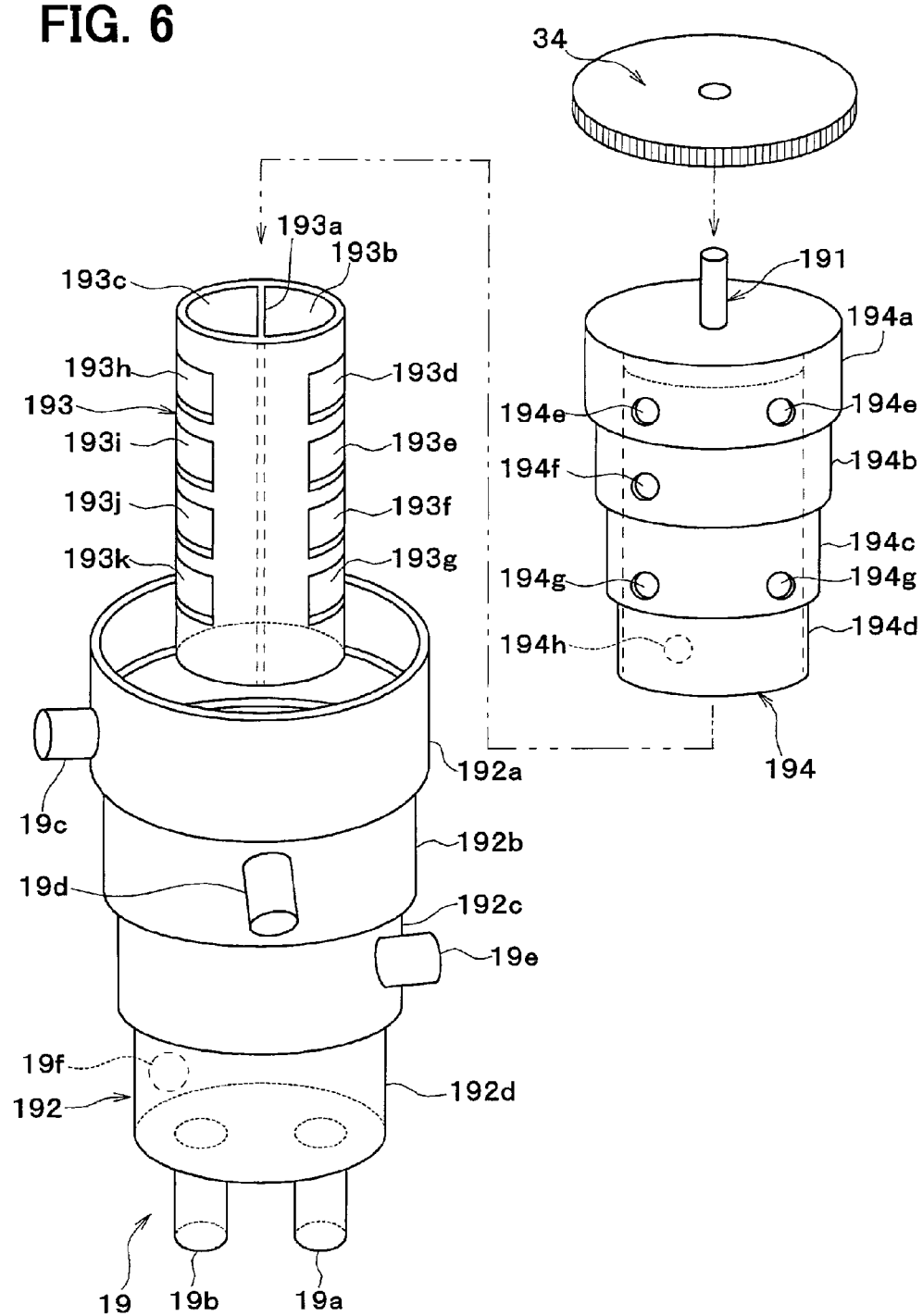
FIG. 6 is an exploded perspective view of the first switching valve of FIG. 5.

As shown in FIG. 6, at the other end surface of the case 192 (lower end surface shown in FIG. 6), the inlet 19a for coolant and the inlet 19b for coolant are formed.

An inner cylindrical member 193 is inserted into an internal space of the case 192. The inner cylindrical member 193 is formed in a cylindrical shape with constant inner and outer diameters, and positioned coaxially with respect to the case 192. One end of the inner cylindrical member 193 on the other end side of the case 192 (the lower end thereof shown in FIG. 6) is fixed in close contact with the other end surface of the case 192.

A partition plate 193a is provided within the inner cylindrical member 193. The partition plate 193a is formed across the entire area of the inner cylindrical member 193 in the axial direction thereof to partition the internal space of the inner cylindrical member 193 into two half-round spaces 193b and 193c.

The first space 193b of the two spaces 193b and 193c communicates with the inlet 19a of the case 192, and the second space 193c thereof communicates with the inlet 19b of the case 192.

The cylindrical surface of the inner member 193 is provided with four openings 193d, 193e, 193f, and 193g communicating with the first space 193b, and four openings 193h, 193i, 193j, and 193k communicating with the second space 193c.

With the inner cylindrical portion 193 inserted into the case 192, the openings 193d and 193h of the inner cylindrical member 193 are opposed to the first cylindrical portion 192a of the cylindrical member 193, the openings 193e and 193i are opposed to the second cylindrical portion 192b of the inner cylindrical member 193, the openings 193f and 193j are opposed to the third cylindrical portion 192c of the inner cylindrical member 193, and the openings 193g and 193k are opposed to the fourth cylindrical portion 192d of the inner cylindrical member 193.

A valve element 194 for opening and closing eight openings 193d to 193k of the inner cylindrical member 193 is inserted into between the case 192 and the inner cylindrical member 193. The valve element 194 is formed in a substantially cylindrical shape, and positioned coaxially with respect to the case 192 and the inner cylindrical member 193.

A rotary shaft 191 is fixed to the center of one end surface (upper end surface of FIG. 6) of the valve element 194. The valve element 194 is rotatable with the rotary shaft 191 centered with respect to the case 192 and the inner cylindrical member 193.

The inner diameter of the valve element 194 is set constant, like the outer diameter of the inner cylindrical member 193. Like the inner diameter of the case 192, the outer diameter of the valve element 194 is decreased in four stages from one end side to the other end side thereof.

Specifically, at the outer peripheral surface of the valve element 194, a first cylindrical portion 194a with the largest outer diameter, a second cylindrical portion 194b with the second largest outer diameter, a third cylindrical portion 194c with the third largest outer diameter, and a fourth cylindrical portion 194d with the smallest outer diameter are formed in that order from the one end side to the other end side.

With the valve element 194 inserted into between the case 192 and the inner cylindrical member 193, the first cylindrical portion 194a of the valve element 194 is opposed to the first cylindrical portion 192a of the case 192, the second cylindrical portion 194b of the valve element 194 is opposed to the second cylindrical portion 192b of the case 192, the third cylindrical portion 194c of the valve element 194 is opposed to the third cylindrical portion 194c of the case 192, and the fourth cylindrical portion 194d of the valve element 194 is opposed to the fourth cylindrical portion 194d of the case 192.

A plurality of holes 194e is formed at the first cylindrical portion 194a of the valve element 194. A plurality of holes 194f is formed at the second cylindrical portion 194b of the valve element 194. A plurality of holes 194g is formed at the third cylindrical portion 194c of the valve element 194. A plurality of holes 194h is formed at the fourth cylindrical portion 194d of the valve element 194.

Figure 7:
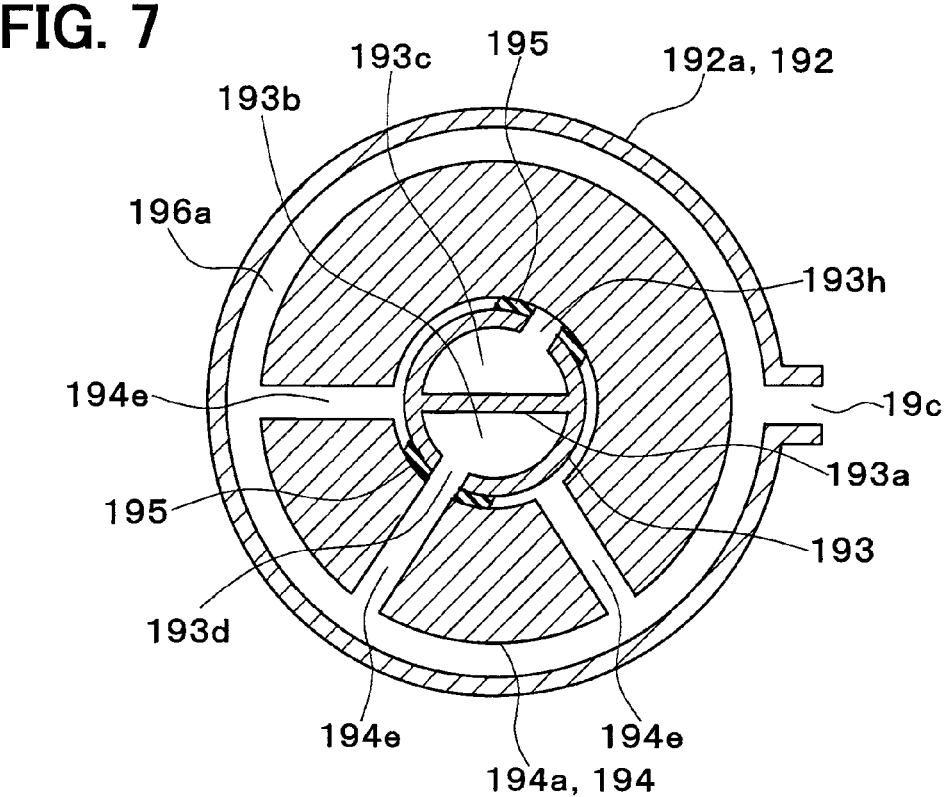
FIG. 7 is a cross-sectional view of the first switching valve of FIG. 5.

FIG. 7 is a cross-sectional view of the first switching valve 19 taken at a part of the first cylindrical portion 194a of the valve element 194 in the direction perpendicular to the axial direction thereof.

The three holes 194e of the first cylindrical portion 194a of the valve element 194 are formed in the circumferential direction of the first cylindrical portion 194a. When the valve element 194 is located in a predetermined rotating position, the holes 194e are superimposed over the openings 193d and 193h of the inner cylindrical member 193.

A packing 195 is fixed to the periphery of each of the openings 193*d* and 193*h* of the inner cylindrical member 193. The packing 195 is in close contact with the first cylindrical portion 194*a* of the valve element 194, and serves to seal a gap between the first cylindrical portion 194*a* and the openings 193*d* and 193*h* of the inner cylindrical member 193 in a liquid-tight manner.

A first ring-like space 196*a* is formed between the first cylindrical portion 194*a* of the valve element 194 and the first cylindrical portion 192*a* of the case 192. The first ring-like space 196*a* communicates with the outlet 19*c*.

Figure 8:
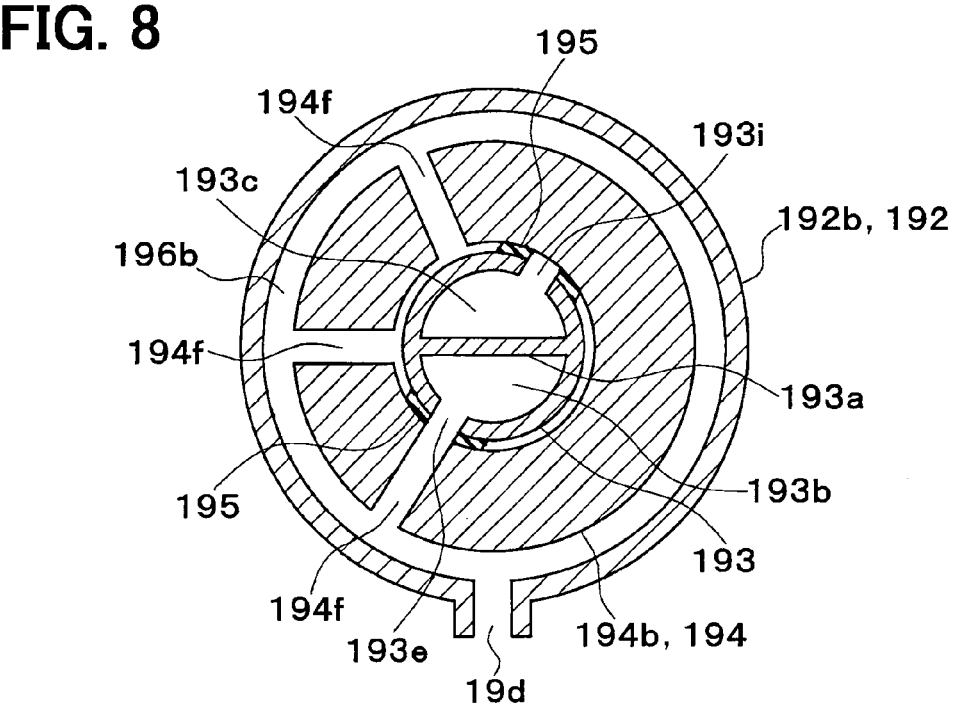
FIG. 8 is another cross-sectional view of the first switching valve of FIG. 5.

FIG. 8 is a cross-sectional view of the first switching valve 19 taken at a part of the second cylindrical portion 194*b* of the valve element 194 in the direction perpendicular to the axial direction thereof.

The three holes 194*f* of the second cylindrical portion 194*b* of the valve element 194 are formed in the circumferential direction of the second cylindrical portion 194*b*. When the valve element 194 is located in a predetermined rotating position, the holes 194*f* are superimposed over the openings 193*e* and 193*i* of the inner cylindrical member 193.

The packing 195 is fixed to the periphery of each of the openings 193*e* and 193*i* of the inner cylindrical member 193. The packing 195 is in close contact with the second cylindrical portion 194*b* of the valve element 194, and serves to seal a gap between the second cylindrical portion 194*b* and the openings 193*e* and 193*i* of the inner cylindrical member 193 in a liquid-tight manner.

A second ring-like space 196*b* is formed between the second cylindrical portion 194*b* of the valve element 194 and the second cylindrical portion 192*b* of the case 192. The second ring-like space 196*b* communicates with the outlet 19*d*.

Figure 9:
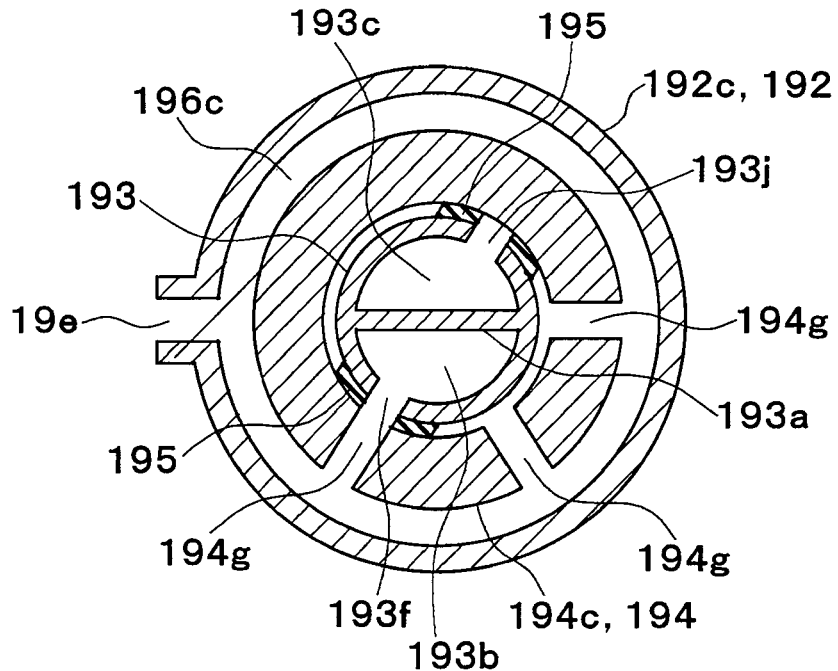
FIG. 9 is another cross-sectional view of the first switching valve of FIG. 5.

FIG. 9 is a cross-sectional view of the first switching valve 19 taken at a part of the third cylindrical portion 194*c* of the valve element 194 in the direction perpendicular to the axial direction thereof.

The three holes 194*g* of the third cylindrical portion 194*c* of the valve element 194 are formed in the circumferential direction of the third cylindrical portion 194*c*. When the valve element 194 is located in a predetermined rotating position, the holes 194*g* are superimposed over the openings 193*f* and 193*j* of the inner cylindrical member 193.

The packing 195 is fixed to the periphery of each of the openings 193*f* and 193*j* of the inner cylindrical member 193. The packing 195 is in close contact with the third cylindrical portion 194*c* of the valve element 194, and serves to seal a gap between the third cylindrical portion 194*c* and the openings 193*f* and 193*j* of the inner cylindrical member 193 in a liquid-tight manner.

A third ring-like space 196*c* is formed between the third cylindrical portion 194*c* of the valve element 194 and the third cylindrical portion 192*c* of the case 192. The third ring-like space 196*c* communicates with the outlet 19*e*.

Figure 10:
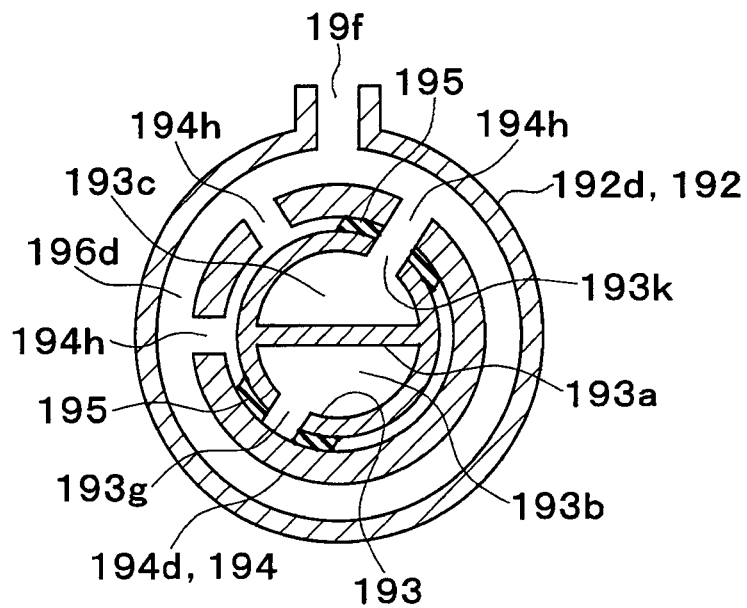
FIG. 10 is another cross-sectional view of the first switching valve of FIG. 5.

FIG. 10 is a cross-sectional view of the first switching valve 19 taken at a part of the fourth cylindrical portion 194*d* of the valve element 194 in the direction perpendicular to the axial direction thereof.

The three holes 194*h* of the fourth cylindrical portion 194*d* of the valve element 194 are formed in the circumferential direction of the third cylindrical portion 194*c*. When the valve element 194 is located in a predetermined rotating position, the holes 194*h* are superimposed over the openings 193*g* and 193*k* of the inner cylindrical member 193.

The packing 195 is fixed to the periphery of each of the openings 193*g* and 193*k* of the inner cylindrical member 193. The packing 195 is in close contact with the fourth cylindrical portion 194*d* of the valve element 194, and serves to seal a gap between the fourth cylindrical portion 194*d* and the openings 193*g* and 193*k* of the inner cylindrical member 193 in a liquid-tight manner.

A fourth ring-like space 196*d* is formed between the fourth cylindrical portion 194*d* of the valve element 194 and the fourth cylindrical portion 192*d* of the case 192. The fourth ring-like space 196*d* communicates with the outlet 19*f*.

Figure 11:
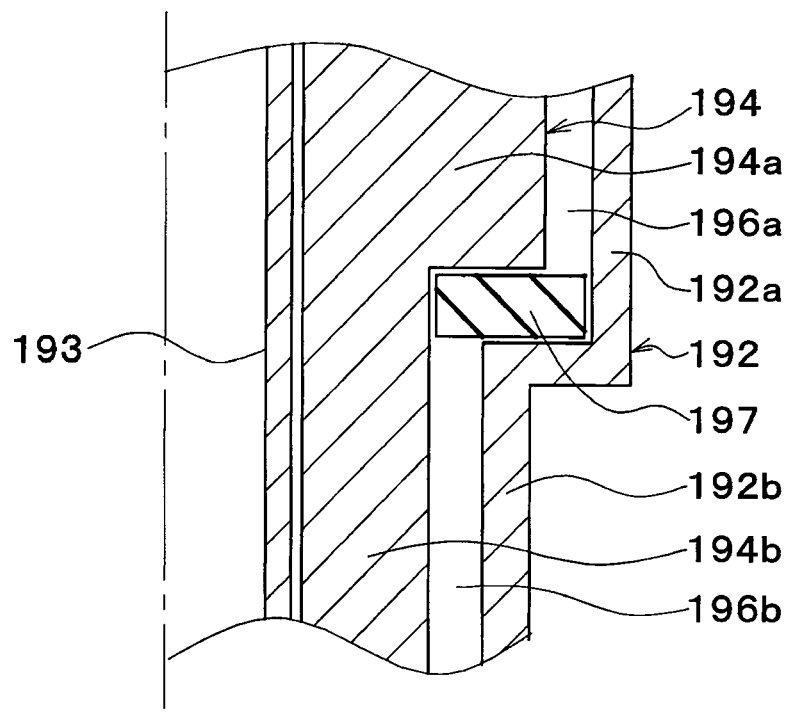
FIG. 11 is another cross-sectional view of the first switching valve of FIG. 5.

As shown in FIG. 11, a gap between the first ring-like space 196*a* and the second ring-like space 196*b* is sealed by a packing 197 in a liquid-tight manner. The packing 197 is formed in a ring-like shape so as to have its entire periphery sandwiched between a stepped surface of the valve element 194 and a stepped surface of the case 192.

Although not shown, a gap between the second and third ring-like spaces 196*b* and 196*c*, as well as a gap between the third and fourth ring-like spaces 196*c* and 196*d* are also sealed by the ring-like packing 197 in the liquid-tight manner.

Figure 12:
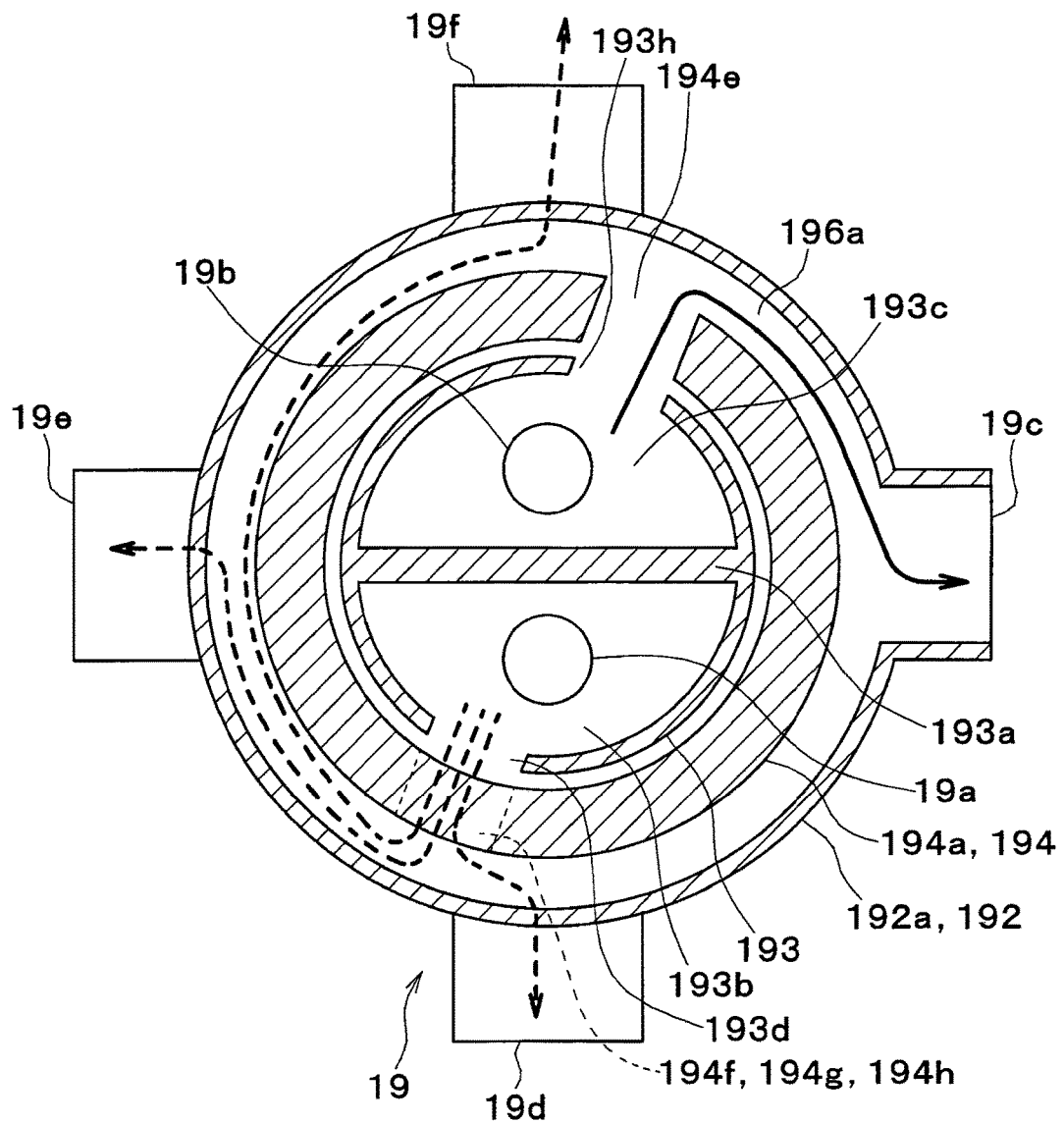
FIG. 12 is a cross-sectional view showing a first state of the first switching valve of FIG. 5.

The first state of the first switching valve 19 will be described below based on FIG. 12. FIG. 12 is a cross-sectional view of the first switching valve 19 taken at a part of the first cylindrical portion 194*a* of the valve element 194 in the direction perpendicular to the axial direction thereof. For better understanding of the description, FIG. 12 illustrates only one of three holes of each of the types 194*e*, 194*f*, 194*g*, and 194*h* while omitting the illustration of other remaining two holes 194*e*, 194*f*, 194*g*, and 194*h* of each type.

In the first state, the valve element 194 is rotated to the position shown in FIG. 12, so that the hole 194*e* of the first cylindrical portion 194*a* of the valve element 194 is superimposed over the opening 193*h* on the second space 193*c* side of the inner cylindrical member 193, thereby causing the first cylindrical portion 194*a* of the valve element 194 to close the opening 193*d* on the first space 193*b* side of the inner cylindrical member 193.

Thus, as indicated by the solid arrows in FIG. 12, the second space 193*c* of the inner cylindrical member 193 communicates with the outlet 19*c* via the opening 193*h* of the inner cylindrical member 193, the hole 194*e* of the valve element 194, and the first ring-like space 196*a*. On the other hand, the first space 193*b* of the inner cylindrical member 193 does not communicate with the outlet 19*c*.

Accordingly, in the first state, the outlet 19*c* communicates with the inlet 19*b*, and not with the inlet 19*a*.

Although not shown, in the first state, the hole 194*f* of the second cylindrical portion 194*b* of the valve element 194 is superimposed over the opening 193*e* on the first space 193*b* side of the inner cylindrical member 193, thereby causing the second cylindrical portion 194*b* of the valve element 194 to close the opening 193*i* on the second space 193*c* side of the inner cylindrical member 193.

Thus, as indicated by the dashed arrows in FIG. 12, the first space 193*b* of the inner cylindrical member 193 communicates with the outlet 19*d*, and the second space 193*c* of the inner cylindrical member 193 does not communicate with the outlet 19*d*. Accordingly, the outlet 19*d* communicates with the inlet 19*a*, and not with the inlet 19*b*.

Although not shown, in the first state, the hole 194*g* of the third cylindrical portion 194*c* of the valve element 194 is superimposed over the opening 193*f* on the first space 193*b* side of the inner cylindrical member 193, thereby causing the third cylindrical portion 194*c* of the valve element 194 to close the opening 193*j* on the second space 193*c* side of the inner cylindrical member 193.

Thus, as indicated by a broken line with an arrow in FIG. 12, the first space 193*b* of the inner cylindrical member 193 communicates with the outlet 19*e*, and the second space 193*c* of the inner cylindrical member 193 does not communicate with the outlet 19*e*. Accordingly, the outlet 19*e* communicates with the inlet 19*a*, and not with the inlet 19*b*.

Although not shown, in the first state, the hole 194*h* of the fourth cylindrical portion 194*d* of the valve element 194 is superimposed over the opening 193*g* on the first space 193*b* side of the inner cylindrical member 193, thereby causing the fourth cylindrical portion 194*d* of the valve element 194 to close the opening 193*k* on the second space 193*c* side of the inner cylindrical member 193.

Thus, as indicated by a broken line with an arrow in FIG. 12, the first space 193*b* of the inner cylindrical member 193 communicates with the outlet 19*f*, and the second space 193*c* of the inner cylindrical member 193 does not communicate with the outlet 19*f*. Accordingly, the outlet 19*f* communicates with the inlet 19*a*, and not with the inlet 19*b*.

Figure 13:
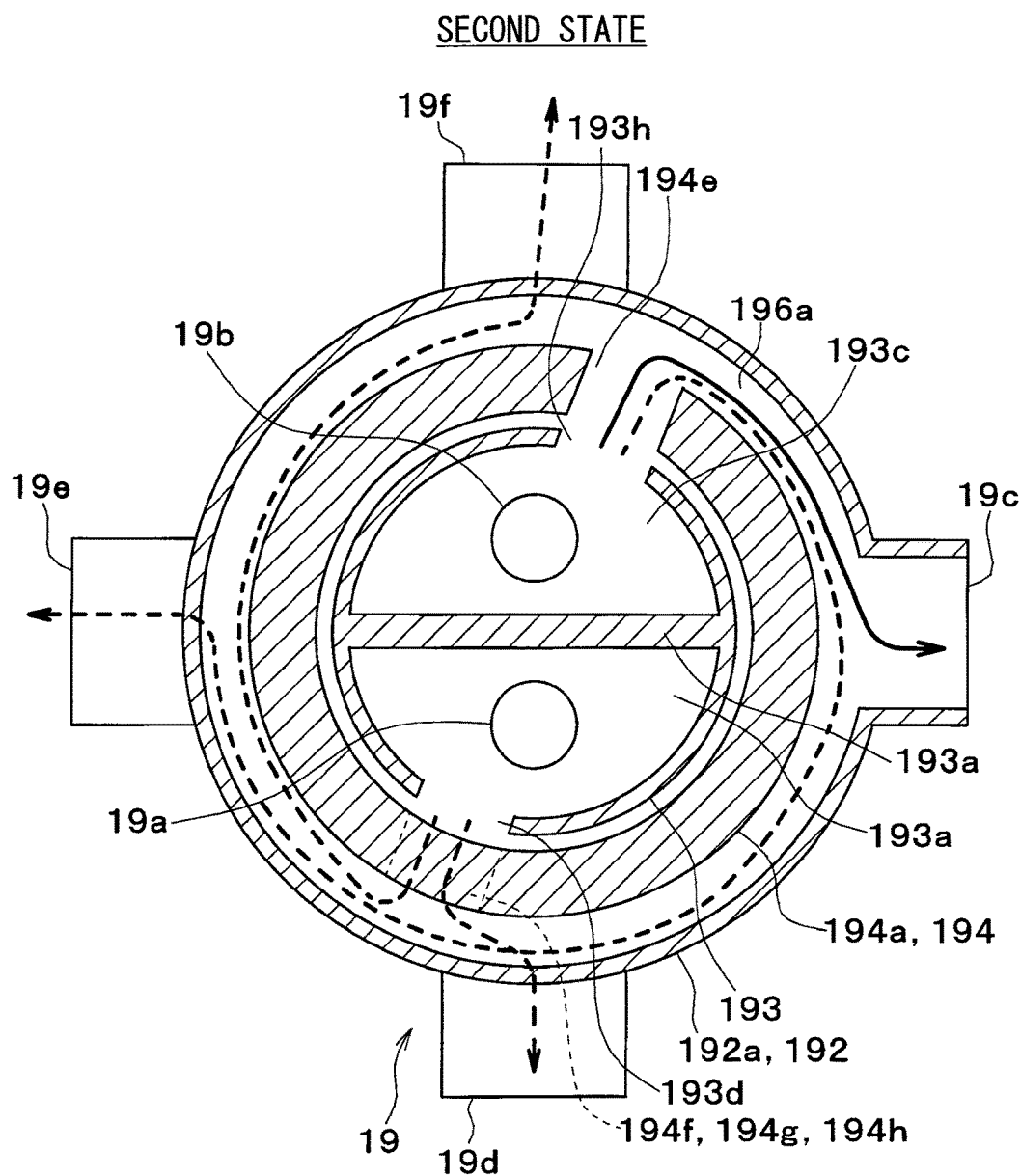
FIG. 13 is a cross-sectional view showing a second state of the first switching valve of FIG. 5.

The second state of the first switching valve 19 will be described below based on FIG. 13. FIG. 13 is a cross-sectional view of the first switching valve 19 taken at a part of the first cylindrical portion 194*a* of the valve element 194 in the direction perpendicular to the axial direction thereof. For better understanding of the description, FIG. 13 illustrates only one of three holes of each of the types 194*e*, 194*f*, 194*g*, and 194*h* while omitting the illustration of other remaining two holes 194*e*, 194*f*, 194*g*, and 194*h* of each type.

In the second state, the valve element 194 is rotated to the position shown in FIG. 13, so that the hole 194*e* of the first cylindrical portion 194*a* of the valve element 194 is superimposed over the opening 193*h* on the second space 193*c* side of the inner cylindrical member 193, thereby causing the first cylindrical portion 194*a* of the valve element 194 to close the opening 193*d* on the first space 193*b* side of the inner cylindrical member 193.

Thus, as indicated by a solid arrow in FIG. 13, the second space 193*c* of the inner cylindrical member 193 communicates with the outlet 19*c*, and the first space 193*b* of the inner cylindrical member 193 does not communicate with the outlet 19*c*. Accordingly, the outlet 19*c* communicates with the inlet 19*b*, and not with the inlet 19*a*.

Although not shown, in the second state, the hole 194*f* of the second cylindrical portion 194*b* of the valve element 194 is superimposed over the opening 193*e* on the first space 193*b* side of the inner cylindrical member 193, thereby causing the second cylindrical portion 194*b* of the valve element 194 to close the opening 193*i* on the second space 193*c* side of the inner cylindrical member 193.

Thus, as indicated by a broken line with an arrow in FIG. 13, the first space 193*b* of the inner cylindrical member 193 communicates with the outlet 19*d*, and the second space 193*c* of the inner cylindrical member 193 does not communicate with the outlet 19*d*. Accordingly, the outlet 19*d* communicates with the inlet 19*a*, and not with the inlet 19*b*.

Although not shown, in the second state, the hole 194*g* of the third cylindrical portion 194*c* of the valve element 194 is superimposed over the opening 193*j* on the second space 193*c* side of the inner cylindrical member 193, thereby causing the third cylindrical portion 194*c* of the valve element 194 to close the opening 193*f* on the first space 193*b* side of the inner cylindrical member 193.

Thus, as indicated by a broken line with an arrow in FIG. 13, the second space 193*c* of the inner cylindrical member 193 communicates with the outlet 19*e*, and the first space 193*b* of the inner cylindrical member 193 does not communicate with the outlet 19*e*. Accordingly, the outlet 19*e* communicates with the inlet 19*b*, and not with the inlet 19*a*.

Although not shown, in the second state, the hole 194*h* of the fourth cylindrical portion 194*d* of the valve element 194 is superimposed over the opening 193*g* on the first space 193*b* side of the inner cylindrical member 193, thereby causing the fourth cylindrical portion 194*d* of the valve element 194 to close the opening 193*k* on the second space 193*c* side of the inner cylindrical member 193.

Thus, as indicated by another broken line with an arrow in FIG. 13, the first space 193*b* of the inner cylindrical member 193 communicates with the outlet 19*f*, and the second space 193*c* of the inner cylindrical member 193 does not communicate with the outlet 19*f*. Accordingly, the outlet 19*f* communicates with the inlet 19*a*, and not with the inlet 19*b*.

Figure 14:
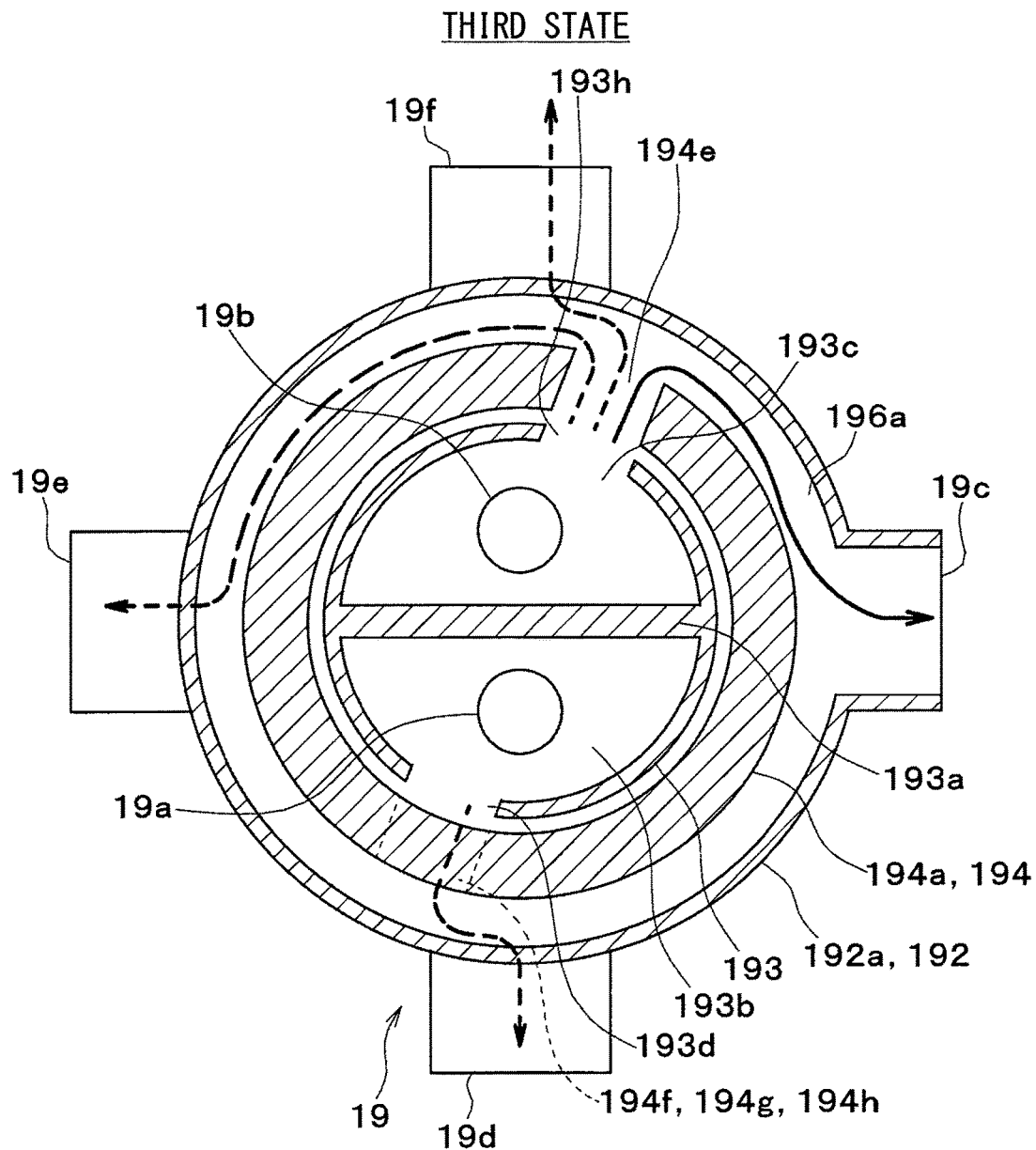
FIG. 14 is a cross-sectional view showing a third state of the first switching valve of FIG. 5.

The third state of the first switching valve 19 will be described below based on FIG. 14. FIG. 14 is a cross-sectional view of the first switching valve 19 taken at a part of the first cylindrical portion 194*a* of the valve element 194 in the direction perpendicular to the axial direction thereof. For better understanding of the description, FIG. 14 illustrates only one of three holes of each of the types 194*e*, 194*f*, 194*g*, and 194*h* while omitting the illustration of other remaining two holes 194*e*, 194*f*, 194*g*, and 194*h* of each type.

In the third state, the valve element 194 is rotated to the position shown in FIG. 14, so that the hole 194*e* of the first cylindrical portion 194*a* of the valve element 194 is superimposed over the opening 193*h* on the second space 193*c* side of the inner cylindrical member 193, thereby causing the first cylindrical portion 194*a* of the valve element 194 to close the opening 193*d* on the first space 193*b* side of the inner cylindrical member 193.

Thus, as indicated by a solid arrow in FIG. 14, the second space 193*c* of the inner cylindrical member 193 communicates with the outlet 19*c*, and the first space 193*b* of the inner cylindrical member 193 does not communicate with the outlet 19*c*. Accordingly, the outlet 19*c* communicates with the inlet 19*b*, and not with the inlet 19*a*.

Although not shown, in the third state, the hole 194*f* of the second cylindrical portion 194*b* of the valve element 194 is superimposed over the opening 193*e* on the first space 193*b* side of the inner cylindrical member 193, thereby causing the second cylindrical portion 194*b* of the valve element 194 to close the opening 193*i* on the second space 193*c* side of the inner cylindrical member 193.

Thus, as indicated by a broken line with an arrow in FIG. 14, the first space 193*b* of the inner cylindrical member 193 communicates with the outlet 19*d*, and the second space 193*c* of the inner cylindrical member 193 does not communicate with the outlet 19*d*. Accordingly, the outlet 19*d* communicates with the inlet 19*a*, and not with the inlet 19*b*.

Although not shown, in the third state, the hole 194*g* of the third cylindrical portion 194*c* of the valve element 194 is superimposed over the opening 193*j* on the second space 193*c* side of the inner cylindrical member 193, thereby causing the third cylindrical portion 194*c* of the valve element 194 to close the opening 193*f* on the first space 193*b* side of the inner cylindrical member 193.

Thus, as indicated by a broken line with an arrow in FIG. 14, the second space 193*c* of the inner cylindrical member 193 communicates with the outlet 19*e*, and the first space 193*b* of the inner cylindrical member 193 does not communicate with the outlet 19*e*. Accordingly, the outlet 19*e* communicates with the inlet 19*b*, and not with the inlet 19*a*.

Although not shown, in the third state, the hole 194h of the fourth cylindrical portion 194d of the valve element 194 is superimposed over the opening 193k on the second space 193c side of the inner cylindrical member 193, thereby causing the fourth cylindrical portion 194d of the valve element 194 to close the opening 193g on the first space 193b side of the inner cylindrical member 193.

Thus, as indicated by a broken line with an arrow in FIG. 14, the second space 193c of the inner cylindrical member 193 communicates with the outlet 19f, and the first space 193b of the inner cylindrical member 193 does not communicate with the outlet 19f. Accordingly, the outlet 19f communicates with the inlet 19b, and not with the inlet 19a.

Figure 15:
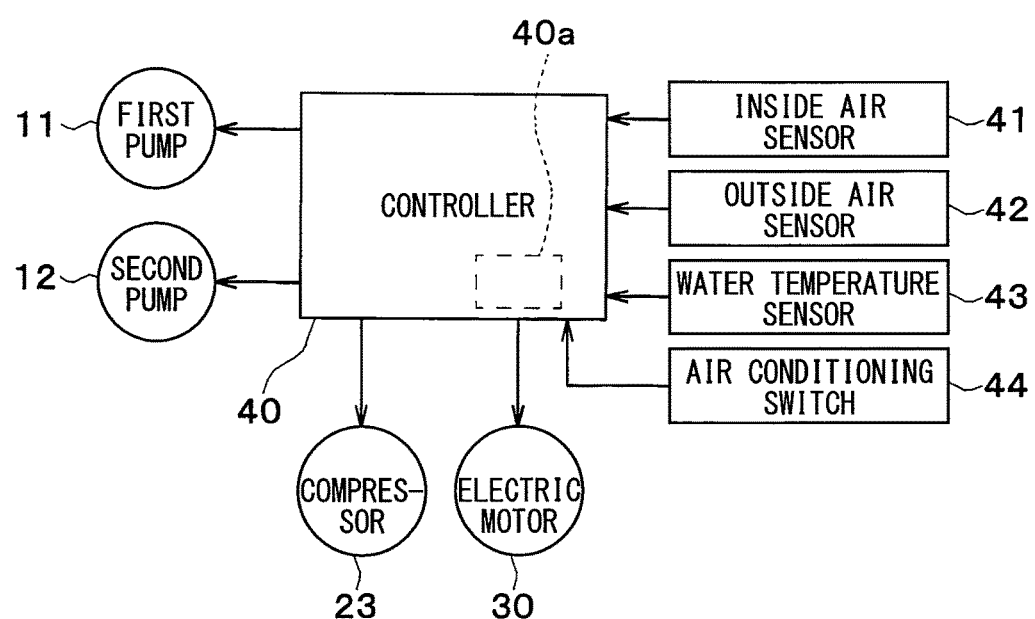
FIG. 15 is a block diagram showing an electric controller of the thermal management system for a vehicle shown in FIG. 1.

Next, an electric controller of the cooling system 10 will be described with reference to FIG. 15. A controller 40 is comprised of a known microcomputer, including CPU, ROM, RAM, and the like, and a peripheral circuit thereof. The controller 40 is a control device for controlling the operations of the devices connected to the output side thereof, including the first pump 11, the second pump 12, the compressor 23, the electric motor 30 for a switching valve, and the like by performing various kinds of computations and processing based on air conditioning control programs stored in the ROM.

The controller 40 is integrally structured with a control unit for controlling various devices for control connected to an output side thereof. The control unit for controlling the operations of the devices for control has a structure (hardware and software) that is adapted to control the operation of each of the devices for control.

In this embodiment, particularly, the structure (hardware and software) that controls the operation of the electric motor 30 for a switching valve acts as a switching valve controller 40a. Obviously, the switching valve controller 40a may be independently provided from the controller 40.

Detection signals from a group of sensors, including an inside air sensor 41, an outside air sensor 42, a water temperature sensor 43, and the like are input to the input side of the controller 40.

The inside air sensor 41 is a detector (inside air temperature detector) for detecting the temperature of inside air (temperature of the vehicle interior). The outside air sensor 42 is a detector (outside air temperature detector) for detecting the temperature of outside air. The water temperature sensor 43 is a detector (heat medium temperature detector) for detecting the temperature of coolant flowing therethrough directly after passing through the radiator 13.

An operation signal is input from an air conditioning switch 44 to the input side of the controller 40. The air conditioning switch 44 is a switch for switching an air conditioner between ON and OFF (in other words, ON and OFF of cooling), and disposed near a dash board in the vehicle compartment.

Now, the operation of the above-mentioned structure will be described. When an outside air temperature detected by the outside air sensor 42 is equal to or lower than 15° C., the controller 40 performs the first mode shown in FIG. 2. When an outside air temperature detected by the outside air sensor 42 ranges from more than 15° C. and less than 40° C., the controller 40 performs the second mode shown in FIG. 3. When an outside air temperature detected by the outside air sensor 42 is equal to or higher than 40° C., the controller 40 performs the third mode shown in FIG. 4.

In the first mode, the controller 40 controls the electric motor 30 for a switching valve such that the first switching valve 19 and the second switching valve 20 are brought into the first state shown in FIG. 2 to thereby operate the first and second pumps 11 and 12 and the compressor 23.

Thus, the first switching valve 19 connects the inlet 19a with the outlets 19d, 19e, and 19f, and also connects the inlet 19b with the outlet 19c. The second switching valve 20 connects the inlets 20b, 20c, and 20d with the outlet 20e, and also connects the inlet 20a with the outlet 20f.

Accordingly, a first coolant circuit (intermediate-temperature coolant circuit) is formed of the first pump 11, the battery cooler 15, the inverter cooler 16, the exhaust gas cooler 17, and the radiator 13, whereas a second coolant circuit (low-temperature coolant circuit) is formed of the second pump 12, the coolant cooler 14, and the cooler core 18.

That is, as indicated by alternate long and short dash lines with arrows in FIG. 2, the coolant discharged from the first pump 11 is branched by the first switching valve 19 into the battery cooler 15, the inverter cooler 16, and the exhaust gas cooler 17. Then, the coolant flows in parallel through the battery cooler 15, the inverter cooler 16, and the exhaust gas cooler 17 are collected into the second switching valve 20 to flow through the radiator 13, thereby being sucked into the first pump 11.

On the other hand, as indicated by a solid arrow in FIG. 2, the coolant discharged from the second pump 12 flows through the coolant cooler 14 and then through the cooler core 18 via the first switching valve 19 into the second switching valve 20. The coolant flows through the second switching valve 20, thereby being sucked into the second pump 12.

Thus, in the first mode, the intermediate-temperature coolant cooled by the radiator 13 flows through the battery cooler 15, the inverter cooler 16, and the exhaust gas cooler 17, whereas the low-temperature coolant cooled by the coolant cooler 14 flows through the cooler core 18.

As a result, the battery, the inverter, and the exhaust gas are cooled by the intermediate-temperature coolant, and the blast air into the vehicle interior is cooled by the low-temperature coolant.

For example, when the outside air temperature is about 15° C., the intermediate-temperature coolant cooled by the outside air in the radiator 13 becomes at a temperature of about 25° C., so that the intermediate-temperature coolant can sufficiently cool the battery, inverter, and exhaust gas.

The low-temperature coolant cooled by the low-pressure refrigerant of the refrigeration cycle 22 in the coolant cooler 14 is at about 0° C., so that the blast air into the vehicle interior can be sufficiently cooled by the low-temperature coolant.

In the first mode, the battery, inverter, and exhaust gas are cooled by the outside air, which can effectively achieve the energy saving as compared to the case in which the battery, inverter, and exhaust gas are cooled by the low-pressure refrigerant of the refrigeration cycle 22.

In the second mode, the controller 40 controls the electric motor 30 for a switching valve such that the first and second switching valves 19 and 20 are brought into the second state shown in FIG. 3 to thereby operate the first and second pumps 11 and 12 and the compressor 23.

Thus, the first switching valve 19 connects the inlet 19a with the outlets 19d and 19f, and also connects the inlet 19b with the outlets 19c and 19e. The second switching valve 20 connects the inlets 20b and 20d with the outlet 20e, and also connects the inlets 20a and 20c with the outlet 20f.

Accordingly, the first coolant circuit (intermediate-temperature coolant circuit) is formed of the first pump 11, the inverter cooler 16, the exhaust gas cooler 17, and the radiator 13, whereas the second coolant circuit (low-temperature coolant circuit) is formed of the second pump 12, the coolant cooler 14, the cooler core 18, and the battery cooler 15.

That is, as indicated by alternate long and short dash lines with arrows in FIG. 3, the coolant discharged from the first pump 11 is branched by the first switching valve 19 into the inverter cooler 16 and the exhaust gas cooler 17. Then, the coolants flowing in parallel through the inverter cooler 16 and the exhaust gas cooler 17 are collected into the second switching valve 20 to flow through the radiator 13, thereby being sucked into the first pump 11.

On the other hand, as indicated by solid arrows in FIG. 3, the coolant discharged from the second pump 12 flows through the coolant cooler 14, and is branched by the first switching valve 19 into the cooler core 18 and the battery cooler 15. Then, the coolants flowing in parallel through the cooler core 18 and the battery cooler 15 are collected into the second switching valve 20 to be sucked into the second pump 12.

That is, in the second mode, the intermediate-temperature coolant cooled by the radiator 13 flows through the inverter cooler 16 and the exhaust gas cooler 17, whereas the low-temperature coolant cooled by the coolant cooler 14 flows through the cooler core 18 and the battery cooler 15.

As a result, the inverter and the exhaust gas are cooled by the intermediate-temperature coolant, and the battery and the blast air into the vehicle interior are cooled by the low-temperature coolant.

For example, when the outside air temperature is about 25° C., the intermediate-temperature coolant cooled by the outside air in the radiator 13 becomes at a temperature of about 40° C., so that the intermediate-temperature coolant can sufficiently cool the inverter, and exhaust gas.

The low-temperature coolant cooled by the low-pressure refrigerant of the refrigeration cycle 22 in the coolant cooler 14 is at about 0° C., so that the battery and the blast air into the vehicle interior can be sufficiently cooled by the low-temperature coolant.

Since in the second mode the battery is cooled by the low-pressure refrigerant of the refrigeration cycle 22, the battery can be sufficiently cooled even when the outside air cannot cool the battery adequately because of the high temperature of the outside air.

In the third mode, the controller 40 controls the electric motor 30 for a switching valve such that the first and second switching valves 19 and 20 are brought into the third state shown in FIG. 4 to thereby operate the first and second pumps 11 and 12 and the compressor 23.

Thus, the first switching valve 19 connects the inlet 19a with the outlet 19d and also connects the inlet 19b with the outlets 19c, 19e, and 19f. The second switching valve 20 connects the inlet 20b with the outlet 20e, and also connects the inlets 20a, 20c, and 20d with the outlet 20f.

Accordingly, the first coolant circuit (intermediate-temperature coolant circuit) is formed of the first pump 11, the exhaust gas cooler 17, and the radiator 13, whereas the second coolant circuit (low-temperature coolant circuit) is formed of the second pump 12, the coolant cooler 14, the cooler core 18, the battery cooler 15, and the inverter cooler 16.

That is, as indicated by an alternate long and short dash line with an arrow in FIG. 4, the coolant discharged from the first pump 11 flows through the exhaust gas cooler 17 via the first switching valve 19, and then through the radiator 13 via the second switching valve 20, thereby being sucked into the first pump 11.

On the other hand, as indicated by solid arrows in FIG. 4, the coolant discharged from the second pump 12 flows through the coolant cooler 14, and is branched by the first switching valve 19 into the cooler core 18, the battery cooler 15, and the inverter cooler 16. Then, the coolants flowing in parallel through the cooler core 18, the battery cooler 15, and the inverter cooler 16 are collected into the second switching valve 20 to be sucked into the second pump 12.

Thus, in the third mode, the intermediate-temperature coolant cooled by the radiator 13 flows through the exhaust gas cooler 17, whereas the low-temperature coolant cooled by the coolant cooler 14 flows through the cooler core 18, the battery cooler 15, and the inverter cooler 16.

Thus, the exhaust gas is cooled by the coolant cooled by the radiator 13, and the blast air into the vehicle interior, the battery, and the inverter are cooled by the coolant cooled by the coolant cooler 14.

For example, when the outside air temperature is about 40° C., the intermediate-temperature coolant cooled by the outside air in the radiator 13 becomes at a temperature of about 50° C., so that the intermediate-temperature coolant can sufficiently cool the exhaust gas.

The low-temperature coolant cooled by the low-pressure refrigerant of the refrigeration cycle 22 in the coolant cooler 14 is at about 0° C., so that the blast air into the vehicle interior, the battery, and the inverter can be sufficiently cooled by the low-temperature coolant.

Since in the third mode the battery and the inverter are cooled by the low-pressure refrigerant of the refrigeration cycle 22, the battery and the inverter can be sufficiently cooled even when the outside air cannot cool the battery and the inverter adequately because of the very high temperature of the outside air.

This embodiment employs the simple structure in which the temperature adjustment devices 15, 16, 17, and 18 are connected in parallel between the first and second switching valves 19 and 20, so that the coolants circulating through the respective temperature adjustment devices 15, 16, 17, and 18 can be switched among the devices.

Specifically, the outside air temperature is detected as a temperature associated with the temperature of the coolant obtained after the heat exchange by the radiator 13, and then based on the outside air temperature detected, the operations of the first switching valve 19 and the second switching valve 20 are controlled to thereby perform the first to third modes. Thus, the coolant circulating through each of the temperature adjustment devices 15, 16, 17, and 18 can be switched among the devices according to the temperature of the coolant obtained after the heat exchange by the radiator 13.

More specifically, when the outside air temperature is lower than a predetermined temperature (15° C. in this embodiment), the first mode is performed to allow the coolant to circulate between the first pump 11 and each of the temperature adjustment devices 15, 16, 17, and 18. When the outside air temperature is higher than the predetermined temperature (15° C. in this embodiment), the operation is shifted from the second mode to the third mode as the outside air temperature becomes higher, which increases the number of devices for temperature for allowing the coolant to circulate through the second pump 12.

Thus, the cooling load of the coolant cooler 14 (that is, cooling load of the refrigeration cycle 22) can be changed according to the temperature of the coolant obtained after the heat exchange by the radiator 13, which can achieve the energy saving.

More specifically, the temperature adjustment devices 15, 16, 17, and 18 have different required cooling temperatures. When the outside air temperature is higher than the predetermined temperature (15° C. in this embodiment), as the outside air temperature becomes higher, the operation is shifted from the second mode to the third mode, whereby the coolant circulates starting from the device requiring the lower cooling temperature in the order of increasing the required cooling temperature to the second pump 12.

Thus, this embodiment can shift the circulation through the respective temperature adjustment devices 15, 16, 17, and 18 between the low-temperature coolant and the high-temperature coolant in accordance with the required coolant temperature thereof, which can appropriately cool the temperature adjustment devices 15, 16, 17, and 18, while achieving the energy saving.

Second Embodiment

Figure 16:
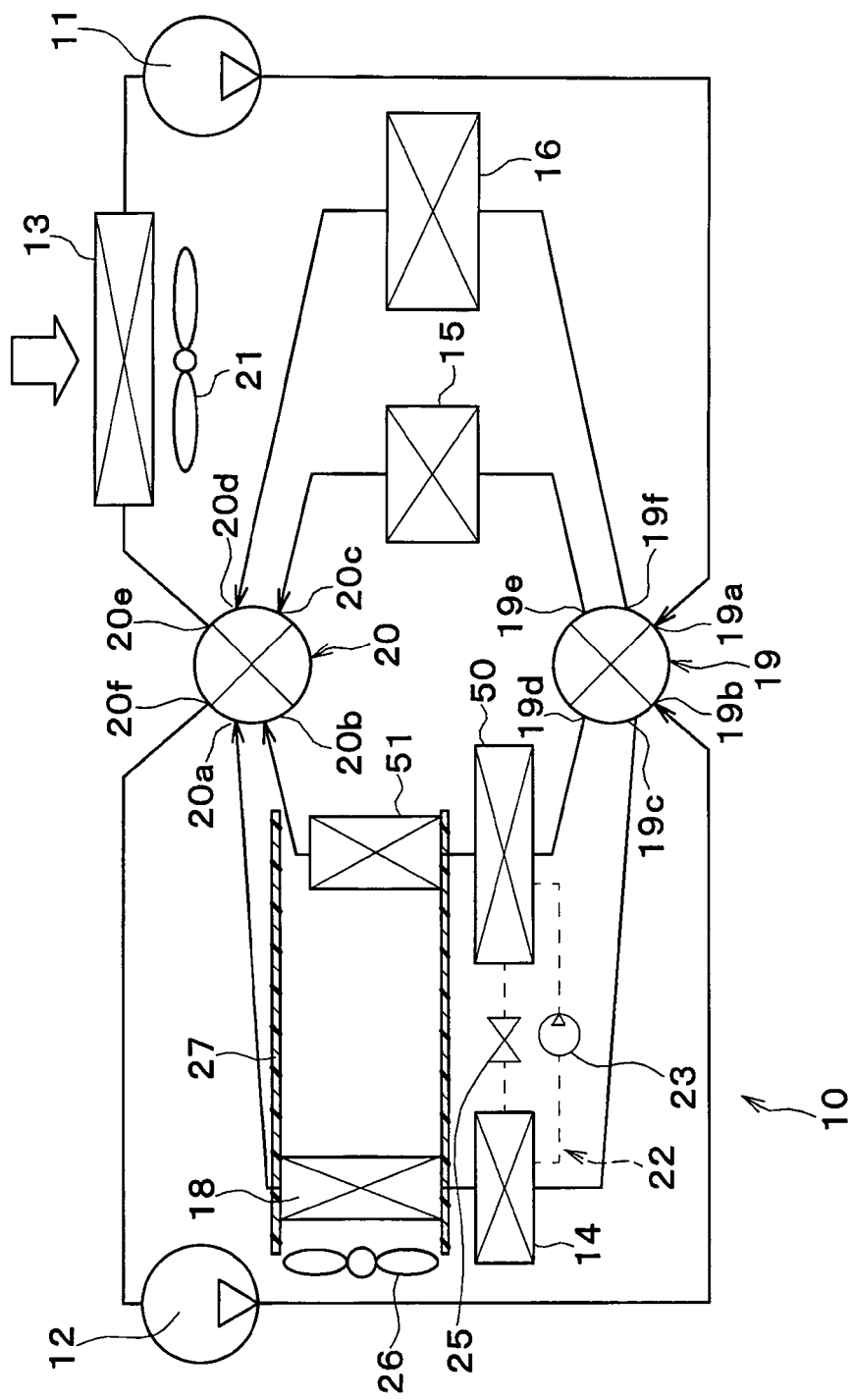
FIG. 16 is an entire configuration diagram of a thermal management system for a vehicle according to a second embodiment of the invention.

Although in the first embodiment, the exhaust gas cooler 17 is connected between the outlet 19d of the first switching valve 19 and the inlet 20b of the second switching valve 20, in a second embodiment, as shown in FIG. 16, a condenser 50 (temperature adjustment device) and a heater core 51 are connected between the outlet 19d of the first switching valve 19 and the inlet 20b of the second switching valve 20.

The condenser 50 is a high-pressure side heat exchanger for condensing a high-pressure refrigerant by exchanging heat between the coolant and the high-pressure refrigerant discharged from the compressor 23, thereby heating the coolant. The coolant inlet side of the condenser 50 is connected to the outlet 19d of the first switching valve 19.

The heater core 51 is a heat exchanger for heating that heats the blast air by exchanging heat between the coolant and the blast air having passed through the cooler core 18. The heater core 51 is disposed downstream of the air flow of the cooler core 18 within the casing 27 of the indoor air conditioning unit.

The coolant inlet side of the heater core 51 is connected to the coolant outlet side of the condenser 50. The coolant outlet side of the heater core 51 is connected to the inlet 20b of the second switching valve 20.

Although in the first embodiment, the coolant cooler 14 is connected between the discharge side of the first pump 11 and the inlet 19b of the first switching valve 19, in this embodiment, the coolant cooler 14 is connected between the first switching valve 19 and the cooler core 18. Specifically, the coolant inlet side of the coolant cooler 14 is connected to the outlet 19c of the first switching valve 19, and the coolant outlet side of the coolant cooler 14 is connected to the coolant inlet side of the cooler core 18.

The first switching valve 19 is configured to be capable of switching among the five types of communication states between the inlets 19a and 19b and the outlets 19c, 19d, 19e, and 19f. The second switching valve 20 is also configured to be capable of switching among five types of communication states between the inlets 20a, 20c, and 20d and the outlets 20e, and 20f.

Figure 17:
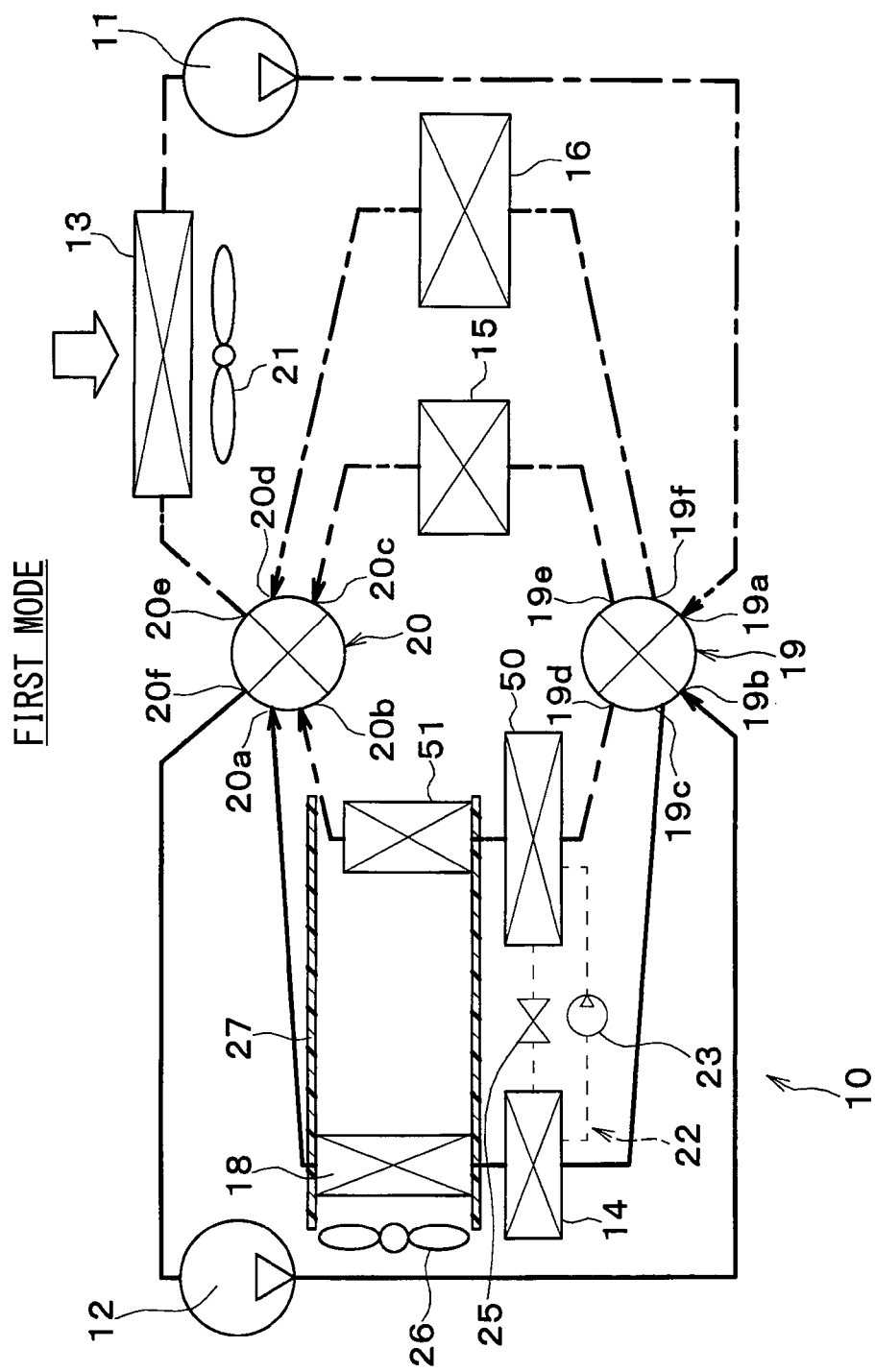
FIG. 17 is a diagram for explaining a first mode in the thermal management system for a vehicle of FIG. 16.

FIG. 17 shows the operation (first mode) of the cooling system 10 when the first and second switching valves 19 and 20 are switched to a first state.

In the first state, the first switching valve 19 connects the inlet 19a with the outlets 19d, 19e, and 19f, and also connects the inlet 19b with the outlet 19c. Thus, the first switching valve 19 allows the coolant entering the inlet 19a to flow out of the outlets 19d, 19e, and 19f as indicated by alternate long and short dash lines with arrows in FIG. 17, and also allows the coolant entering the inlet 19b to flow out of the outlet 19c as indicated by a solid arrow in FIG. 17.

In the first state, the second switching valve 20 connects the inlets 20b, 20c, and 20d with the outlet 20e, and also connects the inlet 20a with the outlet 20f. Thus, the second switching valve 20 allows the coolant entering the inlets 20b, 20c, and 20d to flow out of the outlet 20e as indicated by alternate long and short dash lines with arrows in FIG. 17, and also allows the coolant entering the inlet 20a to flow out of the outlet 20f as a solid arrow in FIG. 17.

Figure 18:
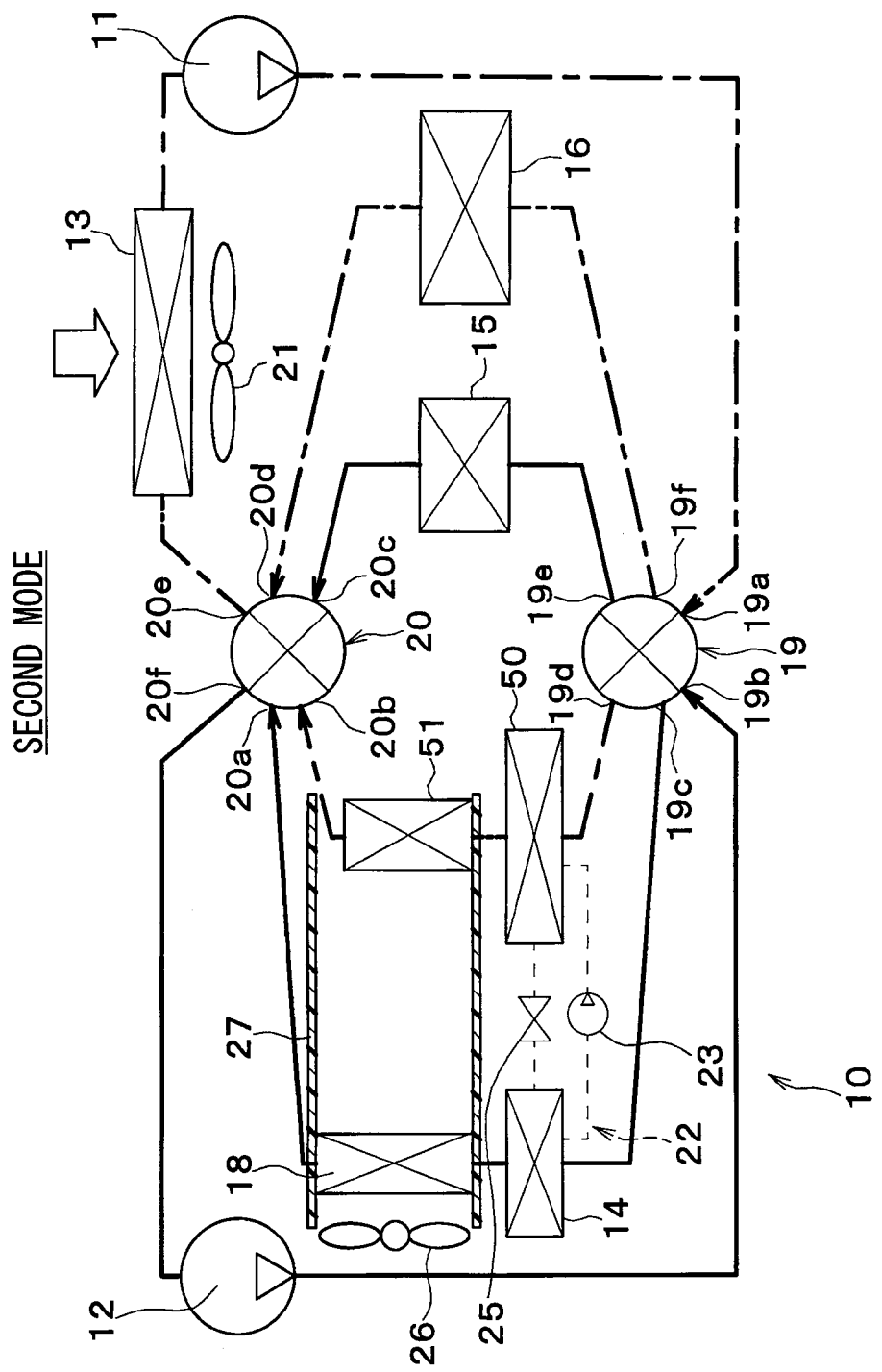
FIG. 18 is a diagram for explaining a second mode in the thermal management system for a vehicle of FIG. 16.

FIG. 18 shows the operation (second mode) of the cooling system 10 when the first and second switching valves 19 and 20 are switched to a second state.

In the second state, the first switching valve 19 connects the inlet 19a with the outlets 19d, and 19f, and also connects the inlet 19b with the outlets 19c and 19e. Thus, the first switching valve 19 allows the coolant entering the inlet 19a to flow out of the outlets 19d and 19f as indicated by dashed-dotted lines with arrows in FIG. 18, and also allows the coolant entering the inlet 19b to flow out of the outlets 19c and 19e as indicated by solid arrows in FIG. 18.

In the second state, the second switching valve 20 connects the inlets 20b and 20d with the outlet 20e and also connects the inlets 20a, and 20c with the outlet 20f. Thus, the second switching valve 20 allows the coolant entering the inlets 20b and 20d to flow out of the outlet 20e as indicated by alternate long and short dash lines with arrows in FIG. 18, and also allows the coolant entering the inlets 20a and 20c to flow out of the outlet 20f as indicated by solid lines with an arrow in FIG. 18.

Figure 19:
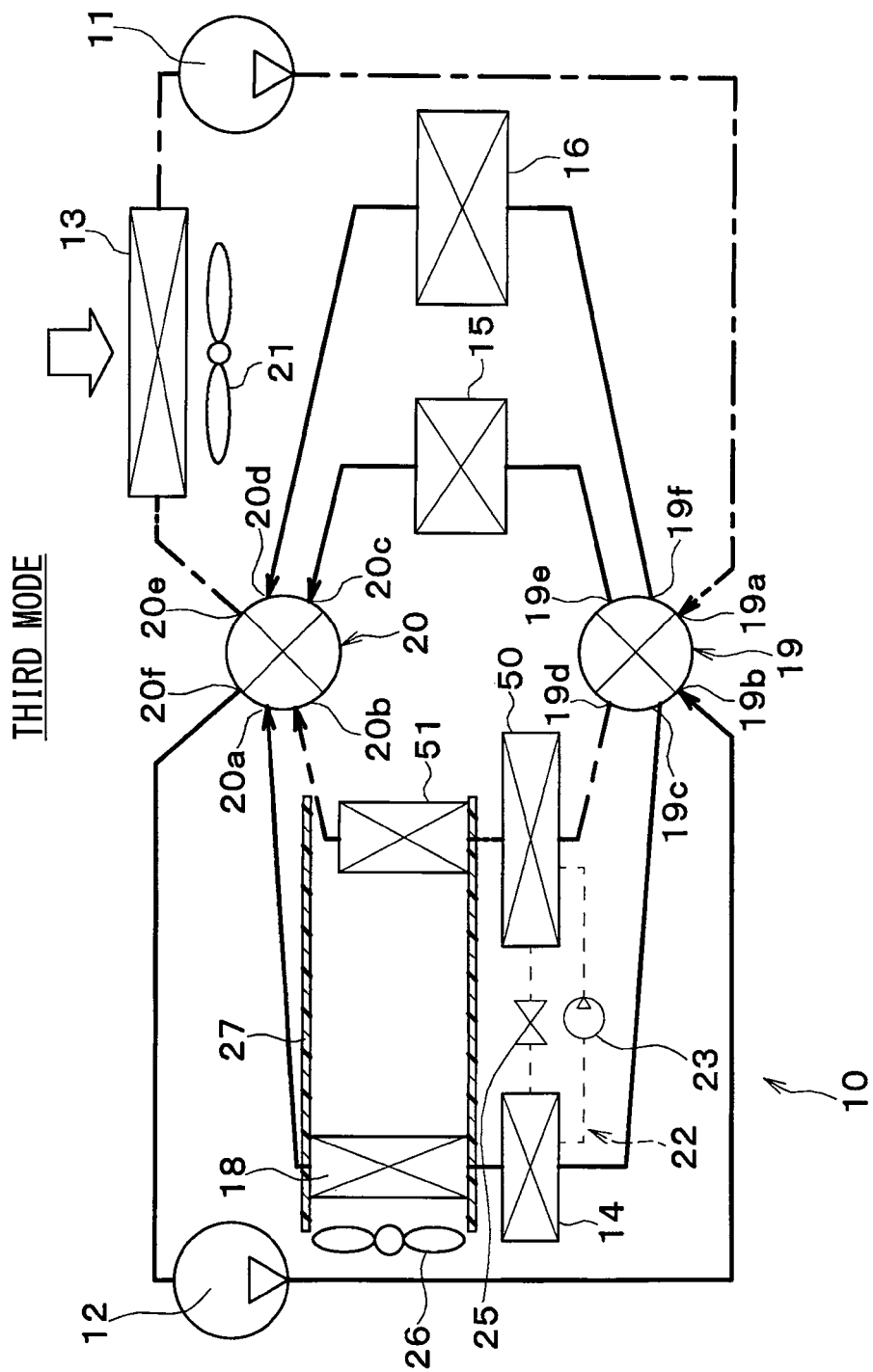
FIG. 19 is a diagram for explaining a third mode in the thermal management system for a vehicle of FIG. 16.

FIG. 19 shows the operation (third mode) of the cooling system 10 when the first and second switching valves 19 and 20 are switched to a third state.

In the third state, the first switching valve 19 connects the inlet 19a with the outlet 19d, and also connects the inlet 19b with the outlets 19c, 19e, and 19f. Thus, the first switching valve 19 allows the coolant entering the inlet 19a to flow out of the outlet 19d as indicated by an alternate long and short dash line with an arrow in FIG. 19, and also allows the coolant entering the inlet 19b to flow out of the outlets 19c, 19e, and 19f as indicated by solid arrows in FIG. 19.

In the third state, the second switching valve 20 connects the inlet 20b with the outlet 20e and also connects the inlets 20a, 20c, and 20d with the outlet 20f. Thus, the second switching valve 20 allows the coolant entering the inlet 20b to flow out of the outlet 20e as indicated by an alternate long and short dash line with an arrow in FIG. 19, and also allows the coolant entering the inlets 20a, 20c, and 20d to flow out of the outlet 20f as indicated by a solid arrow in FIG. 19.

Figure 20:
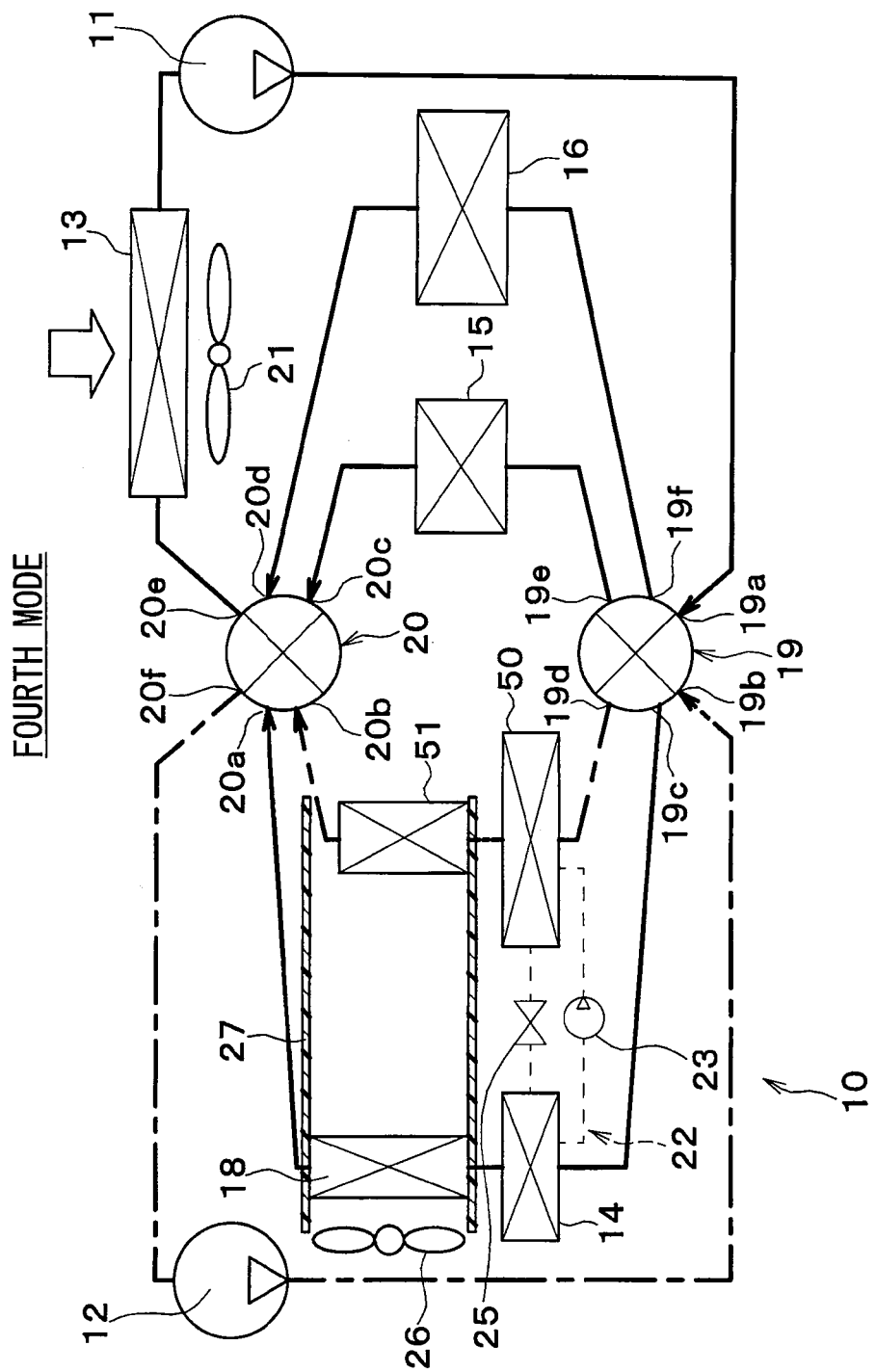
FIG. 20 is a diagram for explaining a fourth mode in the thermal management system for a vehicle of FIG. 16.

FIG. 20 shows the operation (fourth mode) of the cooling system 10 when the first and second switching valves 19 and 20 are switched to a fourth state.

In the fourth state, the first switching valve 19 connects the inlet 19a with the outlets 19c, 19e, and 19f, and also connects the inlet 19b with the outlet 19d. Thus, the first switching valve 19 allows the coolant entering the inlet 19a to flow out of the outlets 19c, 19e, and 19f as indicated by solid arrows in FIG. 20, and also allows the coolant entering the inlet 19b to flow out of the outlet 19d as indicated by an alternate long and short dash line with an arrow in FIG. 20.

In the fourth state, the second switching valve 20 connects the inlet 20b with the outlet 20f and also connects the inlets 20a, 20c, and 20d with the outlet 20e. Thus, the second switching valve 20 allows the coolant entering the inlets 20a, 20c, and 20d to flow out of the outlet 20e as indicated by solid arrows in FIG. 20, and also allows the coolant entering the inlet 20b to flow out of the outlet 20f as indicated by an alternate long and short dash line with an arrow in FIG. 20.

Figure 21:
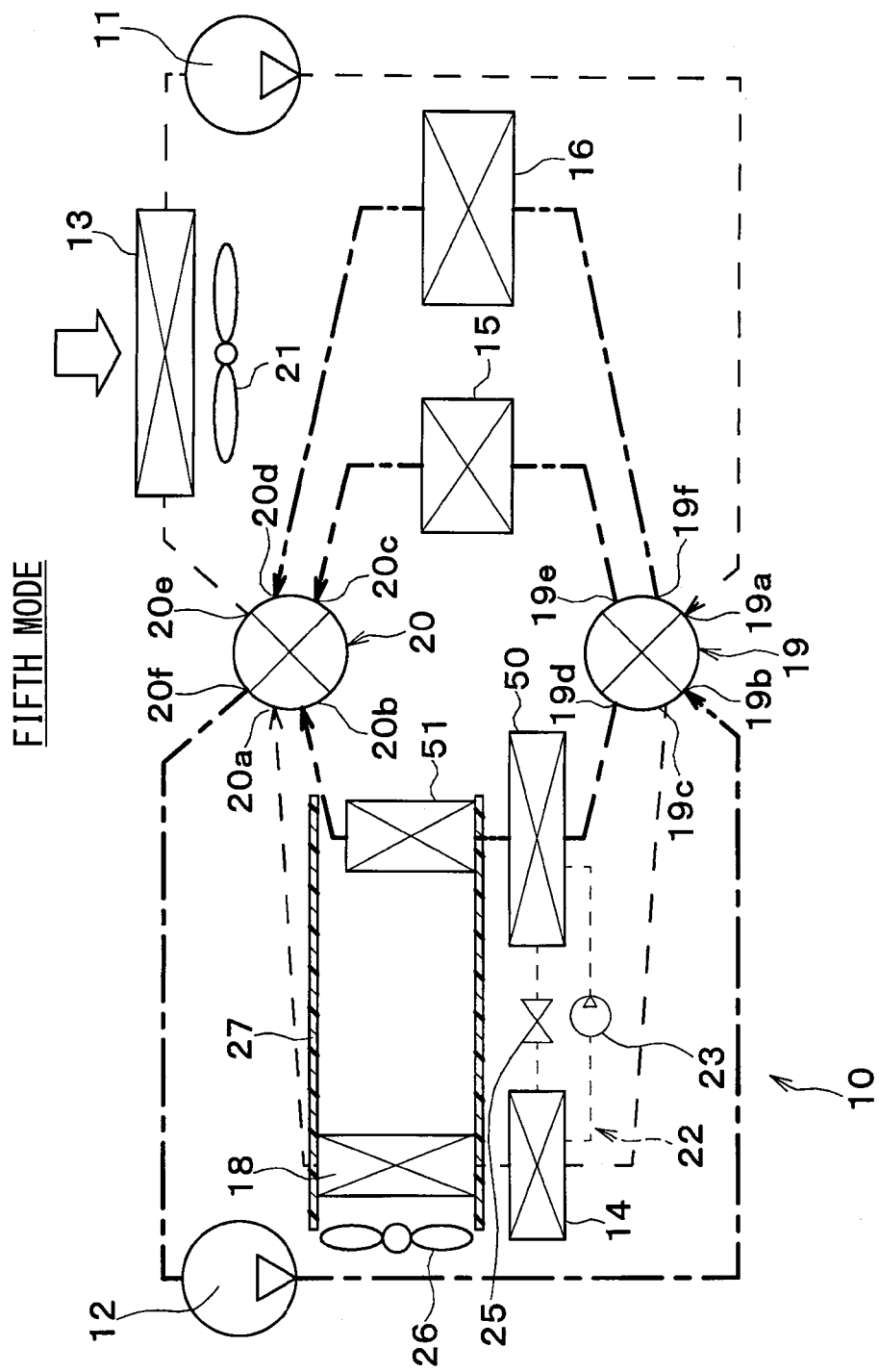
FIG. 21 is a diagram for explaining a fifth mode in the thermal management system for a vehicle of FIG. 16.

FIG. 21 shows the operation (fifth mode) of the cooling system 10 when the first and second switching valves 19 and 20 are switched to a fifth state.

In the fifth state, the first switching valve 19 connects the inlet 19a with the outlet 19c, and also connects the inlet 19b with the outlets 19d, 19e, and 19f. Thus, the first switching valve 19 allows the coolant entering the inlet 19a to flow out of the outlet 19c as indicated by a broken line with an arrow in FIG. 21, and also allows the coolant entering the inlet 19b to flow out of the outlets 19d, 19e, and 19f as indicated by an alternate long and short dash line with an arrow in FIG. 21.

In the fifth state, the second switching valve 20 connects the inlet 20a with the outlet 20e and also connects the inlets 20b, 20c, and 20d with the outlet 20f. Thus, the second switching valve 20 allows the coolant entering the inlet 20a to flow out of the outlet 20e as indicated by a broken line with an arrow in FIG. 21, and also allows the coolant entering the inlets 20b, 20c, and 20d to flow out of the outlet 20f as indicated by alternate long and short dash lines with arrows in FIG. 21.

The specific structures of the coolant cooler 14 and the condenser 50 in this embodiment will be described below with reference to FIG. 22. The coolant cooler 14 and condenser 50 are included in one heat exchanger 52 of the tank-and-tube type. One half of the heat exchanger 52 constitutes the coolant cooler 14, while the other half of the heat exchanger 52 constitutes the condenser 50.

The heat exchanger 52 includes a heat exchanger core 52a, tank portions 52b and 52c, and a partition portion 52d. The heat exchanger core 52a includes a plurality of tubes through which the coolant and the refrigerant independently flow. The tubes are stacked on each other in parallel.

The tank portions 52b and 52c are disposed on both sides of the tubes to distribute and collect the coolant and refrigerant with respect to the tubes. The internal spaces of the tank portions 52b and 52c are partitioned into a space for allowing the coolant to flow therethrough, and another space for allowing the refrigerant to flow therethrough by a partition member (not shown).

Figure 22:
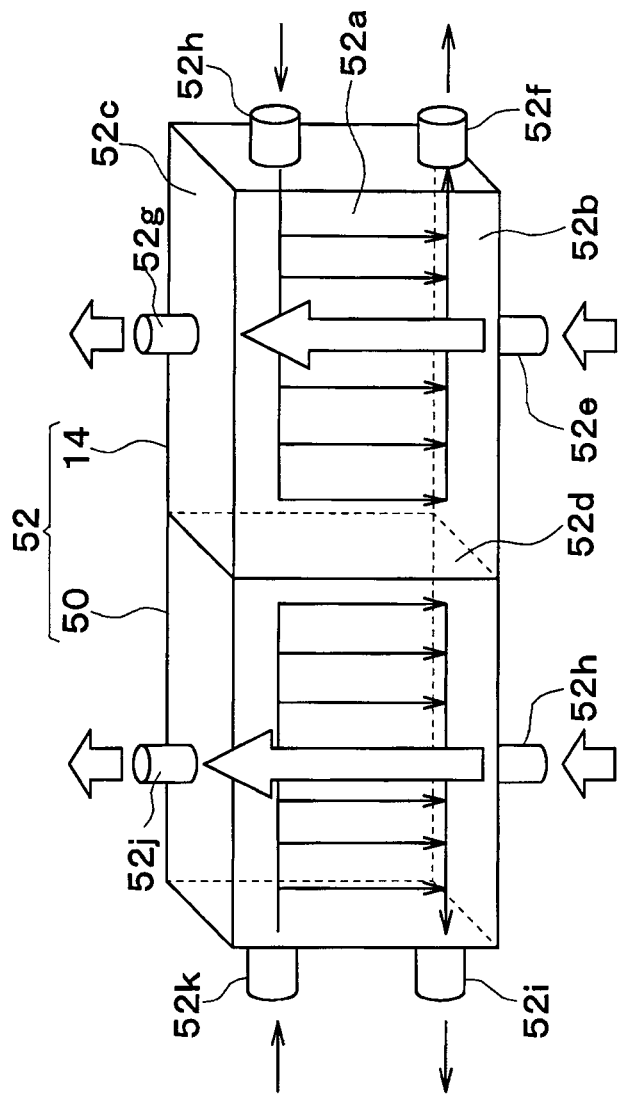
FIG. 22 is a perspective view showing a coolant cooler and a condenser in a second embodiment.

The partition portion 52d partitions the insides of the tank portions 52b and 52c into two spaces in the stacking direction of the tubes (in the left-right direction of FIG. 22). One side of the heat exchanger 52 (on the right side of FIG. 22) in the stacking direction of the tubes with respect to the partition portion 52d constitutes the coolant cooler 14, whereas the other side of the heat exchanger 52 (on the left side of FIG. 22) in the stacking direction of the tubes with respect to the partition portion 52d constitutes the condenser 50.

Members constituting the heat exchanger core 52a, the tank portions 52b and 52c, and the partition portion 52d are formed of metal (for example, an aluminum alloy), and bonded together by brazing.

One part of the tank portion 52b serving as the coolant cooler 14 is provided with an inlet 52e for the coolant and an outlet 52f for the refrigerant. The other part of the tank portion 52c serving as the coolant cooler 14 is provided with an outlet 52g for the coolant and an inlet 52h for the refrigerant.

Thus, in the coolant cooler 14, the coolant flows from the inlet 52e into the tank portion 52b, and is then distributed to the tubes for the coolant by the tank portion 52b. The coolants after having passed through the tubes for the coolant are collected into the tank portion 52c to flow from the outlet 52g.

In the coolant cooler 14, the refrigerant flows from the inlet 52h into the tank portion 52c, and is then distributed to the tubes for the refrigerant by the tank portion 52c. The refrigerants after having passed through the tubes for the coolant are collected into the tank portion 52b to flow from the outlet 52f.

One part of the tank portion 52b serving as the condenser 50 is provided with an inlet 52h for the coolant and an outlet 52i for the refrigerant. The other part of the tank portion 52c serving as the condenser 50 is provided with an outlet 52j for the coolant and an inlet 52k for the refrigerant.

Thus, in the condenser 50, the coolant flows from the inlet 52h into the tank portion 52b, and is then distributed to the tubes for the coolant by the tank portion 52b. The coolants after having passed through the tubes for the coolant are collected into the tank portion 52c to flow from the outlet 52j.

In the condenser 50, the refrigerant flows from the inlet 52k into the tank portion 52c, and is then distributed to the tubes for the refrigerant by the tank portion 52c. The refrigerants after having passed through the tubes for the refrigerant are collected into the tank portion 52b to flow from the outlet 52i.

The heat exchanger 52 is not limited to the tank-and-tube type heat exchanger, and can be applied to other types of heat exchangers. For example, a laminate-type heat exchanger including a lamination of a number of plate-like members may be adopted.

Figure 23:
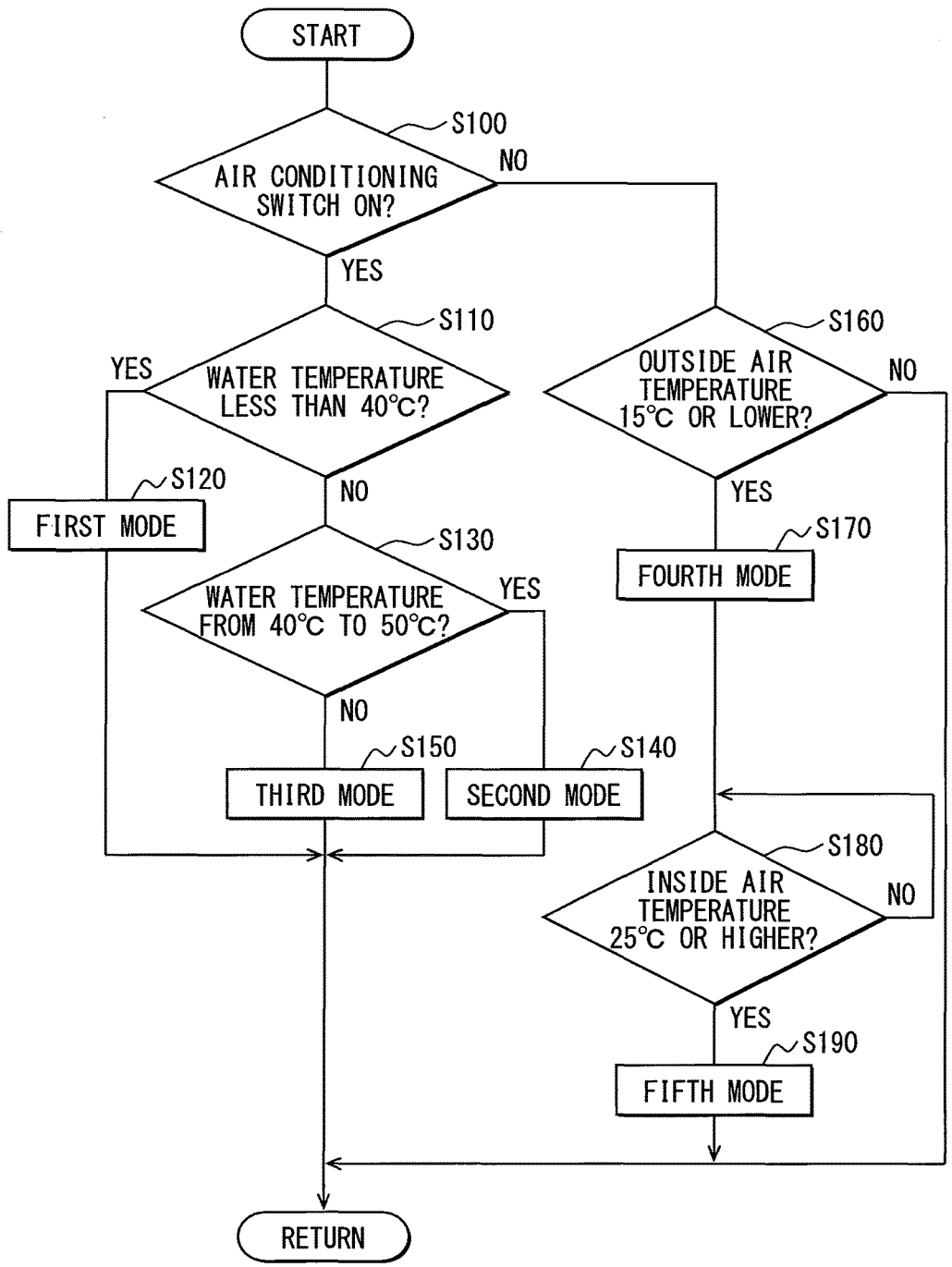
FIG. 23 is a flowchart showing the flow of a control process performed by a controller of the second embodiment.

A control process executed by the controller 40 of this embodiment will be described with reference to FIG. 23. The controller 40 executes a computer program according to a flowchart of FIG. 23.

First, in step S100, it is determined whether the air conditioning switch 44 is turned on or not. When the air conditioner 44 is determined to be turned on, the cooling is considered to be necessary, and then the operation proceeds to step S110. In step S110, it is determined whether the temperature of coolant detected by the water temperature sensor 43 is lower than 40 degrees or not.

When the temperature of coolant detected by the water temperature sensor 43 is determined to be lower than 40 degrees, the temperature of the coolant (intermediate-temperature coolant) cooled by the outside air in the radiator 13 is considered to be low, and then the operation proceeds to step S120. In step S120, the first mode shown in FIG. 17 is performed.

In the first mode, the controller 40 controls the electric motor 30 for a switching valve such that the first and second switching valves 19 and 20 are brought into the first state shown in FIG. 17 to thereby operate the first and second pumps 11 and 12 and the compressor 23.

Thus, the first switching valve 19 connects the inlet 19a with the outlets 19d, 19e, and 19f, and also connects the inlet 19b with the outlet 19c. The second switching valve 20 connects the inlets 20b, 20c, and 20d with the outlet 20e, and also connects the inlet 20a with the outlet 20f.

Accordingly, the first coolant circuit (intermediate-temperature coolant circuit) is formed of the first pump 11, the battery cooler 15, the inverter cooler 16, the condenser 50, the heater core 51, and the radiator 13, whereas the second coolant circuit (low-temperature coolant circuit) is formed of the second pump 12, the coolant cooler 14, and the cooler core 18.

That is, as indicated by alternate long and short dash lines with arrows in FIG. 17, the coolant discharged from the first pump 11 is branched by the first switching valve 19 into the battery cooler 15, the inverter 16, and the condenser 50 to flow in parallel through the battery cooler 15, the inverter cooler 16, and the condenser 50. The coolant flowing through the condenser 50 flows in series through the heater core 51. The coolants flowing through the heater core 51, through the battery cooler 15, and through the inverter cooler 16 are collected by the second switching valve 20 to flow through the radiator 13, thereby being sucked into the first pump 11.

On the other hand, as indicated by a solid arrow in FIG. 17, the coolant discharged from the second pump 12 flows through the coolant cooler 14 and the cooler core 18 in series via the first switching valve 19, and is then sucked into the second pump 12 via the second switching valve 20.

Thus, in the first mode, the intermediate-temperature coolant cooled by the radiator 13 flows through the battery cooler 15, the inverter cooler 16, the condenser 50, and the heater core 51, whereas the low-temperature coolant cooled by the coolant cooler 14 flows through the cooler core 18.

Thus, in the battery cooler 15 and the inverter cooler 16, the battery and inverter are cooled by the intermediate-temperature coolant. In the condenser 50, the intermediate-temperature coolant is heated by exchanging heat with the high-pressure refrigerant of the refrigeration cycle 22. In the cooler core 18, the blast air into the vehicle interior is cooled by exchanging heat between the low-temperature coolant and the blast air into vehicle interior.

The intermediate-temperature coolant heated by the condenser 50 exchanges heat with the blast air having passed through the cooler core 18 when flowing through the heater core 51. Thus, the heater core 51 heats the blast air having passed through the cooler core 18. That is, the blast air cooled and dehumidified by the cooler core 18 can be heated by the heater core 51 to form a conditioned air at a desired temperature.

For example, when the outside air temperature is about 15° C., the intermediate-temperature coolant cooled by the outside air in the radiator 13 becomes at about 25° C., so that the intermediate-temperature coolant can sufficiently cool the battery and the inverter.

The low-temperature coolant cooled by the low-pressure refrigerant of the refrigeration cycle 22 in the coolant cooler 14 becomes at about 0° C., so that the low-temperature coolant can sufficiently cool the blast air into the vehicle interior.

In the first mode, the battery and the inverter are cooled by the outside air, which can effectively achieve the energy saving as compared to the case in which the battery and the inverter are cooled by the low-pressure refrigerant of the refrigeration cycle 22.

In contrast, in step S110, when the temperature of the coolant detected by the water temperature sensor 43 is determined not to be lower than 40 degrees, the temperature of the intermediate-temperature coolant is considered to be higher, and then the operation proceeds to step S130. In step S130, it is determined whether or not the temperature of the coolant detected by the water temperature sensor 43 is 40 degrees or more and less than 50 degrees.

When the temperature of the coolant detected by the water temperature sensor 43 is determined to be 40 degrees or more and less than 50 degrees, the operation proceeds to step S140, in which the second mode is performed as shown in FIG. 18.

In the second mode, the controller 40 controls the electric motor 30 for a switching valve such that the first and second switching valves 19 and 20 are brought into the second state shown in FIG. 18 to thereby operate the first and second pumps 11 and 12 and the compressor 23.

Thus, the first switching valve 19 connects the inlet 19a with the outlets 19d and 19f, and also connects the inlet 19b with the outlets 19c and 19e. The second switching valve 20 connects the inlets 20b and 20d with the outlet 20e, and also connects the inlets 20a and 20c with the outlet 20f.

Accordingly, the first coolant circuit (intermediate-temperature coolant circuit) is formed of the first pump 11, the inverter cooler 16, the condenser 50, the heater core 51, and the radiator 13, whereas the second coolant circuit (low-temperature coolant circuit) is formed of the second pump 12, the coolant cooler 14, the cooler core 18, and the battery cooler 15.

That is, as indicated by alternate long and short dash lines with arrows in FIG. 18, the coolant discharged from the first pump 11 is branched into the inverter cooler 16 and the condenser 50 by the first switching valve 19 to flow in parallel through the inverter cooler 16 and the condenser 50. The coolant flowing through the condenser 50 flows in series through the heater core 51. The coolants flowing through the heater core 51 and through the inverter cooler 16 are collected by the second switching valve 20 to flow through the radiator 13, thereby being sucked into the first pump 11.

On the other hand, as indicated by solid arrows in FIG. 18, the coolant discharged from the second pump 12 is branched into the coolant cooler 14 and the battery cooler 15 by the first switching valve 19 to flow in parallel through the coolant cooler 14 and the battery cooler 15. The coolant flowing through the coolant cooler 14 flows in series through the cooler core 18. The coolants flowing through the cooler core 18 and through the battery cooler 15 are collected by the second switching valve 20 to be sucked into the second pump 12.

Thus, in the second mode, the intermediate-temperature coolant cooled by the radiator 13 flows through the inverter cooler 16, the condenser 50, and the heater core 51, whereas the low-temperature coolant cooled by the coolant cooler 14 flows through the cooler core 18 and the battery cooler 15.

Thus, the inverter can be cooled by the intermediate-temperature coolant, and the battery can be cooled by the low-temperature coolant. Additionally, like the first mode, the blast air cooled and dehumidified by the cooler core 18 is heated by the heater core 51, which can make the conditioned air at the desired temperature.

For example, when the outside air temperature is about 30° C., the intermediate-temperature coolant cooled by the outside air in the radiator 13 becomes at a temperature of about 40° C., so that the intermediate-temperature coolant can sufficiently cool the inverter.

The low-temperature coolant cooled by the low-pressure refrigerant of the refrigeration cycle 22 in the coolant cooler 14 becomes at about 0° C., so that the battery and the blast air into the vehicle interior can be sufficiently cooled by the low-temperature coolant.

Since in the second mode the battery is cooled by the low-pressure refrigerant of the refrigeration cycle 22, the battery can be sufficiently cooled even when the outside air cannot cool the battery adequately because of the high temperature of the outside air.

In step S130, when the temperature of coolant detected by the water temperature sensor 43 is determined to be 40 degrees or more and less than 50 degrees, the temperature of the intermediate-temperature coolant is considered to be very high, and then the operation proceeds to step S150. In step S150, the third mode shown in FIG. 19 is performed.

In the third mode, the controller 40 controls the electric motor 30 for a switching valve such that the first and second switching valves 19 and 20 are brought into the third state shown in FIG. 19 to thereby operate the first and second pumps 11 and 12 and the compressor 23.

Thus, the first switching valve 19 connects the inlet 19a with the outlet 19d and also connects the inlet 19b with the outlets 19c, 19e, and 19f. The second switching valve 20 connects the inlet 20b with the outlet 20e, and also connects the inlets 20a, 20c, and 20d with the outlet 20f.

Accordingly, the first coolant circuit (intermediate-temperature coolant circuit) is formed of the first pump 11, the condenser 50, the heater core 51, and the radiator 13, whereas the second coolant circuit (low-temperature coolant circuit) is formed of the second pump 12, the coolant cooler 14, the cooler core 18, the battery cooler 15, and the inverter cooler 16.

That is, as indicated by an alternate long and short dash line with an arrow in FIG. 19, the coolant discharged from the first pump 11 flows through the condenser 50 and heater core 51 in series via the first switching valve 19, and then through the radiator 13 via the second switching valve 20, thereby being sucked into the first pump 11.

On the other hand, as indicated by solid arrows in FIG. 19, the coolant discharged from the second pump 12 is branched into the coolant cooler 14, the battery cooler 15, and the inverter cooler 16 by the first switching valve 19. The coolant flowing through the coolant cooler 14 flows in series through the cooler core 18. The coolants flowing through the cooler core 18, through the battery cooler 15, and through the inverter cooler 16 are collected by the second switching valve 20 to be sucked into the second pump 12.

Accordingly, in the third mode, the intermediate-temperature coolant cooled by the radiator 13 flows through the condenser 50 and the heater core 51, whereas the low-temperature coolant cooled by the coolant cooler 14 flows through the cooler core 18, the battery cooler 15, and the inverter cooler 16.

Thus, the battery and the inverter can be cooled by the low-temperature coolant, and like the first and second modes, the blast air cooled and dehumidified by the cooler core 18 is heated by the heater core 51, which can make the conditioned air at the desired temperature.

For example, when the outside air temperature is about 40° C., the intermediate-temperature coolant cooled by the outside air in the radiator 13 becomes at about 50° C. The low-temperature coolant cooled by the low-pressure refrigerant of the refrigeration cycle 22 in the coolant cooler 14 becomes at about 0° C., so that the blast air into the vehicle interior, the battery, and the inverter can be sufficiently cooled by the low-temperature coolant.

Since in the third mode the battery and the inverter are cooled by the low-pressure refrigerant of the refrigeration cycle 22, the battery and the inverter can be sufficiently cooled even when the outside air cannot cool the battery and the inverter adequately because of the very high temperature of the outside air.

When the air conditioning switch 44 is determined not to be turned on in step S100, the cooling is considered not to be necessary, and then the operation proceeds to step S160. In step S160, it is determined whether the outside air temperature detected by the outside air sensor 42 is lower than 15 degrees or not.

When the outside air temperature detected by the outside air sensor 42 is determined to be 15 degrees or less, the high heating capacity is considered to be necessary, and then the operation proceeds to step S170, in which a fourth mode is performed as shown in FIG. 20.

In the fourth mode, the controller 40 controls the electric motor 30 for a switching valve such that the first and second switching valves 19 and 20 are brought into the fourth state shown in FIG. 20 to thereby operate the first and second pumps 11 and 12 and the compressor 23.

Thus, the first switching valve 19 connects the inlet 19a with the outlets 19c, 19e, and 19f, and also connects the inlet 19b with the outlet 19d. The second switching valve 20 connects the inlets 20a, 20c, and 20d with the outlet 20e, and also connects the inlet 20b with the outlet 20f.

Accordingly, a first coolant circuit (low-temperature coolant circuit) is formed of the first pump 11, the coolant cooler 14, the cooler core 18, the battery cooler 15, the inverter cooler 16, and the radiator 13, whereas a second coolant circuit (intermediate-temperature coolant circuit) is formed of the second pump 12, the condenser 50, and the heater core 51.

That is, as indicated by solid arrows in FIG. 20, the coolant discharged from the first pump 11 is branched into the coolant cooler 14, the battery cooler 15, and the inverter cooler 16 by the first switching valve 19. The coolant flowing through the coolant cooler 14 flows in series through the cooler core 18. The coolants flowing through the cooler core 18, through the battery cooler 15, and through the inverter cooler 16 are collected by the second switching valve 20 to flow through the radiator 13, thereby being sucked into the first pump 11.

On the other hand, as indicated by an alternate long and short dash line with an arrow in FIG. 20, the coolant discharged from the second pump 12 flows through the condenser 50 and the heater core 51 in series via the first switching valve 19, and is then sucked into the second pump 12 via the second switching valve 20.

Thus, in the fourth mode, the low-temperature coolant cooled by the coolant cooler 14 flows through the cooler core 18, the battery cooler 15, and the inverter cooler 16, which can cool the blast air into the vehicle interior, the battery, and the inverter by the low-temperature coolant.

In the fourth mode, the low-temperature coolant cooled by the coolant cooler 14 flows through the radiator 13, allowing the coolant to absorb heat from the outside air in the radiator 13. Then, the coolant having absorbed heat from the outside air in the radiator 13 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the outside air via the coolant.

The refrigerant having absorbed heat from the outside air in the coolant cooler 14 exchanges heat with the coolant of the intermediate-temperature coolant circuit in the condenser 50, whereby the coolant of the intermediate-temperature coolant circuit is heated. The coolant of the intermediate-temperature circuit heated by the condenser 50 exchanges heat with the blast air having passed through the cooler core 18 in flowing through the heater core 51, thereby dissipating heat therefrom. Thus, the heater core 51 heats the blast air having passed through the cooler core 18. Accordingly, the fourth mode can achieve heat pump heating that heats the vehicle interior by absorbing heat from the outside air.

For example, when the outside air temperature is 10° C., the intermediate-temperature coolant heated by the condenser 50 becomes at about 50° C., so that the blast air having passed through the cooler core 18 can be sufficiently heated by the intermediate-temperature coolant.

The low-temperature coolant cooled by the low-pressure refrigerant of the refrigeration cycle 22 in the coolant cooler 14 becomes at about 0° C., so that the battery and the inverter can be sufficiently cooled by the low-temperature coolant.

Note that the fourth mode can achieve the dehumidification heating, by allowing the heater core 51 to heat the blast air cooled and dehumidified by the cooler core 18.

In the following step S180, it is determined whether or not the inside air temperature detected by the inside air sensor 41 is 25 degrees or more. When the inside air temperature detected by the inside air sensor 41 is determined not to be 25 degrees or more, the high heating capacity is considered to be necessary, and then the operation returns to step S180. Thus, until the inside air temperature is increased to 25 degrees or more, the fourth mode is performed.

When the inside air temperature detected by the inside air sensor 41 is determined to be 25 degrees or more, the high heating capacity is considered not to be necessary, and then the operation proceeds to step S190, in which a fifth mode is performed as shown in FIG. 21.

In the fifth mode, the controller 40 controls the electric motor 30 for a switching valve such that the first and second switching valves 19 and 20 becomes the fifth state shown in FIG. 21.

Thus, the first switching valve 19 connects the inlet 19a with the outlet 19c and also connects the inlet 19b with the outlets 19d, 19e, and 19f. The second switching valve 20 connects the inlet 20a with the outlet 20e, and also connects the inlets 20b, 20c, and 20d with the outlet 20f.

Accordingly, a first coolant circuit (low-temperature coolant circuit) is formed of the first pump 11, the coolant cooler 14, the cooler core 18, and the radiator 13, whereas a second coolant circuit (intermediate-temperature coolant circuit) is formed of the second pump 12, the battery cooler 15, the inverter cooler 16, the condenser 50, and the heater core 51.

At this time, the second pump 12 is operated to thereby stop the first pump 11 and compressor 23. Thus, in the first coolant circuit indicated by dashed arrows in FIG. 21, the coolant does not circulate therethrough.

On the other hand, as indicated by alternate long and short dash lines with arrows in FIG. 21, in the second coolant circuit, the coolant discharged from the second pump 12 is branched into the battery cooler 15, the inverter cooler 16, and the condenser 50 by the first switching valve 19. The coolant flowing through the condenser 50 flows in series through the heater core 51. The coolants flowing through the heater core 51, through the battery cooler 15, and through the inverter cooler 16 are collected by the second switching valve 20 to be sucked into the second pump 12.

Thus, in the fifth mode, the coolant which has absorbed heat from the battery in the battery cooler 15 and the coolant which has absorbed heat from the inverter in the inverter cooler 16 flow through the heater core 51, so that the blast air into the vehicle interior can be heated by exhaust heat from the battery and inverter.

For example, when the outside air temperature is 10° C., the coolant heated by the battery cooler 15 and the inverter cooler 16 becomes at about 30° C., whereby the blast air into the vehicle interior can be heated to 25 degrees or more with the inside air temperature maintained at 25 degrees or more.

In this embodiment, when the outside air temperature is lower than a predetermined temperature (15° C. in this embodiment), the forth mode or the fifth mode can be carried out to perform heating.

In the fourth mode, the coolant circulates between the coolant cooler 14 and the first pump 11, whereas the coolant heat medium circulates between the condenser 50 and the second pump 12.

Thus, the coolant cooled by the coolant cooler 14 flows through the radiator 13, so that the refrigerant of the refrigeration cycle 22 in the coolant cooler 14 can absorb heat from the outside air via the coolant flowing through the radiator 13. Thus, the heat of the outside air can be pumped up from the coolant cooler 14 (low-pressure side heat exchanger) of the refrigeration cycle 22 to the condenser 50 (high-pressure side heat exchanger).

The heat of the outside air pumped up by the refrigeration cycle 22 can heat the blast air into the vehicle interior by use of the heater core 51, which can achieve the heat pump heating which heats the vehicle interior by absorption of the heat from the outside air.

In the fifth mode, the coolant circulates between each of the battery cooler 15 and the heater core 51, and the second pump 12, whereby the operation of the first pump 11 is stopped. Thus, the coolant absorbs heat from the battery in the battery cooler 15, and the coolant which has absorbed the heat from the battery heats the blast air into the vehicle interior by the heater core 51, so that the exhaust heat from the battery can be used to heat the vehicle interior.

Third Embodiment

Figure 24:
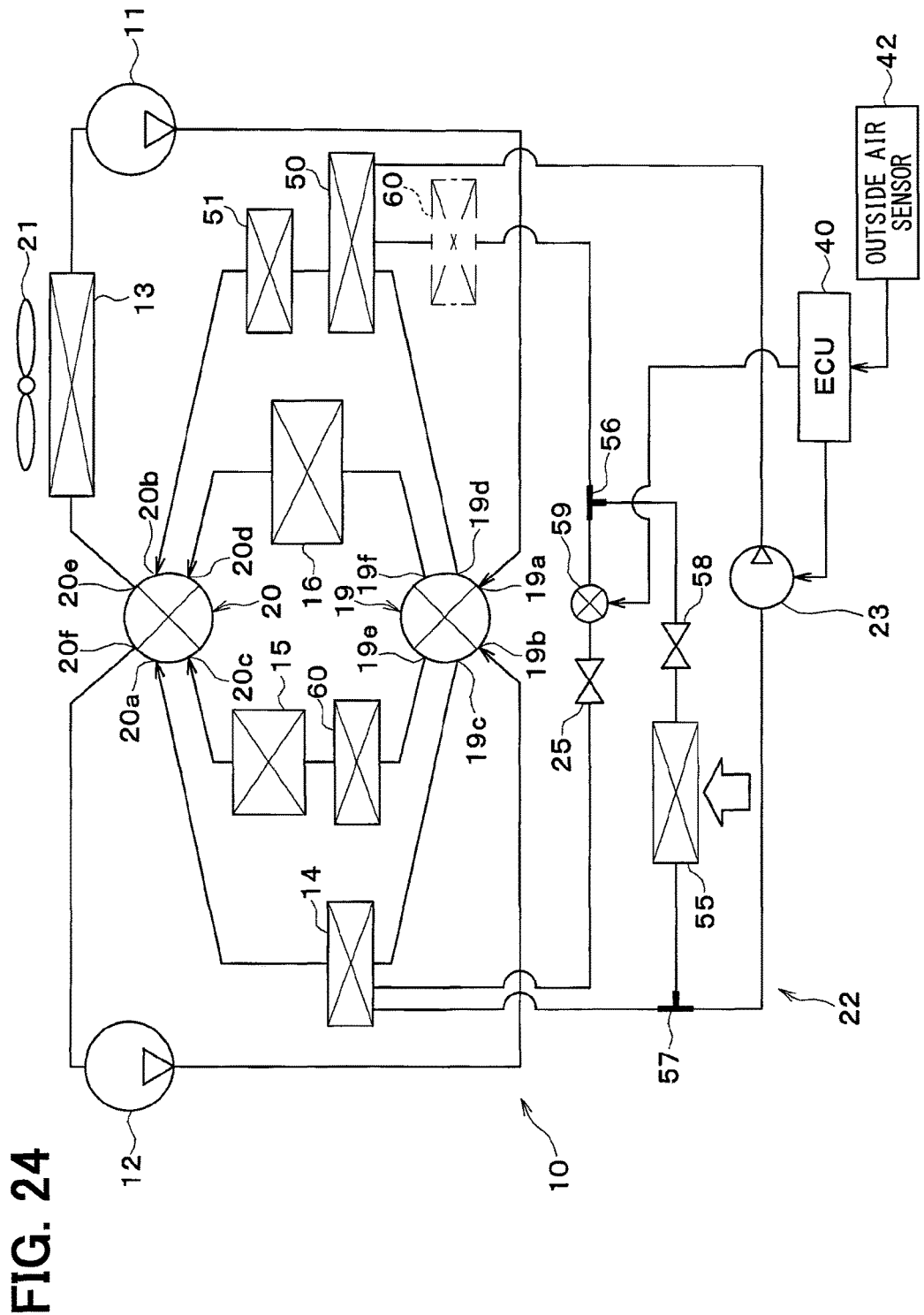
FIG. 24 is an entire configuration diagram of a thermal management system for a vehicle according to a third embodiment of the invention.

In the second embodiment, the low-pressure refrigerant of the refrigeration cycle 22 is evaporated by the coolant cooler 14, thereby cooling the blast air into the vehicle interior by the cooler core 18. However, in a third embodiment, as shown in FIG. 24, the low-pressure refrigerant of the refrigeration cycle 22 is evaporated in the coolant cooler 14 and an evaporator 55, thereby cooling the blast air into the vehicle interior by the evaporator 55 of the refrigeration cycle 22.

The evaporator 55 allows the refrigerant to flow in parallel to the coolant cooler 14. Specifically, the refrigerant cycle 22 has a branch portion 56 for refrigerant flow that is located between the refrigerant discharge side of the compressor 23 and the refrigerant inlet side of the expansion valve 25, and a collection portion 57 for refrigerant flow that is located between the refrigerant outlet side of the coolant cooler 14 and the refrigerant suction side of the compressor 23. An expansion valve 58 and the evaporator 55 are connected between the branch portion 56 and the collection portion 57.

The expansion valve 58 is a decompression device for decompressing and expanding a liquid-phase refrigerant branched by the branch portion 56. The evaporator 55 is adapted to evaporate a low-pressure refrigerant so as to cool the blast air by exchanging heat between the blast air into the vehicle interior and the low-pressure refrigerant decompressed and expanded by the expansion valve 25.

An electromagnetic valve 59 (opening and closing valve) is connected between the branch portion 56 and the expansion valve 25. When the electromagnetic valve 59 is opened, the refrigerant discharged from the compressor 23 flows through the expansion valve 25 and the coolant cooler 14. When the electromagnetic valve 59 is closed, the flow of refrigerant toward the expansion valve 25 and the coolant cooler 14 is interrupted. The operation of the electromagnetic valve 59 is controlled by the controller 40.

The refrigeration cycle 22 includes a supercooler 60. The supercooler 60 is a heat exchanger for further cooling the liquid-phase refrigerant to enhance a supercooling degree of the refrigerant by exchanging heat between the coolant and the liquid-phase refrigerant condensed by the condenser 50.

The coolant inlet side of the supercooler 60 is connected to the outlet 19e of the first switching valve 19. The coolant outlet side of the supercooler 60 is connected to the coolant inlet side of the battery cooler 15.

In this embodiment, the battery cooler 15 and the battery are accommodated in an insulating container formed of thermal insulating material. Thus, cold energy stored in the battery can be prevented from escaping outward, thereby keeping the battery cold.

The first switching valve 19 is configured to be capable of switching between two types of communication states between the inlets 19a and 19b and the outlets 19c, 19d, 19e, and 19f. The second switching valve 20 is also configured to be capable of switching between two types of communication states between the inlets 20a, 20b, 20c, and 20d and the outlets 20e, and 20f.

Figure 25:
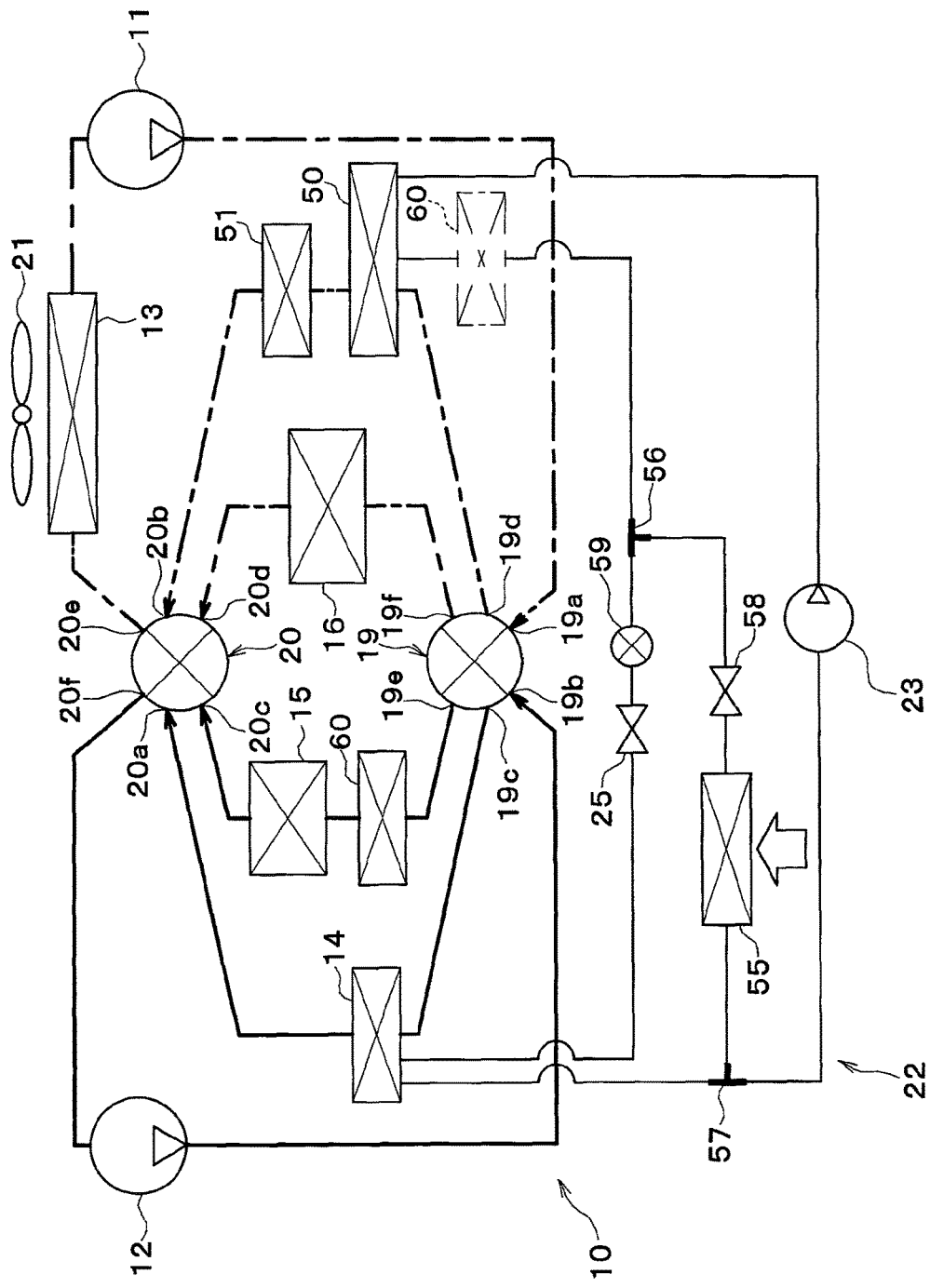
FIG. 25 is a diagram for explaining a first mode in the vehicle thermal management system of FIG. 24.
Figure 26:
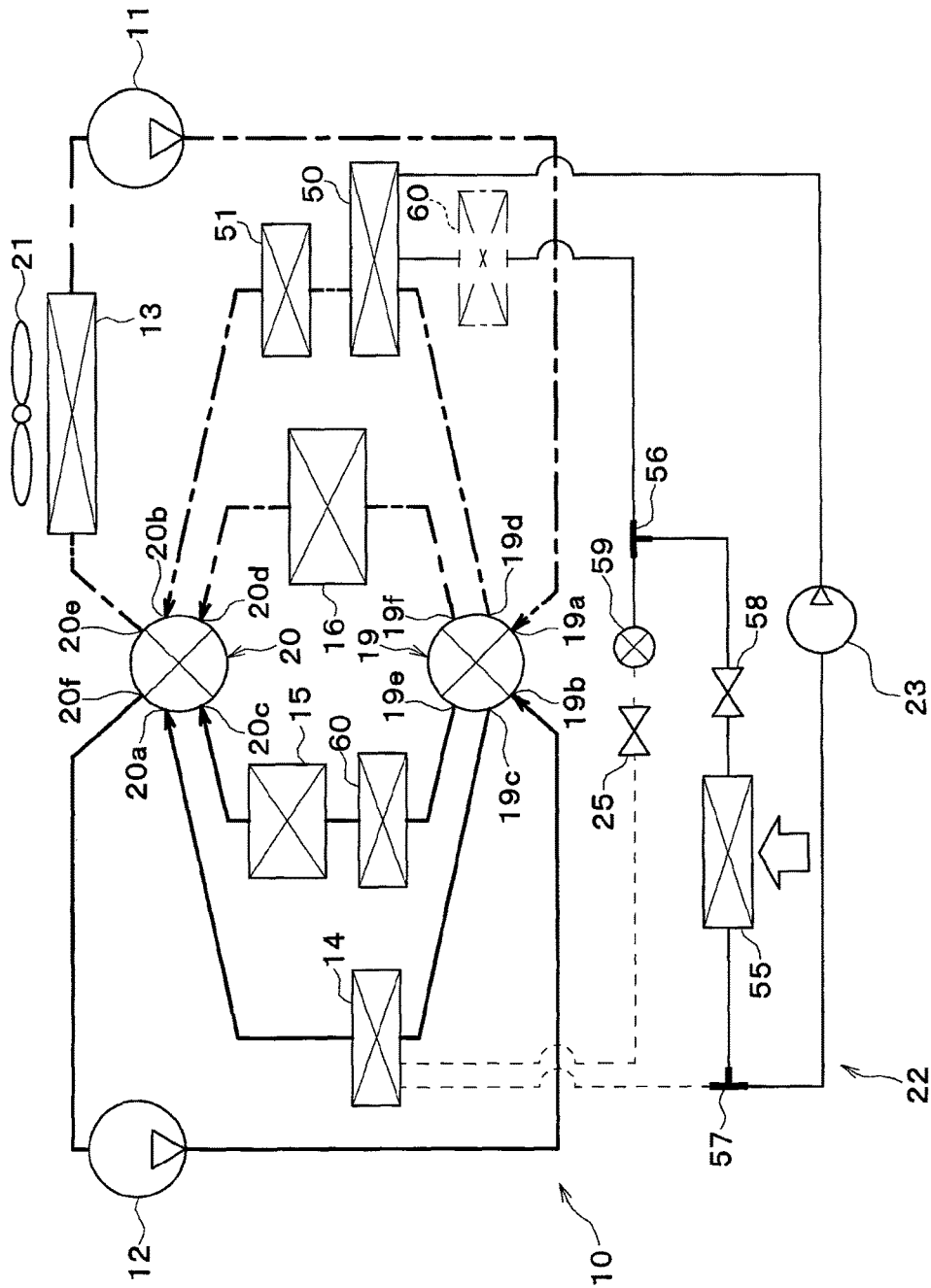
FIG. 26 is a diagram for explaining a second mode in the vehicle thermal management system of FIG. 24.

FIG. 25 shows the operation (first mode) of the cooling system 10 when the first and second switching valves 19 and 20 are switched to a first state, and the electromagnetic valve 59 is switched to an opened state. FIG. 26 shows the operation (second mode) of the cooling system 10 when the first and second switching valves 19 and 20 are switched to the first state, and the electromagnetic valve 59 is switched to a closed state.

In the first and second states, the first switching valve 19 connects the inlet 19a with the outlets 19d, and 19f, and also connects the inlet 19b with the outlets 19c and 19e. Thus, the first switching valve 19 allows the coolant entering the inlet 19a to flow out of the outlets 19d, and 19f as indicated by alternate long and short dash lines with arrows in FIGS. 25 and 26, and also allows the coolant entering the inlet 19b to flow out of the outlets 19c and 19e as indicated by solid arrows in FIGS. 25 and 26.

In the first and second states, the second switching valve 20 connects the inlets 20b and 20d with the outlet 20e and also connects the inlets 20a, and 20c with the outlet 20f. Thus, the second switching valve 20 allows the coolant entering the inlets 20b, and 20d to flow out of the outlet 20e as indicated by alternate long and short dash lines with arrows in FIGS. 25 and 26, and also allows the coolant entering the inlets 20a and 20c to flow out of the outlet 20f as indicated by solid arrows in FIGS. 25 and 26.

Figure 27:
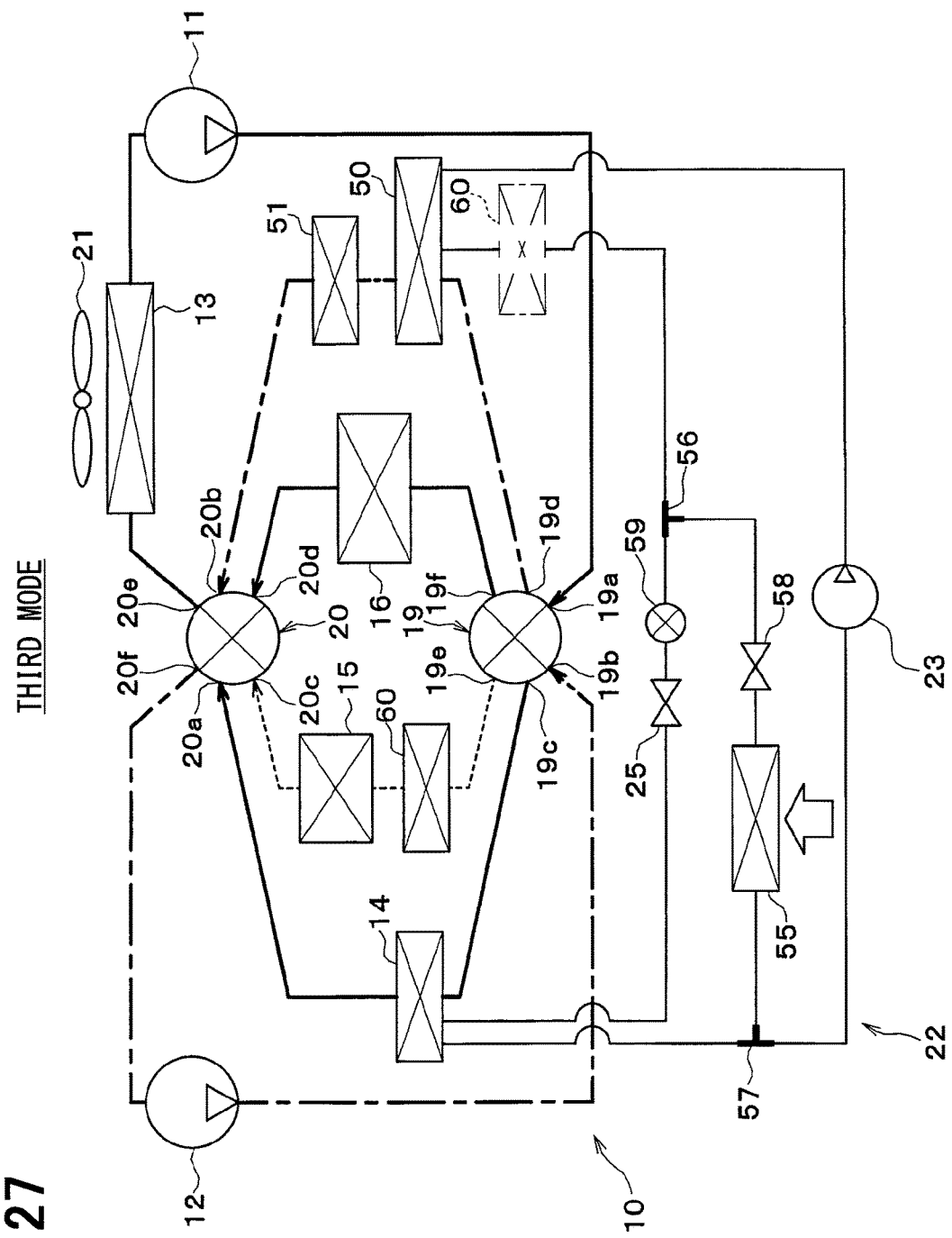
FIG. 27 is a diagram for explaining a third mode in the vehicle thermal management system of FIG. 24.

FIG. 27 shows the operation (third mode) of the cooling system 10 when the first and second switching valves 19 and 20 are switched to a third state.

In the third state, the first switching valve 19 connects the inlet 19a with the outlets 19c, and 19f, and also connects the inlet 19b with the outlet 19d, thereby closing the outlet 19e. Thus, the first switching valve 19 allows the coolant entering the inlet 19a to flow out of the outlets 19c and 19f as indicated by solid arrows in FIG. 27, and also allows the coolant entering the inlet 19b to flow out of the outlet 19d as indicated by an alternate long and short dash line with an arrow in FIG. 27, thereby preventing the coolant from flowing out of the outlet 19e.

In the third state, the second switching valve 20 connects the inlets 20a and 20d with the outlet 20e and also connects the inlet 20b with the outlet 20f, thereby closing the inlet 20c. Thus, the second switching valve 20 allows the coolant entering the inlets 20a and 20d to flow out of the outlet 20e as indicated by solid arrows in FIG. 27, and also allows the coolant entering the inlet 20b to flow out of the outlet 20f as indicated by an alternate long and short dash line with an arrow in FIG. 27, thereby preventing the coolant from flowing out of the inlet 20c.

The specific structures of the coolant cooler 14, the condenser 50, and the supercooler 60 in this embodiment will be described below with reference to FIG. 28.

The coolant cooler 14, the condenser 50, and the supercooler 60 are included in one heat exchanger 61 of the tank-and-tube type. Specifically, the supercooler 60 is disposed between the coolant cooler 14 and the condenser 50.

The heat exchanger 61 includes a heat exchanger core 61a, tank portions 61b and 61c, and two partition portions 61d and 61d. The heat exchanger core 61a includes a plurality of tubes through which the coolant and the refrigerant independently flow. The tubes are stacked on each other in parallel.

The tank portions 61b and 61c are disposed on both sides of the tubes to distribute and collect the coolant and refrigerant with respect to the tubes. The internal spaces of the tank portions 61b and 61c are partitioned into a space for allowing the coolant to flow therethrough, and another space for allowing the refrigerant to flow therethrough by a partition member (not shown).

Figure 28:
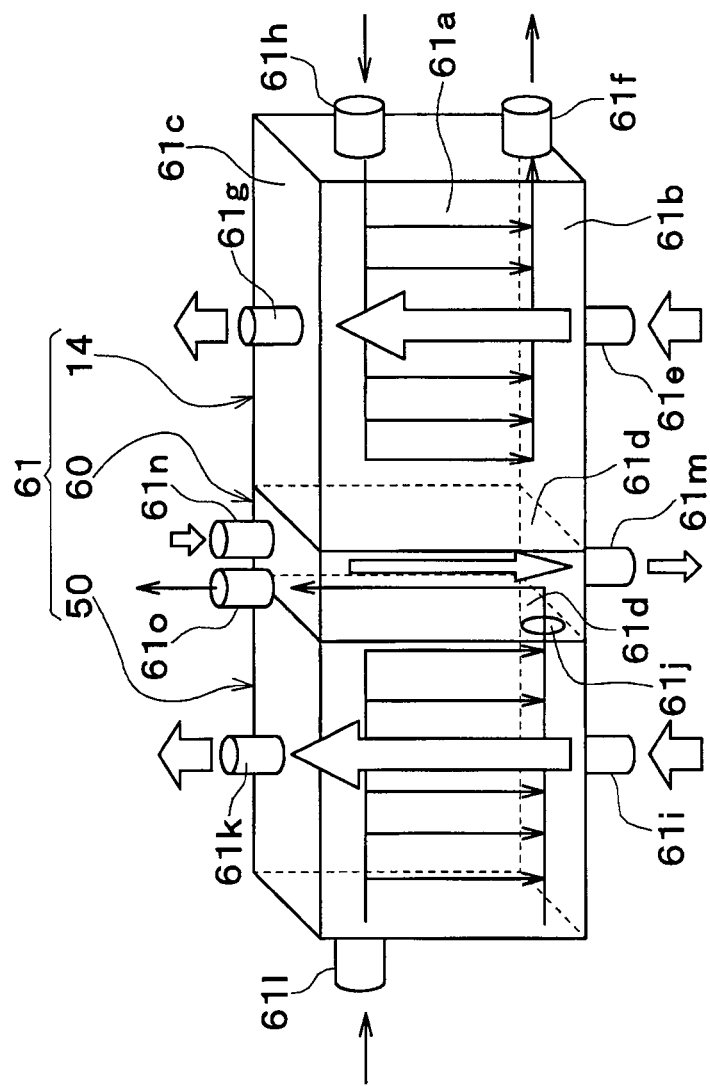
FIG. 28 is a perspective view showing a coolant cooler, a condenser, and a supercooler in a third embodiment.

The two partition portions 61d and 61d partition the insides of the tank portions 61b and 61c into three spaces in the stacking direction of the tubes (in the left-right direction of FIG. 28). One side of the heat exchanger 52 (on the right side of FIG. 28) in the stacking direction of the tubes with respect to the partition portion 61d constitutes the coolant cooler 14, whereas the other side of the heat exchanger 52 (on the left side of FIG. 28) in the stacking direction of the tubes with respect to the partition portion 61d constitutes the condenser 50, whereby a gap between the partitions 61d and 61d serves as the supercooler 60.

Members constituting the heat exchanger core 61a, the tank portions 61b and 61c, and the partition portion 61d are formed of metal (for example, an aluminum alloy), and bonded together by brazing.

One part of the tank portion 61b serving as the coolant cooler 14 is provided with an inlet 61e for the coolant and an outlet 61f for the refrigerant. The other part of the tank portion 61c serving as the coolant cooler 14 is provided with an outlet 61g for the coolant and an inlet 61h for the refrigerant.

Thus, in the coolant cooler 14, the coolant flows from the inlet 61e into the tank portion 61b, and is then distributed to the tubes for the coolant by the tank portion 61b. The coolants after having passed through the tubes for the coolant are collected into the tank portion 61c to flow from the outlet 61g.

In the coolant cooler 14, the refrigerant flows from the inlet 61h into the tank portion 61c, and is then distributed to the tubes for the refrigerant by the tank portion 61c. The refrigerants after having passed through the tubes for the refrigerant are collected into the tank portion 61b to flow from the outlet 61f.

One part of the tank portion 61b serving as the condenser 50 is provided with an inlet 61i for the coolant. A hole 61j for allowing the refrigerant to flow therethrough is formed in a part of the partition portion 61d for partitioning the inner space of the tank portion 61b into a tank space for the condenser 50 and another tank space for the supercooler 60. Another part of the other tank portion 61c serving as the condenser 50 is provided with an outlet 61k for the coolant and an inlet 61l for the refrigerant.

Thus, in the condenser 50, the coolant flows from the inlet 61i into the tank portion 61b, and is then distributed to the tubes for the coolant by the tank portion 61b. The coolants after having passed through the tubes for the coolant are collected into the tank portion 61c to flow from the outlet 61k.

In the condenser 50, the refrigerant flows from the inlet 61l into the tank portion 61c, and is then distributed to the tubes for the refrigerant by the tank portion 61c. The refrigerants after having passed through the tubes for the refrigerant are collected into the tank portion 61b to flow from the supercooler 60 via the hole 61j of the partition portion 61d.

One part of the tank portion 61b serving as the supercooler 60 is provided with an outlet 61m for the coolant. Another part of the other tank portion 61c serving as the supercooler 60 is provided with an inlet 61n for the coolant and an outlet 61o for the refrigerant.

Thus, in the condenser 60, the coolant flows from the inlet 61n into the tank portion 61c, and is then distributed to the tubes for the coolant by the tank portion 61c. The coolants after having passed through the tubes for the coolant are collected into the tank portion 61b to flow from the outlet 61m.

In the supercooler 60, the refrigerant flows into the tank portion 61b through the hole 61j of the partition portion 61d, and is then distributed to the tubes for the refrigerant by the tank portion 61b. The refrigerants after having passed through the tubes for the refrigerant are collected into the tank portion 61c to flow from the outlet 61o.

Now, the operation of the above-mentioned structure will be described. When the battery is charged with an external power source, the controller 40 performs the first mode shown in FIG. 25.

In the first mode, the controller 40 controls the electric motor 30 for a switching valve such that the first and second switching valves 19 and 20 are brought into the first state shown in FIG. 25 to operate the first and second pumps 11 and 12 and the compressor 23, thereby switching the electromagnetic valve 59 to the opened state.

Thus, the first switching valve 19 connects the inlet 19a with the outlets 19d and 19f, and also connects the inlet 19b with the outlets 19c and 19e. The second switching valve 20 connects the inlets 20b and 20d with the outlet 20e, and also connects the inlets 20a and 20c with the outlet 20f.

Accordingly, the first coolant circuit (intermediate-temperature coolant circuit) is formed of the first pump 11, the inverter cooler 16, the condenser 50, the heater core 51, and the radiator 13, whereas the second coolant circuit (low-temperature coolant circuit) is formed of the second pump 12, the coolant cooler 14, the supercooler 60, and the battery cooler 15.

That is, as indicated by alternate long and short dash lines with arrows in FIG. 25, the coolant discharged from the first pump 11 is branched into the inverter cooler 16 and the condenser 50 by the first switching valve 19 to flow in parallel through the inverter cooler 16 and the condenser 50. The coolant flowing through the condenser 50 flows in series through the heater core 51. The coolants flowing through the heater core 51 and through the inverter cooler 16 are collected by the second switching valve 20 to flow through the radiator 13, thereby being sucked into the first pump 11.

On the other hand, as indicated by solid arrows in FIG. 25, the coolant discharged from the second pump 12 is branched into the coolant cooler 14 and the supercooler 60 by the first switching valve 19 to flow in parallel through the coolant cooler 14 and the supercooler 60. The coolant flowing through the supercooler 60 flows in series through the battery cooler 15. The coolants flowing through the battery cooler 15 and through the coolant cooler 14 are collected by the second switching valve 20 to be sucked into the second pump 12.

In this way, in the first mode, the intermediate-temperature coolant cooled by the radiator 13 flows through the inverter cooler 16, the condenser 50, and the heater core 51, whereas the low-temperature coolant cooled by the coolant cooler 14 flows through the supercooler 60 and the battery cooler 15.

As a result, the inverter and the high-pressure refrigerant of the condenser 50 are cooled by the intermediate-temperature coolant, and the battery and the liquid-phase refrigerant of the supercooler 60 are cooled by the low-temperature coolant. Thus, the cold energy is stored in the battery.

When the battery is charged with the external power source, the compressor 23 of the refrigeration cycle 22 is driven by power supplied from the external power source. Thus, in the first mode, the cold energy is stored in the battery using the power supplied from the external power source.

In the first mode, the evaporator 55 exchanges heat between the blast air into the vehicle interior and the low-pressure refrigerant of the refrigeration cycle 22 to thereby cool the blast air into the vehicle interior. In the first mode, the condenser 50 exchanges heat between the intermediate-temperature coolant and the high-pressure refrigerant of the refrigeration cycle 22 to thereby heat the intermediate-temperature coolant, whereas the heater core 51 exchanges heat between the blast air into the vehicle interior and the intermediate-temperature coolant to thereby heat the blast air into the vehicle interior.

Thus, the conditioned air at the desired temperature can be made to adjust the temperature of air in the vehicle interior. For example, when the battery is charged before a passenger rides on a vehicle, pre-air conditioning can be carried out to perform air conditioning of the vehicle interior before the passenger rides on.

When the battery is not charged with the external power source and the interior of the vehicle needs cooling, the controller 40 performs the second mode shown in FIG. 26.

In the second mode, the controller 40 controls the electric motor 30 for a switching valve such that the first and second switching valves 19 and 20 are brought into the first state shown in FIG. 26 to operate the first and second pumps 11 and 12 and the compressor 23, thereby switching the electromagnetic valve 59 to the closed state. That is, the second mode has the same states of the first and second switching valves 19 and 20 as those in the first mode, but differs from the first mode in that the electromagnetic valve 59 is closed.

Thus, the low-pressure refrigerant of the refrigeration cycle 22 does not flow through the coolant cooler 14, and as a result the coolant is not cooled by the coolant cooler 14. However, the coolant is cooled by the cold energy stored in the battery in the first mode, at the battery cooler 15.

Since the low-temperature coolant cooled by the battery cooler 15 flows through the supercooler 60, the liquid-phase refrigerant (high-pressure refrigerant) of the supercooler 60 is cooled by the low-temperature coolant.

Thus, in the second mode, the cold energy stored in the battery can be used to supercool the high-pressure refrigerant of the refrigeration cycle 22, which can improve the efficiency of the refrigeration cycle 22, thereby achieving the energy saving.

Note that in the second mode, the low-temperature coolant may be cooled by the coolant cooler 14 with the electromagnetic valve 59 opened.

When the battery is at a predetermined temperature (for example, 40° C.) or less, and thus does not need cooling, and when the vehicle interior needs to be heated, the controller 40 performs the third mode shown in FIG. 27.

In the third mode, the controller 40 controls the electric motor 30 for a switching valve such that the first and second switching valves 19 and 20 are brought into the second state shown in FIG. 27 to operate the first and second pumps 11 and 12 and the compressor 23, thereby switching the electromagnetic valve 59 to the opened state.

Thus, the first switching valve 19 connects the inlet 19a with the outlets 19c, and 19f, and also connects the inlet 19b with the outlet 19d, thereby closing the outlet 19e. The second switching valve 20 connects the inlets 20a and 20d with the outlet 20e, and also connects the inlet 20b with the outlet 20f, thereby closing the inlet 20c.

Accordingly, a first coolant circuit (low-temperature coolant circuit) is formed of the first pump 11, the coolant cooler 14, the inverter cooler 16, and the radiator 13, whereas a second coolant circuit (intermediate-temperature coolant circuit) is formed of the second pump 12, the condenser 50, and the heater core 51.

That is, as indicated by solid arrows in FIG. 27, the coolant discharged from the first pump 11 is branched into the coolant cooler 14, and the inverter cooler 16 by the first switching valve 19 to flowing through the coolant cooler 14 and the inverter cooler 16 in parallel. The coolants flowing through the coolant cooler 14, and through the inverter cooler 16 are collected by the second switching valve 20 to flow through the radiator 13, thereby being sucked into the first pump 11.

On the other hand, as indicated by an alternate long and short dash line with an arrow in FIG. 27, the coolant discharged from the second pump 12 flows through the condenser 50 and the heater core 51 in series via the first switching valve 19, and is then sucked into the second pump 12 via the second switching valve 20.

Thus, in the third mode, the low-temperature coolant cooled by the coolant cooler 14 flows through the inverter cooler 16, which can cool the inverter by the low-temperature coolant.

In this case, the battery is at a predetermined temperature (for example, 40° C.) or less, and thus does not need to be cooled, so that the circulation of the coolant to the battery cooler 15 is stopped.

In the third mode, the low-temperature coolant cooled by the coolant cooler 14 flows through the radiator 13, allowing the coolant to absorb heat from the outside air in the radiator 13. Then, the coolant that has absorbed heat from the outside air in the radiator 13 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the outside air via the coolant.

The refrigerant that has absorbed heat from the outside air in the coolant cooler 14 exchanges heat with the coolant of the intermediate-temperature coolant circuit in the condenser 50, whereby the coolant of the intermediate-temperature coolant circuit is heated. The coolant of the intermediate-temperature circuit heated by the condenser 50 exchanges heat with the blast air having passed through the evaporator 55 in flowing through the heater core 51, thereby dissipating heat therefrom. Thus, the heater core 51 heats the blast air after having passed through the evaporator 55. Accordingly, the fourth mode can achieve heat pump heating that heats the vehicle interior by absorbing heat from the outside air.

The blast air heated by the heater core 51 is a dried cool air cooled and dehumidified by the low-pressure refrigerant of the refrigeration cycle 22 in the evaporator 55. Thus, in the third mode, the dehumidification heating can be performed.

Alternatively, when the temperature of the battery increases in the third mode, the intermediate-temperature coolant or low-temperature coolant may circulate into the battery cooler 15, thereby cooling the battery.

In this embodiment, when the battery is charged with the electric power supplied from the external power source, the electromagnetic valve 59 is opened to allow the low-pressure refrigerant of the refrigeration cycle to flow into the coolant cooler 14, so that the coolant cooled by the coolant cooler 14 flows through the battery cooler 15 to thereby cool the battery. Thus, the cold energy made by the refrigeration cycle 22 can be stored in the battery.

After the battery is charged with the electric power supplied from the external power source, the coolant flowing through the battery cooler 15 flows through the supercooler 60, so that the refrigerant flowing through the supercooler 60 can be cooled by the cold energy stored in the battery, further improving the efficiency of the refrigeration cycle 22. At this time, the electromagnetic valve 59 is closed to prevent the low-pressure refrigerant of the refrigeration cycle from flowing into the coolant cooler 14, thereby decreasing a cooling load on the refrigeration cycle 22.

Thus, for example, when the external power source cannot be used during traveling of the vehicle, the cold energy stored in the battery can be used for cooling of the temperature adjustment devices, thereby decreasing the power consumption.

In this embodiment, the supercooler 60 and the battery cooler 15 are connected together in series, which can effectively cool the coolant heated through the supercooler 60 with the cold energy stored in the battery cooler 15 as compared to the case in which the supercooler 60 and the battery cooler 15 are connected together in parallel.

Fourth Embodiment

Figure 29:
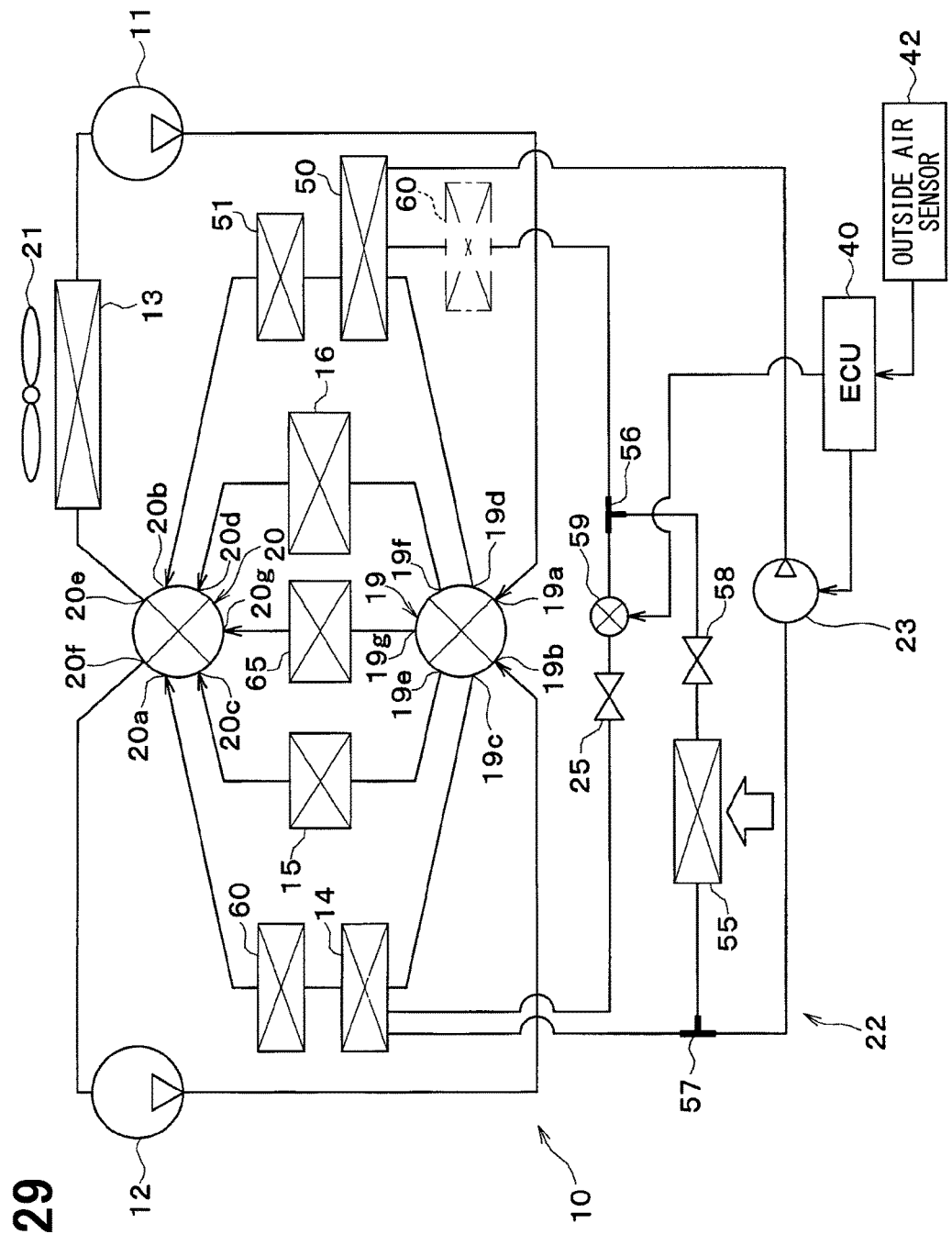
FIG. 29 is an entire configuration diagram of a vehicle thermal management system according to a fourth embodiment of the invention.

In a fourth embodiment of the invention, as shown in FIG. 29, an intake air cooler 65 (temperature adjustment device) is added to the structure of the above third embodiment. The intake air cooler 65 is a heat exchanger that cools intake air by exchanging heat between the coolant and the intake air at a high temperature compressed by a supercharger for an engine. The intake air is preferably cooled down to about 30° C.

The coolant inlet side of the intake air cooler 65 is connected to the outlet 19g of the first switching valve 19. The coolant outlet side of the intake air cooler 65 is connected to the inlet 20g of the second switching valve 20.

In this embodiment, the supercooler 60 is connected to the coolant outlet side of the coolant cooler 14 and the inlet 20a of the second switching valve 20.

The first switching valve 19 is configured to be capable of switching among three types of communication states between the inlets 19a and 19b and the outlets 19c, 19d, 19e, 19f, and 19g. The second switching valve 20 is also configured to be capable of switching among three types of communication states between the inlets 20a, 20b, 20c, 20d, and 20g and the outlets 20e, and 20f.

Figure 30:
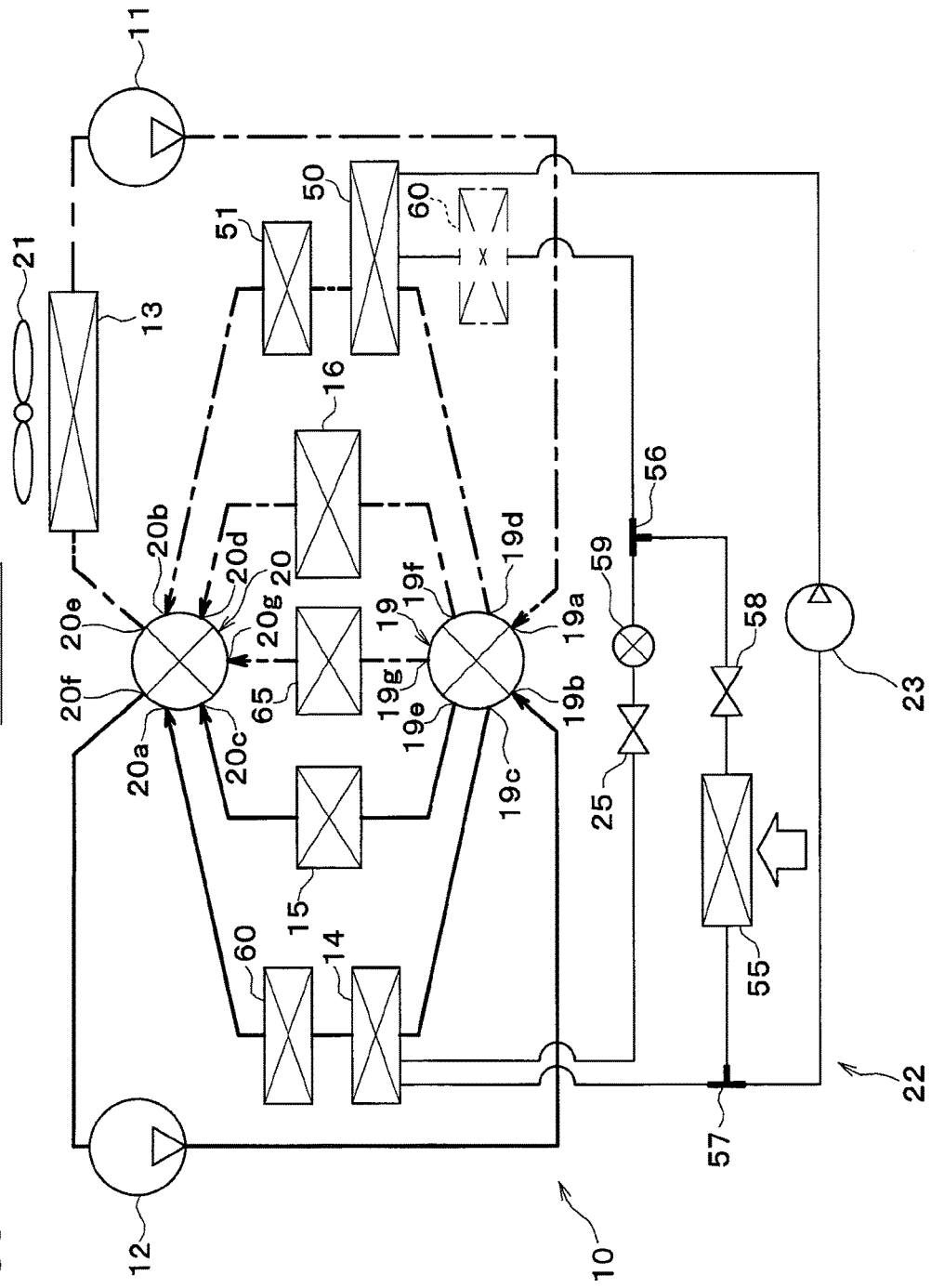
FIG. 30 is a diagram for explaining a first mode in the vehicle thermal management system of FIG. 29.

FIG. 30 shows the operation (first mode) of the cooling system 10 when the first and second switching valves 19 and 20 are switched to a first state.

In the first state, the first switching valve 19 connects the inlet 19a with the outlets 19d, 19f, and 19g, and also connects the inlet 19b with the outlets 19c and 19e. Thus, the first switching valve 19 allows the coolant entering the inlet 19a to flow out of the outlets 19d, 19f, and 19g as indicated by alternate long and short dash lines with arrows in FIG. 30, and also allows the coolant entering the inlet 19b to flow out of the outlets 19c and 19e as indicated by solid arrows in FIG. 30.

In the first state, the second switching valve 20 connects the inlets 20b, 20d, and 20g with the outlet 20e, and also connects the inlets 20a, and 20c with the outlet 20f. Thus, the second switching valve 20 allows the coolant entering the inlets 20b, 20d, and 20g to flow out of the outlet 20e as indicated by alternate long and short dash lines with arrows in FIG. 30, and also allows the coolant entering the inlets 20a and 20c to flow out of the outlet 20f as indicated by solid lines with an arrow in FIG. 30.

Figure 31:
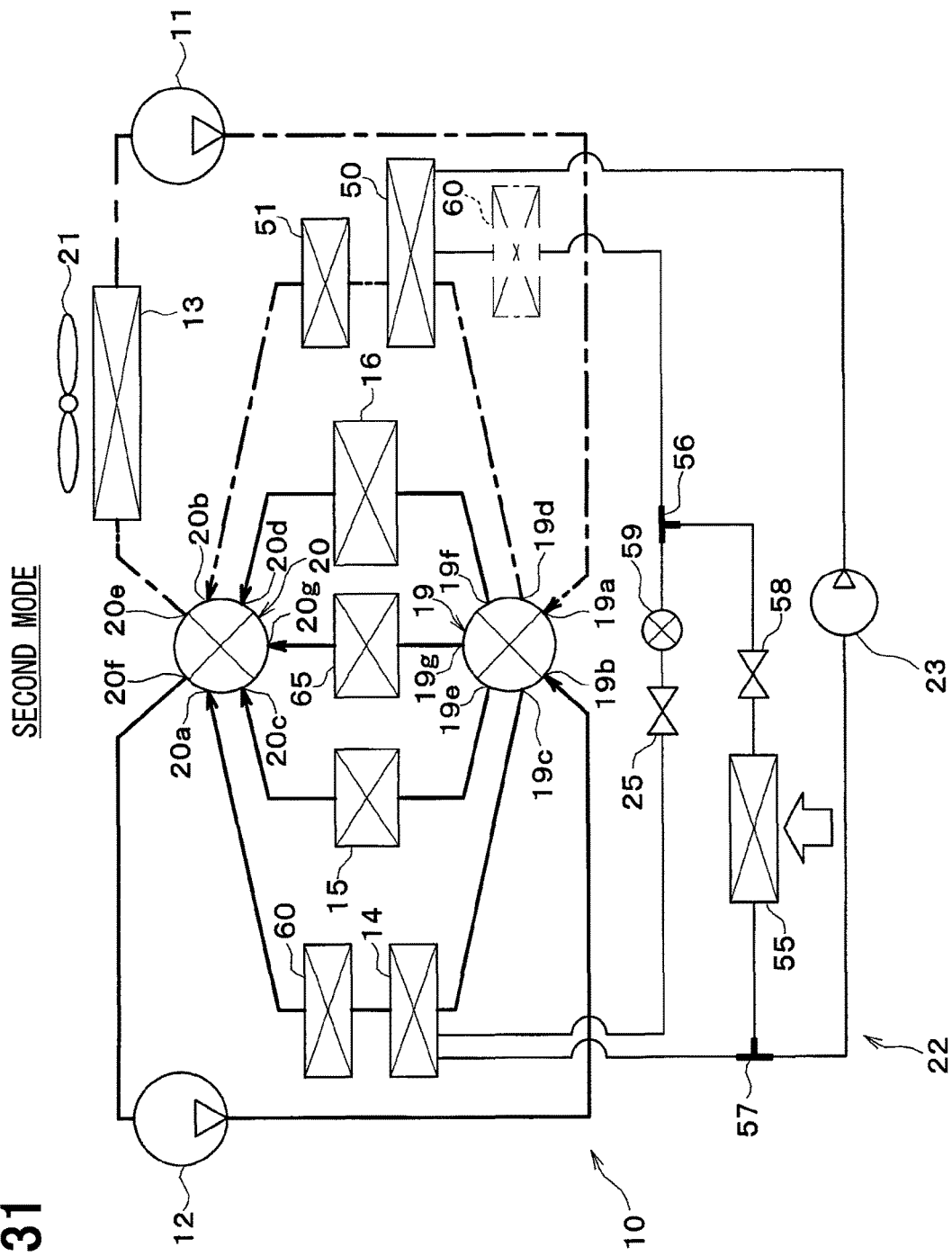
FIG. 31 is a diagram for explaining a second mode in the vehicle thermal management system of FIG. 29.

FIG. 31 shows the operation (second mode) of the cooling system 10 when the first and second switching valves 19 and 20 are switched to a second state.

In the second state, the first switching valve 19 connects the inlet 19a with the outlet 19d, and also connects the inlet 19b with the outlets 19c, 19e, 19f, and 19g. Thus, the first switching valve 19 allows the coolant entering the inlet 19a to flow out of the outlet 19d as indicated by an alternate long and short dash line with an arrow in FIG. 31, and also allows the coolant entering the inlet 19b to flow out of the outlets 19c, 19e, 19f, and 19g as indicated by solid arrows in FIG. 31.

In the second state, the second switching valve 20 connects the inlet 20b with the outlet 20e and also connects the inlets 20a, 20c, 20d, and 20g with the outlet 20f. Thus, the second switching valve 20 allows the coolant entering the inlet 20b to flow out of the outlet 20e as indicated by an alternate long and short dash line with an arrow in FIG. 31, and also allows the coolant entering the inlets 20a, 20c, 20d, and 20g to flow out of the outlet 20f as a solid arrow in FIG. 31.

Figure 32:
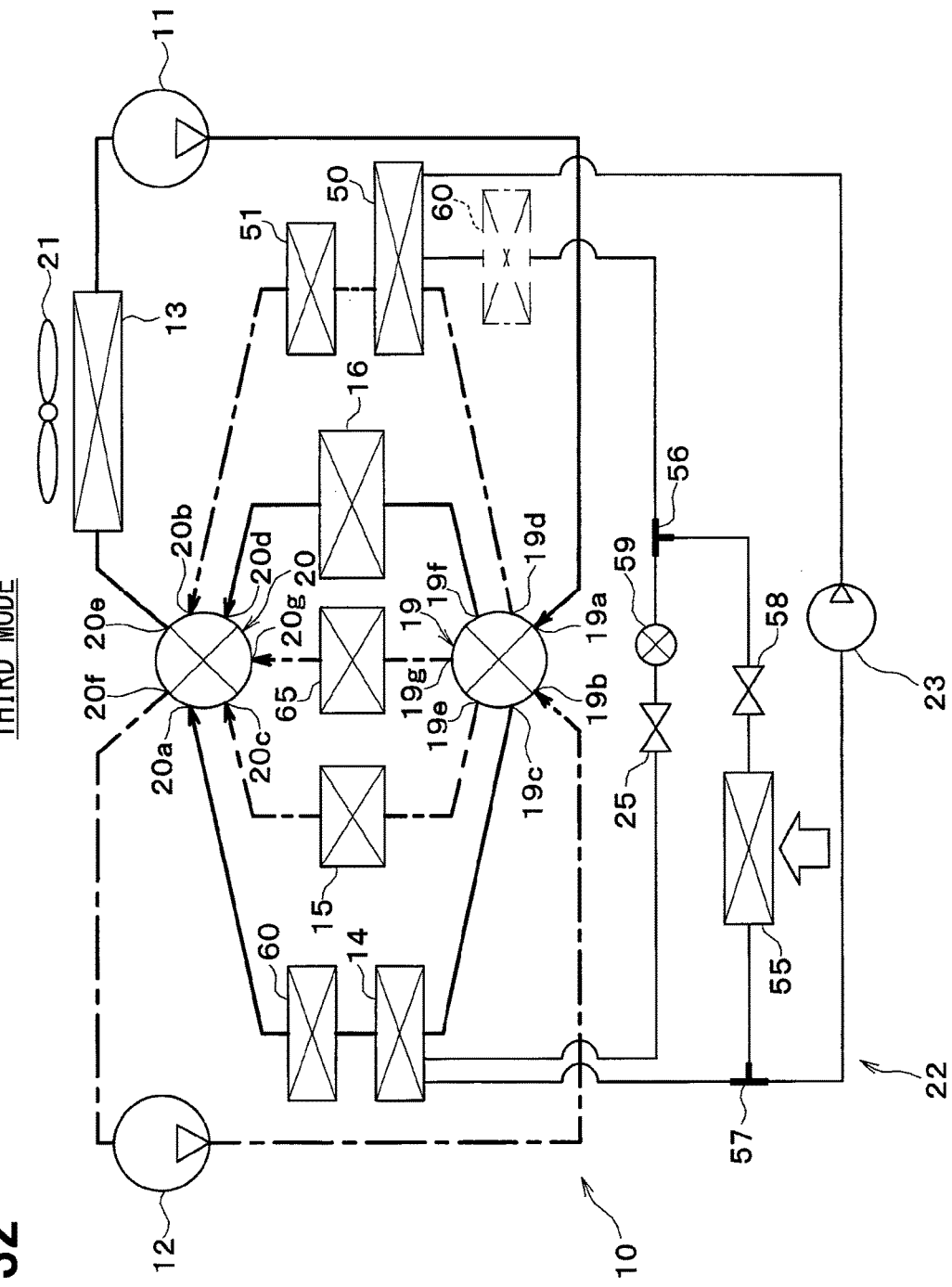
FIG. 32 is a diagram for explaining a third mode in the vehicle thermal management system of FIG. 29.

FIG. 32 shows the operation (third mode) of the cooling system 10 when the first and second switching valves 19 and 20 are switched to a third state.

In the third state, the first switching valve 19 connects the inlet 19a with the outlets 19c and 19f, and also connects the inlet 19b with the outlets 19d, 19e, and 19g. Thus, the first switching valve 19 allows the coolant entering the inlet 19a to flow out of the outlets 19c, and 19f as indicated by solid arrows in FIG. 32, and also allows the coolant entering the inlet 19b to flow out of the outlets 19d, 19e, and 19g as indicated by alternate long and short dash lines with arrows in FIG. 32.

In the third state, the second switching valve 20 connects the inlets 20a, and 20d with the outlet 20e, and also connects the inlets 20b, 20c, and 20g with the outlet 20f. Thus, the second switching valve 20 allows the coolant entering the inlets 20a and 20d to flow out of the outlet 20e as indicated by solid arrows in FIG. 32, and also allows the coolant entering the inlets 20b, 20c, and 20g to flow out of the outlet 20f as the alternate long and short dash line with the arrow in FIG. 32.

Now, the operation of the above-mentioned structure will be described. When the outside air temperature detected by the outside air sensor 42 is more than 15° C. and less than 40° C., the controller 40 performs the first mode shown in FIG. 30.

In the first mode, the controller 40 controls the electric motor 30 for a switching valve such that the first and second switching valves 19 and 20 are brought into the first state shown in FIG. 30 to operate the first and second pumps 11 and 12 and the compressor 23, thereby switching the electromagnetic valve 59 to the opened state.

Thus, the first switching valve 19 connects the inlet 19a with the outlets 19d, 19f, and 19g, and also connects the inlet 19b with the outlets 19c and 19e. The second switching valve 20 connects the inlets 20b, 20d, and 20g with the outlet 20e, and also connects the inlets 20a and 20c with the outlet 20f.

Accordingly, the first coolant circuit (intermediate-temperature coolant circuit) is formed of the first pump 11, the inverter cooler 16, the condenser 50, the heater core 51, the intake air cooler 65, and the radiator 13, whereas the second coolant circuit (low-temperature coolant circuit) is formed of the second pump 12, the coolant cooler 14, the supercooler 60, and the battery cooler 15.

That is, as indicated by alternate long and short dash lines with arrows in FIG. 30, the coolant discharged from the first pump 11 is branched into the inverter cooler 16, the condenser 50, and the intake air cooler 65 by the first switching valve 19 to flow in parallel through the inverter cooler 16, the condenser 50, and the intake air cooler 65. The coolant flowing through the condenser 50 flows in series through the heater core 51. The coolants flowing through the heater core 51, through the inverter cooler 16, and through the intake air cooler 65 are collected by the second switching valve 20 to flow through the radiator 13, thereby being sucked into the first pump 11.

On the other hand, as indicated by solid arrows in FIG. 30, the coolant discharged from the second pump 12 is branched into the coolant cooler 14 and the battery cooler 15 by the first switching valve 19 to flow in parallel through the coolant cooler 14 and the battery cooler 15. The coolant flowing through the coolant cooler 14 flows in series through the supercooler 60. The coolants flowing through the supercooler 60 and through the battery cooler 15 are collected by the second switching valve 20 to be sucked into the second pump 12.

Thus, in the first mode, the intermediate-temperature coolant cooled by the radiator 13 flows through the inverter cooler 16, the condenser 50, the heater core 51, and the intake air cooler 65, whereas the low-temperature coolant cooled by the coolant cooler 14 flows through the supercooler 60 and the battery cooler 15.

As a result, the inverter, the intake air, and the high-pressure refrigerant of the condenser 50 are cooled by the intermediate-temperature coolant, and the liquid-phase refrigerant of the supercooler 60 and the battery are cooled by the low-temperature coolant.

In the first mode, the evaporator 55 exchanges heat between the blast air into the vehicle interior and the low-pressure refrigerant of the refrigeration cycle 22 to thereby cool the blast air into the vehicle interior. In the first mode, the condenser 50 exchanges heat between the intermediate-temperature coolant and the high-pressure refrigerant of the refrigeration cycle 22 to thereby heat the intermediate-temperature coolant, whereas the heater core 51 exchanges heat between the blast air into the vehicle interior and the intermediate-temperature coolant to thereby heat the blast air into the vehicle interior. Thus, the conditioned air at the desired temperature can be made to adjust the temperature of air in the vehicle interior.

When the outside air temperature detected by the outside air sensor 42 is 40° C. or higher, the controller 40 performs the second mode shown in FIG. 31.

In the second mode, the controller 40 controls the electric motor 30 for a switching valve such that the first and second switching valves 19 and 20 are brought into the second state shown in FIG. 31 to operate the first and second pumps 11 and 12 and the compressor 23, thereby switching the electromagnetic valve 59 to the opened state.

Thus, the first switching valve 19 connects the inlet 19a with the outlet 19d and also connects the inlet 19b with the outlets 19c, 19e, 19f, and 19g. The second switching valve 20 connects the inlet 20b with the outlet 20e, and also connects the inlets 20a, 20c, 20d, and 20g with the outlet 20f.

Accordingly, the first coolant circuit (intermediate-temperature coolant circuit) is formed of the first pump 11, the condenser 50, the heater core 51, and the radiator 13, whereas the second coolant circuit (low-temperature coolant circuit) is formed of the second pump 12, the coolant cooler 14, the supercooler 60, the battery cooler 15, the inverter cooler 16, and the intake air cooler 65.

That is, as indicated by an alternate long and short dash line with an arrow in FIG. 31, the coolant discharged from the first pump 11 flows through the condenser 50 and the heater core 51 in series via the first switching valve 19, and is then sucked into the first pump 11 via the second switching valve 20.

On the other hand, as indicated by solid arrows in FIG. 31, the coolant discharged from the second pump 12 is branched into the coolant cooler 14, the battery cooler 15, the inverter cooler 16, and the intake air cooler 65 by the first switching valve 19. The coolant flowing through the coolant cooler 14 flows in series through the supercooler 60. The coolants flowing through the supercooler 60, through the battery cooler 15, through the inverter cooler 16, and through the intake air cooler 65 are collected by the second switching valve 20 to be sucked into the second pump 12.

Thus, in the second mode, the intermediate-temperature coolant cooled by the radiator 13 flows through the condenser 50 and the heater core 51, whereas the low-temperature coolant cooled by the coolant cooler 14 flows through the supercooler 60, the battery cooler 15, the inverter cooler 16, and the intake air cooler 65.

As a result, the high-pressure refrigerant of the condenser 50 is cooled by the intermediate-temperature coolant, and the liquid-phase refrigerant of the supercooler 60, the battery, the inverter, and the intake air are cooled by the low-temperature coolant.

In the second mode, the evaporator 55 exchanges heat between the blast air into the vehicle interior and the low-pressure refrigerant of the refrigeration cycle 22 to thereby cool the blast air into the vehicle interior. In the second mode, the condenser 50 exchanges heat between the high-pressure refrigerant of the refrigeration cycle 22 and the intermediate-temperature coolant to thereby heat the intermediate-temperature coolant, whereas the heater core 51 exchanges heat between the intermediate-temperature coolant and the blast air into the vehicle interior to thereby heat the blast air into the vehicle interior. Thus, the conditioned air at the desired temperature can be made to adjust the temperature of air in the vehicle interior.

Even in performing the first mode, under sudden acceleration, such as upon startup, the low-temperature coolant is allowed to flow through the intake air cooler 65, thereby cooling the intake air with the low-temperature coolant in the same way as the second mode. Thus, even though the intake air temperature is increased due to an increase in supercharging pressure at the time of sudden acceleration, the intake air can be sufficiently cooled to improve the fuel efficiency.

When the outside air temperature detected by the outside air sensor 42 is 0° C. or lower, the controller 40 performs the third mode shown in FIG. 32.

In the third mode, the controller 40 controls the electric motor 30 for a switching valve such that the first and second switching valves 19 and 20 are brought into the third state shown in FIG. 32 to operate the first and second pumps 11 and 12 and the compressor 23, thereby switching the electromagnetic valve 59 to the opened state.

Thus, the first switching valve 19 connects the inlet 19a with the outlets 19c and 19f and also connects the inlet 19b with the outlets 19d, 19e, and 19g. The second switching valve 20 connects the inlets 20a and 20d with the outlet 20e, and also connects the inlets 20b, 20c, and 20g with the outlet 20f.

Accordingly, the first coolant circuit (low-temperature coolant circuit) is formed of the first pump 11, the coolant cooler 14, the supercooler 60, the inverter cooler 16, and the radiator 13, whereas the second coolant circuit (intermediate-temperature coolant circuit) is formed of the second pump 12, the battery cooler 15, the condenser 50, the heater core 51, and the intake cooler 65.

That is, as indicated by solid arrows in FIG. 32, the coolant discharged from the first pump 11 is branched into the coolant cooler 14 and the inverter cooler 16 by the first switching valve 19. The coolant flowing through the coolant cooler 14 flows in series through the supercooler 60. The coolants flowing through the supercooler 60 and through the inverter cooler 16 are collected by the second switching valve 20 to thereby be sucked into the second pump 11.

On the other hand, as indicated by alternate long and short dash lines with arrows in FIG. 32, the coolant discharged from the second pump 12 is branched into the battery cooler 15, the condenser 50, and the intake air cooler 65 by the first switching valve 19. The coolant flowing through the condenser 50 flows in series through the heater core 51. The coolants flowing through the heater core 51, through the battery cooler 15, and through the intake air cooler 65 are collected by the second switching valve 20 to be sucked into the second pump 12.

In the third mode, the low-temperature coolant cooled by the coolant cooler 14 flows through the inverter cooler 16, which can cool the inverter by the low-temperature coolant.

In the third mode, the low-temperature coolant cooled by the coolant cooler 14 flows through the radiator 13, allowing the coolant to absorb heat from the outside air in the radiator 13. Then, the coolant which has absorbed heat from the outside air in the radiator 13 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the outside air via the coolant.

The refrigerant which has absorbed heat from the outside air in the coolant cooler 14 exchanges heat with the coolant of the intermediate-temperature coolant circuit in the condenser 50, whereby the coolant of the intermediate-temperature coolant circuit is heated. The coolant of the intermediate-temperature circuit heated by the condenser 50 exchanges heat with the blast air having passed through the evaporator 55 in flowing through the heater core 51, thereby dissipating heat therefrom. Thus, the heater core 51 heats the blast air after having passed through the evaporator 55.

Accordingly, the fourth mode can achieve heat pump heating that heats the vehicle interior by absorbing heat from the outside air.

The blast air heated by the heater core 51 is a dried cool air cooled and dehumidified by the evaporator 55. Thus, in the third mode, the dehumidification heating can be performed.

In the third mode, the intermediate-temperature coolant heated by the condenser 50 flows through the battery cooler 15 and the intake air cooler 65. Thus, the third mode can improve the output of the battery by heating the battery, and promote the atomization of the fuel by heating the intake air, further improving the fuel efficiency. In particular, at the cold start when fuel is difficult to atomize due to the cold engine, the promotion of the atomization of the fuel can improve the combustion efficiency.

Fifth Embodiment

Figure 33:
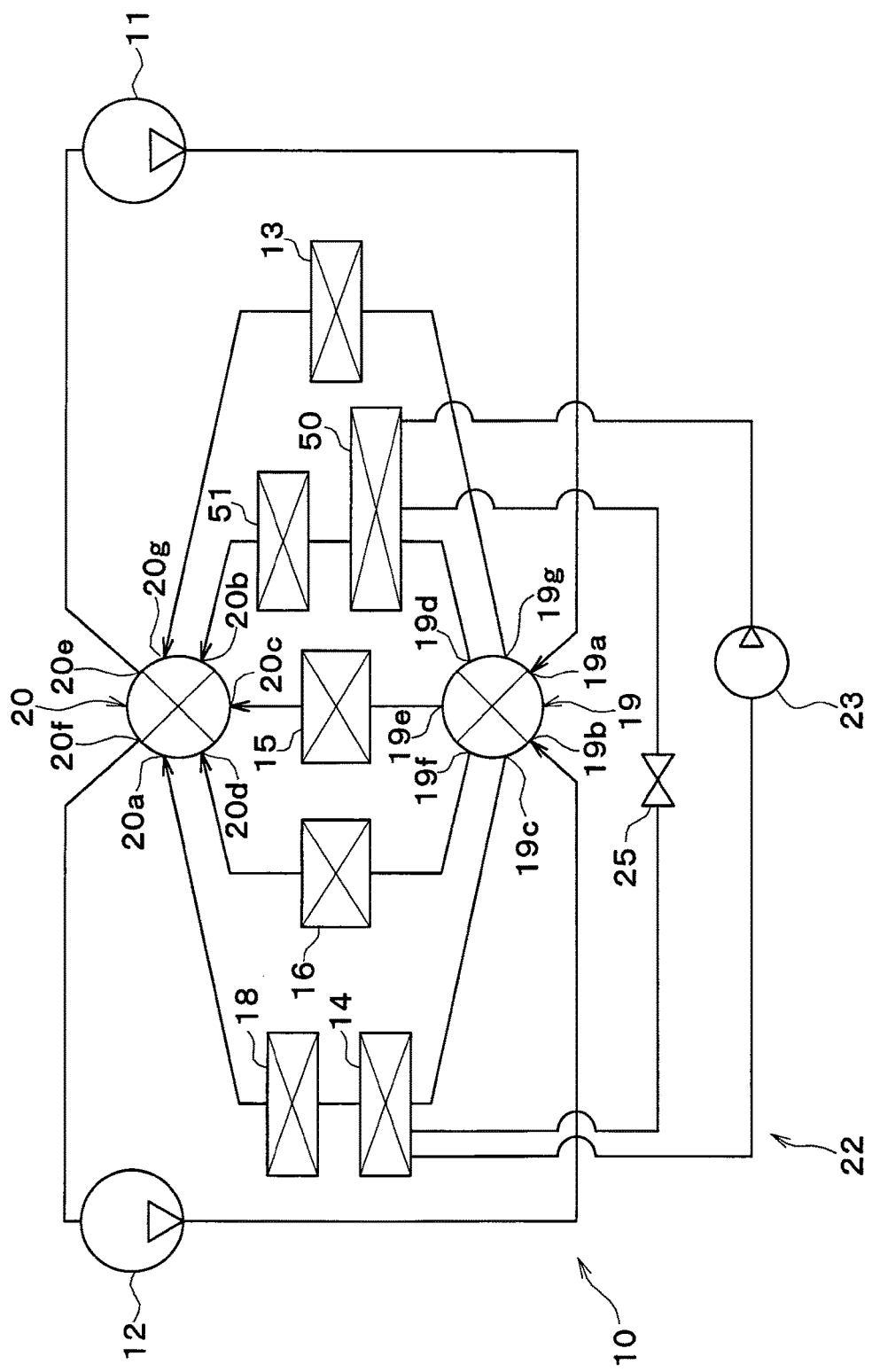
FIG. 33 is an entire configuration diagram of a vehicle thermal management system according to a fifth embodiment of the invention.

Although in the second embodiment, the radiator 13 is connected between the outlet 20e of the second switching valve 20 and the suction side of the first pump 11, in a fifth embodiment, as shown in FIG. 33, the radiator 13 is connected between the outlet 19g of the first switching valve 19 and the inlet 20g of the second switching valve 20.

The coolant inlet side of the radiator 13 is connected to the outlet 19g of the first switching valve 19. The coolant outlet side of the radiator 13 is connected to the inlet 20g of the second switching valve 20.

The first switching valve 19 is configured to be capable of switching between two types of communication states between the inlets 19a and 19b and the outlets 19c, 19d, 19e, 19f, and 19g. The second switching valve 20 is also configured to be capable of switching between two types of communication states between the inlets 20a, 20b, 20c, 20d, and 20g and the outlets 20e, and 20f.

Figure 34:
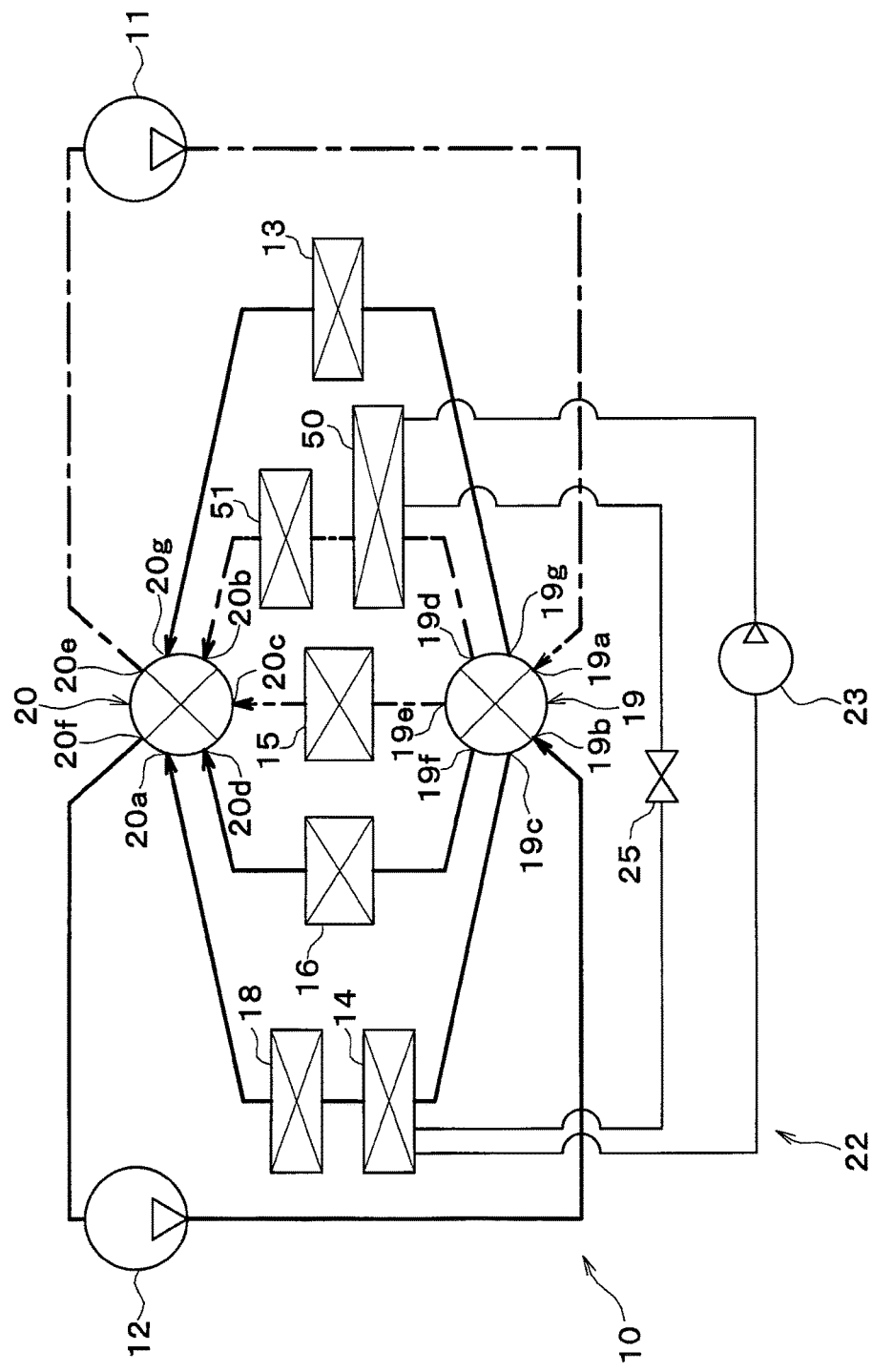
FIG. 34 is a diagram for explaining a first mode in the vehicle thermal management system of FIG. 33.

FIG. 34 shows the operation (first mode) of the cooling system 10 when the first and second switching valves 19 and 20 are switched to a first state.

In the first state, the first switching valve 19 connects the inlet 19a with the outlets 19d and 19e, and also connects the inlet 19b with the outlets 19c, 19f, and 19g. Thus, the first switching valve 19 allows the coolant entering the inlet 19a to flow out of the outlets 19d and 19e as indicated by an alternate long and short dash line with an arrow in FIG. 34, and also allows the coolant entering the inlet 19b to flow out of the outlets 19c, 19f, and 19g as indicated by solid arrows in FIG. 34.

In the first state, the second switching valve 20 connects the inlets 20b, and 20c with the outlet 20e and also connects the inlets 20a, 20d, and 20g with the outlet 20f. Thus, the second switching valve 20 allows the coolant entering the inlets 20b and 20c to flow out of the outlet 20e as indicated by alternate long and short dash lines with arrows in FIG. 34, and also allows the coolant entering the inlets 20a, 20d, and 20g to flow out of the outlet 20f as indicated by solid arrows in FIG. 30.

Figure 35:
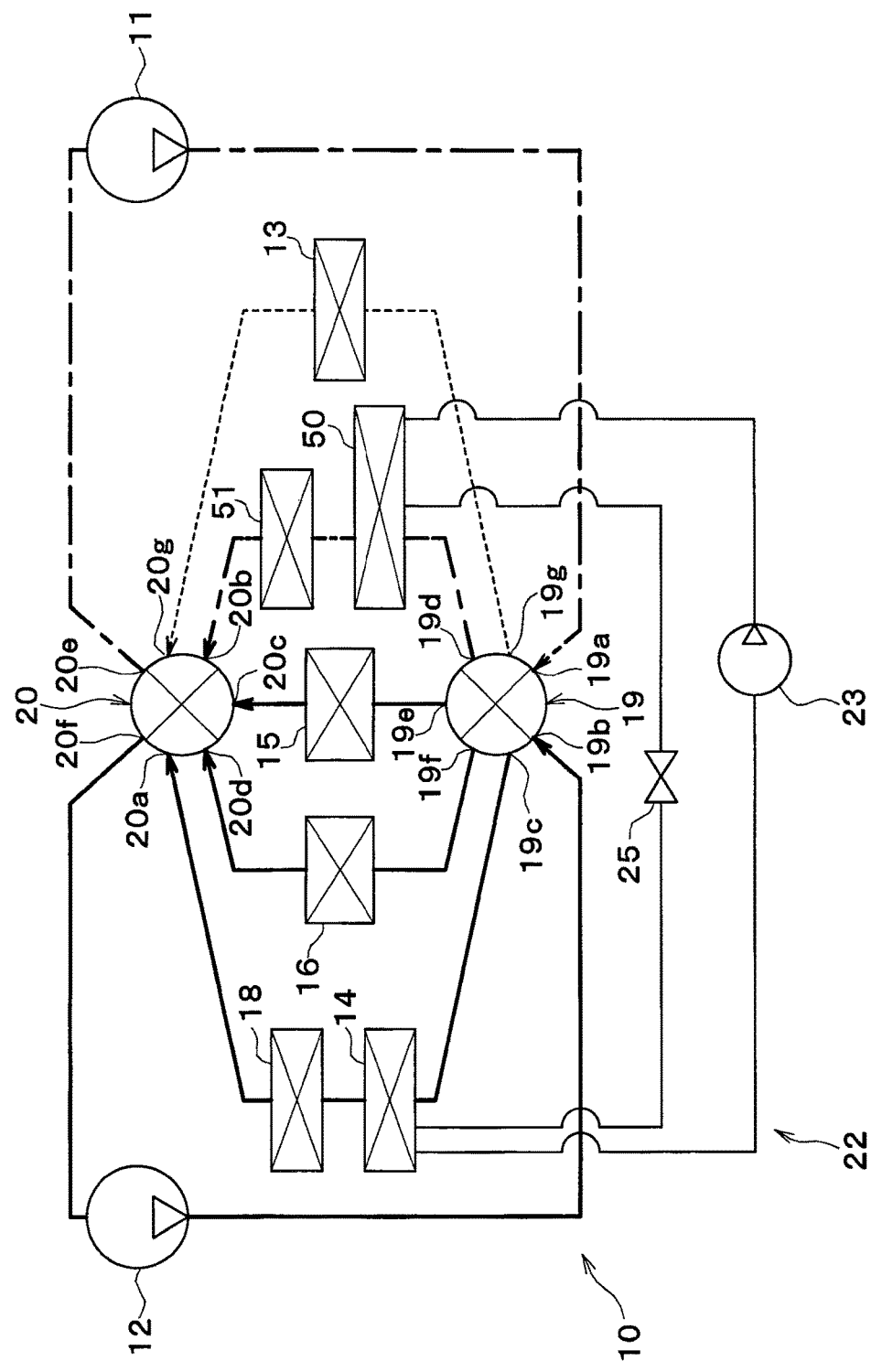
FIG. 35 is a diagram for explaining a second mode in the vehicle thermal management system of FIG. 34.

FIG. 35 shows the operation (second mode) of the cooling system 10 when the first and second switching valves 19 and 20 are switched to a second state.

In the second state, the first switching valve 19 connects the inlet 19a with the outlet 19d, and also connects the inlet 19b with the outlets 19c, 19e, and 19f, thereby closing the outlet 19g. Thus, the first switching valve 19 allows the coolant entering the inlet 19a to flow out of the outlet 19d as indicated by an alternate long and short dash line with an arrow in FIG. 35, and also allows the coolant entering the inlet 19b to flow out of the outlets 19c, 19e, and 19f as indicated by solid arrows in FIG. 35, thereby preventing the coolant from flowing out of the outlet 19g.

In the second state, the second switching valve 20 connects the inlet 20b with the outlet 20e and also connects the inlets 20a, 20c, and 20d with the outlet 20f, thereby closing the inlet 20g. Thus, the second switching valve 20 allows the coolant entering the inlets 20b to flow out of the outlet 20e as indicated by an alternate long and short dash line with an arrow in FIG. 35, and also allows the coolant entering the inlets 20a, 20c, and 20d to flow out of the outlet 20f as indicated by solid arrows in FIG. 35, thereby preventing the coolant from flowing out of the inlet 20g.

When the battery is charged with the power supplied from the external power supply at a very low temperature of the outside air (for example, at 0° C.) in winter, the controller 40 performs the first mode shown in FIG. 34.

In the first mode, the controller 40 controls the electric motor 30 for a switching valve such that the first and second switching valves 19 and 20 are brought into the first state shown in FIG. 34 to thereby operate the first and second pumps 11 and 12 and the compressor 23.

Thus, the first switching valve 19 connects the inlet 19a with the outlets 19d and 19e and also connects the inlet 19b with the outlets 19c, 19f, and 19g. The second switching valve 20 connects the inlets 20b and 20c with the outlet 20e, and also connects the inlets 20a, 20d, and 20g with the outlet 20f.

Accordingly, a first coolant circuit (intermediate-temperature coolant circuit) is formed of the first pump 11, the battery cooler 15, the condenser 50, and the heater core 51, whereas a second coolant circuit (low-temperature coolant circuit) is formed of the second pump 12, the coolant cooler 14, the cooler core 18, the inverter cooler 16, and the radiator 13.

That is, as indicated by alternate long and short dash lines with arrows in FIG. 34, the coolant discharged from the first pump 11 is branched into the battery cooler 15 and the condenser 50 by the first switching valve 19 to flow in parallel through the battery cooler 15 and the condenser 50. The coolant flowing through the condenser 50 flows in series through the heater core 51. The coolants flowing through the heater core 51 and through the battery cooler 15 are collected by the second switching valve 20 to be sucked into the first pump 11.

On the other hand, as indicated by solid arrows in FIG. 34, the coolant discharged from the second pump 12 is branched into the coolant cooler 14, the inverter cooler 16, and the radiator 13 by the first switching valve 19. The coolant flowing through the coolant cooler 14 flows in series through the cooler core 18. The coolants flowing through the cooler core 18, through the inverter cooler 16, and through the radiator 13 are collected by the second switching valve 20 to be sucked into the second pump 12.

In the first mode, the low-temperature coolant cooled by the coolant cooler 14 flows through the inverter cooler 16 and the cooler core 18, which can cool the inverter and the blast air into the vehicle interior by the low-temperature coolant.

In the first mode, the low-temperature coolant cooled by the coolant cooler 14 flows through the radiator 13, allowing the coolant to absorb heat from the outside air in the radiator 13. Then, the coolant which has absorbed heat from the outside air in the radiator 13 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the outside air via the coolant.

The refrigerant which has absorbed heat from the outside air in the coolant cooler 14 exchanges heat with the coolant of the intermediate-temperature coolant circuit in the condenser 50, whereby the coolant of the intermediate-temperature coolant circuit is heated. The coolant of the intermediate-temperature circuit heated by the condenser 50 exchanges heat with the blast air having passed through the cooler core 18 in flowing through the heater core 51, thereby dissipating heat therefrom. Thus, the heater core 51 heats the blast air having passed through the cooler core 18. Accordingly, the fourth mode can achieve heat pump heating that heats the vehicle interior by absorbing heat from the outside air.

The blast air heated by the heater core 51 is a dried cool air cooled and dehumidified by the cooler core 18. Thus, in the first mode, the dehumidification heating can be performed.

For example, when the battery is charged before a passenger rides on a vehicle, pre-air conditioning can be carried out to perform air conditioning of the vehicle interior before the passenger rides on.

Further, in the first mode, the intermediate-temperature coolant heated by the condenser 50 flows through the battery cooler 15, so that the warm energy can be stored in the battery by heating the battery. In this embodiment, in the first mode, the battery is heated up to about 40° C.

When the charging of the battery with the power from the external power source is completed and the vehicle starts traveling, the controller 40 performs the second mode shown in FIG. 35.

In the second mode, the controller 40 controls the electric motor 30 for a switching valve such that the first and second switching valves 19 and 20 are brought into the second state shown in FIG. 35 to thereby operate the first and second pumps 11 and 12 and the compressor 23.

Thus, the first switching valve 19 connects the inlet 19$a$ with the outlet 19$d$, and also connects the inlet 19$b$ with the outlets 19$c$, 19$e$, and 19$f$, thereby closing the outlet 19$g$. The second switching valve 20 connects the inlet 20$b$ with the outlet 20$e$, and also connects the inlets 20$a$, 20$c$, and 20$d$ with the outlet 20$f$, thereby closing the inlet 20$g$.

Accordingly, the first coolant circuit (intermediate-temperature coolant circuit) is formed of the first pump 11, the condenser 50, and the heater core 51, whereas the second coolant circuit (low-temperature coolant circuit) is formed of the second pump 12, the coolant cooler 14, the cooler core 18, the battery cooler 15, and the inverter cooler 16, thus stopping circulation of the coolant toward the radiator 13.

That is, as indicated by an alternate long and short dash line with an arrow in FIG. 35, the coolant discharged from the first pump 11 flows through the condenser 50 and the heater core 51 in series via the first switching valve 19, and is then sucked into the first pump 11 via the second switching valve 20.

On the other hand, as indicated by solid arrows in FIG. 35, the coolant discharged from the second pump 12 is branched into the coolant cooler 14, the battery cooler 15, and the inverter cooler 16 by the first switching valve 19. The coolant flowing through the coolant cooler 14 flows in series through the cooler core 18. The coolants flowing through the cooler core 18, through the battery cooler 15, and through the inverter cooler 16 are collected by the second switching valve 20 to be sucked into the second pump 12.

In the second mode, the low-temperature coolant cooled by the coolant cooler 14 flows through the battery cooler 15, allowing the low-temperature coolant to absorb heat from the battery in the battery cooler 15. Then, the coolant absorbing heat from the battery in the battery cooler 15 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the battery via the coolant.

The refrigerant absorbing heat from the battery in the coolant cooler 14 exchanges heat with the coolant of the intermediate-temperature coolant circuit in the condenser 50, thereby heating the coolant of the intermediate-temperature coolant circuit. The coolant of the intermediate-temperature circuit heated by the condenser 50 exchanges heat with the blast air having passed through the cooler core 18 in flowing through the heater core 5, thereby dissipating heat therefrom. Thus, the heater core 51 heats the blast air having passed through the cooler core 18. Accordingly, the second mode can achieve heat pump heating that heats the vehicle interior by absorbing heat from the battery.

The blast air heated by the heater core 51 is a dried cool air cooled and dehumidified by the cooler core 18. Thus, in the second mode, the dehumidification heating can be performed.

In this embodiment, in the first mode, the battery is heated up to about 40° C., and hence in the second mode, the heat pump can be achieved by drawing heat from the battery at the 40° C. Thus, this embodiment can operate the thermal management system at a higher temperature than the case where the low-pressure refrigerant of the refrigeration cycle 22 absorbs heat from the outside air (for example, 0° C.), thereby improving the operating efficiency of the heat pump.

In the second mode, the coolant does not circulate through the radiator 13, and the radiator 13 does not absorb heat from outside air, which can prevent the frost formation of the radiator 13.

Sixth Embodiment

Figure 36:
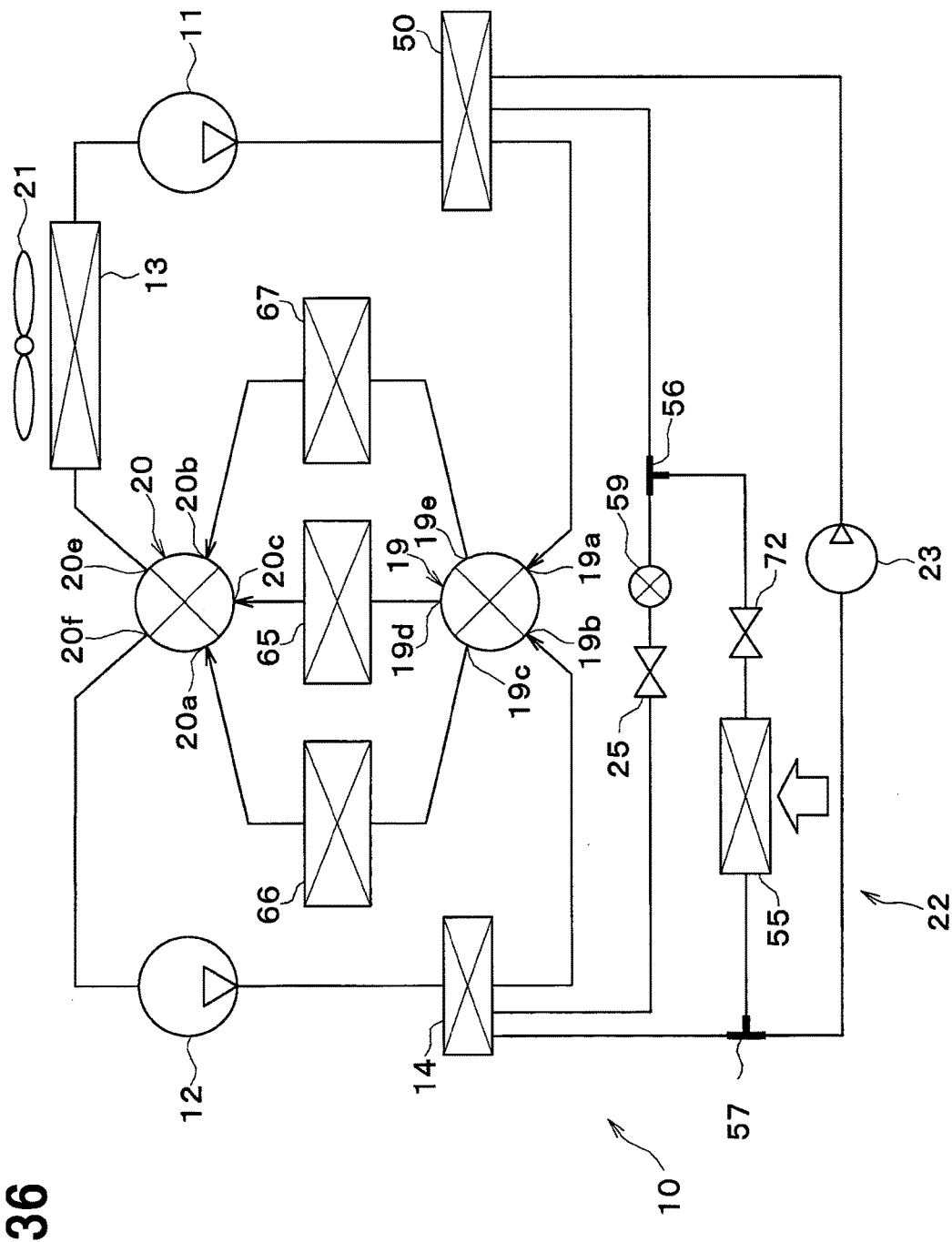
FIG. 36 is an entire configuration diagram of a vehicle thermal management system according to a sixth embodiment of the invention.

Although in the above respective embodiments, the temperature adjustment devices include the coolant cooler 14, the battery cooler 15, the inverter cooler 16, the exhaust gas cooler 17, the cooler core 18, the condenser 50, and the intake air cooler 65 by way of example, in a sixth embodiment, as shown in FIG. 36, the temperature adjustment devices include the intake air cooler 65, a fuel cooler 66, and a vehicle-mounted electronic device cooler 67.

The fuel cooler 66 is a heat exchanger for cooling fuel by exchanging heat between the fuel supplied to the engine and the coolant. The vehicle-mounted electronic device cooler 67 is a heat exchanger for cooling a vehicle-mounted electronic device by exchanging heat between the vehicle-mounted electronic device and the coolant. Thus, various devices can be used as the temperature adjustment devices.

Like this embodiment, the condenser 50 may be connected to the discharge side of the first pump 11 and the inlet 19$a$ of the first switching valve 19.

Seventh Embodiment

Figure 37:
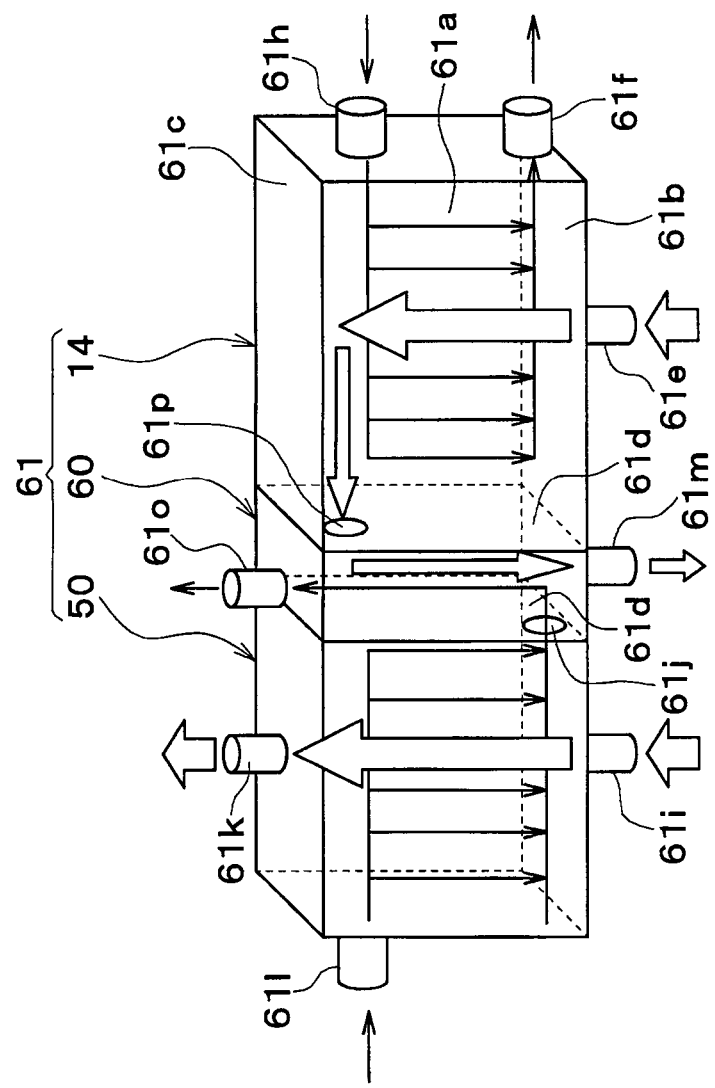
FIG. 37 is a perspective view showing a coolant cooler, a condenser, and a supercooler in a seventh embodiment.

Although in the above third embodiment, the outlet 61$g$ and inlet 61$n$ for the coolant are formed in parts constituting the coolant cooler 14 and the supercooler 60 of the tank portion 61$c$ of the heat exchanger 61, in a seventh embodiment, as shown in FIG. 37, the outlet 61$g$ and inlet 61$n$ for the coolant are removed, and a hole 61$p$ for allowing the refrigerant to flow therethrough is formed in a part of the partition portion 61$d$ that partitions the internal space of the tank portion 61b into a tank space for the coolant cooler 14, and another tank space for the supercooler 60.

Thus, in the coolant cooler 14, the coolant flows from the inlet 61e into the tank portion 61b, and is then distributed to the tubes for the coolant by the tank portion 61b. The coolants after having passed through the tubes for the coolant are collected into the tank portion 61c to flow from the hole 61p of the partition portion 61d into the supercooler 60.

In the supercooler 60, the coolant flows into the tank portion 61b through the hole 61p of the partition portion 61d, and is then distributed to the tubes for the coolant by the tank portion 61c. The coolants after having passed through the tubes for the coolant are collected into the tank portion 61b to flow from the outlet 61m.

This embodiment can remove the outlet 61g and inlet 61n for the coolant with respect to the heat exchanger 61 of the third embodiment, and thus can simplify the connection structure of the coolant pipes.

Eighth Embodiment

Figure 38:
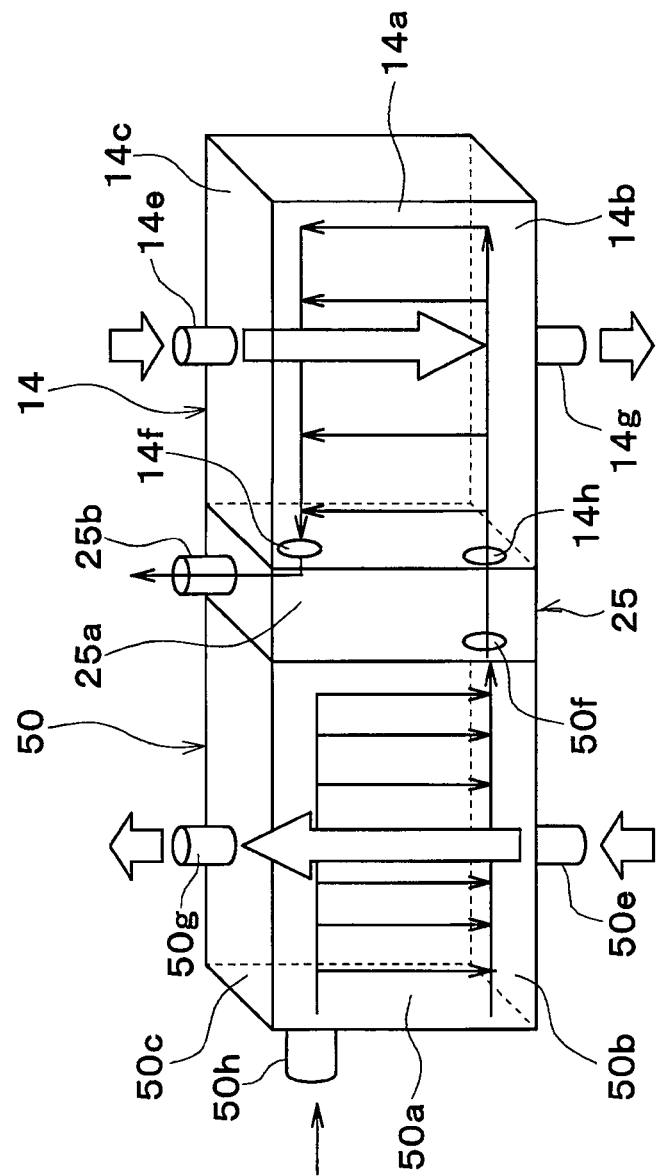
FIG. 38 is a perspective view showing a coolant cooler, a condenser, and an expansion valve in an eighth embodiment.

Although in the seventh embodiment, the coolant cooler 14, the condenser 50, and the supercooler 60 are included in one heat exchanger 61, in an eighth embodiment, as shown in FIG. 38, the coolant cooler 14, the condenser 50, and the expansion valve 25 are integrated together.

The coolant cooler 14 is composed of the tank-and-tube type heat exchanger, and includes a heat exchanger core 14a, and tank portions 14b and 14c. The heat exchanger core 14a includes a plurality of tubes through which the coolant and the refrigerant independently flow. The tubes are stacked on each other in parallel. The tank portions 14b and 14c are disposed on both sides of the tubes to distribute and collect the coolant and refrigerant for the tubes.

Members constituting the heat exchanger core 14a, and the tank portions 14b and 14c are formed of metal (for example, an aluminum alloy), and bonded together by brazing.

The condenser 50 is composed of the tank-and-tube type heat exchanger, and includes a heat exchanger core 50a, and tank portions 50b and 50c. The heat exchanger core 50a includes a plurality of tubes through which the coolant and the refrigerant flow independently. The tubes are stacked on each other in parallel. The tank portions 50b and 50c are disposed on both sides of the tubes to distribute and collect the coolant and refrigerant for the tubes.

Members constituting the heat exchanger core 50a, and the tank portions 50b and 50c are formed of metal (for example, an aluminum alloy), and bonded together by brazing.

The coolant cooler 14 and the condenser 24 are disposed in parallel in the stacking direction of tubes (in the horizontal direction of FIG. 38). Specifically, the expansion valve 25 is fixed while being sandwiched between the coolant cooler 14 and the condenser 24.

The expansion valve 25 is a thermal expansion valve whose valve opening is adjusted by a mechanical system such that a degree of superheat of the refrigerant flowing from the coolant cooler 14 is in a predetermined range. The expansion valve 25 has a temperature sensing portion 25a for sensing the superheat degree of the refrigerant on the outlet side of the coolant cooler 14.

One tank portion 14c of the coolant cooler 14 is provided with an inlet 14e for the coolant and an outlet 14f for the refrigerant. The outlet 14f for the refrigerant is superimposed over the refrigerant inlet of the temperature sensing portion 25a of the expansion valve 25.

The other tank portion 14b of the coolant cooler 14 is provided with an outlet 14g for the coolant and an inlet 14h for the refrigerant. The inlet 14h for the refrigerant is superimposed over the refrigerant outlet of the expansion valve 25.

Thus, in the coolant cooler 14, the coolant flows from the inlet 14e into the tank portion 14c, and is then distributed to the tubes for the coolant by the tank portion 14c. The coolants after having passed through the tubes for the coolant are collected into the tank portion 14b to flow from the outlet 14g.

In the coolant cooler 14, the refrigerant decompressed by the expansion valve 25 flows from the inlet 14h into the tank portion 14b, and is then distributed to the tubes for the refrigerant in the tank portion 14b. The refrigerants having passed through the tubes for the refrigerant are collected into the tank portion 14c to flow from the outlet 14f into the temperature sensing portion 25a of the expansion valve 25. The temperature sensing portion 25a of the expansion valve 25 is provided with an outlet 25b for the refrigerant.

One tank portion 50b of the condenser 50 is provided with an inlet 50e for the coolant and an outlet 50f for the refrigerant. The outlet 50b for the refrigerant is superimposed over the refrigerant inlet of the expansion valve 25. The other tank portion 50c of the condenser 50 is provided with an outlet 50g for the coolant and an inlet 50h for the refrigerant.

Thus, in the condenser 50, the coolant flows from the inlet 50e into the tank portion 50b, and is then distributed to the tubes for the coolant by the tank portion 50b. The coolants after having passed through the tubes for the coolant are collected into the tank portion 50c to flow from the outlet 50g.

In the condenser 50, the refrigerant flows from the inlet 50h into the tank portion 50c, and is then distributed to the tubes for the refrigerant by the tank portion 50c. The coolants after having passed through the tubes for the refrigerant are collected into the tank portion 50b to flow from the outlet 50f into the expansion valve 25. The refrigerant flowing from the outlet 50f into the expansion valve 25 is decompressed by the expansion valve 25 to flow into the coolant cooler 14.

This embodiment does not need any refrigerant pipe between the coolant cooler 14 and the expansion valve 25, and between the condenser 50 and the expansion valve 25, and thus can simplify the connection structure between the refrigerant pipes.

Ninth Embodiment

Although in the above first embodiment, the operating mode is switched according to the outside air temperature detected by the outside air sensor 42, in a ninth embodiment, the operating mode is switched according to the temperature of the inverter and the temperature of the battery.

The first switching valve 19 is capable of switching among four types of communication states between the inlets 19a and 19b and the outlets 19c, 19d, 19e, and 19f. The second switching valve 20 is also capable of switching among four types of communication states between the inlets 20a, 20b, 20c, and 20d and the outlets 20e, and 20f.

Figure 39:
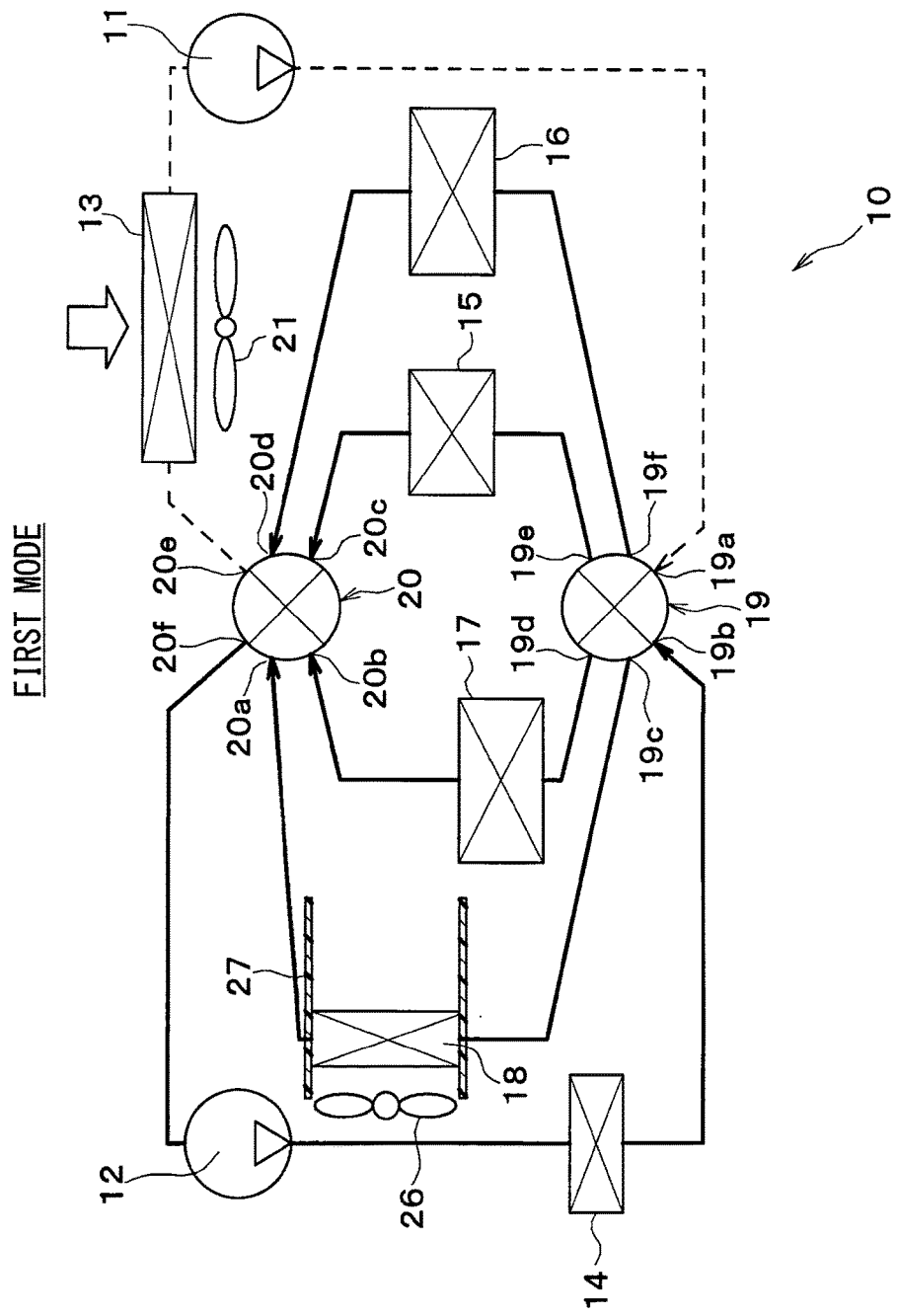
FIG. 39 is a diagram for explaining a first mode in the vehicle thermal management system according to a ninth embodiment of the invention.

FIG. 39 shows the operation (first mode) of the cooling system 10 when the first and second switching valves 19 and 20 are switched to a first state.

In the first state, the first switching valve 19 closes the inlet 19a, and connects the inlet 19b with the outlet 19c, 19d, 19e, and 19f. Thus, the first switching valve 19 does not allow the coolant to enter the inlet 19a, but allows the coolant entering the inlet 19b to flow out of the outlets 19c, 19d, 19e, and 19f as indicated by solid arrows in FIG. 39.

In the first state, the second switching valve 20 closes the outlet 20e, and connects the inlets 20a, 20b, 20c, and 20d with the outlet 20f. Thus, the second switching valve 20 does not allow the coolant to flow out of the outlet 20e, but allows the coolant entering the inlets 20a, 20b, 20c, and 20d to flow out of the outlet 20f as indicated by solid arrows in FIG. 39.

Figure 40:
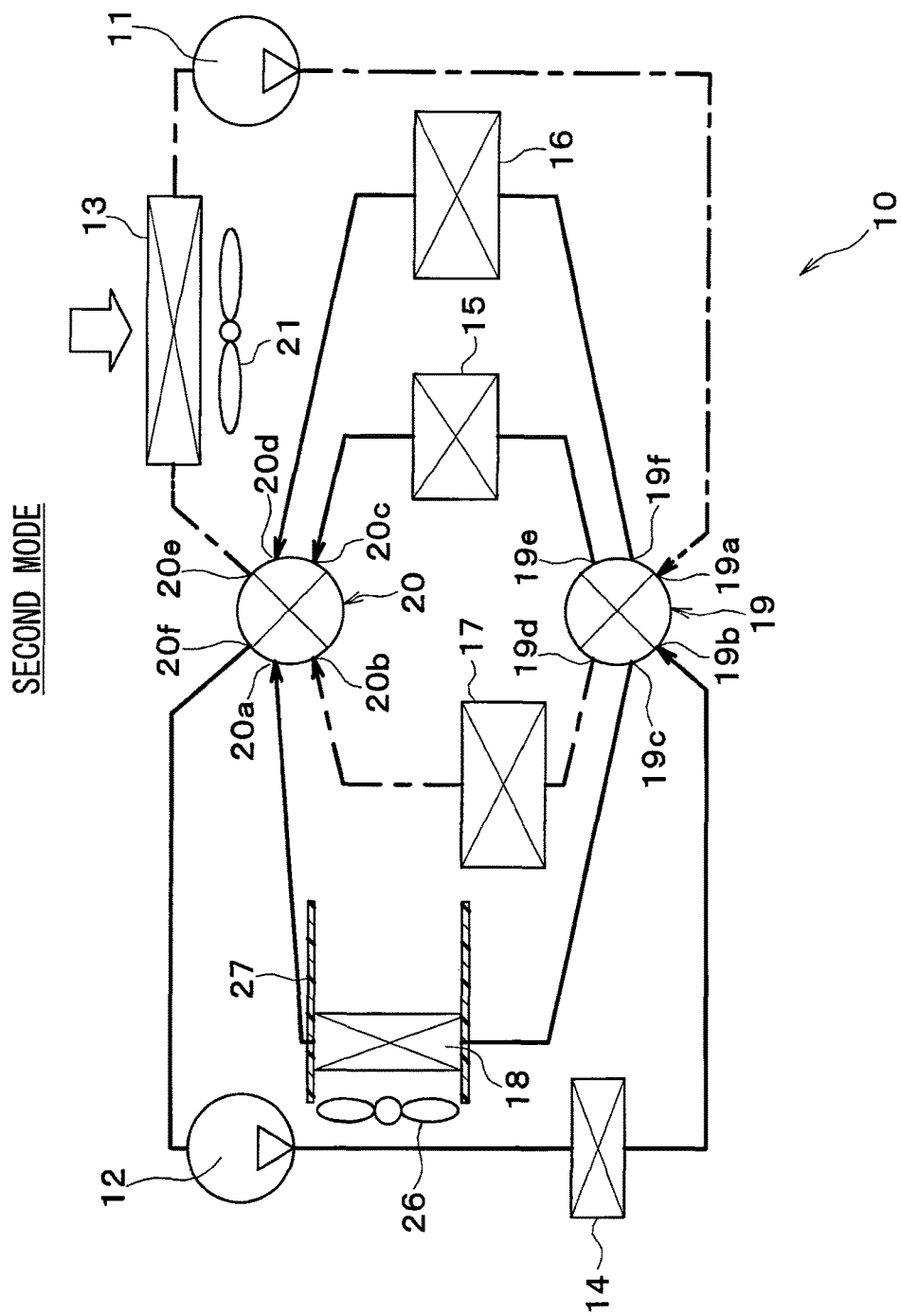
FIG. 40 is a diagram for explaining a second mode in the vehicle thermal management system in the ninth embodiment.

FIG. 40 shows the operation (second mode) of the cooling system 10 when the first and second switching valves 19 and 20 are switched to a second state.

In the second state, the first switching valve 19 connects the inlet 19a with the outlet 19d, and also connects the inlet 19b with the outlets 19c, 19e, and 19f. Thus, the first switching valve 19 allows the coolant entering the inlet 19a to flow out of the outlet 19d as indicated by an alternate long and short dash line with an arrow in FIG. 40, and also allows the coolant entering the inlet 19b to flow out of the outlets 19c, 19e, and 19f as indicated by solid arrows in FIG. 40.

In the second state, the second switching valve 20 connects the inlets 20a, 20c, and 20d with the outlet 20f, and also connects the inlet 20b with the outlet 20e. Thus, the second switching valve 20 allows the coolant entering the inlet 20b to flow out of the outlet 20e as indicated by an alternate long and short dash line with an arrow in FIG. 40, and also allows the coolant entering the inlets 20a, 20c, and 20d to flow out of the outlet 20f as indicated by a solid arrow in FIG. 40.

Figure 41:
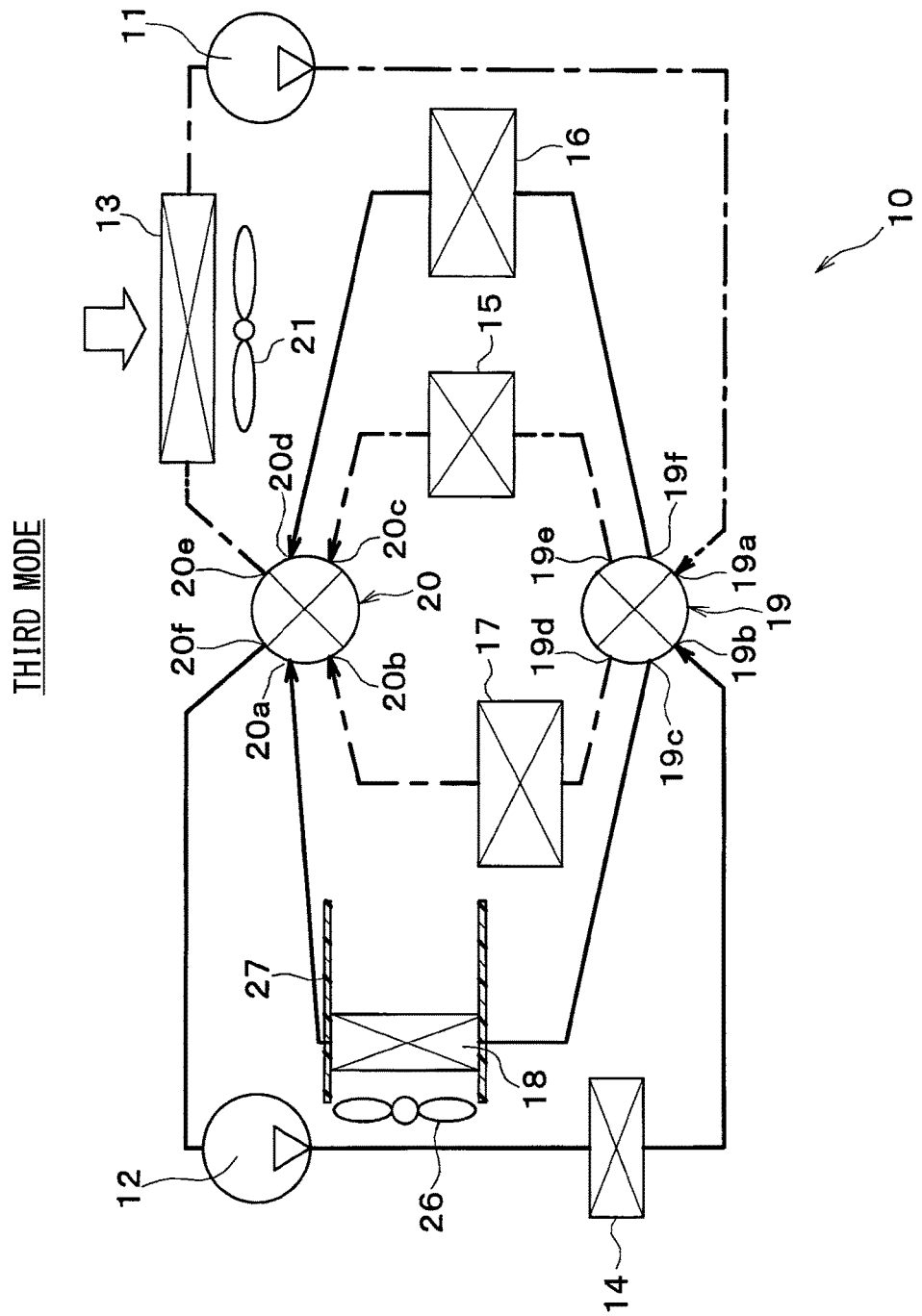
FIG. 41 is a diagram for explaining a third mode in the vehicle thermal management system in the ninth embodiment.

FIG. 41 shows the operation (third mode) of the cooling system 10 when the first and second switching valves 19 and 20 are switched to a third state.

In the third state, the first switching valve 19 connects the inlet 19a with the outlets 19d and 19e, and also connects the inlet 19b with the outlets 19c, and 19f. Thus, the first switching valve 19 allows the coolant entering the inlet 19a to flow out of the outlets 19d and 19e as indicated by alternate long and short dash lines with arrows in FIG. 41, and also allows the coolant entering the inlet 19b to flow out of the outlets 19c and 19f as indicated by solid arrows in FIG. 41.

In the third state, the second switching valve 20 connects the inlets 20a, and 20d with the outlet 20f, and also connects the inlets 20b and 20c with the outlet 20e. Thus, the second switching valve 20 allows the coolant entering the inlets 20b and 20c to flow out of the outlet 20e as indicated by alternate long and short dash lines with arrows in FIG. 41, and also allows the coolant entering the inlets 20a and 20d to flow out of the outlet 20f as indicated by solid lines with an arrow in FIG. 41.

Figure 42:
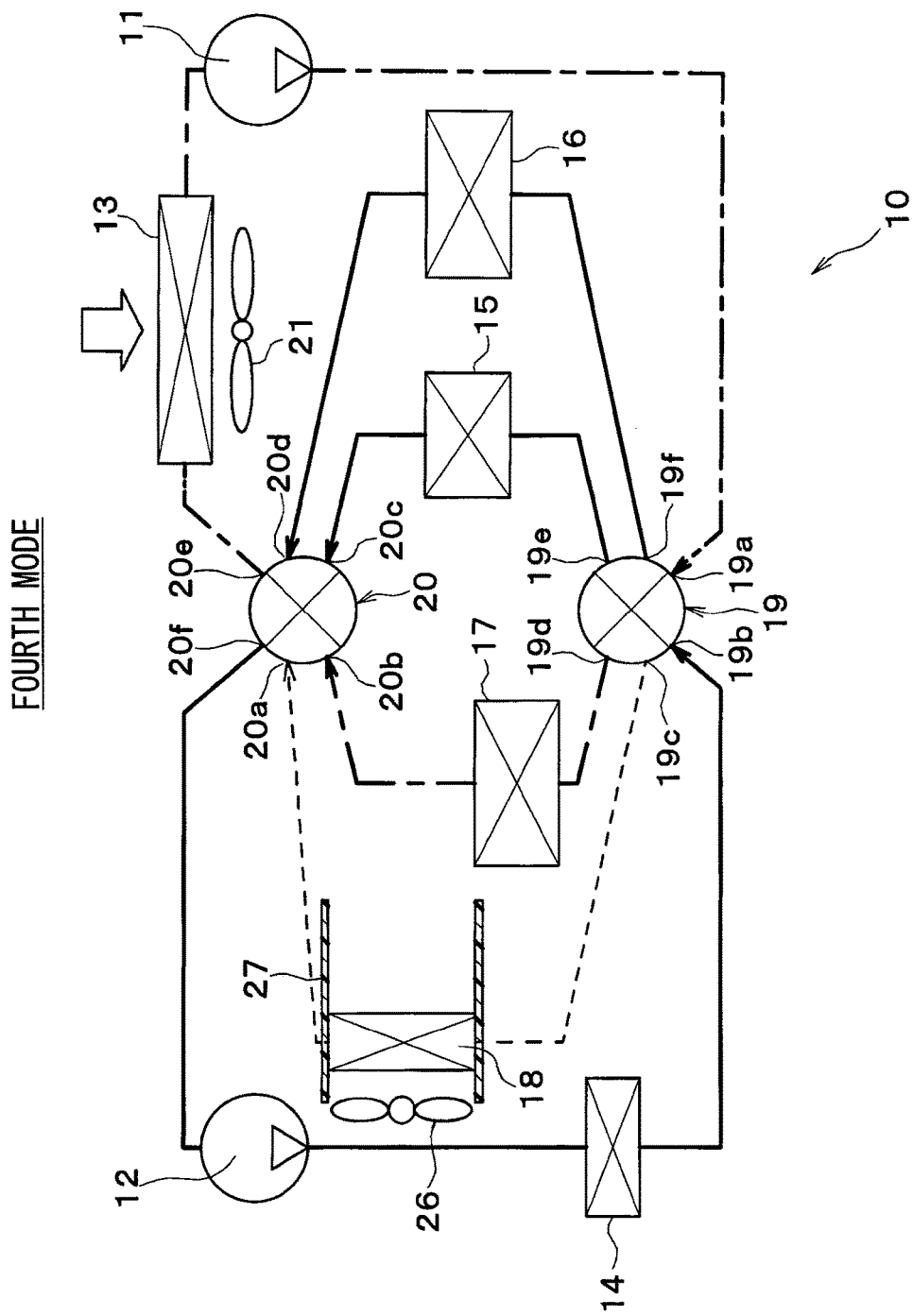
FIG. 42 is a diagram for explaining a fourth mode in the vehicle thermal management system in the ninth embodiment.

FIG. 42 shows the operation (fourth mode) of the cooling system 10 when the first and second switching valves 19 and 20 are switched to a fourth state.

In the fourth state, the first switching valve 19 connects the inlet 19a with the outlet 19d, and also connects the inlet 19b with the outlets 19e and 19f, thereby closing the outlet 19c. Thus, the first switching valve 19 allows the coolant entering the inlet 19a to flow out of the outlet 19d as indicated by an alternate long and short dash line with an arrow in FIG. 42, and also allows the coolant entering the inlet 19b to flow out of the outlets 19e and 19f as indicated by solid arrows in FIG. 42, thereby preventing the coolant from flowing out of the outlet 19c.

In the fourth state, the second switching valve 20 connects the inlets 20c and 20d with the outlet 20f and also connects the inlet 20b with the outlet 20e, thereby closing the inlet 20a. Thus, the second switching valve 20 allows the coolant entering the inlets 20b to flow out of the outlet 20e as indicated by an alternate long and short dash line with an arrow in FIG. 42, and also allows the coolant entering the inlets 20c and 20d to flow out of the outlet 20f as indicated by solid arrows in FIG. 42, thereby preventing the coolant from flowing out of the inlet 20a.

Figure 43:
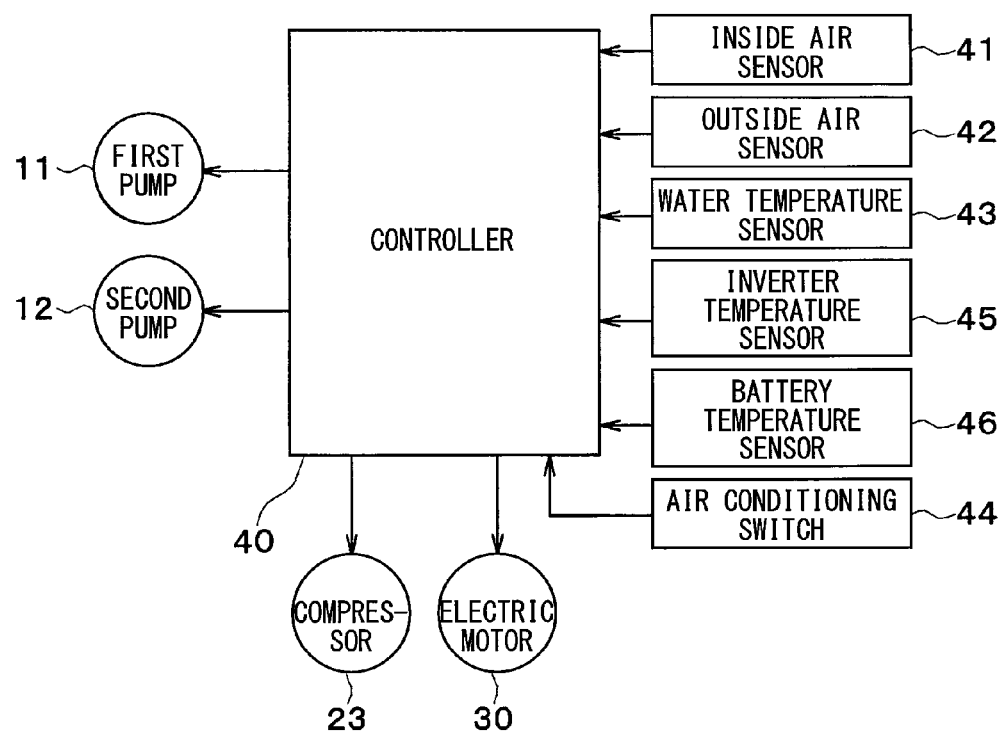
FIG. 43 is a block diagram showing an electric controller of the vehicle thermal management system in the ninth embodiment.

Next, an electric controller of the cooling system 10 will be described with reference to FIG. 43. The electric controller of the cooling system 10 has a structure in which detection signals from an inverter temperature sensor 45 and a battery temperature sensor 46 are input to the input side of the controller 40, in addition to the above-mentioned structure of the first embodiment.

The inverter temperature sensor 45 is an inverter temperature detector for detecting the temperature of the inverter. For example, the inverter temperature sensor 45 may detect the temperature of coolant flowing from the inverter cooler 16. The battery temperature sensor 46 is a battery temperature detector for detecting the temperature of the battery. For example, the battery temperature sensor 46 may detect the temperature of coolant flowing from the battery cooler 15.

Figure 44:
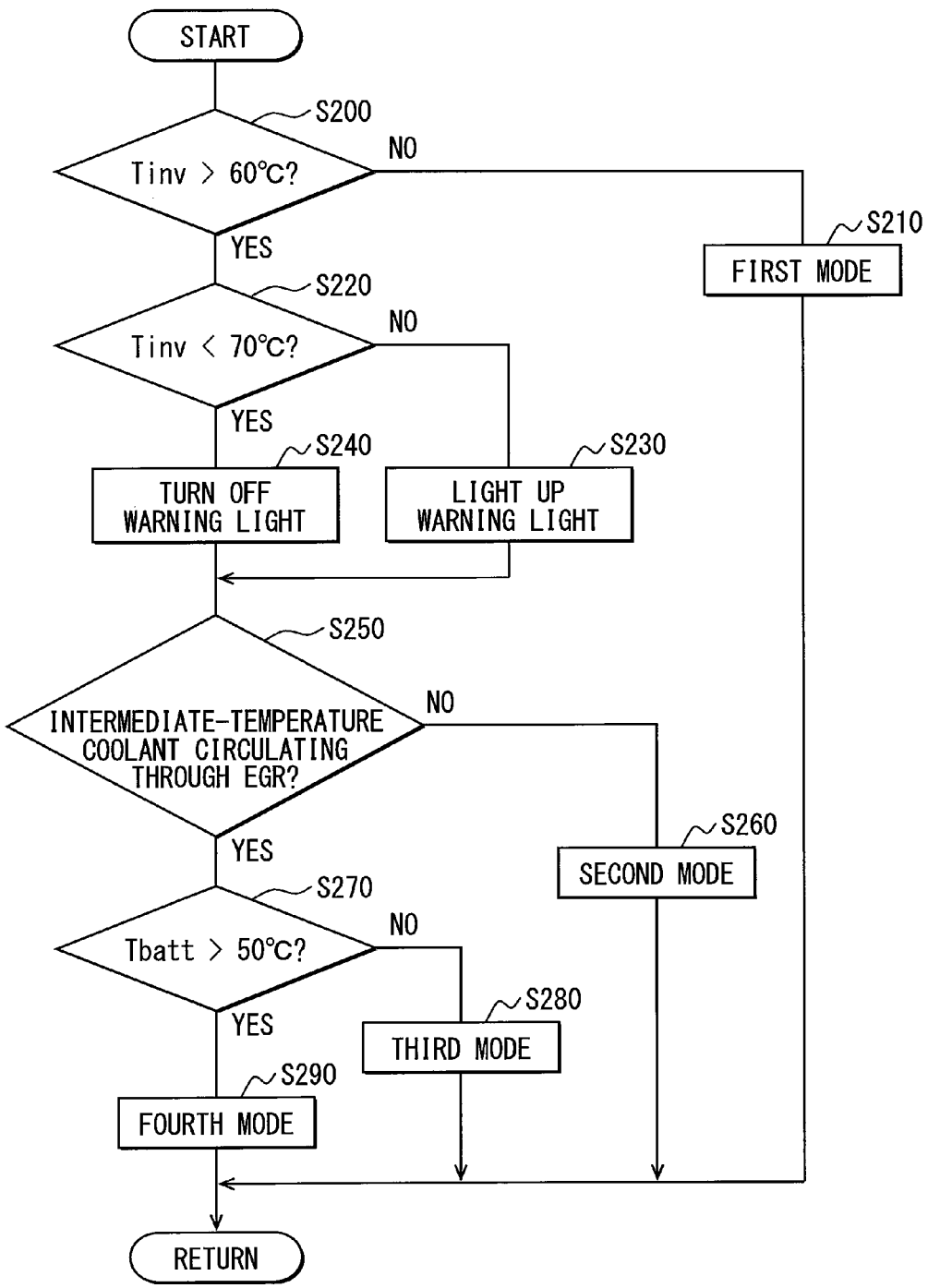
FIG. 44 is a flowchart showing the flow of a control process performed by a controller of the ninth embodiment.

A control process executed by the controller 40 of this embodiment will be described with reference to FIG. 44. The controller 40 executes a computer program according to a flowchart of FIG. 44.

First, in S200, it is determined whether an inverter temperature Tinv detected by the inverter temperature sensor 45 exceeds 60° C.

When the inverter temperature Tinv is determined not to exceed 60° C., the priority of cooling of the inverter is determined not to be high, and the operation proceeds to S210, in which the first mode shown in FIG. 39 is performed.

In the first mode, the controller 40 controls the electric motor 30 for a switching valve such that the first and second switching valves 19 and 20 are brought into the first state shown in FIG. 39, thereby operating the second pump 12 and the compressor 23, and stopping the first pump 11.

Thus, the first switching valve 19 closes the inlet 19a, and connects the inlet 19b with the outlets 19c, 19d, 19e, and 19f. The second switching valve 20 connects the inlets 20a, 20b, 20c, and 20d with the outlet 20f, and closes the outlet 20e.

Thus, the low-temperature coolant circuit is formed of the second pump 12, the coolant cooler 14, the battery cooler 15, the inverter cooler 16, the exhaust gas cooler 17, and the cooler core 18, and the intermediate-temperature coolant circuit is not formed.

That is, as indicated by solid arrows in FIG. 39, the coolant discharged from the second pump 12 flows through the coolant cooler 14, and is branched into the battery cooler 15, the inverter cooler 16, the exhaust gas cooler 17, and the cooler core 18 by the first switching valve 19. Then, the coolants flowing in parallel through the battery cooler 15, the inverter cooler 16, the exhaust gas cooler 17, and the cooler core 18 are collected into the second switching valve 20 to be sucked into the second pump 12.

In contrast, as indicated by a broken line with an arrow in FIG. 39, the coolant is not discharged from the first pump 11, and does not flow through the radiator 13.

Thus, in the first mode, the low-temperature coolant cooled by the coolant cooler 14 flows through the battery cooler 15, the inverter cooler 16, the exhaust gas cooler 17, and the cooler core 18. As a result, the battery, the inverter, the exhaust gas, and the blast air into the vehicle interior are cooled by the low-temperature coolant.

When the inverter temperature Tinv is determined to exceed 60° C. in S200, the priority of cooling of the inverter is considered to be high, and then the operation proceeds to S220. In S220, it is determined whether or not the inverter temperature Tinv is less than 70° C.

When the inverter temperature Tinv is determined to be 70° C. or more, the inverter is considered to be at an abnormal high temperature, and the operation proceeds to S230, in which a warning light is lit up. Thus, a passenger can be informed that the inverter is at the abnormal high temperature.

When the inverter temperature Tinv is determined to be less than 70° C., the inverter is considered not to be at an abnormal high temperature, and the operation proceeds to S240, in which the warning light is turned off. Thus, a passenger can be informed that the inverter is not at the abnormal high temperature.

In S250 following steps S230 and S240, it is determined whether or not the coolant of the intermediate-temperature coolant circuit (intermediate-temperature coolant) circulates through the exhaust gas cooler 17. Specifically, whether or not the coolant of the intermediate-temperature coolant circuit (intermediate-temperature coolant) circulates through the exhaust gas cooler 17 is determined based on the operating states of the first and second switching valves 19 and 20.

When the intermediate-temperature coolant is determined not to circulate through the exhaust gas cooler 17, the operation proceeds to S260 so as to reduce the cooling capacity of the exhaust gas. In S260, the second mode shown in FIG. 40 is performed.

In the second mode, the controller 40 controls the electric motor 30 for a switching valve such that the first and second switching valves 19 and 20 are brought into the second state shown in FIG. 40 to thereby operate the first and second pumps 11 and 12 and the compressor 23.

Thus, the first switching valve 19 connects the inlet 19a with the outlet 19d and also connects the inlet 19b with the outlets 19c, 19e, and 19f. The second switching valve 20 connects the inlets 20a, 20c, and 20d with the outlet 20f, and also connects the inlet 20b with the outlet 20e.

Accordingly, an intermediate-temperature coolant circuit is formed of the first pump 11, the exhaust gas cooler 17, and the radiator 13, whereas a low-temperature coolant circuit is formed of the second pump 12, the coolant cooler 14, the battery cooler 15, the inverter cooler 16, and the cooler core 18.

That is, as indicated by an alternate long and short dash line with an arrow in FIG. 40, the coolant discharged from the first pump 11 flows through the exhaust gas cooler 17 via the first switching valve 19, and then through the radiator 13 via the second switching valve 20, thereby being sucked into the first pump 11.

On the other hand, as shown in solid arrows in FIG. 40, the coolant discharged from the second pump 12 flows through the coolant cooler 14 to be branched into the battery cooler 15, the inverter cooler 16, and the cooler core 18 by the first switching valve 19. The coolants flowing in parallel through the battery cooler 15, the inverter cooler 16, and the cooler core 18 are collected into the second switching valve 20 to be sucked into the second pump 12.

Thus, in the second mode, the intermediate-temperature coolant cooled by the radiator 13 flows through the exhaust gas cooler 17, whereas the low-temperature coolant cooled by the coolant cooler 14 flows through the battery cooler 15, the inverter cooler 16, and the cooler core 18. As a result, the exhaust gas is cooled by the intermediate-temperature coolant, and the battery, the inverter, and the blast air into the vehicle interior are cooled by the low-temperature coolant.

Accordingly, the cooling capacity of the inverter can be improved as compared to the first mode in which the exhaust gas can also be cooled by the low-temperature coolant.

When the intermediate-temperature coolant is determined to circulate through the exhaust gas cooler 17 in S250, the operation proceeds to S270. In S270, it is determined whether a battery temperature Tbatt detected by the battery temperature sensor 46 exceeds 50° C. or not.

When the battery temperature Tbatt is determined not to exceed 50° C., the priority of cooling of the battery is determined not to be high, and the operation proceeds to S280, in which the third mode shown in FIG. 41 is performed.

In the third mode, the controller 40 controls the electric motor 30 for a switching valve such that the first and second switching valves 19 and 20 are brought into the third state shown in FIG. 41 to thereby operate the first and second pumps 11 and 12 and the compressor 23.

Thus, the first switching valve 19 connects the inlet 19a with the outlets 19d, and 19e, and also connects the inlet 19b with the outlets 19c and 19f. The second switching valve 20 connects the inlets 20a, and 20d with the outlet 20f, and also connects the inlets 20b and 20c with the outlet 20e.

Accordingly, an intermediate-temperature coolant circuit is formed of the first pump 11, the battery cooler 15, the exhaust gas cooler 17, and the radiator 13, whereas a low-temperature coolant circuit is formed of the second pump 12, the coolant cooler 14, the inverter cooler 16, and the cooler core 18.

That is, as indicated by alternate long and short dash lines with arrows in FIG. 41, the coolant discharged from the first pump 11 is branched by the first switching valve 19 into the battery cooler 15 and the exhaust gas cooler 17. Then, the coolants flowing in parallel through the battery cooler 15 and the exhaust gas cooler 17 are collected into the second switching valve 20 to flow through the radiator 13, thereby being sucked into the first pump 11.

On the other hand, as shown in solid arrows in FIG. 41, the coolant discharged from the second pump 12 flows through the coolant cooler 14 to be branched into the inverter cooler 16, and the cooler core 18 by the first switching valve 19. The coolants flowing in parallel through the inverter cooler 16, and the cooler core 18 are collected into the second switching valve 20 to be sucked into the second pump 12.

Thus, in the second mode, the intermediate-temperature coolant cooled by the radiator 13 flows through the battery cooler 15 and the exhaust gas cooler 17, whereas the low-temperature coolant cooled by the coolant cooler 14 flows through the inverter cooler 16, and the cooler core 18. As a result, the battery and the exhaust gas are cooled by the intermediate-temperature coolant, and the inverter and the blast air into the vehicle interior are cooled by the low-temperature coolant.

Thus, the cooling capacity of the inverter can be improved as compared to the second mode in which the battery can also be cooled by the low-temperature coolant.

When the battery temperature Tbatt is determined to exceed 50° C. in S270, the priority of cooling of the battery is determined to be high, and the operation proceeds to S290, in which the fourth mode shown in FIG. 42 is performed.

In the fourth mode, the controller 40 controls the electric motor 30 for a switching valve such that the first and second switching valves 19 and 20 are brought into the fourth state shown in FIG. 42 to thereby operate the first and second pumps 11 and 12 and the compressor 23.

Thus, the first switching valve 19 connects the inlet 19a with the outlet 19d, and also connects the inlet 19b with the outlets 19e, and 19f, thereby closing the outlet 19c. The second switching valve 20 closes the inlet 20a and connects the inlet 20b with the outlet 20e, and also connects the inlets 20c and 20d with the outlet 20f.

Accordingly, an intermediate-temperature coolant circuit is formed of the first pump 11, the exhaust gas cooler 17, and the radiator 13, whereas a low-temperature coolant circuit is formed of the second pump 12, the coolant cooler 14, the battery cooler 15, and the inverter cooler 16.

That is, as indicated by an alternate long and short dash line with an arrow in FIG. 42, the coolant discharged from the first pump 11 flows through the exhaust gas cooler 17 via the first switching valve 19, and then through the radiator 13 via the second switching valve 20, thereby being sucked into the first pump 11.

On the other hand, as indicated by solid arrows in FIG. 41, the coolant discharged from the second pump 12 flows through the coolant cooler 14, and is branched into the battery cooler 15 and the inverter cooler 16 by the first switching valve 19. Then, the coolants flowing in parallel through the battery cooler 15, and the inverter cooler 16 are collected into the second switching valve 20 to be sucked into the second pump 12. In contrast, as indicated by a broken line with an arrow in FIG. 41, the coolant does not circulate through the cooler core 18.

In this way, in the second mode, the intermediate-temperature coolant cooled by the radiator 13 flows through the exhaust gas cooler 17, whereas the low-temperature coolant cooled by the coolant cooler 14 flows through the battery cooler 15 and the inverter cooler 16, thereby stopping the circulation of the coolant toward the cooler core 18. As a result, the battery and the exhaust gas are cooled by the intermediate-temperature coolant, and the inverter is cooled by the low-temperature coolant, thereby stopping the cooling (that is, air conditioning) of the blast air into the vehicle interior.

Thus, the cooling capabilities of the battery and the inverter can be improved as compared to the second mode in which the blast air into the vehicle interior can also be cooled by the low-temperature coolant.

In this embodiment, when the inverter temperature Tinv is higher than the predetermined temperature (60° C. in this embodiment), the third mode is performed to allow the coolant to circulate between the inverter coolant 16 and the second pump 12, and also to circulate between the above-mentioned battery cooler 15 and the first pump 11. Thus, when the inverter temperature is high, the inverter with a smaller heat capacity can be preferentially cooled as compared to the battery with a larger heat capacity. As a result, the inverter can be effectively cooled while suppressing the increase in temperature of the battery.

Tenth Embodiment

Figure 45:
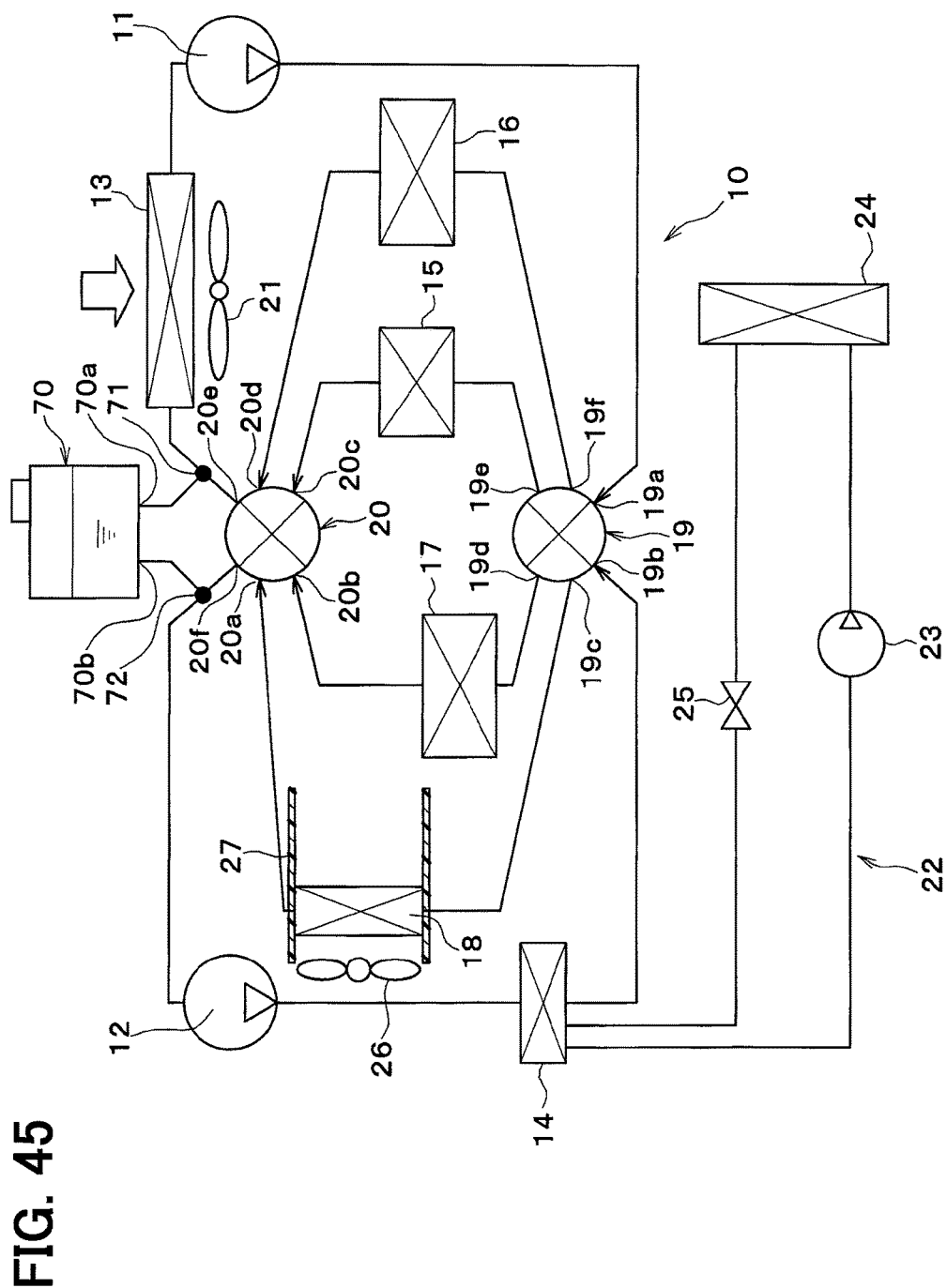
FIG. 45 is an entire configuration diagram of a vehicle thermal management system according to a tenth embodiment of the invention.

As shown in FIG. 45, a tenth embodiment of the invention includes a coolant tank 70 for storing the coolant therein, in addition to the structure of the first embodiment.

The coolant tank 70 is provided with a first coolant outlet/inlet 70a and a second coolant outlet/inlet 70b. The first coolant outlet/inlet 70a is connected to a first branch portion 71 provided between an outlet 20e of the second switching valve 20 and a coolant inlet side of the radiator 13. The second coolant outlet/inlet 70b is connected to a second branch portion 72 provided between an outlet 20f of the second switching valve 20 and a suction side of the second pump 12.

Thus, a coolant flow path of the first coolant circuit (coolant circuit on the first pump 11 side) on the suction side of the first pump 11 communicates with a coolant flow path of the second coolant circuit (coolant circuit on the second pump 12 side) on the suction side of the second pump 12 via the coolant tank 70.

In this embodiment, the first coolant circuit communicates with the second coolant circuit, which can equalize the internal pressure between the first and second coolant circuits. Thus, a difference in pressure acting on a valve element inside each of the first and second switching valves 19 and 20 can be decreased to thereby prevent the leakage of the coolant in the switching valve.

For example, given that the first coolant circuit and the second coolant circuit communicate with each other on the discharge side of one pump as well as on the suction side of the other pump, the coolant circuit communicating with the suction side of the pump might have its internal pressure abnormally increased. In contrast, in this embodiment, the first coolant circuit and the second coolant circuit communicate with each other on the suction sides of both pumps, which can prevent the internal pressure of the coolant circuits from abnormally increasing, thereby facilitating the design of parts with good pressure resistance.

Eleventh Embodiment

Figure 46:
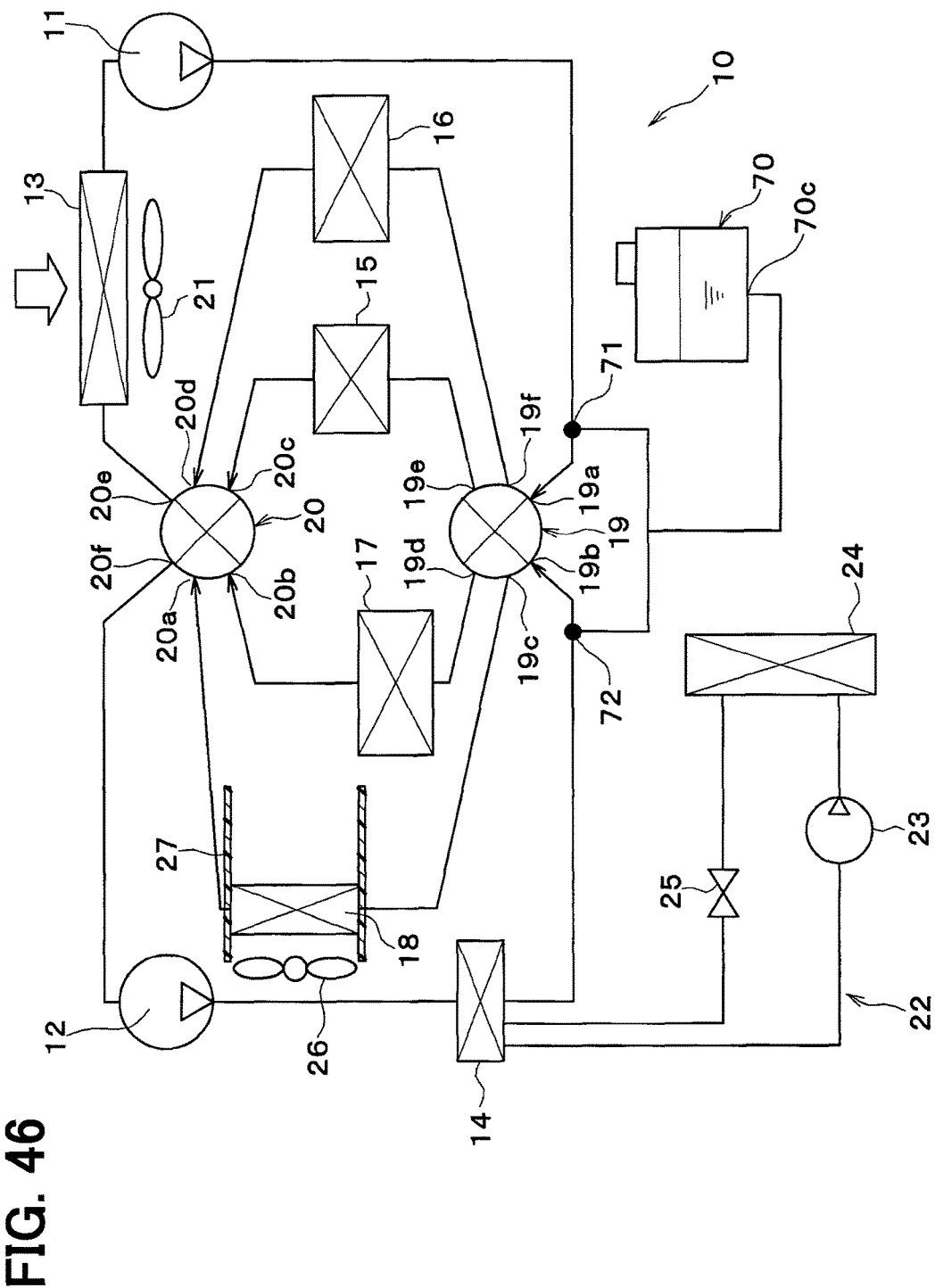
FIG. 46 is an entire configuration diagram of a vehicle thermal management system according to an eleventh embodiment of the invention.

Although in the tenth embodiment, the first coolant circuit and the second coolant circuit communicate with each other on the suction sides of both the pumps, in an eleventh embodiment of the invention, as shown in FIG. 46, the first coolant circuit and the second coolant circuit communicate with each other on the discharge sides of both the pumps.

Specifically, the first branch portion 71 of the first coolant circuit is provided between the discharge side of the first pump 11 and the inlet 19a of the first switching valve 19, and the second branch portion 72 of the second coolant circuit is provided between the discharge side of the second pump 12 and the inlet 19b of the first switching valve 19.

Although in the tenth embodiment, the coolant tank 70 is provided with the first coolant outlet/inlet 70a for connection with the first coolant circuit, and the second coolant outlet/inlet 70b for connection with the second coolant circuit, in an eleventh embodiment, the coolant tank 70 is provided with one coolant outlet/inlet 70c connected to both the first and second coolant circuits.

One coolant pipe connected to the coolant outlet/inlet 70c of the coolant tank 70 is branched into two parts toward the first branch portion 71 and the second branch portion 72.

This embodiment can also obtain the same operation and effects as those of the tenth embodiment described above.

Twelfth Embodiment

Figure 47:
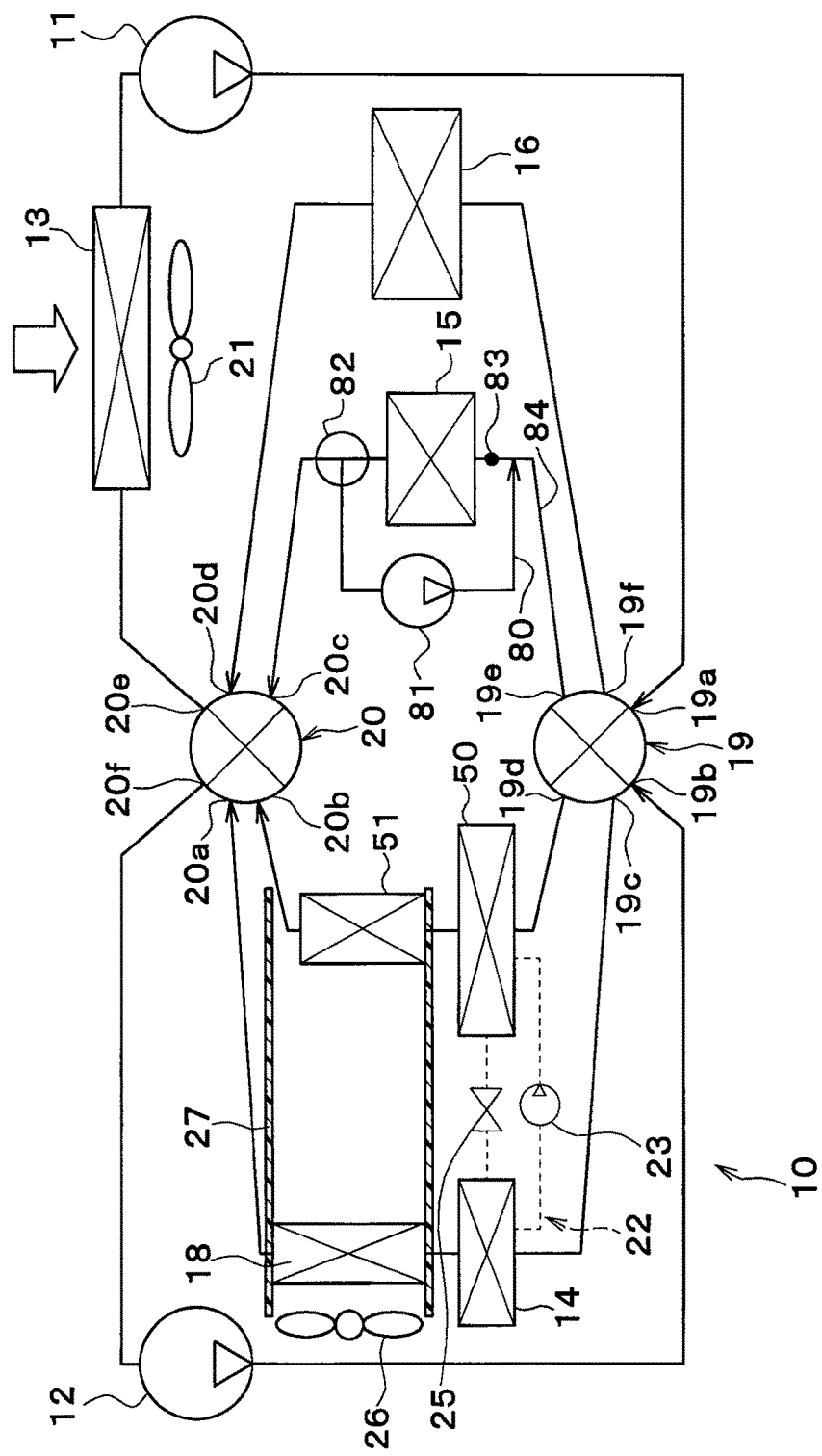
FIG. 47 is an entire configuration diagram of a vehicle thermal management system according to a twelfth embodiment of the invention.

A twelfth embodiment of the invention includes a circulation flow path 80, a third pump 81, a three-way valve 82, and an inlet water temperature sensor 83 as shown in FIG. 47, in addition to the structure of the second embodiment.

The circulation flow path 80 is a flow path through which the coolant circulates without passing through the first and second switching valves 19 and 20. The circulation flow path 80 has one end connected to the coolant outlet side of the battery cooler 15, and the other end connected to the coolant inlet side of the battery cooler 15.

The circulation flow path 80 is provided in parallel to a flow path 84 for the battery cooler (non-circulation flow path). The flow path 84 for the battery cooler is a flow path in which the battery cooler 15 is disposed. The flow path 84 has one end connected to the outlet 19e of the first switching valve 19, and the other end connected to the inlet 20c of the second switching valve 20.

In the example shown in FIG. 47, parts of the circulation flow path 80 and the flow path 84 for the battery cooler, which are located near the battery cooler 15, are integrated together to form one flow path. Thus, between the battery cooler 15 and the second switching valve 20, the flow path is branched into the circulation flow path 80 and the flow path 84 for the battery cooler, whereas between the battery cooler 15 and the first switching valve 19, the circulation flow path 80 and the flow path 84 for the battery cooler are merged into.

The third pump 81 is an electric pump adapted for drawing and discharging a coolant (heat medium), and disposed in the circulation flow path 80. In the example of FIG. 47, the third pump 81 is disposed in a branched part of the circulation flow path 80 other than the flow path 84 for the battery cooler (or, a part forming a flow path different from the flow path 84 for the battery cooler).

The three-way valve 82 is a circulation switching valve for switching between opening and closing of the circulation flow path 80 and the flow path 84 for the battery cooler, and thus is disposed in the branch portion between the circulation flow path 80 and the flow path 84 for the battery cooler.

When the three-way valve 82 opens the circulation flow path 80 and closes the flow path 84 for the battery cooler, the coolant flowing from the battery cooler 15 circulates through the circulation flow path 80 into the battery cooler 15. In contrast, when the three-way valve 82 opens the flow path 84 for the battery cooler and closes the circulation flow path 80, the coolant flowing from the battery cooler 15 flows through the flow path 84 for the battery cooler to flow into the second switching valve 20.

The inlet water temperature sensor 83 is disposed on the coolant inlet side of the battery cooler 15. The inlet water temperature sensor 83 is an inflow temperature detector for detecting the temperature of coolant flowing into the battery cooler 15 (inflow heat medium temperature).

The operations of the third pump 81 and the three-way valve 82 are controlled by the controller 40. A detection signal from the inlet water temperature sensor 83 is input to the controller 40.

Figure 48:
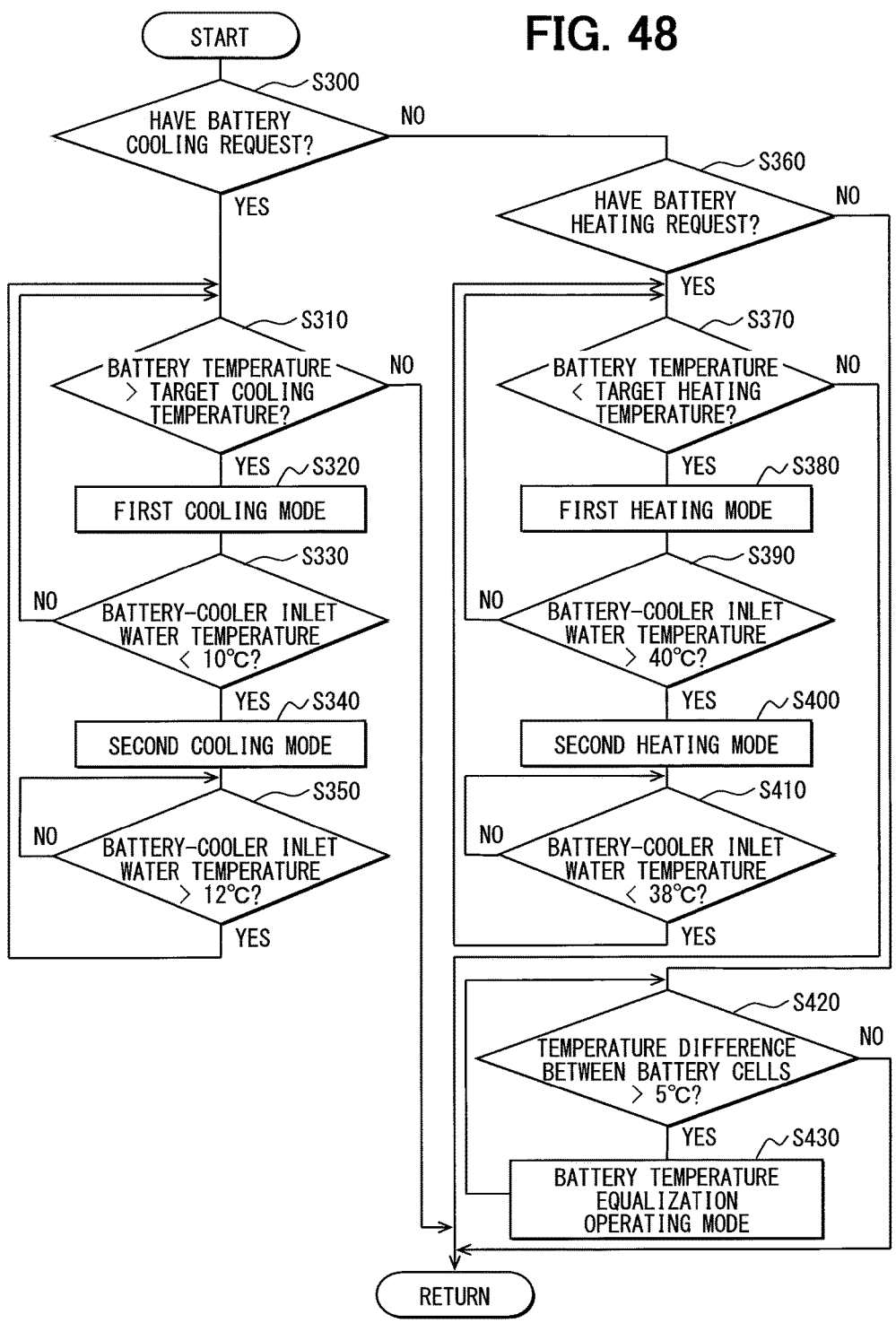
FIG. 48 is a flowchart showing the flow of a control process performed by a controller of the twelfth embodiment.

A control process executed by the controller 40 of this embodiment will be described with reference to FIG. 48. The controller 40 executes a computer program according to a flowchart of FIG. 48.

In S300, first, it is determined whether the battery is required to be cooled or not. Specifically, when the battery temperature is equal to or higher than a first predetermined temperature (for example, 35° C.), the cooling of the battery is considered to be required. In contrast, when the battery temperature is lower than the first predetermined temperature, the cooling of the battery is determined not to be required.

When the cooling of the battery is determined to be required, the operation proceeds to S310, in which it is determined whether the battery temperature exceeds a target cooling temperature (for example, 40° C.). When the battery temperature is determined to exceed the target cooling temperature, the operation proceeds to S320. When the battery temperature is determined not to exceed the target cooling temperature, the operation returns to S300.

Figure 49:
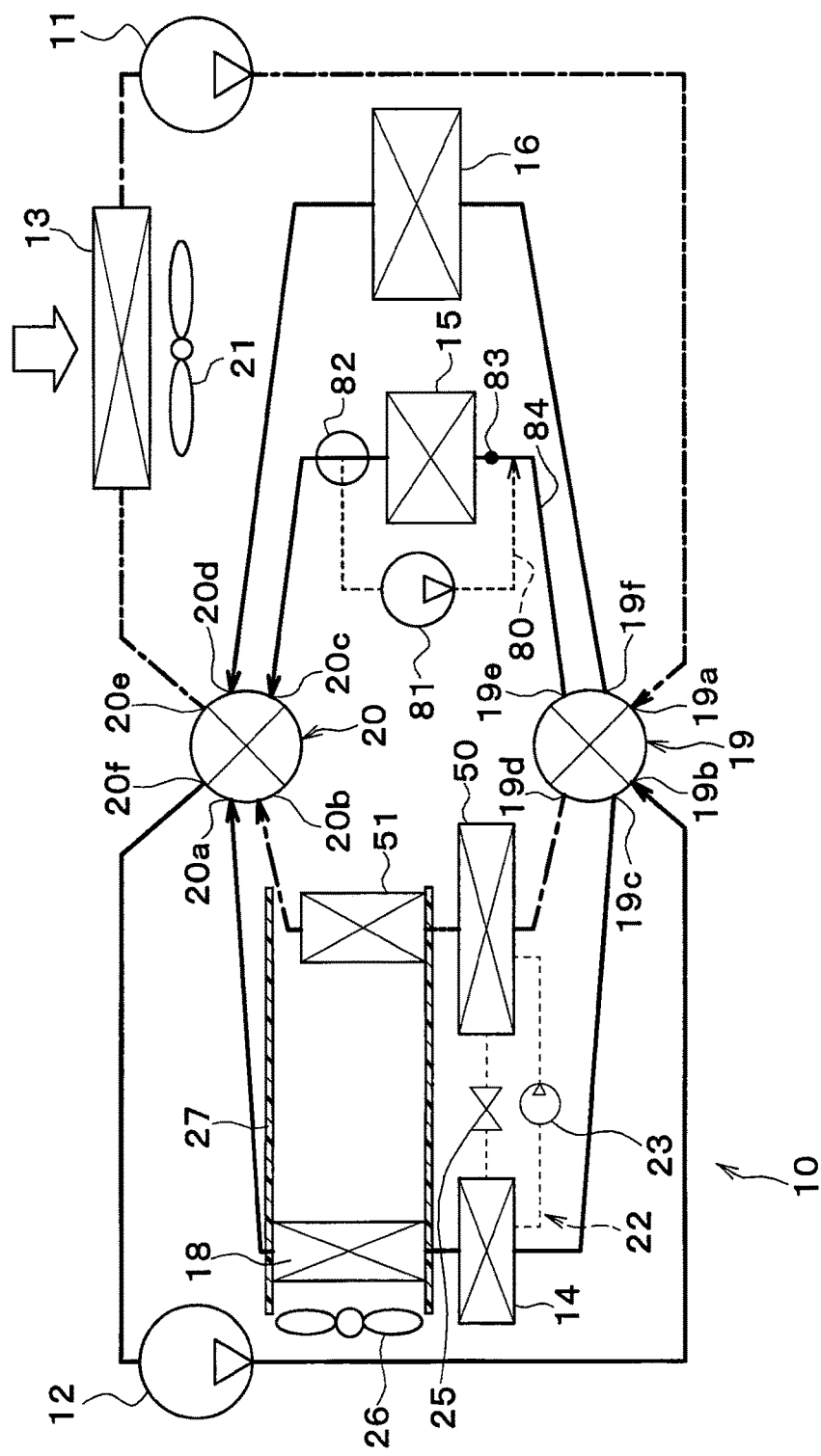
FIG. 49 is a diagram for explaining a first cooling mode in the vehicle thermal management system in the twelfth embodiment.

In S320, the operations of the first switching valve 19, the second switching valve 20, the three-way valve 82, and the third pump 81 are controlled so as to achieve a first cooling mode (non-circulation mode) shown in FIG. 49.

In the first cooling mode, the first switching valve 19 connects the inlet 19a with the outlet 19d, as well as the inlet 19b with the outlets 19c, 19e, and 19f, whereas the second switching valve 20 connects the inlet 20b with the outlet 20e, as well as the inlets 20a, 20c, and 20d with the outlet 20f.

In the first cooling mode, the three-way valve 82 opens the flow path 84 for the battery cooler to close the circulation flow path 80, so that the third pump 81 is stopped.

Thus, a first coolant circuit (intermediate-temperature coolant circuit) indicated by an alternate long and short dash line with an arrow in FIG. 49 and a second coolant circuit (low-temperature coolant circuit) indicated by a solid arrow in FIG. 49 are formed.

Accordingly, the first coolant circuit (intermediate-temperature coolant circuit) is formed of the first pump 11, the condenser 50, the heater core 51, and the radiator 13, whereas the second coolant circuit (low-temperature coolant circuit) is formed of the second pump 12, the coolant cooler 14, the cooler core 18, the battery cooler 15, and the inverter cooler 16.

That is, as indicated by the alternate long and short dash line with the arrow in FIG. 49, the coolant discharged from the first pump 11 flows through the condenser 50 and heater core 51 in series via the first switching valve 19, and then through the second switching valve 20 and radiator 13, thereby being sucked into the first pump 11.

On the other hand, as indicated by the solid line with the arrow in FIG. 49, the coolant discharged from the second pump 12 is branched into the coolant cooler 14, the battery cooler 15, and the inverter cooler 16 by the first switching valve 19. The coolants flow in parallel through the coolant cooler 14, the battery cooler 15, and the inverter cooler 16. The coolant flowing through the coolant cooler 14 flows in series through the cooler core 18. The coolant flowing through the cooler core 18, the coolant flowing through the battery cooler 15, and the coolant flowing through the inverter cooler 16 are collected by the second switching valve 20 to be sucked into the second pump 12.

As mentioned above, in the first cooling mode, the low-temperature coolant cooled by the coolant cooler 14 flows through the battery cooler 15. Thus, the battery is cooled by the low-temperature coolant cooled by the coolant cooler 14.

In the following S330, it is determined whether or not the coolant temperature detected by the inlet water temperature sensor 83 (hereinafter referred to as a "battery-cooler inlet water temperature") is below a first cooling determination temperature Tc1 (for example, 10° C.). The first cooling determination temperature Tc1 is a temperature determined based on the lower limit temperature in a range of usable temperatures of the battery (for example, from 10 to 40° C.), and is previously stored in the controller 40.

When the battery-cooler inlet water temperature is determined to be less than the first cooling determination temperature Tc1, the operation proceeds to S340. When the battery-cooler inlet water temperature is determined not to be less than the first cooling determination temperature Tc1, the operation returns to S310.

Figure 50:
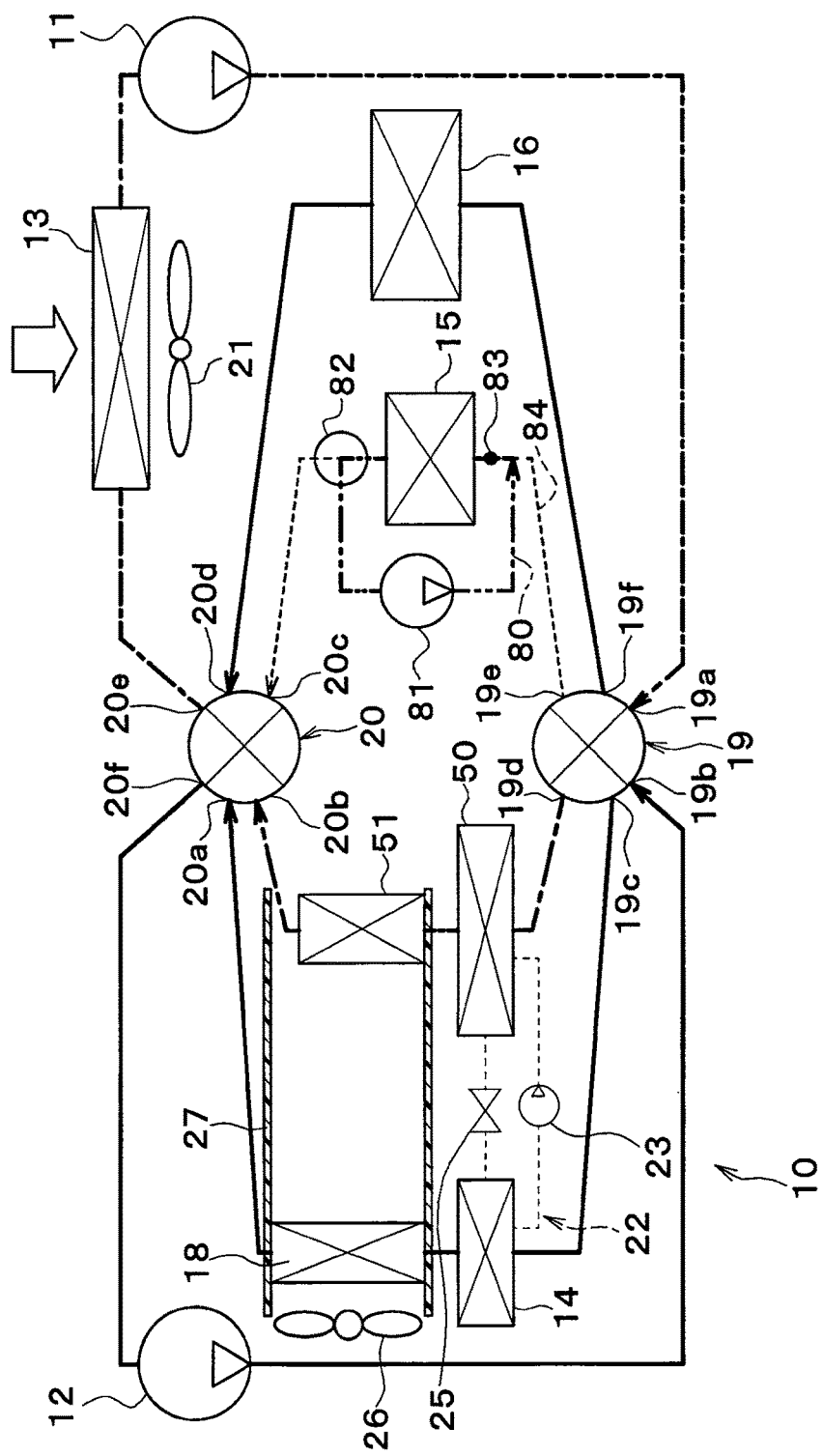
FIG. 50 is a diagram for explaining a second cooling mode in the vehicle thermal management system in the twelfth embodiment.

In S340, the operations of the first switching valve 19, the second switching valve 20, the three-way valve 82, and the third pump 81 are controlled so as to achieve a second cooling mode (circulation mode) shown in FIG. 50.

In the second cooling mode, the first switching valve 19 connects the inlet 19a with the outlet 19d, as well as the inlet 19b with the outlets 19c and 19f, and closes the outlet 19e, whereas the second switching valve 20 connects the inlet 20b with the outlet 20e, as well as the inlets 20a and 20d with the outlet 20f, and closes the inlet 20c.

In the second cooling mode, the three-way valve 82 opens the circulation flow path 80 to close the flow path 84 for the battery cooler, so that the third pump 81 operates.

Thus, a first coolant circuit (intermediate-temperature coolant circuit) indicated by a solid arrow in FIG. 50, a second coolant circuit (low-temperature coolant circuit) indicated by an alternate long and two short dashes line with an arrow in FIG. 50, and an internal circulation circuit indicated by an alternate long and two short dashes line with an arrow in FIG. 50 are formed.

Accordingly, the first coolant circuit (intermediate-temperature coolant circuit) is formed of the first pump 11, the condenser 50, the heater core 51, and the radiator 13. The second coolant circuit (low-temperature coolant circuit) is formed of the second pump 12, the coolant cooler 14, the cooler core 18, the inverter cooler 16. An internal circulation circuit is formed of the third pump 81 and the battery cooler 15.

That is, as indicated by the alternate long and short dash line with the arrow in FIG. 50, the coolant discharged from the first pump 11 flows through the condenser 50 and heater core 51 in series via the first switching valve 19, and then through the second switching valve 20 and the radiator 13, thereby being sucked into the first pump 11.

On the other hand, as indicated by solid arrows in FIG. 50, the coolant discharged from the second pump 12 is branched into the coolant cooler 14 and the inverter cooler 16 by the first switching valve 19 to flow in parallel through the coolant cooler 14 and the inverter cooler 16. The coolant flowing through the coolant cooler 14 flows in series through the cooler core 18. The coolants flowing through the cooler core 18 and through the inverter cooler 16 are collected by the second switching valve 20 to be sucked into the second pump 12.

Further, as indicated by an alternate long and two short dashes line with an arrow in FIG. 50, the coolant discharged from the third pump 81 flows through the battery cooler 15 to be sucked into the third pump 81.

As mentioned above, in the second cooling mode, the coolant circulating through the internal circulation circuit flows through the battery cooler 15. Thus, the low-temperature coolant cooled by the coolant cooler 14 does not flow through the battery cooler 15.

In the following S350, it is determined whether or not the battery-cooler inlet water temperature exceeds a second cooling determination temperature Tc2 (for example, 12° C.). The second cooling determination temperature Tc2 is a higher temperature than the first cooling determination temperature Tc1, and is previously stored in the controller 40.

When the battery-cooler inlet water temperature is determined to exceed the second cooling determination temperature Tc2, the operation returns to S310. When the battery-cooler inlet water temperature is determined not to exceed the second cooling determination temperature Tc2, the operation returns to S350.

On the other hand, when the cooling of the battery is determined not to be required in S300, the operation proceeds to S360, in which it is determined whether the battery is required to be heated or not. Specifically, when the battery temperature is less than a second predetermined temperature (for example, 15° C.), the heating of the battery is considered to be required. In contrast, when the battery temperature is equal to or higher than the second predetermined temperature, the heating of the battery is determined not to be required.

When the heating of the battery is determined to be required, the operation proceeds to S370, in which it is determined whether the battery temperature is below a target heating temperature (for example, 10° C.). When the battery temperature is determined to be lower than the target heating temperature, the operation proceeds to S380. When the battery temperature is determined not to be lower than the target heating temperature, the operation returns to S300.

Figure 51:
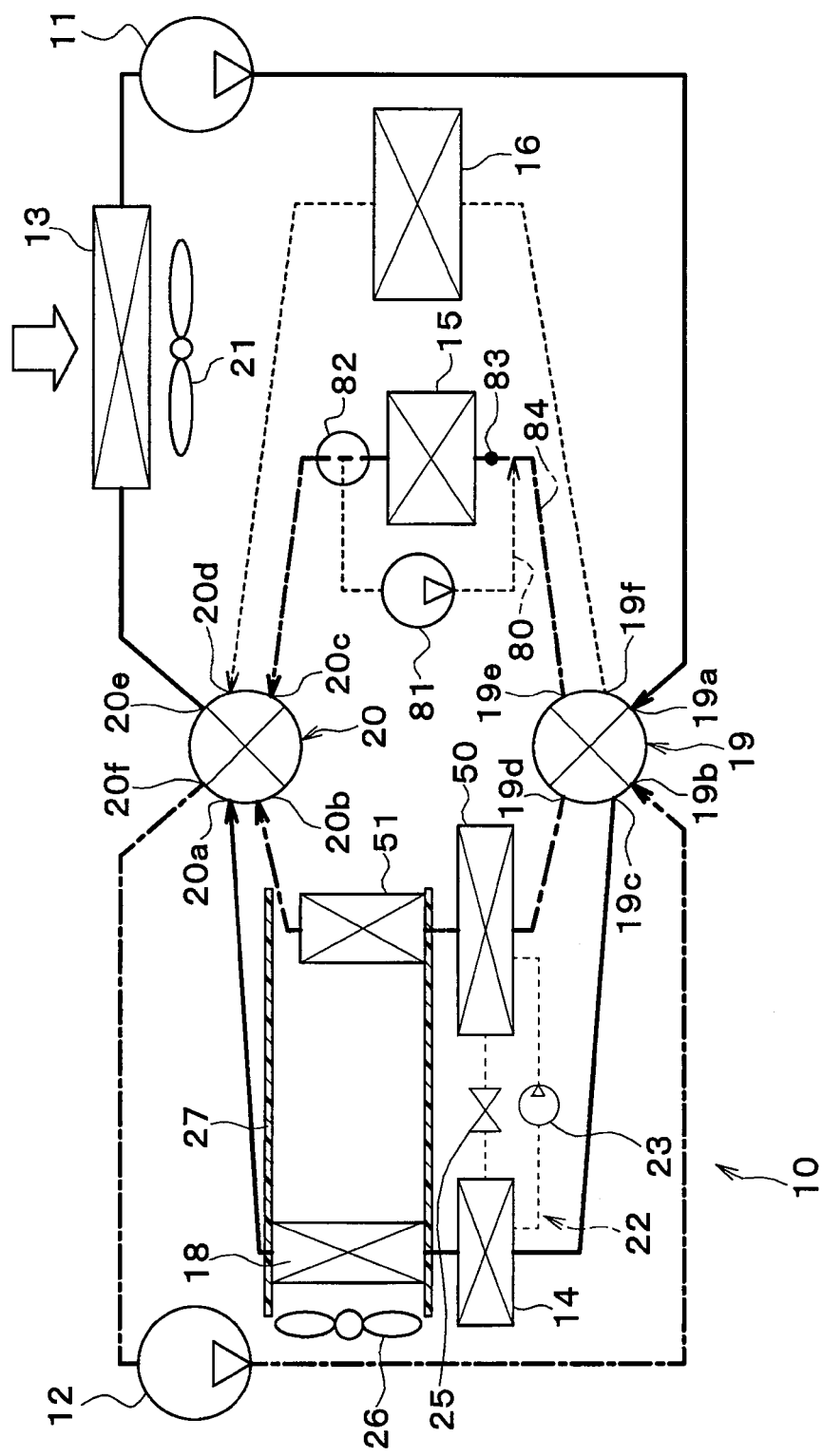
FIG. 51 is a diagram for explaining a first heating mode in the vehicle thermal management system in the twelfth embodiment.

In S380, the operations of the first switching valve 19, the second switching valve 20, the three-way valve 82, and the third pump 81 are controlled so as to achieve a first heating mode (non-circulation mode) shown in FIG. 51.

In the first heating mode, the first switching valve 19 connects the inlet 19a with the outlet 19c, as well as the inlet 19b with the outlets 19d and 19e, whereas the second switching valve 20 connects the inlet 20a with the outlet 20e, as well as the inlets 20b and 20c with the outlet 20f.

In the first heating mode, the three-way valve 82 opens the flow path 84 for the battery cooler to close the circulation flow path 80, so that the third pump 81 is stopped.

Thus, a first coolant circuit (intermediate-temperature coolant circuit) indicated by an alternate long and short dash line with an arrow in FIG. 51 and a second coolant circuit (low-temperature coolant circuit) indicated by a solid arrow in FIG. 51 are formed.

Accordingly, a first coolant circuit (intermediate-temperature coolant circuit) is formed of the second pump 12, the battery cooler 15, the condenser 50, and the heater core 51, whereas a second coolant circuit (low-temperature coolant circuit) is formed of the first pump 11, the coolant cooler 14, the cooler core 18, and the radiator 13.

That is, as indicated by alternate long and short dash lines with arrows in FIG. 51, the coolant discharged from the second pump 12 is branched into the battery cooler 15 and the condenser 50 by the first switching valve 19 to flow in parallel through the battery cooler 15 and the condenser 50. The coolant flowing through the condenser 50 flows in series through the heater core 51. The coolants flowing through the battery cooler 15 and through the heater core 51 are collected by the second switching valve 20 to be sucked into the second pump 12.

On the other hand, as indicated by a solid arrow in FIG. 51, the coolant discharged from the first pump 11 flows through the coolant cooler 14 and the cooler core 18 in series via the first switching valve 19, and is then sucked into the first pump 11 via the second switching valve 20 and the radiator 13.

As mentioned above, in the first heating mode, the intermediate-temperature coolant heated by the condenser 50 flows through the battery cooler 15. Thus, the battery is heated by the intermediate-temperature coolant heated by the condenser 50.

In the following S390, it is determined whether or not the battery-cooler inlet water temperature exceeds a first heating determination temperature Tw1 (for example, 40° C.). The first heating determination temperature Tw1 is a temperature determined based on the upper limit temperature in a range of usable temperatures of the battery (for example, from 10 to 40° C.), and is previously stored in the controller 40.

When the battery-cooler inlet water temperature is determined to exceed the first heating determination temperature Tw1, the operation proceeds to S400.

When the battery-cooler inlet water temperature is determined not to exceed the first heating determination temperature Tw1, the operation returns to S370.

Figure 52:
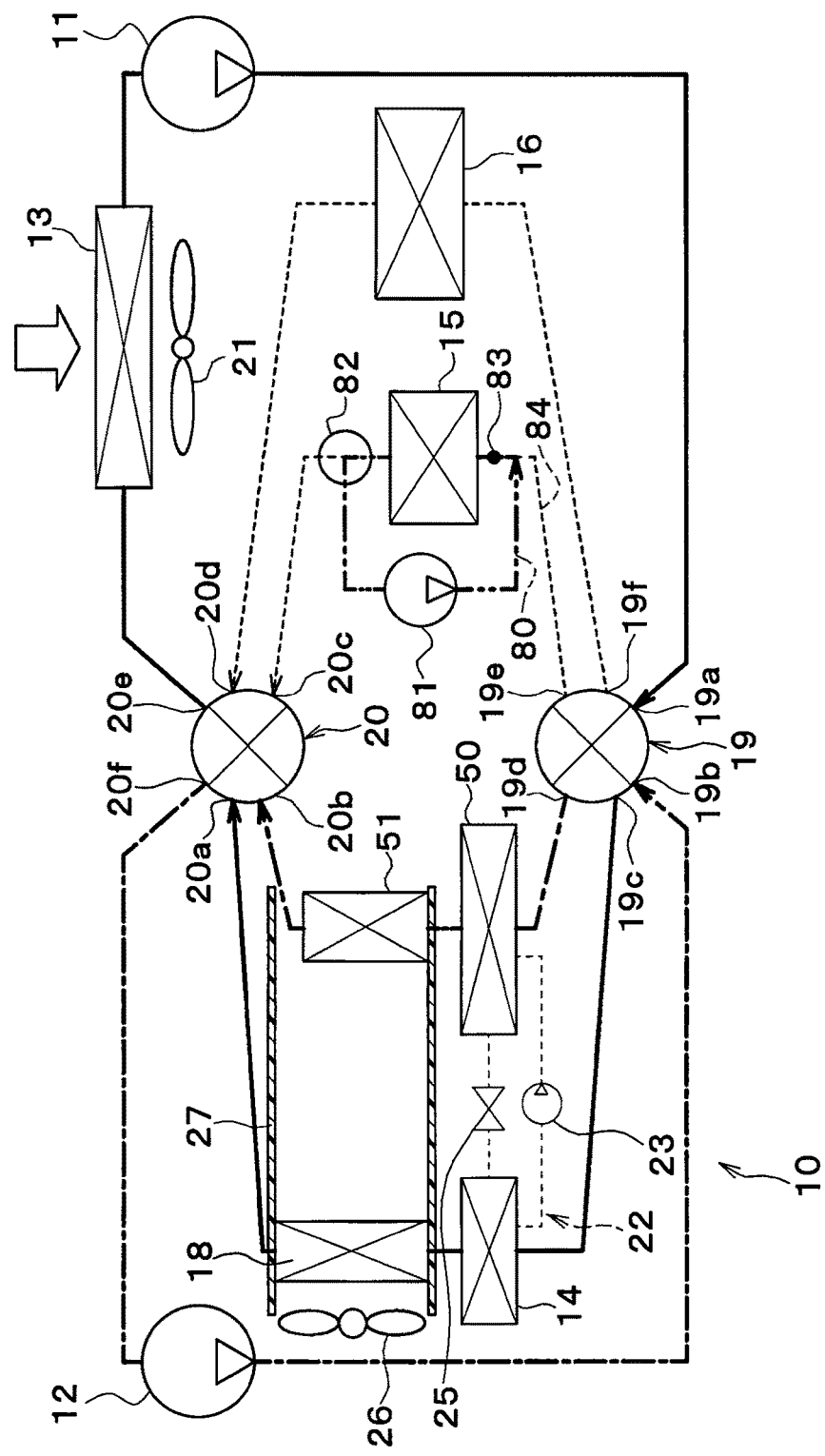
FIG. 52 is a diagram for explaining a second heating mode in the vehicle thermal management system in the twelfth embodiment.

In S400, the operations of the first switching valve 19, the second switching valve 20, the three-way valve 82, and the third pump 81 are controlled so as to achieve a second heating mode (circulation mode) shown in FIG. 52.

In the second heating mode, the first switching valve 19 connects the inlet 19a with the outlet 19c, as well as the inlet 19b with the outlet 19d, and closes the outlet 19e, whereas the second switching valve 20 connects the inlet 20a with the outlet 20e, as well as the inlet 20b with the outlet 20f, and closes the inlet 20c.

In the second heating mode, the three-way valve 82 opens the circulation flow path 80 to close the flow path 84 for the battery cooler, so that the third pump 81 is operated.

Thus, a first coolant circuit (intermediate-temperature coolant circuit) indicated by an alternate long and short dash line with an arrow in FIG. 52, a second coolant circuit (low-temperature coolant circuit) indicated by a solid arrow in FIG. 52, and an internal circulation circuit indicated by an alternate long and two short dashes line with an arrow in FIG. 52 are formed.

Accordingly, the first coolant circuit (intermediate-temperature coolant circuit) is formed of the second pump 12, the condenser 50, and the heater core 51, whereas a second coolant circuit (low-temperature coolant circuit) is formed of the first pump 11, the coolant cooler 14, the cooler core 18, and the radiator 13.

That is, as indicated by the alternate long and short dash line with the arrow in FIG. 52, the coolant discharged from the second pump 12 flows through the condenser 50 and the heater core 51 in series via the first switching valve 19, and is then sucked into the second pump 12 via the second switching valve 20.

On the other hand, as indicated by the solid line with the arrow in FIG. 52, the coolant discharged from the first pump 11 flows through the coolant cooler 14 and the cooler core 18 in series via the first switching valve 19, and is then sucked into the first pump 11 via the second switching valve 20.

Further, as indicated by an alternate long and two short dashes line with an arrow in FIG. 52, the coolant discharged from the third pump 81 flows through the battery cooler 15 to be sucked into the third pump 81.

As mentioned above, in the second heating mode, the coolant circulating through the internal circulation circuit flows through the battery cooler 15. Thus, the intermediate-temperature coolant heated by the condenser 50 does not flow through the battery cooler 15.

In the following S410, it is determined whether or not the battery-cooler inlet water temperature is below the second heating determination temperature Tw2 (for example, 38° C.). The second heating determination temperature Tw2 is higher than the first heating determination temperature Tw1, and is previously stored in the controller 40.

When the battery-cooler inlet water temperature is determined to be lower than the second heating determination temperature Tw2, the operation returns to S370. When the battery-cooler inlet water temperature is determined not to be lower than the first cooling determination temperature Tc1, the operation returns to S410.

On the other hand, when the heating of the battery is determined not to be required in S360, the operation proceeds to S420. In S420, it is determined whether or not a difference in temperature between battery cells forming the battery, namely, a difference in temperature between a cell having the highest temperature and another cell having the lowest temperature exceeds a predetermined value (for example, 5° C.).

Figure 53:
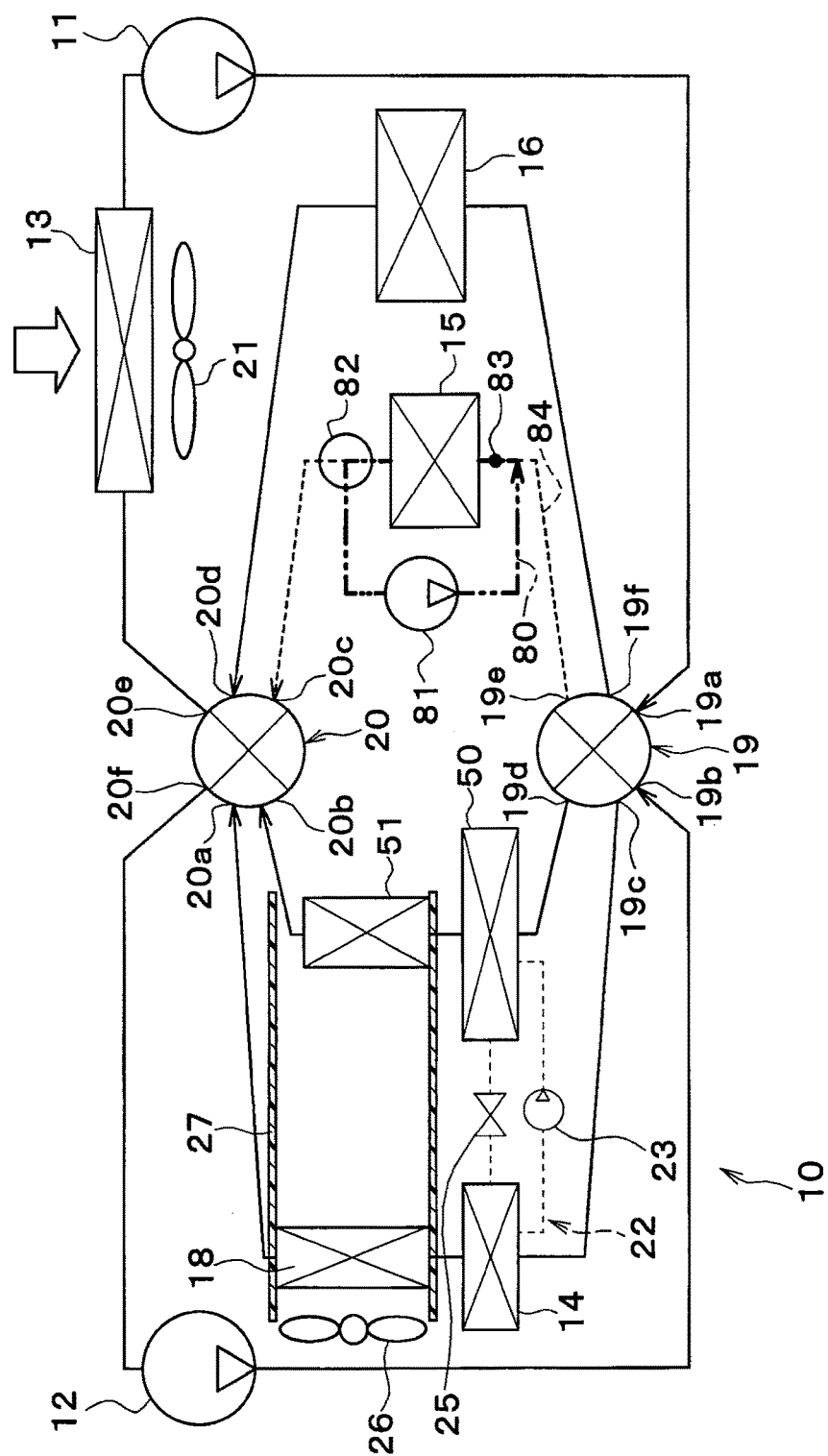
FIG. 53 is a diagram for explaining a battery temperature equalization operating mode in the vehicle thermal management system in the twelfth embodiment.

When the difference in temperature between the battery cells is determined to exceed the predetermined value, the operation proceeds to S430, in which the operations of the first switching valve 19, the second switching valve 20, the three-way valve 82, and the third pump 81 are controlled so as to achieve a battery temperature equalization operating mode (circulation mode) shown in FIG. 53.

In the battery temperature equalization operating mode, the first switching valve 19 closes the outlet 19e, and the second switching valve 20 closes the inlet 20c. In the battery temperature equalization operating mode, the three-way valve 82 opens the circulation flow path 80 to close the flow path 84 for the battery cooler, so that the third pump 81 is operated.

Thus, the internal circulation circuit indicated by an alternate long and two short dashes line with an arrow in FIG. 53 is configured. Accordingly, as indicated by the alternate long and two short dashes line with the arrow in FIG. 53, the coolant discharged from the third pump 81 flows through the battery cooler 15 to be sucked into the third pump 81.

As mentioned above, in the battery temperature equalization operating mode, the coolant circulating through the internal circulation circuit flows through the battery cooler 15. Thus, the low-temperature coolant cooled by the coolant cooler 14 and the intermediate-temperature coolant heated by the condenser 50 do not flow through the battery cooler 15.

When the difference in temperature between the battery cells is determined not to exceed the predetermined value in S420, the operation returns to S300.

In this embodiment, when the cooling of the battery is required, once the battery-cooler inlet water temperature becomes lower than the first cooling determination temperature Tc1, the first cooling mode is switched to the second cooling mode, which can optimize the operation of the battery, while ensuring the cooling performance. In the following, the reason for this will be described.

The temperature of coolant flowing into the battery coolant 15 is preferably in a range of 10 to 40° C. This is because the temperature at which the battery optimally operates ranges from 10 to 40° C. That is, when the battery temperature exceeds 40° C., the degradation of the battery is rapidly promoted, which leads to the reduction in lifetime of the battery, or breakage of the battery. On the other hand, when the battery temperature is lower than 10° C., the chemical reaction of the battery is suppressed to reduce an input/output of the battery, which reduces the acceleration of the vehicle, or the efficiency of regeneration and charging of the battery.

Since the output or internal resistance of the battery depends on the temperature, the drastic change in temperature of the battery causes drastic changes in input and output performance of the battery, which makes the controllability of the battery worse. Further, the drastic change in temperature of the battery also causes variations in temperature of the inside of the battery, which reduces the lifetime of the battery.

In contrast, when the cooling performance is intended to be ensured, the temperature of coolant flowing into the cooler core 18 is preferably in a range of 0 to 10° C.

Thus, the battery cooler 15 and the cooler core 18 differ in appropriate temperature range for the coolant flowing thereinto.

In this aspect, in the second cooling mode, the coolant circulating through the internal circulation circuit flows through the battery cooler 15, and the low-temperature coolant cooled by the coolant cooler 14 does not flow through the battery cooler 15, so that the coolant circulating through the internal circulation circuit is heated by the heat from the battery, resulting in a gradual increase in temperature of the coolant.

Even though the temperature of the low-temperature coolant cooled by the coolant cooler 14 is lower than the first cooling determination temperature Tc1, the temperature of coolant flowing through the battery cooler 15 can be equal to or higher than the first cooling determination temperature Tc1. This embodiment can prevent the degradation of the input and output of the battery due to the battery temperature lower than the usable temperature range, as well as the reduction in charging efficiency of the battery.

On the other hand, the low-temperature coolant cooled by the coolant cooler 14 flows into the cooler core 18. The low-temperature coolant having a temperature equal to or lower than the first cooling determination temperature Tc1 can flow into the cooler core 18 to ensure the cooling performance.

Furthermore, when the temperature of coolant circulating through the internal circulation circuit gradually increases in the second cooling mode to exceed the second cooling determination temperature Tc2, the second cooling mode is switched to the first cooling mode, whereby the low-temperature coolant cooled by the coolant cooler 14 is guided to the battery cooler 15. Thus, the temperature of the coolant flowing through the battery cooler 15 can be prevented from continuously increasing to be much higher than the second cooling determination temperature Tc2.

Likewise, in order to ensure the heating performance, the temperature of coolant flowing into the heater 51 is preferably in a range of 50 to 60° C. The battery cooler 15 and the heater core 51 differ in appropriate temperature range of the coolant flowing thereinto.

In this embodiment, taking this point into consideration, when the cooling of the battery is required, once the battery-cooler inlet water temperature exceeds the first heating determination temperature Tw1, the first cooling mode is switched to the second cooling mode, which can optimize the operation of the battery, while ensuring the heating performance.

That is, in the second heating mode, the coolant circulating through the internal circulation circuit flows through the battery cooler 15, and the intermediate-temperature coolant heated by the condenser 50 does not flow through the battery cooler 15, so that the coolant circulating through the internal circulation circuit is cooled by the battery, resulting in a gradual decrease in temperature of the coolant.

Even though the temperature of the intermediate-temperature coolant heated by the condenser 50 exceeds the first heating determination temperature Tw1, the temperature of coolant flowing through the battery cooler 15 can be equal to or higher than the first heating determination temperature Tw1. This embodiment can prevent the quick degradation of the battery and the decrease in lifetime of the battery due to the battery temperature exceeding the usable temperature range, as well as the breakage of the battery.

On the other hand, the intermediate-temperature coolant heated by the condenser 50 flows into the heater core 51. The intermediate-temperature coolant having a temperature equal to or lower than the first heating determination temperature Tw1 can flow into the heater core 51 to ensure the heating performance.

Once the temperature of the coolant circulating through the internal circulation circuit gradually decreases in the second heating mode to be lower than the second heating determination temperature Tw2, the second heating mode is switched to the first heating mode, whereby the intermediate-temperature coolant heated by the condenser 50 is guided to the battery cooler 15. Thus, the temperature of the coolant flowing through the battery cooler 15 can be prevented from continuously decreasing to be much lower than the second heating determination temperature Tw2.

In the case where neither the cooling nor heating of the battery is required in this embodiment, when the difference in temperature between the battery cells forming the battery exceeds the predetermined value (for example, 5° C.), the battery temperature equalization operating mode is performed, so that the coolant can circulate through the battery cooler 15 to decrease the difference in temperature between the battery cells forming the battery. In the following, the reason for this will be described.

In general, a battery is mounted under a floor or a luggage area of a vehicle. In particular, in battery cars or the like, batteries are mounted to be distributed due to a large volume of each battery, which makes the temperature distribution in the surroundings of the respective battery cells, resulting in variations in temperature of each battery cell.

Such a difference in temperature between the battery cells causes variations in internal resistance of the respective cells, leading to variations in amount of heat generated by each cell, output from the cell, degradation speed thereof, and the like, disadvantageously resulting in reduction in output from a battery pack and in lifetime thereof.

From this point of view, even when neither the cooling nor heating of the battery is required in this embodiment, once the difference in temperature between the battery cells exceeds the predetermined value (for example, 5° C.), the battery temperature equalization operating mode is performed to allow the coolant to flow through the battery cooler 15, so that the difference in temperature among the battery cells can be reduced.

In the battery temperature equalization operating mode, the coolant circulating through the internal circulation circuit flows through the battery cooler 15, and the low-temperature coolant cooled by the coolant cooler 14 and the intermediate-temperature coolant heated by the condenser 50 do not flow through the battery cooler 15.

Thus, when the air conditioning is not necessary, that is, when the coolant does not need to be cooled by the coolant cooler 14 and also does not need to be heated by the condenser 50, the coolant is allowed to circulate through the battery cooler 15.

When the air conditioning is not necessary, the coolant can circulate through the battery cooler 15 without allowing the coolant to circulate through the first and second coolant circuits, which can reduce a water flow resistance as compared to the case where the coolant of the first or second coolant circuit circulates through the battery cooler 15, further decreasing the power consumption by the pump.

Thirteenth Embodiment

Figure 54:
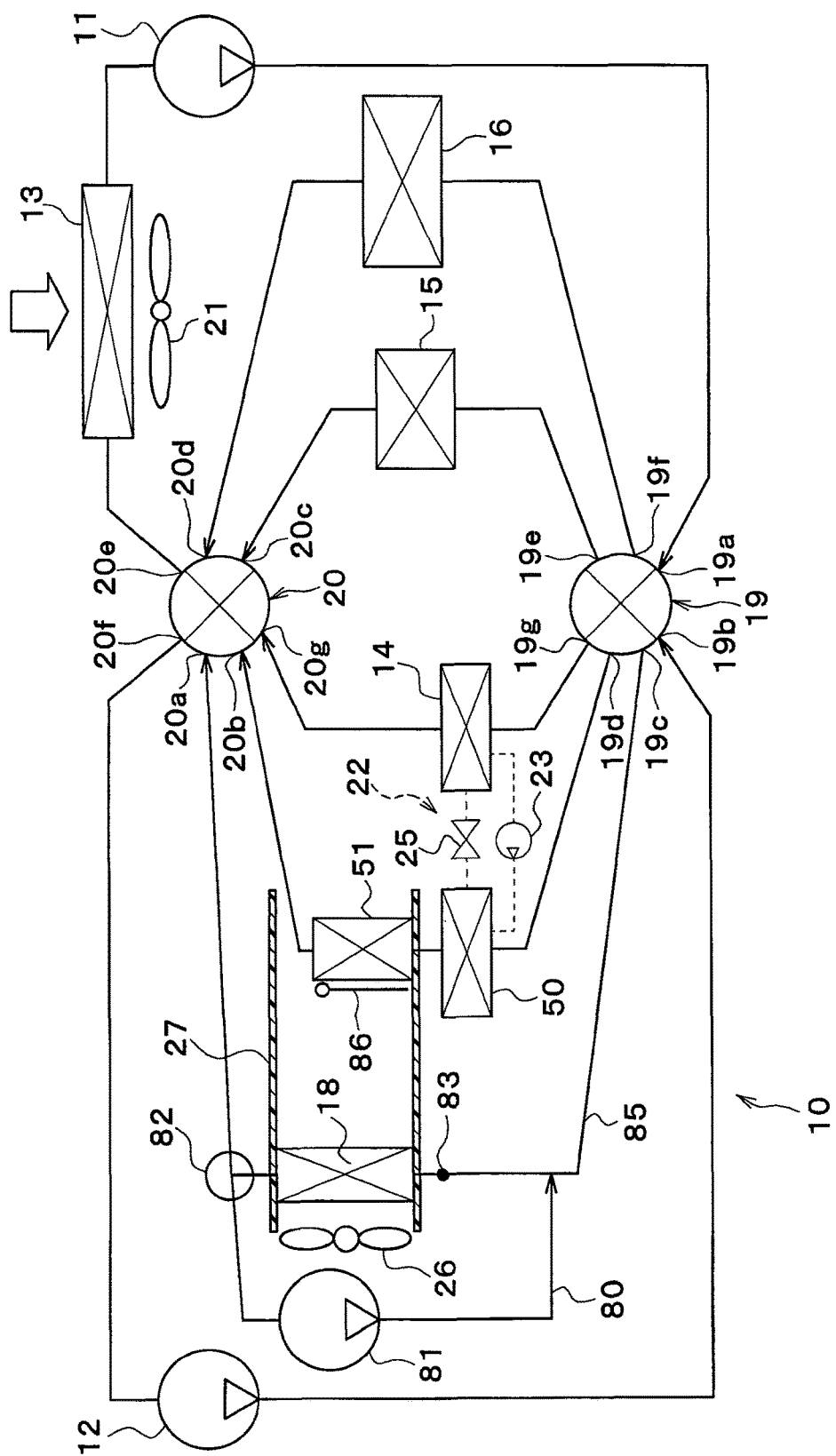
FIG. 54 is an entire configuration diagram of a vehicle thermal management system according to a thirteenth embodiment of the invention.

Although in the twelfth embodiment, the circulation flow path 80 is provided for the battery cooler 15, in a thirteenth embodiment, as shown in FIG. 54, the circulation flow path 80 is provided for the cooler core 18.

The circulation flow path 80 is provided in parallel with a flow path 85 for a cooler core. The flow path 85 for the cooler core is a flow path in which the cooler core 18 is disposed. The flow path 85 has one end connected to the outlet 19c of the first switching valve 19, and the other end connected to the inlet 20a of the second switching valve 20.

One end of the circulation flow path 80 is connected to the coolant outlet side of the cooler core 18, and the other end of the circulation flow path 80 is connected to the coolant inlet side of the cooler core 18.

In the example shown in FIG. 54, parts of the circulation flow path 80 and the flow path 85 for the cooler core, which are located near the cooler core 18, are integrated together to form one flow path. Thus, between the cooler core 18 and the second switching valve 20, the flow path is branched into the circulation flow path 80 and the flow path 85 for the cooler core, whereas between the cooler core 18 and the first switching valve 19, the circulation flow path 80 and the flow path 85 for the cooler core are merged into one path.

The three-way valve 82 is disposed in the branch portion between the circulation flow path 80 and the flow path 85 for the cooler core, and adapted to switch between opening and closing of the circulation flow path 80 and the flow path 85 for the cooler core.

That is, when the three-way valve 82 opens the circulation flow path 80 and closes the flow path 85 for the cooler core, the coolant flowing from the cooler core 18 circulates through the circulation flow path 80 into the cooler core 18. In contrast, when the three-way valve 82 opens the flow path 85 for the cooler core and closes the circulation flow path 80, the coolant flowing from the cooler core 18 circulates through the cooler core 18 to flow into the second switching valve 20.

The inlet water temperature sensor 83 is disposed on the coolant inlet side of the cooler core 18. The inlet water temperature sensor 83 is adapted to detect the temperature of coolant flowing into the cooler core 18 (intake heat medium temperature).

Although in the above twelfth embodiment, the coolant cooler 14 and the cooler core 18 are disposed in series in the same flow path, in this embodiment, the coolant cooler 14 and the cooler core 18 are disposed in different flow paths in parallel.

That is, the coolant inlet side of the coolant cooler 14 is connected to the outlet 19g of the first switching valve 19. The coolant outlet side of the coolant cooler 14 is connected to the inlet 20g of the second switching valve 20.

The first switching valve 19 is capable of switching the communication states between the inlets 19a and 19b and the outlets 19c, 19d, 19e, 19f, and 19g. The second switching valve 20 is also capable of switching the communication states between the inlets 20a, 20b, 20c, 20d, and 20g and the outlets 20e, and 20f.

Although a description has been omitted in the embodiments mentioned above, as shown in FIG. 54, an air mix door 86 is disposed between the cooler core 18 and the heater core 51 within the casing 27 of the indoor air conditioning unit. The air mix door 86 is a temperature adjustment device for controlling the temperature of conditioned air to be blown into the vehicle interior by adjusting the ratio of the volume of air passing through the heater core 51 to that of air bypassing the heater core 51 in the blast air having passed through the cooler core 18.

Figure 55:
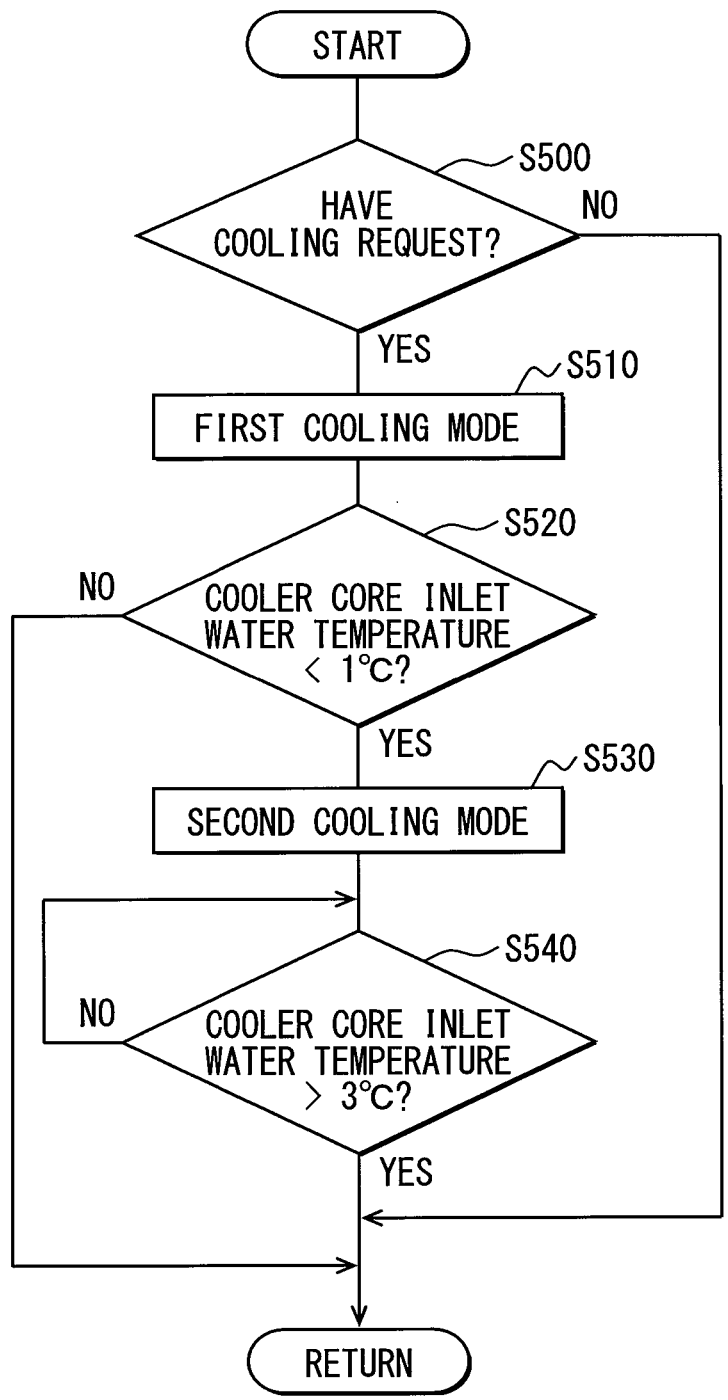
FIG. 55 is a flowchart showing the flow of a control process performed by a controller of the thirteenth embodiment.

A control process executed by the controller 40 of this embodiment will be described with reference to FIG. 55. The controller 40 executes a computer program according to a flowchart of FIG. 55.

In S500, first, it is determined whether the cooling is required or not. Specifically, when the air conditioning switch 44 is turned on, the cooling is determined to be required. In contrast, when the air conditioning switch 44 is turned off, the cooling is determined not to be required.

When the cooling is determined to be required, the operation proceeds to S510. In S510, the operations of the first and second switching valves 19 and 20, the three-way valve 82, and the third pump 81 are controlled so as to achieve the first cooling mode (non-circulation mode) shown in FIG. 56.

In the first cooling mode, the first switching valve 19 connects the inlet 19a with the outlets 19c and 19g, as well as the inlet 19b with the outlets 19d and 19e, whereas the second switching valve 20 connects the inlets 20a and 20g with the outlet 20e, as well as the inlets 20b and 20c with the outlet 20f.

In the first cooling mode, the three-way valve 82 opens the flow path 85 for the cooler core to close the circulation flow path 80, so that the third pump 81 is stopped.

Figure 56:
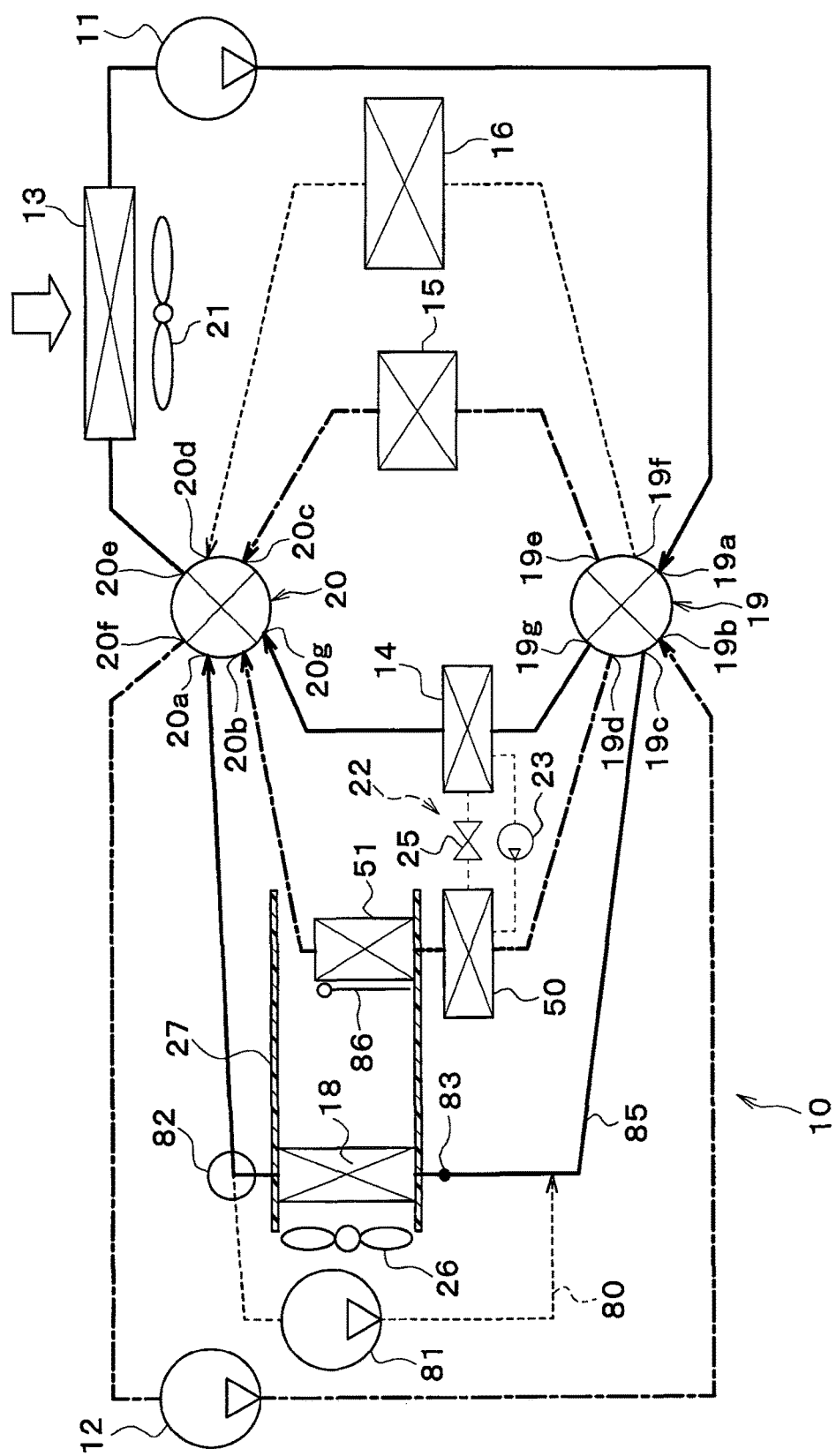
FIG. 56 is a diagram for explaining a first cooling mode in the vehicle thermal management system of the thirteenth embodiment.

Thus, a first coolant circuit (intermediate-temperature coolant circuit) indicated by an alternate long and short dash line with an arrow in FIG. 56, and a second coolant circuit (low-temperature coolant circuit) indicated by a solid arrow in FIG. 56 are formed.

Accordingly, a first coolant circuit (intermediate-temperature coolant circuit) is formed of the second pump 12, the condenser 50, the heater core 51, and the battery cooler 15, whereas a second coolant circuit (low-temperature coolant circuit) is formed of the first pump 11, the coolant cooler 14, the cooler core 18, and the radiator 13.

That is, as indicated by alternate long and short dash lines with arrows in FIG. 56, the coolant discharged from the second pump 12 is branched into the condenser 50 and the battery cooler 15 by the first switching valve 19. The coolant flowing through the condenser 50 flows in series through the heater core 51. The coolants flowing through the heater core 51 and through the battery cooler 15 are collected by the second switching valve 20 to be sucked into the second pump 12.

On the other hand, as indicated by solid arrows in FIG. 56, the coolant discharged from the first pump 11 is branched into the coolant cooler 14 and the cooler core 18 by the first switching valve 19 to flow through the coolant cooler 14 and the cooler core 18 in parallel. The coolants flowing through the coolant cooler 14, and through the cooler core 18 are collected by the second switching valve 20 to flow through the radiator 13, thereby being sucked into the first pump 11.

As mentioned above, in the first cooling mode, the low-temperature coolant cooled by the coolant cooler 14 flows through the cooler core 18. Thus, the blast air into the vehicle interior is cooled by the low-temperature coolant cooled by the coolant cooler 14.

In the following S520, it is determined whether or not the coolant temperature detected by the inlet water temperature sensor 83 (hereinafter referred to as a "cooler core inlet water temperature") is lower than a first cooling determination temperature Tf1 (for example, 1° C.). The first cooling determination temperature Tf1 is a temperature determined based on the lower limit temperature in a range of temperatures that does not cause the frost formation (frost) on the surface of the cooler core 18, and is previously stored in the controller 40. Instead of the cooler core inlet water temperature, the surface temperature (fin temperature) of the cooler core 18 may be used.

When the cooler core inlet water temperature is determined to be lower than the first cooling determination temperature Tf1, the operation proceeds to S530. When the cooler core inlet water temperature is determined not to be lower than the first cooling determination temperature Tf1, the operation returns to S500.

Figure 57:
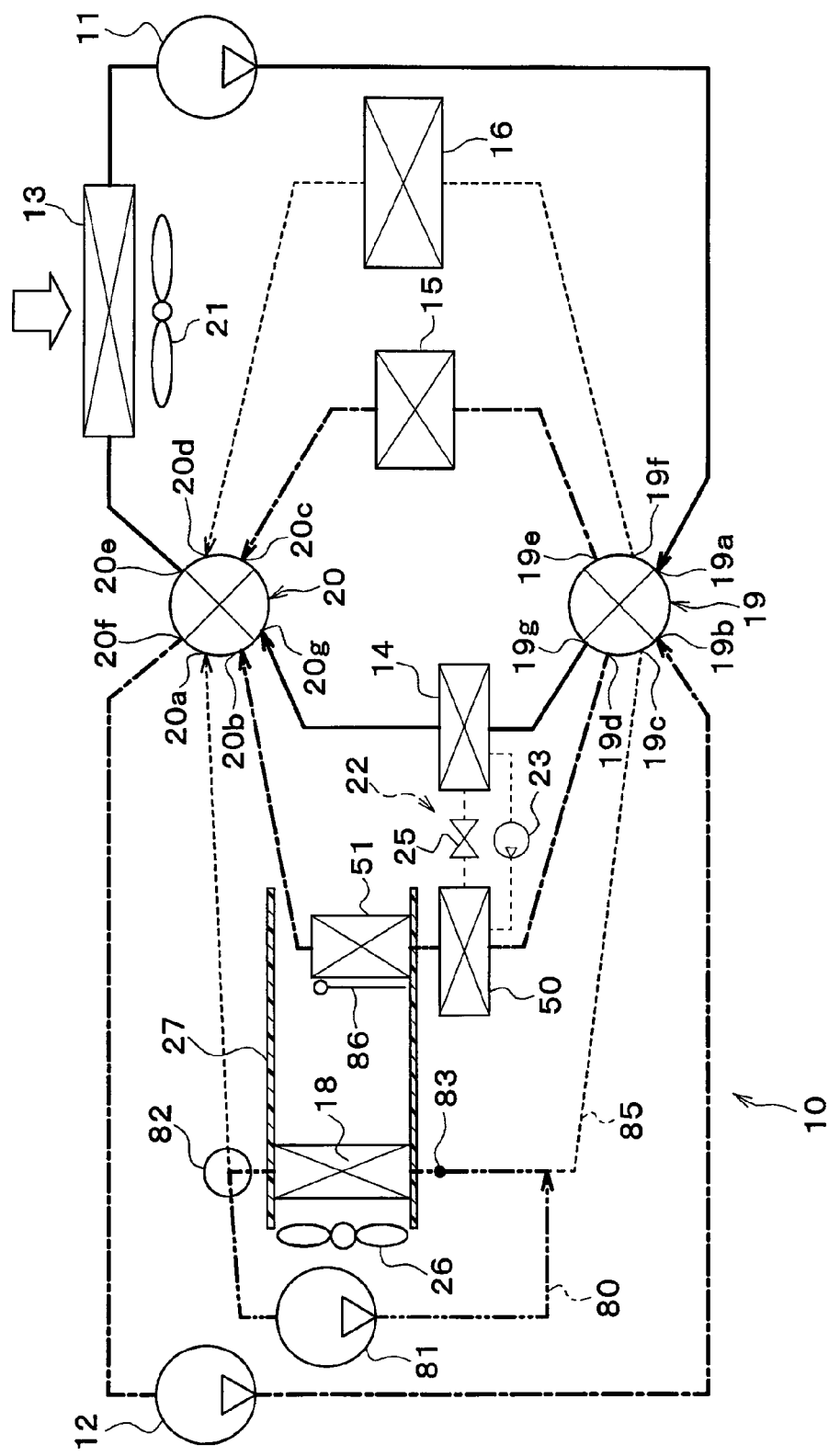
FIG. 57 is a diagram for explaining a second cooling mode in the vehicle thermal management system of the thirteenth embodiment.

In S530, the operations of the first switching valve 19, the second switching valve 20, the three-way valve 82, and the third pump 81 are controlled so as to achieve a second cooling mode (circulation mode) shown in FIG. 57.

In the second cooling mode, the first switching valve 19 connects the inlet 19a with the outlet 19g, as well as the inlet 19b with the outlets 19d and 19e, and closes the outlet 19c, whereas the second switching valve 20 connects the inlet 20g with the outlet 20e, as well as the inlets 20b and 20c with the outlet 20f, and closes the inlet 20a.

In the second cooling mode, the three-way valve 82 opens the circulation flow path 80 to close the flow path 85 for the cooler core, so that the third pump 81 is operated.

Thus, a first coolant circuit (intermediate-temperature coolant circuit) indicated by an alternate long and short dash line with an arrow in FIG. 57, a second coolant circuit (low-temperature coolant circuit) indicated by a solid arrow in FIG. 57, and an internal circulation circuit indicated by an alternate long and two short dashes line with an arrow in FIG. 57 are formed.

Accordingly, the first coolant circuit (intermediate-temperature coolant circuit) is formed of the second pump 12, the condenser 50, the heater core 51, and the battery cooler 15. The second coolant circuit (low-temperature coolant circuit) is formed of the first pump 11, the coolant cooler 14, and the radiator 13. The internal circulation circuit is formed of the third pump 81 and the cooler core 18.

That is, as indicated by the alternate long and short dash lines with arrows in FIG. 57, the coolant discharged from the second pump 12 is branched into the condenser 50 and the battery cooler 15 by the first switching valve 19. The coolant flowing through the condenser 50 flows in series through the heater core 51. The coolants flowing through the heater core 51 and through the battery cooler 15 are merged into the second switching valve 20 to be sucked into the second pump 12.

On the other hand, as indicated by the solid line with the arrow in FIG. 57, the coolant discharged from the first pump 11 flows through the coolant cooler 14 via the first switching valve 19. The coolant flowing through the coolant cooler 14 is then sucked into the second pump 12 via the second switching valve 20 and the radiator 13.

Further, as indicated by the alternate long and two short dashes line with an arrow in FIG. 57, the coolant discharged from the third pump 81 flows through the battery cooler 18 to be sucked into the third pump 81.

As mentioned above, in the second cooling mode, the coolant circulating through the internal circulation circuit flows through the cooler core 18. Thus, the low-temperature coolant cooled by the coolant cooler 14 does not flow through the cooler core 18.

In the following S540, it is determined whether or not the cooler core inlet water temperature exceeds a second cooling determination temperature Tf2 (the second cooling determination temperature). The second cooling determination temperature Tf2 is a temperature (for example, 3° C.) which is higher than the first cooling determination temperature Tf1, and is previously stored in the controller 40.

When the cooler core inlet water temperature is determined to exceed the second cooling determination temperature Tf2, the operation returns to S500.

When the cooler core inlet water temperature is determined not to exceed the second cooling determination temperature Tf2, the operation returns to S540.

In this embodiment, when the cooling is required, once the cooler core inlet water temperature becomes lower than the first cooling determination temperature Tf1, the first cooling mode is switched to the second cooling mode, which can suppress the generation of the frost formation (frost) on the surface of the cooler core 18. In the following, the reason for the above description will be described.

When the surface temperature of the cooler core 18 is lower than 0° C., the condensed water attached to the surface of the cooler core 18 is frozen to generate the frost formation (frost). As a result, an air passage of the cooler core 18 is closed to decrease the volume of blast air into the vehicle interior, reducing the air conditioning performance. Thus, the appropriate range of the temperatures of coolant flowing into the cooler core 18 is equal to or higher than 0° C.

From this point of view, in this embodiment, when the cooling is required, once the cooler core inlet water temperature is lower than the first cooling determination temperature Tf1 in the first cooling mode, the first cooling mode is switched to the second cooling mode, so that the coolant circulating through the internal circulation circuit flows through the cooler core 18, and the low-temperature coolant cooled by the coolant cooler 14 does not flow through the cooler core 18.

At this time, the coolant circulating through the internal circulation circuit is heated by the blast air into the vehicle interior, gradually increasing its temperature. Even though the temperature of the low-temperature coolant cooled by the coolant cooler 14 is lower than the first cooling determination temperature Tf1, the temperature of coolant flowing through the cooler core 18 can be equal to or higher than the first cooling determination temperature Tf1, which can suppress the frost formation (frost) on the surface of the cooler core 18.

Fourteenth Embodiment

Figure 58:
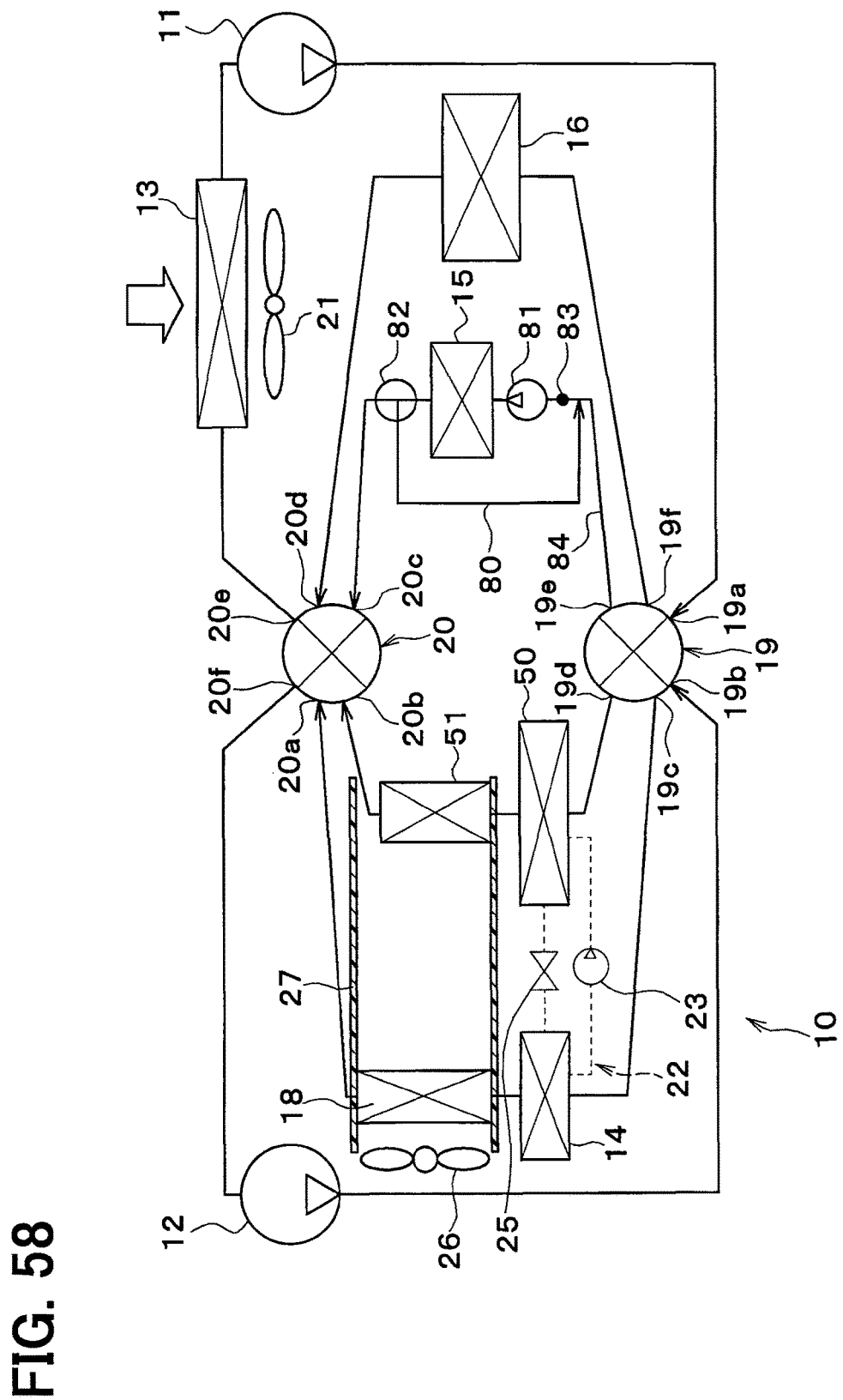
FIG. 58 is an entire configuration diagram of a vehicle thermal management system according to a fourteenth embodiment of the invention.

Although in the twelfth embodiment, the third pump 81 is disposed in a part branched from the flow path 84 for the battery cooler in the circulation flow path 80, in a fourteenth embodiment, as shown in FIG. 58, the third pump 81 is disposed in a part of the circulation flow path 80 which is integrated with the flow path 84 for the battery cooler (near the battery cooler 15).

This embodiment can obtain the same operation and effects as those of the twelfth embodiment described above. Further, in this embodiment, the third pump 81 is operated all the time, whereby the supply of the coolant to the battery cooler 15 can be controlled not to be stopped in switching between the non-circulation mode (first cooling mode or the like) and the circulation mode (second cooling mode or the like).

Fifteenth Embodiment

Figure 59:
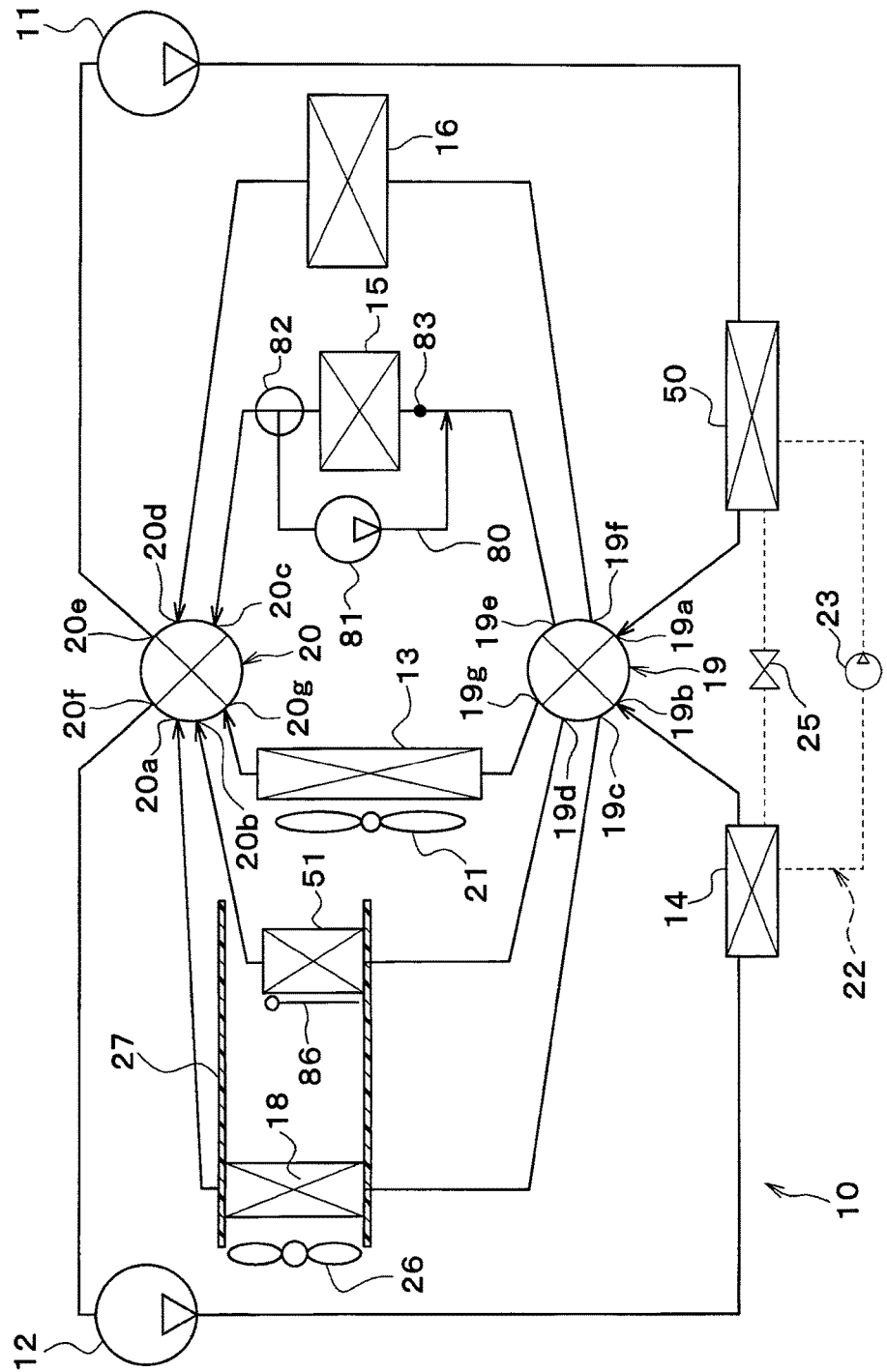
FIG. 59 is an entire configuration diagram of a vehicle thermal management system according to a fifteenth embodiment of the invention.

In a fifteenth embodiment of the invention, as shown in FIG. 59, the arrangement of the coolant cooler 14, condenser 50, and radiator 13 is modified with respect to the arrangement of the above-mentioned twelfth embodiment.

The coolant cooler 14 is disposed between the second pump 12 and the first switching valve 19. That is, the coolant inlet side of the coolant cooler 14 is connected to the coolant discharge side of the second pump 12, and the coolant outlet side of the coolant cooler 14 is connected to the inlet 19b of the first switching valve 19.

The condenser 50 is disposed between the first pump 11 and the first switching valve 19. That is, the coolant inlet side of the condenser 50 is connected to the coolant discharge side of the first pump 11, and the coolant outlet side of the condenser 50 is connected to the inlet 19a of the first switching valve 19.

The radiator 13 is disposed between the first and second switching valves 19 and 20. That is, the coolant inlet side of the radiator 13 is connected to the outlet 19g of the first switching valve 19, and the coolant outlet side of the radiator 13 is connected to the inlet 20g of the second switching valve 20.

The first switching valve 19 is configured to be capable of switching the communication state between the inlets 19a and 19b and the outlets 19c, 19d, 19e, 19f, and 19g. The second switching valve 20 is also configured to be capable of switching the communication state between the inlets 20a, 20b, 20c, 20d, and 20g and the outlets 20e, and 20f.

This embodiment can obtain the same operation and effects as those of the twelfth embodiment described above.

Sixteenth Embodiment

In the above-mentioned twelfth embodiment, the coolant is allowed to circulate through the battery cooler 15 without flowing through the first and second switching valves 19 and 20, which optimizes the operation of the battery, while ensuring the air conditioning performance (cooling and heating performance). On the other hand, in a sixteenth embodiment shown in FIG. 60, the battery cooler 15 is composed of a heat pipe type heat exchanger, which optimizes the operation of the battery, while ensuring the air conditioning performance.

Figure 60:
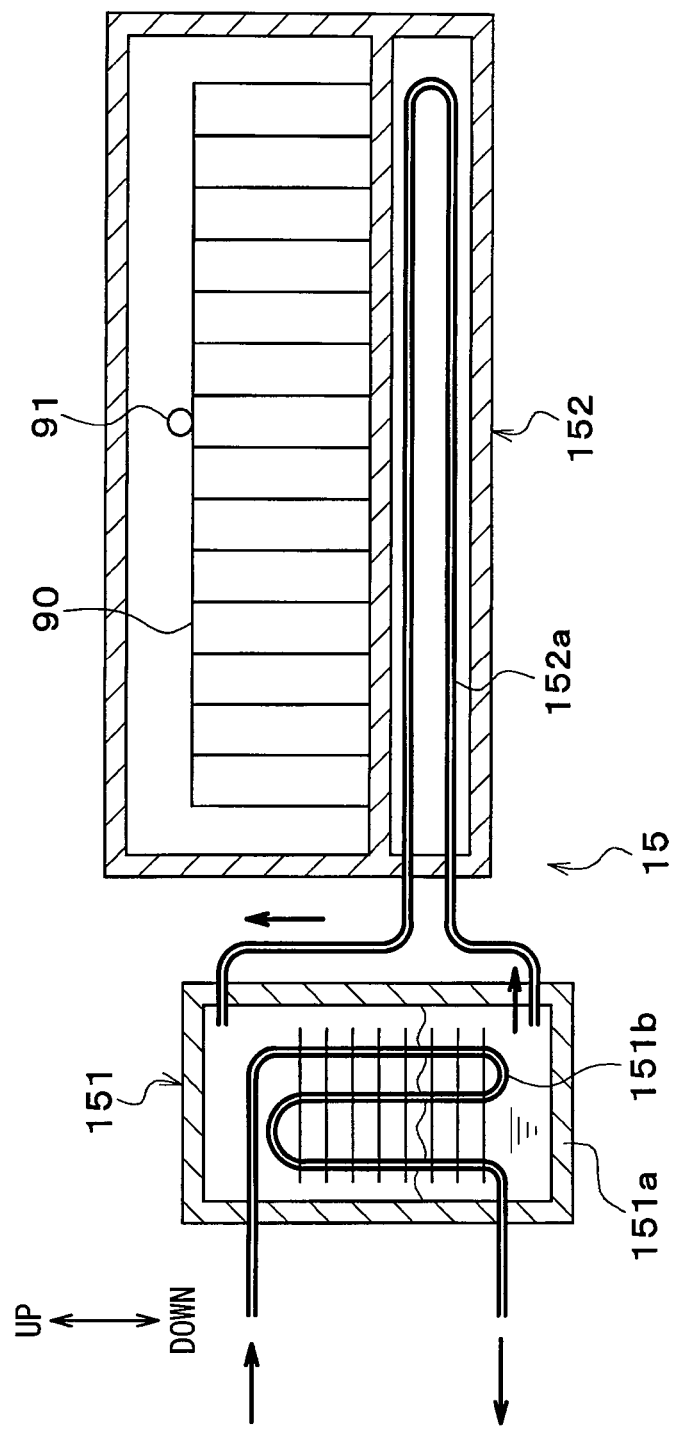
FIG. 60 is a cross-sectional diagram of a battery cooler according to a sixteenth embodiment of the invention.

The upward and downward arrows shown in FIG. 60 indicate the vertical direction (direction of gravitational force) in a vehicle-mounted state. The battery cooler 15 includes a first gas-liquid phase changing portion 151 and a second gas-liquid phase changing portion 152 which are adapted to condense or evaporate the refrigerant (working fluid).

The first gas-liquid phase changing portion 151 includes a container 151a and a coolant pipe 151b. The refrigerant is sealed in the container 151a in two phases, namely, in gas and liquid phases. The inlet side of the coolant pipe 151b is connected to the outlet of the first switching valve 19, and the outlet side of the coolant pipe 151b is connected to the inlet of the second switching valve 20. An intermediate part of the coolant pipe 151b is disposed in the container 151a.

The refrigerant sealed in the container 151a exchanges heat with coolant flowing through the coolant pipe 151b to condense or evaporate.

The second gas-liquid phase changing portion 152 includes a refrigerant pipe 152a through which the refrigerant flows. One end of the refrigerant pipe 152a is connected to a lower portion of the container 151a of the first gas-liquid phase changing portion 151, that is, a portion where the liquid-phase refrigerant exists. The other end of the refrigerant pipe 152a is connected to an upper portion of the container 151a of the first gas-liquid phase changing portion 151, that is, a portion where the gas-phase refrigerant exists.

In the second gas-liquid phase changing portion 152, the refrigerant flowing through the refrigerant pipe 152a evaporates or condenses by being heated or cooled by a battery 90.

The battery 90 is composed of a plurality of battery cells. The battery 90 is provided with a battery temperature sensor 91 for detecting a temperature of the battery cells. A detection signal from the battery temperature sensor 91 is input to the controller 40.

When the temperature of coolant flowing into the first gas-liquid phase changing portion 151 is low, the gas-phase refrigerant is cooled by the coolant to condense in the first gas-liquid phase changing portion 151. At this time, when the liquid-phase refrigerant evaporates in the second gas-liquid phase changing portion 152 by being heated by the battery 90, the refrigerant circulates between the first gas-liquid phase changing portion 151 and the second gas-liquid phase changing portion 152 as indicated by the arrows in FIG. 60, so that the battery 90 is cooled.

Conversely, when the temperature of coolant flowing into the first gas-liquid phase changing portion 151 (battery cooler 15) is high, the liquid-phase refrigerant is heated by the coolant to evaporate in the first gas-liquid phase changing portion 151. At this time, when the gas-phase refrigerant is cooled by the battery 90 to condense in the second gas-liquid phase changing portion 152, the refrigerant circulates between the first gas-liquid phase changing portion 151 and the second gas-liquid phase changing portion 152 in the direction opposite to the direction of the arrows in FIG. 60, so that the battery 90 is heated.

Figure 61:
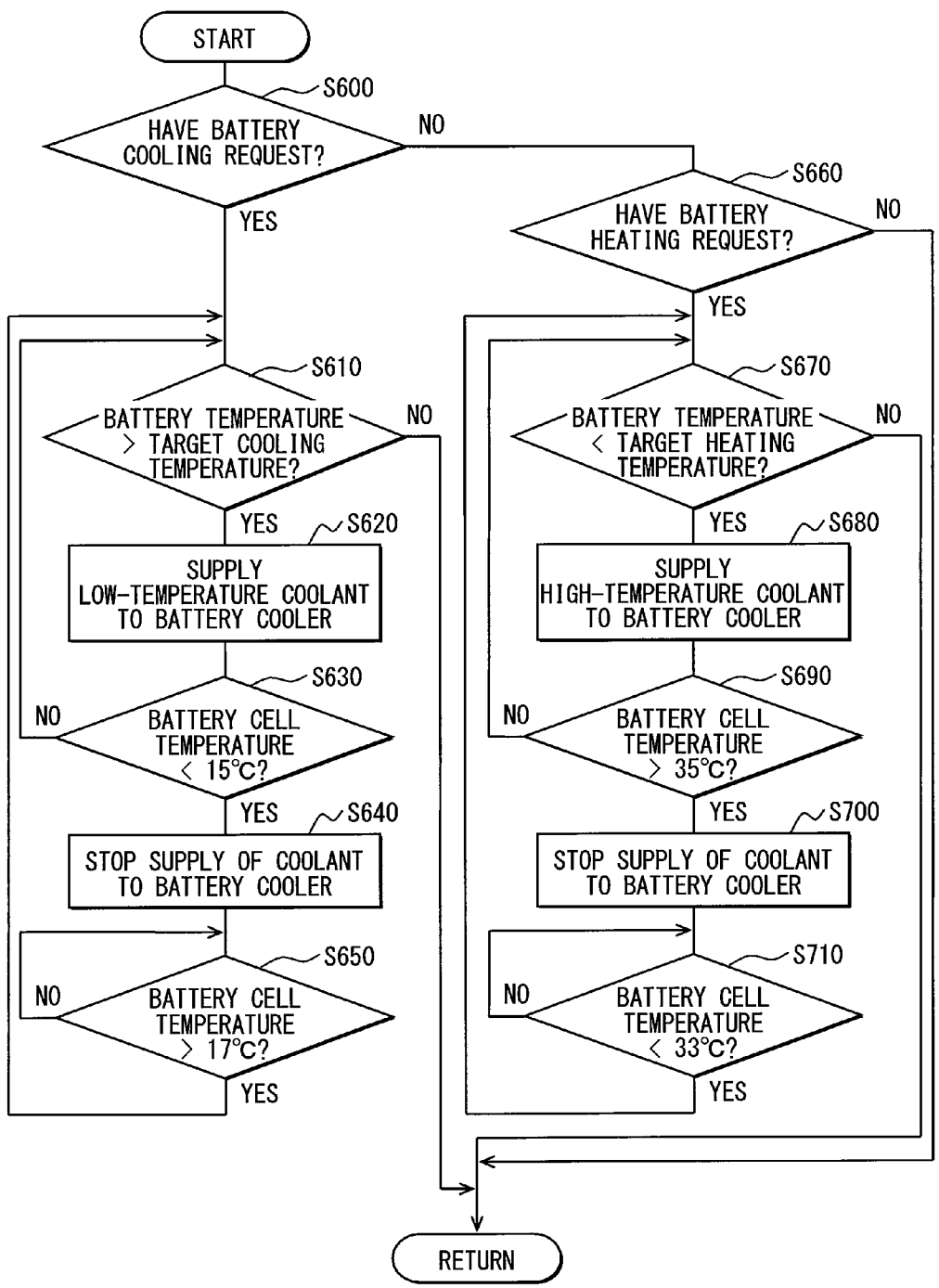
FIG. 61 is a flowchart showing the flow of a control process performed by a controller of the sixteenth embodiment.

A control process executed by the controller 40 of this embodiment will be described with reference to FIG. 61. The controller 40 executes a computer program according to a flowchart of FIG. 61.

In S600, first, it is determined whether the battery is required to be cooled or not. Specifically, when the battery temperature is equal to or higher than a first predetermined temperature (for example, 35° C.), the cooling of the battery is considered to be required. In contrast, when the battery temperature is lower than the first predetermined temperature, the cooling of the battery is determined not to be required.

When the cooling of the battery is determined to be required, the operation proceeds to S610, in which it is determined whether the battery temperature exceeds a target cooling temperature (for example, 40° C.). When the battery temperature is determined to exceed the target cooling temperature, the operation proceeds to S620. When the battery temperature is determined not to exceed the target cooling temperature, the operation returns to S600.

In S620, the operations of the first and second switching valves 19 and 20 are controlled such that the low-temperature coolant (coolant cooled by the coolant cooler 14) is supplied to the battery cooler 15. Thus, the battery 90 is cooled.

In the following S630, it is determined whether or not the temperature of the battery cell detected by the battery temperature sensor 91 is lower than the first cooling determination temperature Tc1 (for example, 15° C.). The first cooling determination temperature Tc1 is the lower limit temperature in a range of usable temperatures of the battery (for example, 15 to 35° C.).

When the battery-cooler inlet water temperature is determined to be less than the first cooling determination temperature Tc1, the operation proceeds to S640. When the battery-cooler inlet water temperature is determined not to be less than the first cooling determination temperature Tc1, the operation returns to S610.

In S640, the operations of the first and second switching valves 19 and 20 are controlled such that the supply of the low-temperature coolant to the battery cooler 15 is stopped.

In the following S650, it is determined whether or not the battery-cooler inlet water temperature exceeds a second cooling determination temperature Tc2 (for example, 17° C.). The second cooling determination temperature Tc2 is higher than the first cooling determination temperature Tc1.

When the battery-cooler inlet water temperature is determined to exceed the second cooling determination temperature Tc2, the operation returns to S610. When the battery-cooler inlet water temperature is determined not to exceed the second cooling determination temperature Tc2, the operation returns to S650.

On the other hand, when the cooling of the battery is determined not to be required in S600, the operation proceeds to S660, in which it is determined whether the battery is required to be heated or not. Specifically, when the battery temperature is less than a second predetermined temperature (for example, 15° C.), the heating of the battery is determined to be required. In contrast, when the battery temperature is equal to or higher than the second predetermined temperature, the heating of the battery is determined not to be required.

When the heating of the battery is determined to be required, the operation proceeds to S670. When the heating of the battery is determined not to be required in S670, the operation returns to S600.

In the following S670, it is determined whether or not the battery temperature is lower than a target heating temperature (for example, 10° C.). When the battery temperature is determined to be lower than the target heating temperature, the operation proceeds to S680. When the battery temperature is determined not to be lower than the target heating temperature, the operation returns to S600.

In S680, the operations of the first and second switching valves 19 and 20 are controlled such that the high-temperature coolant (coolant heated by the condenser 50) is supplied to the battery cooler 15. Thus, the battery 90 is heated.

In the following S690, it is determined whether or not the temperature of the battery cell detected by the battery temperature sensor 91 is higher than the first heating determination temperature Tw1 (for example, 35° C.). The first heating determination temperature Tw1 is the upper limit temperature in a range of usable temperatures (for example, 15 to 35° C.) of the battery.

When the battery-cooler inlet water temperature is determined to exceed the first heating determination temperature Tw1, the operation proceeds to S700. When the battery-cooler inlet water temperature is determined not to exceed the first heating determination temperature Tw1, the operation returns to S670.

In S700, the operations of the first and second switching valves 19 and 20 are controlled so as to stop the supply of the high-temperature coolant to the battery cooler 15.

In the following S710, it is determined whether or not the battery-cooler inlet water temperature is lower than the second heating determination temperature Tw2 (for example, 33° C.). The second heating determination temperature Tw2 is lower than the first heating determination temperature Tw1.

When the battery-cooler inlet water temperature is determined to be lower than the second heating determination temperature Tw2, the operation returns to S670. When the battery-cooler inlet water temperature is determined not to be lower than the second heating determination temperature Tw2, the operation returns to S710.

In this embodiment, when the cooling of the battery is required, once the battery cell temperature is lower than the first cooling determination temperature Tc1, the supply of the low-temperature coolant to the battery cooler 15 is stopped, which can prevent the reduction in input and output of the battery and in charging efficiency of the battery due to the low battery temperature which is lower than the usable temperature range.

When the battery cell temperature is gradually increased to exceed the second cooling determination temperature Tc2 while the supply of the low-temperature coolant to the battery coolant 15 is stopped, the low-temperature coolant can be supplied to the battery cooler 15 to prevent the battery cell temperature from continuously increasing to much higher than the second cooling determination temperature Tc2.

Likewise, when the heating of the battery is required, once the battery cell temperature exceeds the first heating determination temperature Tw1, the supply of the high-temperature coolant to the battery cooler 15 is stopped, which can prevent the quick degradation of the battery, the decrease in lifetime of the battery, and the breakage of the battery due to the high battery temperature exceeding the usable temperature range.

When the battery cell temperature is gradually decreased to be lower than the second heating determination temperature Tw2 while the supply of the high-temperature coolant to the battery coolant 15 is stopped, the high-temperature coolant can be supplied to the battery cooler 15 to prevent the battery cell temperature from continuously decreasing to much lower than the second heating determination temperature Tw2.

In this embodiment, the battery cooler 15 is composed of a heat pipe type heat exchanger, so that the difference in temperature between the battery cells forming the battery 90 can be reduced by action of the refrigerant even when the supply of the coolant into the battery coolant 15 is stopped.

Seventeenth Embodiment

Figure 62:
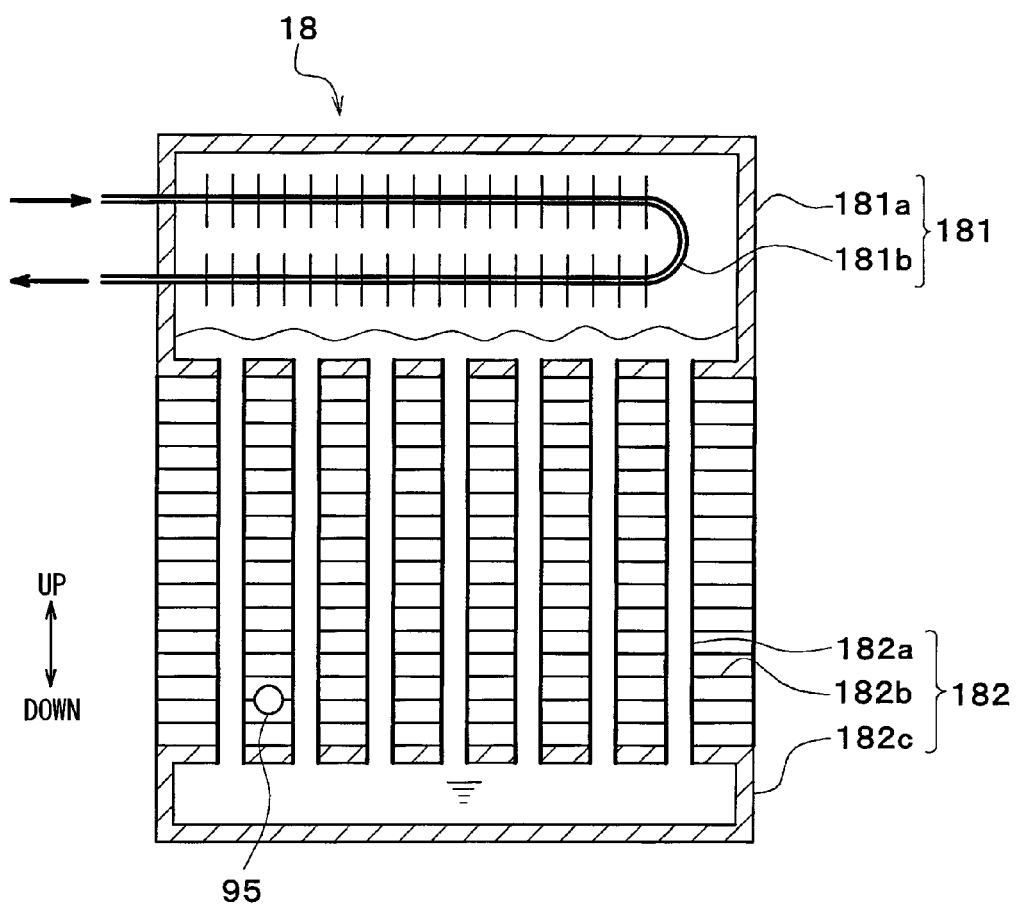
FIG. 62 is a cross-sectional diagram of a battery cooler according to a seventeenth embodiment of the invention.

Although in the above-mentioned sixteenth embodiment, the battery cooler 15 is composed of the heat pipe type heat exchanger, in a seventeenth embodiment, as shown in FIG. 62, the cooler core 18 is composed of a heat pipe type heat exchanger.

The upward and downward arrows shown in FIG. 62 indicate the vertical direction (direction of gravitational force) in a vehicle-mounted state. The cooler core 18 includes a first gas-liquid phase changing portion 181 and a second gas-liquid phase changing portion 182 which are adapted to condense or evaporate the refrigerant. The first gas-liquid phase changing portion 181 includes an upper tank 181a, and a coolant pipe 181b. The second gas-liquid phase changing portion 182 includes tubes 182a, fins 182b, and a lower tank 182c.

A number of the tubes 182a form refrigerant flow paths for allowing the refrigerant to flow therethrough, and are arranged in parallel with each other to have the longitudinal direction thereof directed vertically. Air passages through which the blast air flow into the vehicle interior are formed in between the tubes 182a.

The fins 182b are a heat transfer promoting member for promoting the heat exchange between the refrigerant and the blast air into the vehicle interior by increasing an area of heat transfer between the tube 182a and the blast air into the vehicle interior. The fins 182b are bonded to the outer surfaces of the tubes 182a.

Each of the upper tank 181a and the lower tank 182c is the tank for distributing refrigerant or collecting refrigerants with respect to the tubes 182a. The upper tank 181a is disposed above a large number of tubes 182a, and the lower tank 182c is disposed below a large number of tubes 182a.

The coolant pipe 181b is disposed inside the upper tank 181a. The inlet side of the coolant pipe 181b is connected to the outlet of the first switching valve 19, and the outlet side of the coolant pipe 181b is connected to the inlet of the second switching valve 20.

The refrigerant is sealed in the cooler core 18 in two phases, namely, in gas and liquid phases. Specifically, the refrigerant is sealed in the tubes 182a and lower tank 182c in the liquid phase, and the refrigerant is sealed in the upper tank 181a in the gas phase.

The fins 182b are provided with a cooler core temperature sensor 95 for detecting the temperature of the fins 182b, that is, the surface temperature of the cooler core 18. A detection signal from the cooler core temperature sensor 95 is input to the controller 40.

When the temperature of the coolant flowing into the coolant pipe 181b is low, the gas-phase refrigerant in the upper tank 181a is cooled and condensed by the coolant flowing through the coolant pipe 181b. At this time, when the liquid-phase refrigerant in each tube 182a is heated and evaporates by the blast air into the vehicle interior, the refrigerant circulates through between the upper tank 181a and the tubes 182a, thereby cooling the blast air into the vehicle interior.

Figure 63:
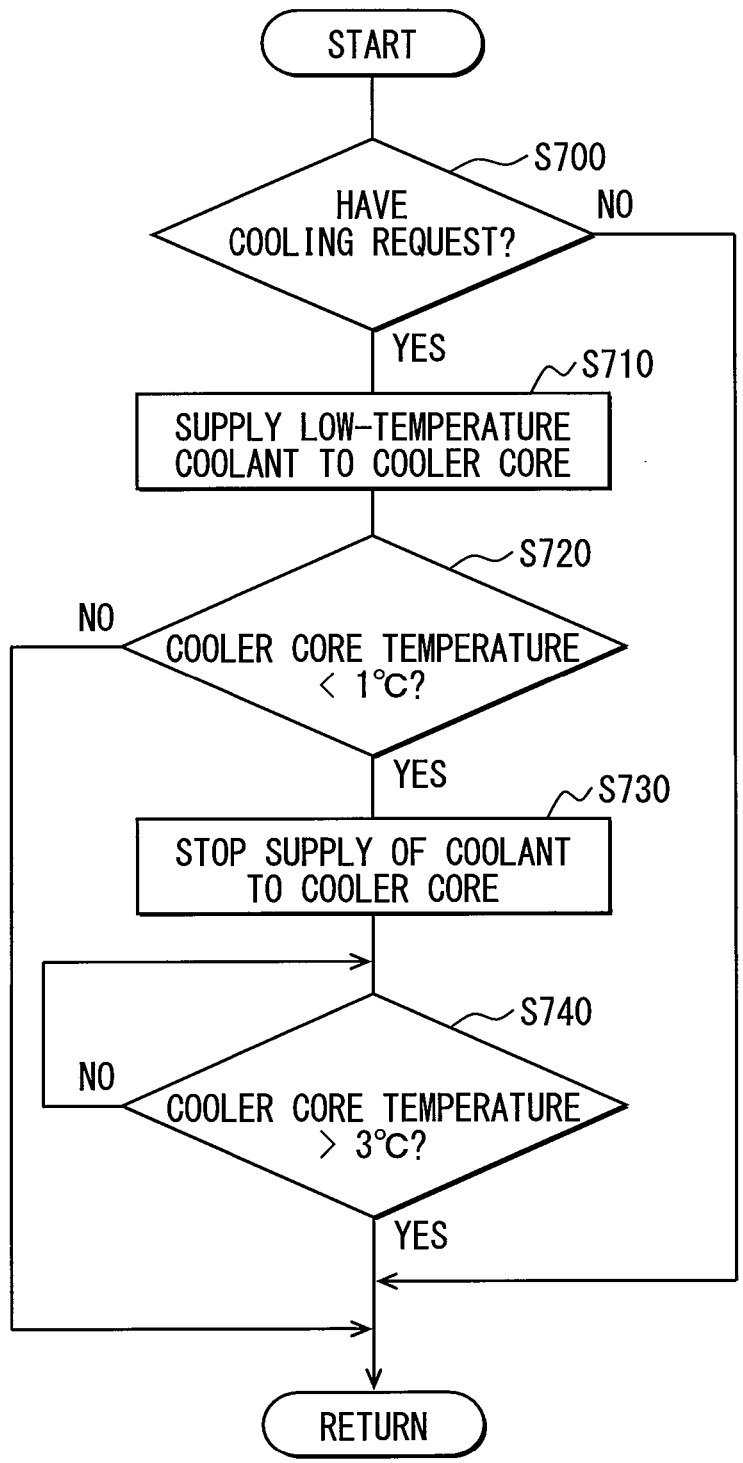
FIG. 63 is a flowchart showing the flow of a control process performed by a controller of the seventeenth embodiment.

A control process executed by the controller 40 of this embodiment will be described with reference to FIG. 63. The controller 40 executes a computer program according to a flowchart of FIG. 63.

In S700, first, it is determined whether the battery is required to be cooled or not. Specifically, when the air conditioning switch 44 is turned on, the cooling is determined to be required. In contrast, when the air conditioning switch 44 is turned off, the cooling is determined not to be required.

When the cooling is determined to be required, the operation proceeds to S710. When the cooling is determined not to be required, the operation returns to S700.

In S710, the operations of the first and second switching valves 19 and 20 are controlled such that the low-temperature coolant (coolant cooled by the coolant cooler 14) is supplied to the cooler core 18. Thus, the blast air into the vehicle interior is cooled in the cooler core 18.

In the following S720, it is determined whether or not the cooler core temperature detected by the cooler core temperature sensor 95 is lower than the first cooling determination temperature Tf1 (for example, 1° C.). The first cooling determination temperature Tf1 is a temperature determined based on the lower limit temperature in a range of temperatures that does not cause the frost formation (frost) on the surface of the cooler core 18, and is previously stored in the controller 40.

When the cooler core temperature is determined to be less than the first cooling determination temperature Tf1, the operation proceeds to S730. When the cooler core temperature is determined not to be less than the first cooling determination temperature Tf1, the operation returns to S700.

In S730, the operations of the first and second switching valves 19 and 20 are controlled such that the supply of the low-temperature coolant to the cooler core 18 is stopped.

In the following S740, it is determined whether or not the cooler core temperature exceeds a second cooling determination temperature Tf2 (for example, 3° C.). The second cooling determination temperature Tf2 is a temperature (for example, 3° C.) which is higher than the first cooling determination temperature Tf1, and is previously stored in the controller 40.

When the cooler core temperature is determined to exceed the second cooling determination temperature Tf2, the operation returns to S700. When the cooler core temperature is determined not to exceed the second cooling determination temperature Tf2, the operation returns to S740.

In this embodiment, when the cooling of the battery is required, once the cooler core temperature becomes lower than the first cooling determination temperature Tf1, the supply of the low-temperature coolant to the cooler core 18 is stopped, which can suppress the generation of the frost formation (frost) on the surface of the cooler core 18.

When the cooler core temperature is gradually increased to exceed the second cooling determination temperature Tf2 while the supply of the low-temperature coolant to the cooler core 18 is stopped, the low-temperature coolant can be supplied to the cooler core 18 to prevent the cooler core temperature from continuously increasing to much higher than the second cooling determination temperature Tf2.

Other Embodiments

The present disclosure is not limited to the above-mentioned embodiments, and various modifications and changes can be made to the disclosed embodiments as follows.

(1) Various devices can be used as the temperature adjustment devices. For example, the temperature adjustment device for use may be a heat exchanger incorporated in a seat where a passenger sits and adapted to cool and heat the seat by coolant. The number of temperature adjustment devices may be any number as long as the number is a plural number (two or more).

(2) The above first embodiment shows one example of the arrangement pattern of holes formed in valve elements of the first and second switching valves 19 and 20. However, the arrangement pattern of holes formed in the valve elements of the first and second switching valves 19 and 20 can be changed in various manners.

The communication state between the inlet and outlet for the coolant can be changed in a variety of ways by modifying the arrangement pattern of the holes formed in the valve elements of the first and second switching valves 19 and 20, which can easily adapt to the change of specifications, including addition of an operating mode and the like.

(3) Although in the above first embodiment, the switching is performed among the first to third modes based on the outside air temperature detected by the outside air sensor 42, the switching among the first to third modes may be performed based on the coolant temperature detected by the water temperature sensor 43.

(4) Although in the above third embodiment, the cold energy stored in the battery is used to supercool the high-pressure refrigerant of the refrigeration cycle 22 in the second mode, the cold energy stored in the battery may be used to cool the air of the vehicle interior, the inverter, and the like.

(5) In the embodiments described above, the coolant cooler 14 for cooling the coolant by the low-pressure refrigerant of the refrigeration cycle 22 is used as the cooler for cooling the coolant down to a lower temperature than the outside air temperature. However, a Peltier device may be used as the cooler.

(6) In each of the above-mentioned embodiments, the coolant may intermittently circulate through the battery cooler 15 to thereby control the cooling capacity for the battery.

(7) In each of the above-mentioned embodiments, the switching may be performed between a state of circulation of the intermediate-temperature coolant through the exhaust gas cooler 17 and another state of circulation of the low-temperature coolant therethrough according to a load on an engine. When a load on the engine is small, for example, while the vehicle is traveling in midtown, the switching can be performed to the low-temperature coolant circulation to cool the exhaust gas by the refrigeration cycle 22, resulting in an increase in density of exhaust gas returned to the engine intake side, thereby improving the fuel efficiency.

(8) In each of the above-mentioned embodiments, the coolant is used as the heat medium for cooling or heating the temperature adjustment device. Alternatively, various kinds of media, such as oil, may be used as the heat medium.

(9) The refrigeration cycle 22 of each of the above embodiments employs a fluorocarbon refrigerant as the refrigerant. However, the kind of the refrigerant is not limited thereto. Specifically, a natural refrigerant, such as carbon dioxide, a hydrocarbon-based refrigerant, and the like may also be used as the refrigerant.

The refrigeration cycle 22 of each of the above embodiments forms a subcritical refrigeration cycle whose high-pressure side refrigerant pressure does not exceed a critical pressure of the refrigerant. Alternatively, the refrigeration cycle 22 may form a supercritical refrigeration cycle whose high-pressure side refrigerant pressure exceeds the critical pressure of the refrigerant.

(10) In each of the above-mentioned embodiments, the vehicle thermal management system of the present disclosure is applied to the hybrid car by way of example. Alternatively, the present disclosure may be applied to an electric vehicle which obtains a driving force for traveling from an electric motor for traveling without including an engine.

(11) In the above twelfth to fifteenth embodiments, the three-way vale 82 is adapted to switching between opening and closing of the circulation flow path 80 and the flow path 84 for the battery cooler by the three-way valve 82. Alternatively, the three-way valve 82 is removed, and then a check valve may be provided in the circulation flow path 80.

In this case, the first and second switching valve 19 and 20 close the flow path 84 for the battery cooler, so that the switching can be performed to the circulation mode (second cooling mode, second heating mode, battery temperature equalization operating mode, or second cooling mode). Alternatively, the switching can also be performed to the circulation mode by causing the first switching valve 19 to connect the flow path 84 for the battery cooler to one of the first and second coolant circuits, and also causing the second switching valve 20 to connect the flow path 84 for the battery cooler to the other of the first and second coolant circuits.

(12) In the twelfth to fifteenth embodiments, the internal circulation circuit is formed in the battery cooler 15 or cooler core 18 by way of example. However, the invention is not limited thereto, and the internal circulation circuit may be formed for other temperature adjustment devices.

For example, the internal circulation circuit may be formed for the inverter cooler 16. Thus, the cooling capacity of the inverter can be adjusted to be prevented from excessively increasing due to the introduction of the low-temperature coolant into the inverter cooler 16 on traveling conditions with the small amount of heat generated by the inverter.

(13) Although in the above sixteenth embodiment, the coolant is intermittently supplied into the battery cooler 15 according to the temperature of the battery 90, the flow rate of the coolant supplied to the battery cooler 15 may be adjusted according to the temperature of the battery 90.

Likewise, although in the above seventeenth embodiment, the coolant is intermittently supplied into the cooler core 18 according to the temperature of the cooler core 18, the flow rate of the coolant supplied to the cooler core 18 may be adjusted according to the temperature of the cooler core 18.

The flow rate of the coolant can be adjusted by controlling the operation of at least one of the first and second switching valves 19 and 20.

(14) The cooler core 18 of the above seventeenth embodiment may be provided with a refrigerant pipe for returning the refrigerant condensed in the upper tank 181a directly to the lower tank 182c.

What is claimed is:
1. A vehicle thermal management system comprising:
a first pump and a second pump drawing and discharging a heat medium;
a heat medium heat exchanger that exchanges heat between the heat medium and outside air;
a plurality of temperature adjustment devices with temperatures adjusted by the heat medium, each of the temperature adjustment devices having a flow path that allows the heat medium to flow therethrough;
a first switching valve that switches an inflow state of the heat medium flowing into each of the temperature adjustment devices between one state in which the heat medium discharged from the first pump flows to the temperature adjustment devices, and another state in which the heat medium discharged from the second pump flows to the temperature adjustment devices, wherein a heat medium discharge side of the first pump and a heat medium discharge side of the second pump are connected in parallel with each other, and respective heat medium inlet sides of the temperature adjustment devices are connected in parallel with each other;
a second switching valve that switches an outflow state of the heat medium from each of the temperature adjustment devices between one state in which the heat medium flowing out of the temperature adjustment devices flows to the first pump, and another state in which the heat medium flowing out of the temperature adjustment devices flows to the second pump, wherein a heat medium suction side of the first pump and a heat medium suction side of the second pump are connected in parallel with each other, and respective heat medium outlet sides of the temperature adjustment devices are connected in parallel with each other; and
a controller that controls operations of the first switching valve and the second switching valve to switch between (i) one circulation state of the heat medium circulating between the first pump and the temperature adjustment devices, and (ii) another circulation state of the heat medium circulating between the second pump and the temperature adjustment devices.
2. The vehicle thermal management system according to claim 1, further comprising
a detector that detects a temperature in connection with a temperature of the heat medium after being heat-exchanged at the heat medium heat exchanger, wherein the controller controls the operations of the first switching valve and the second switching valve according to the temperature detected by the detector.

3. The vehicle thermal management system according to claim 2, further comprising
a cooler that cools the heat medium discharged from the second pump to a temperature lower than an outside air temperature, wherein
the heat medium heat exchanger exchanges heat between outside air and the heat medium discharged from the first pump, and
the controller controls the operations of the first switching valve and the second switching valve such that when the temperature detected by the detector is lower than a predetermined temperature, the heat medium circulates between the first pump and all of the temperature adjustment devices, and such that when the temperature detected by the detector is higher than the predetermined temperature, the number of the temperature adjustment devices through which the heat medium circulates with respect to the second pump is increased as the temperature detected by the detector increases.

4. The vehicle thermal management system according to claim 3, wherein
the temperature adjustment devices have different required cooling temperatures, and
the controller controls the first switching valve and the second switching valve such that when the temperature detected by the detector is higher than a predetermined temperature, the heat medium circulates between the second pump and the temperature adjustment devices in order of increasing the required cooling temperature from a lowest one as the temperature detected by the detector increases.

5. The vehicle thermal management system according to claim 2, further comprising
a low-pressure side heat exchanger that exchanges heat between the heat medium and a low-pressure refrigerant of the refrigeration cycle, wherein
a heat medium inlet side of the low-pressure side heat exchanger is connected to the first switching valve,
a heat medium outlet side of the low-pressure side heat exchanger is connected to the second switching valve,
the first switching valve switches between an inflow state of the heat medium discharged from the first pump into the low-pressure side heat exchanger, and another inflow state of the heat medium discharged from the second pump into the low-pressure side heat exchanger,
the second switching valve switches between an outflow state of the heat medium flowing out of the low-pressure side heat exchanger into the first pump, and another outflow state of the heat medium flowing out of the low-pressure side heat exchanger into the second pump,
one device among the temperature adjustment devices is a high-pressure side heat exchanger exchanging heat between the heat medium and a high-pressure refrigerant of the refrigeration cycle,
the heat medium heat exchanger is adapted to exchange heat between outside air and the heat medium discharged from the first pump, and
the controller controls the first switching valve and the second switching valve, such that the heat medium circulates between the low-pressure side heat exchanger and the first pump, and the heat medium circulates between the high-pressure side heat exchanger and the second pump, when the temperature detected by the detector is lower than a predetermined temperature.

6. The vehicle thermal management system according to claim 5, further comprising
a heating heat exchanger that heats air to be blown into an interior of the vehicle by using the heat medium after being heat-exchanged at the high-pressure side heat exchanger.

7. The vehicle thermal management system according to claim 5, being applied to a vehicle capable of charging a battery with an electric power supplied from an external power source, the vehicle thermal management system further comprising:
a supercooler that cools the refrigerant after being heat-exchanged at the high-pressure side heat exchanger, by using the heat medium; and
an opening/closing valve opening or closing a refrigerant flow path in which the refrigerant flowing into the low-pressure side heat exchanger flows, wherein one device among the temperature adjustment devices is a battery cooler that cools the battery by using the heat medium,
the supercooler is provided such that the heat medium after flowing through the low-pressure side heat exchanger and the battery cooler flows to the supercooler, and
the controller opens the opening/closing valve when the battery is being charged with the electric power supplied from the external power source, and closes the opening/closing valve after the battery is charged with the electric power supplied from the external power source.

8. The vehicle thermal management system according to claim 7, wherein
a heat medium inlet side of the supercooler is connected to the first switching valve, and
a heat medium outlet side of the supercooler is connected to a heat medium inlet side of the battery cooler.

9. The vehicle thermal management system according to claim 1, further comprising
a cooler that cools the heat medium discharged from the second pump to a temperature lower than an outside air temperature, wherein
the heat medium heat exchanger is adapted to exchange heat between outside air and the heat medium discharged from the first pump,
two of the temperature adjustment devices are a battery cooler that cools a battery by using the heat medium, and an inverter cooler that cools an inverter with a smaller heat capacity than that of the battery, by using the heat medium, and
the controller controls the first switching valve and the second switching valve such that when a temperature of the inverter is higher than a predetermined temperature, the heat medium circulates between the inverter cooler as the temperature adjustment device and the second pump, and the heat medium circulates between the battery cooler as the temperature adjustment device and the first pump.

10. The vehicle thermal management system according to claim 1, further comprising
a heating heat exchanger that heats air to be blown into a vehicle interior by using the heat medium, wherein
a heat medium inlet side of the heating heat exchanger is connected to the first switching valve, a heat medium outlet side of the heating heat exchanger is connected to the second switching valve, the first switching valve switches an inflow state of the heat medium to the heating heat exchanger between a state in which the heat medium discharged from the first pump flows into the heating heat exchanger and another state in which the heat medium discharged from the second pump flows into the heating heat exchanger, the second switching valve switches an outflow state of the heat medium from the heating heat exchanger between a state in which the heat medium from the heating heat exchanger flows into the first pump and another state in which the heat medium from the heating heat exchanger flows into the second pump, one of the temperature adjustment devices is a battery cooler that cools a battery by using the heat medium, the heat medium heat exchanger is adapted to exchange heat between outside air and the heat medium discharged from the first pump, and the controller controls the first switching valve and the second switching valve such that when the temperature detected by the detector is lower than a predetermined temperature, the heat medium circulates between the second pump and each of the battery cooler and the heating heat exchanger.

11. The vehicle thermal management system according to claim 1, wherein the first switching valve is adapted to switch a flow of the heat medium among (i) two inlets individually connected one by one to a heat medium discharge side of the first pump and a heat medium discharge side of the second pump, respectively, and (ii) a plurality of outlets individually connected one by one to respective heat medium inlet sides of the temperature adjustment devices, and the second switching valve is adapted to switch the flow of the heat medium among (i) a plurality of inlets individually connected one by one to respective heat medium outlet sides of the temperature adjustment devices, and (ii) two outlets individually connected one by one to a heat medium discharge side of the first pump and a heat medium discharge side of the second pump, respectively.

12. The vehicle thermal management system according to claim 1, further comprising a third pump disposed in a circulation flow path through which the heat medium circulates without passing through the first switching valve and the second switching valve, the third pump being adapted to suck and discharge the heat medium, wherein at least one temperature adjustment device among the temperature adjustment devices allows both the heat media to flow therethrough, the both heat media including (i) the heat medium flowing through a non-circulation flow path from the first switching valve to the second switching valve via the at least one temperature adjustment device, and (ii) the heat medium flowing through the circulation flow path, and the first switching valve and the second switching valve is capable of switching between a non-circulation mode that allows the heat medium flowing through the non-circulation flow path to flow through the at least one temperature adjustment device, and a circulation mode that allows the heat medium circulating through the circulation flow path to flow through the at least one temperature adjustment device.

13. The vehicle thermal management system according to claim 12, wherein the first switching valve and the second switching valve are operated to switch between the circulation mode and the non-circulation mode by switching a flow of the heat medium with respect to the non-circulation flow path.

14. The vehicle thermal management system according to claim 12, further comprising a circulation switching valve for switching between opening and closing of each of the non-circulation flow path and the circulation flow path.

15. The vehicle thermal management system according to claim 12, wherein the circulation mode or the non-circulation mode is switched based on an inflow heat medium temperature which is a temperature of the heat medium flowing into the at least one temperature adjustment device.

16. The vehicle thermal management system according to claim 15, wherein in a cooling operation of the at least one temperature adjustment device, the circulation mode is switched when the inflow heat medium temperature is equal to or lower than a first cooling determination temperature, and the non-circulation mode is switched when the inflow heat medium temperature is equal to or higher than a second cooling determination temperature which is higher than the first cooling determination temperature.

17. The vehicle thermal management system according to claim 16, wherein the at least one temperature adjustment device is a battery cooler that cools a battery by using the heat medium, and the first cooling determination temperature is a temperature determined based on a lower limit temperature in a range of usable temperatures of the battery.

18. The vehicle thermal management system according to claim 16, wherein the at least one temperature adjustment device is an air cooler that cools air to be blown into an interior of a vehicle by using the heat medium, and the first cooling determination temperature is a temperature determined based on a lower limit temperature in a range of temperatures that do not cause frost formation on the air cooler.

19. The vehicle thermal management system according to claim 15, wherein in a heating operation of the at least one temperature adjustment device, the circulation mode is switched when the inflow heat medium temperature is equal to or higher than a first heating determination temperature, and the non-circulation mode is switched when the inflow heat medium temperature is equal to or lower than a second heating determination temperature which is lower than the first heating determination temperature.

20. The vehicle thermal management system according to claim 19, wherein the at least one temperature adjustment device is a device that heats a battery by using the heat medium, and the first heating determination temperature is a temperature determined based on an upper limit temperature in a range of usable temperatures of the battery.

21. The vehicle thermal management system according to claim 1, wherein the at least one temperature adjustment device is a heat-pipe heat exchanger which includes a first gas-liquid phase changing portion that condenses or evaporates a working fluid by exchanging heat between the heat medium and the working fluid, and a second gas-liquid phase changing portion that evaporates or condenses the working fluid by absorbing or dissipating heat in or from the working fluid.

22. The vehicle thermal management system according to claim 21, wherein the controller controls an operation of at least one of the first switching valve, the second switching valve, the first pump, and the second pump, to adjust a flow rate of the heat medium flowing into the at least one temperature adjustment device.

23. The vehicle thermal management system according to claim 21, wherein the at least one temperature adjustment device is a battery cooler that cools and condenses the working fluid having absorbed heat from the battery.

24. The vehicle thermal management system according to claim 21, wherein the at least one temperature adjustment device is an air cooler that cools and condenses the working fluid having absorbed heat from air blown into the vehicle interior.

* * * * *